United States Patent
Jacobs et al.

(10) Patent No.: US 10,349,744 B2
(45) Date of Patent: *Jul. 16, 2019

(54) POWERED CHAIRS FOR PUBLIC VENUES, ASSEMBLIES FOR USE IN POWERED CHAIRS, AND COMPONENTS FOR USE IN ASSEMBLIES FOR USE IN POWERED CHAIRS

(71) Applicants: Matthew D. Jacobs, Holland, MI (US); Frederick D. Jacobs, Holland, MI (US); Terry Plumert, Grand Haven, MI (US)

(72) Inventors: Matthew D. Jacobs, Holland, MI (US); Frederick D. Jacobs, Holland, MI (US); Terry Plumert, Grand Haven, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/919,172

(22) Filed: Mar. 12, 2018

(65) Prior Publication Data

US 2018/0271286 A1    Sep. 27, 2018

Related U.S. Application Data

(63) Continuation-in-part of application No. 15/800,182, filed on Nov. 1, 2017, and a continuation-in-part of
(Continued)

(51) Int. Cl.
*E04H 3/10*   (2006.01)
*A47C 1/024*   (2006.01)
(Continued)

(52) U.S. Cl.
CPC .......... *A47C 1/0242* (2013.01); *A47C 1/0355* (2013.01); *A47C 1/124* (2013.01);
(Continued)

(58) Field of Classification Search
CPC ......... A47C 1/022; A47C 1/00; A47C 1/0242; A47C 3/025; A47C 7/506; A47C 1/0342;
(Continued)

(56) References Cited

U.S. PATENT DOCUMENTS 4,294,048 A  10/1981  Sutter
4,850,645 A   7/1989  Crockett
(Continued)

FOREIGN PATENT DOCUMENTS

EP    1884225 A1   2/2008
JP    11318623    11/1999

OTHER PUBLICATIONS

Extended European Search Report and Search Opinion, dated Nov. 23, 2018.
(Continued)

*Primary Examiner* — Chi Q Nguyen
(74) *Attorney, Agent, or Firm* — James E. Shultz, Jr.

(57) ABSTRACT

Powered recliner chairs, assemblies for use in the chairs, and components for use in the assemblies are provided. Electrical systems for use in the chairs, and components for use in the electrical systems are provided. Control systems and methods for operating powered recliner chairs are also provided. Any given chair may be locally and/or remotely controlled.

30 Claims, 115 Drawing Sheets

Related U.S. Application Data application No. 15/675,865, filed on Aug. 14, 2017, now Pat. No. 9,943,174, and a continuation-in-part of application No. 15/710,768, filed on Sep. 20, 2017.

(60) Provisional application No. 62/631,457, filed on Feb. 15, 2018, provisional application No. 62/477,421, filed on Mar. 27, 2017.

(51) Int. Cl.

| | | |
|---|---|---|
| *A47C 1/124* | (2006.01) | |
| *A47C 7/72* | (2006.01) | |
| *A47C 31/00* | (2006.01) | |
| *A47C 7/74* | (2006.01) | |
| *A63J 99/00* | (2009.01) | |
| *A47C 1/0355* | (2013.01) | |
| *A47C 7/70* | (2006.01) | |
| *A47C 1/13* | (2006.01) | |
| *A47C 7/54* | (2006.01) | |
| *G05B 19/402* | (2006.01) | |
| *A63J 5/00* | (2006.01) | |
| *A63J 25/00* | (2009.01) | |
| *A47C 7/38* | (2006.01) | |
| *A47C 7/62* | (2006.01) | |
| *A61G 5/14* | (2006.01) | |
| *A47C 7/50* | (2006.01) | |

(52) U.S. Cl.
CPC ............. *A47C 1/13* (2013.01); *A47C 7/38* (2013.01); *A47C 7/54* (2013.01); *A47C 7/624* (2018.08); *A47C 7/70* (2013.01); *A47C 7/723* (2018.08); *A47C 7/725* (2013.01); *A47C 7/727* (2018.08); *A47C 7/744* (2013.01); *A47C 7/748* (2013.01); *A47C 31/008* (2013.01); *A63J 5/00* (2013.01); *A63J 25/00* (2013.01); *A63J 99/00* (2013.01); *G05B 19/402* (2013.01); *A47C 7/506* (2013.01); *A61G 5/14* (2013.01); *A63J 2005/002* (2013.01); *A63J 2005/006* (2013.01); *G05B 2219/40175* (2013.01)

(58) Field of Classification Search
CPC ....... A47C 1/035; A47C 31/008; B64D 11/06; B64D 11/0601; B64D 25/04
USPC ... 297/330, 217.2, 217.3, 88, 217.6, 344.12, 297/354.12, 68, 85 M, 248, 232, 463.1, 297/362.11; 340/664, 657, 687, 691.1; 601/26; 244/118.6; 74/490.07, 469, 74/473.12; 52/6
See application file for complete search history.

(56) References Cited

U.S. PATENT DOCUMENTS

| | | |
|---|---|---|
| 5,061,010 A | 10/1991 | Lapointe |
| 5,893,608 A | 4/1999 | Cravenor |
| 5,954,508 A | 9/1999 | Lo |
| 6,840,575 B2 | 1/2005 | Hesse |
| 7,152,922 B2 | 12/2006 | Garland |
| 7,172,155 B2 | 2/2007 | Feist |
| 7,309,101 B2 | 12/2007 | True |
| 7,633,401 B1 | 12/2009 | Copley |
| 8,585,142 B2 | 11/2013 | Jameie |
| 8,646,837 B2 | 2/2014 | Bovelli |
| 8,783,781 B1 | 7/2014 | McClure |
| 9,140,027 B2 | 9/2015 | Ramirez Magana |
| 9,234,363 B1 | 1/2016 | Ramirez Magana |
| 9,655,458 B2 * | 5/2017 | Jacobs ................ A47C 1/029 |
| 9,730,518 B1 * | 8/2017 | Jacobs ................ A47C 31/008 |
| 9,730,524 B2 | 8/2017 | Chen |
| 9,808,085 B1 * | 11/2017 | Jacobs ................ A47C 1/121 |
| 9,943,174 B1 * | 4/2018 | Jacobs ................ A47C 31/008 |
| 9,993,080 B2 * | 6/2018 | Jacobs ................ A47C 7/30 |
| 2001/0035668 A1 | 11/2001 | Gaffney |
| 2003/0025366 A1 | 2/2003 | Barreiro, Jr. |
| 2004/0004376 A1 | 1/2004 | Cabebe |
| 2004/0232283 A1 | 11/2004 | Ferry |
| 2005/0073180 A1 | 4/2005 | Reed |
| 2006/0032979 A1 | 2/2006 | Mitchell |
| 2006/0061148 A1 | 3/2006 | Polland |
| 2006/0103193 A1 | 5/2006 | Kramer |
| 2008/0002390 A1 | 1/2008 | Paillard |
| 2008/0185888 A1 | 8/2008 | Beall |
| 2009/0072604 A1 | 3/2009 | Browne |
| 2009/0105046 A1 | 4/2009 | Rudich |
| 2009/0152915 A1 | 6/2009 | Krasna |
| 2009/0152917 A1 | 6/2009 | Ostler |
| 2010/0217164 A1 | 8/2010 | Meyer |
| 2010/0320819 A1 | 12/2010 | Cohen |
| 2011/0266841 A1 | 11/2011 | Tanaka |
| 2012/0203378 A1 | 4/2012 | Yank, III |
| 2012/0132746 A1 | 5/2012 | Sizelove |
| 2012/0215363 A1 | 8/2012 | Menard et al. |
| 2012/0289312 A1 | 11/2012 | Hamlin |
| 2014/0070588 A1 | 3/2014 | Wittenberg, Jr. |
| 2014/0257571 A1 | 3/2014 | Chen |
| 2014/0152068 A1 | 6/2014 | Hille |
| 2014/0197666 A1 | 7/2014 | Koch |
| 2014/0259967 A1 | 9/2014 | Ferjuson |
| 2014/0265497 A1 | 9/2014 | Hough |
| 2014/0265502 A1 | 9/2014 | Hough |
| 2014/0292047 A1 | 10/2014 | Boyer, Jr. |
| 2015/0025688 A1 | 1/2015 | Hille |
| 2015/0076891 A1 | 3/2015 | Lapointe |
| 2015/0112542 A1 | 4/2015 | Fuglewicz |
| 2015/0120340 A1 | 4/2015 | Cheatham |
| 2016/0096626 A1 | 4/2016 | Hoch |
| 2016/0100686 A1 | 4/2016 | Regev |
| 2016/0242548 A1 | 8/2016 | Barnum |
| 2017/0303697 A1 | 10/2017 | Chen |
| 2018/0271286 A1 * | 9/2018 | Jacobs ................ G05B 19/402 |

OTHER PUBLICATIONS

Communication pursuant to Rule 164(1) EPC—Partial Supplementary European Search Report.

* cited by examiner

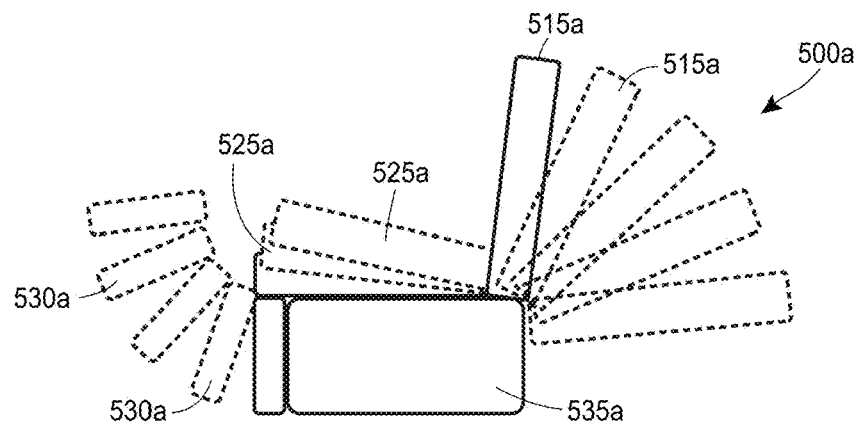
FIG. 5A
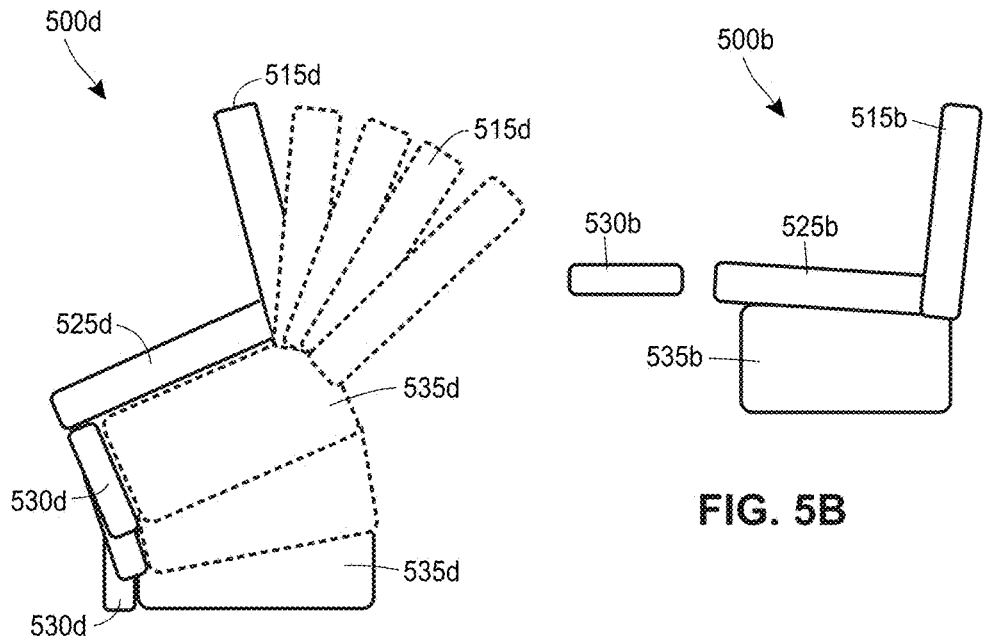
FIG. 5D
FIG. 5B
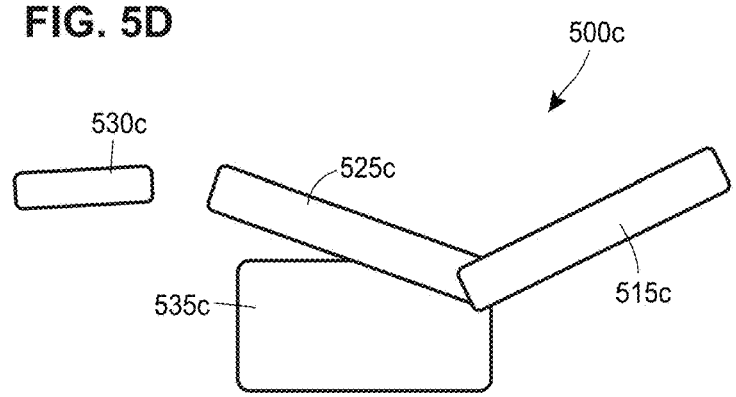
FIG. 5C

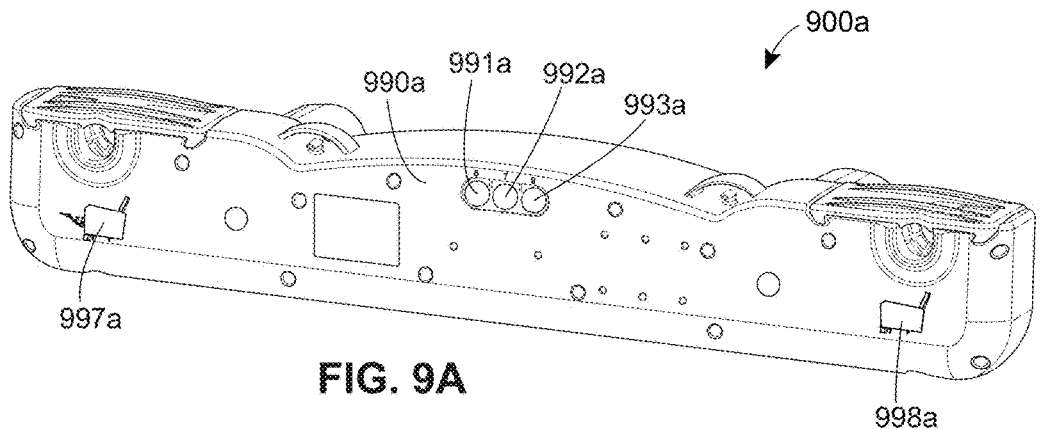
FIG. 9A
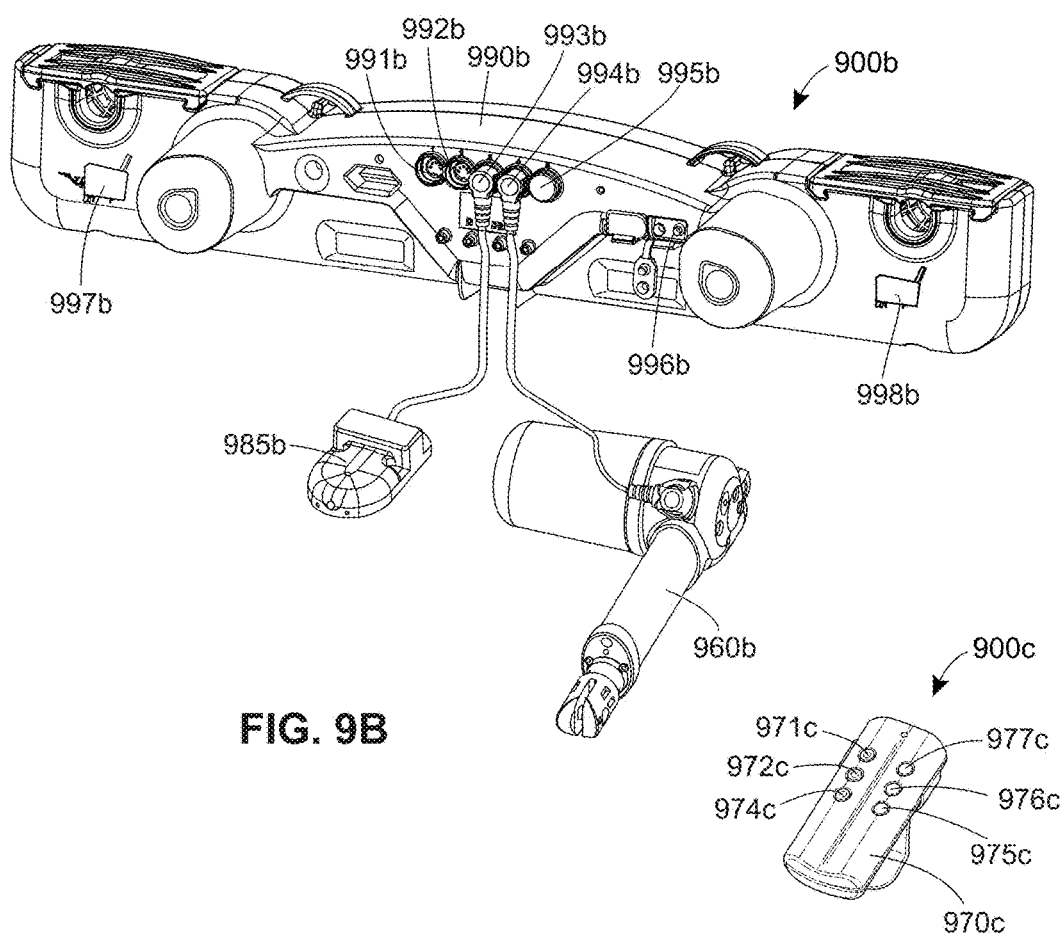
FIG. 9B
FIG. 9C

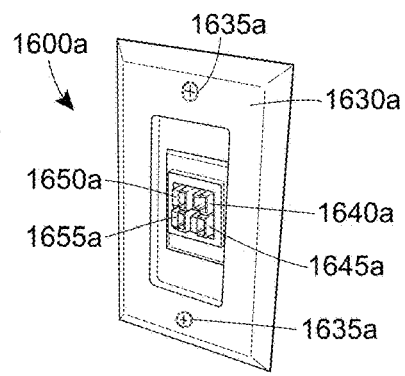
FIG. 16A
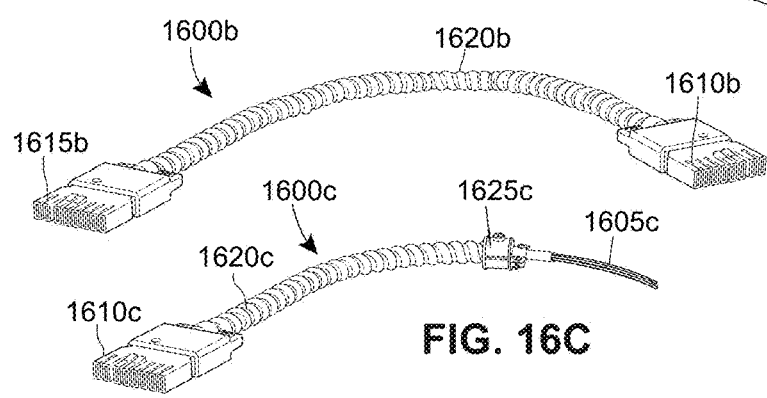
FIG. 16B
FIG. 16C
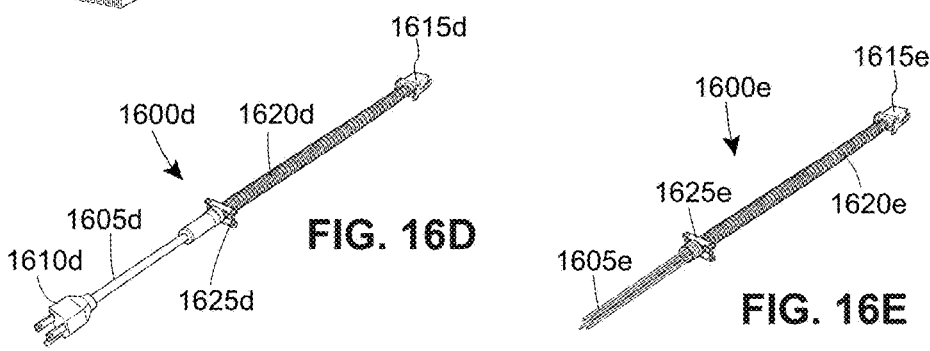
FIG. 16D
FIG. 16E
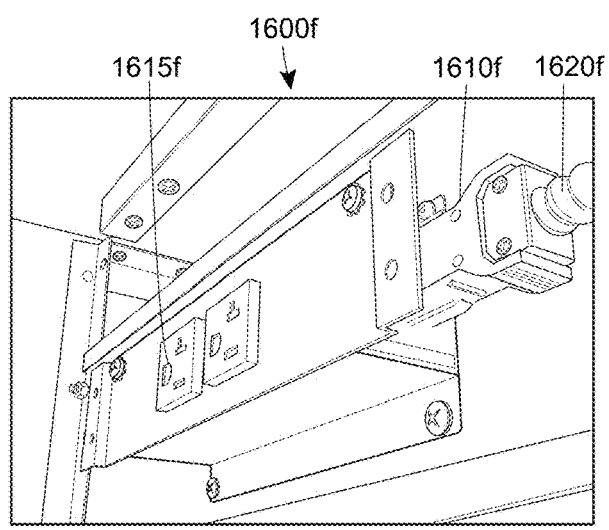
FIG. 16F

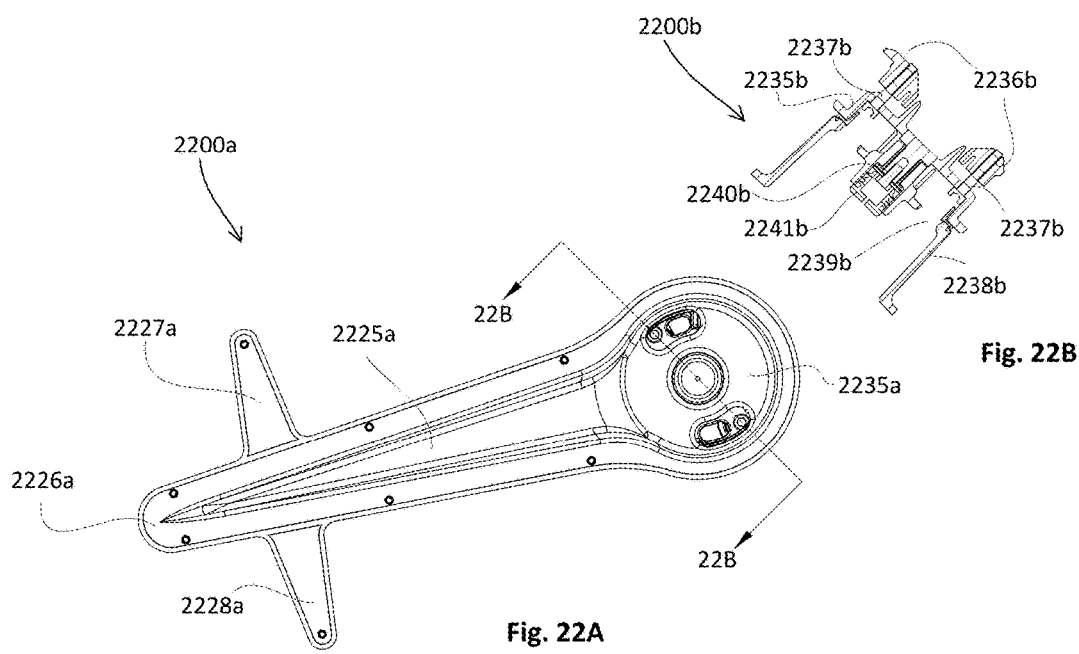
Fig. 22A
Fig. 22B
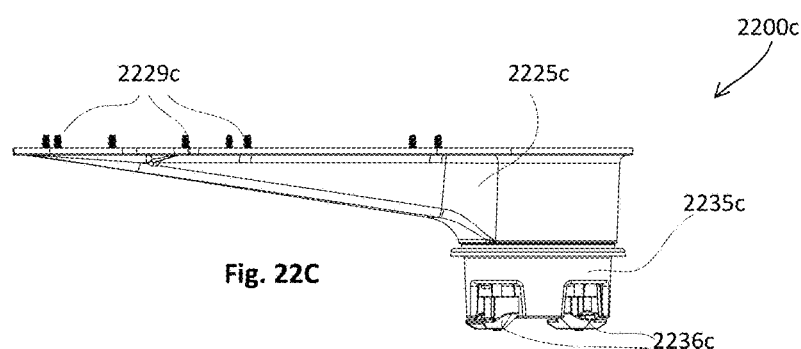
Fig. 22C
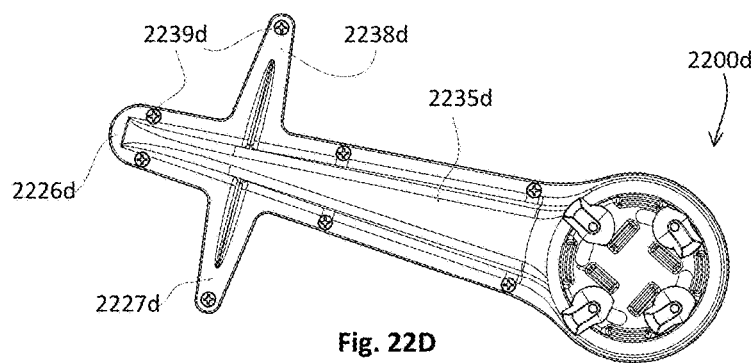
Fig. 22D

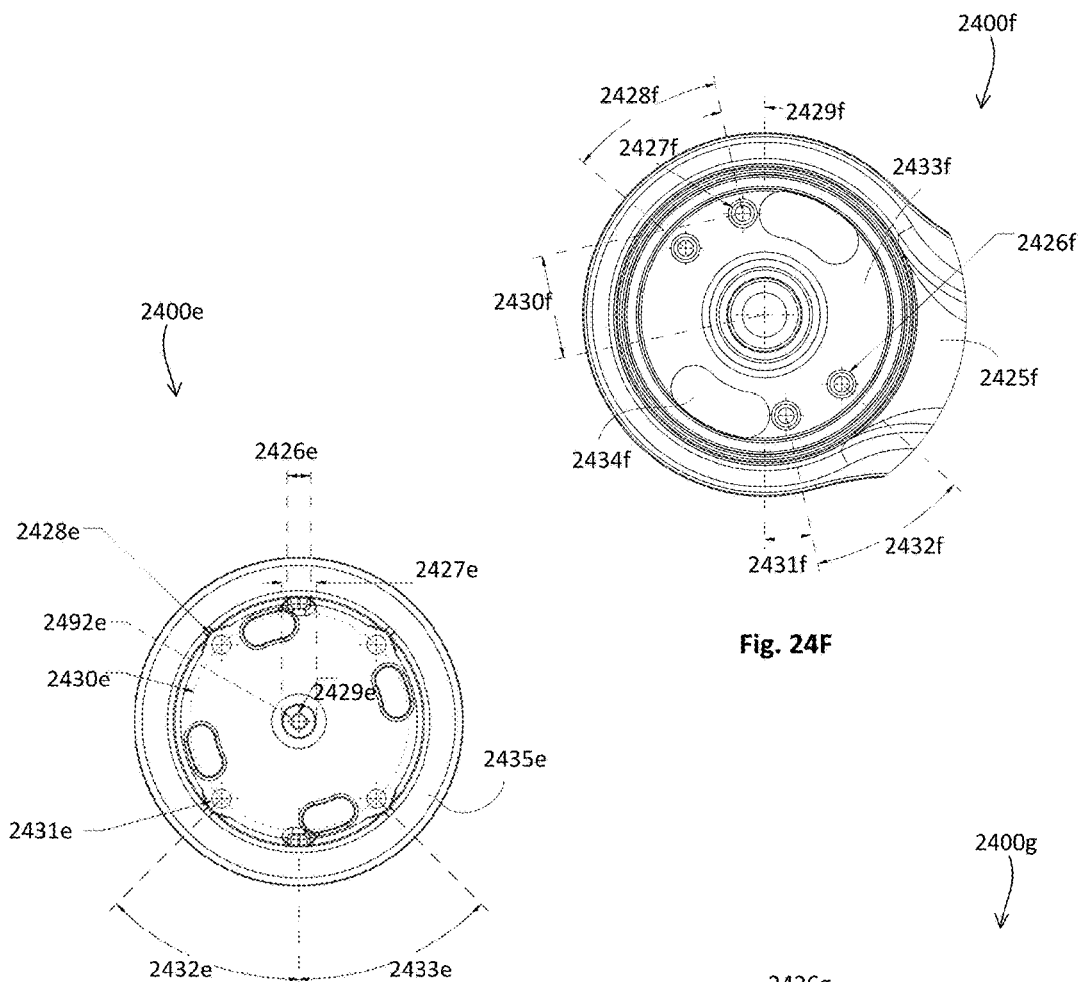
Fig. 24F
Fig. 24E
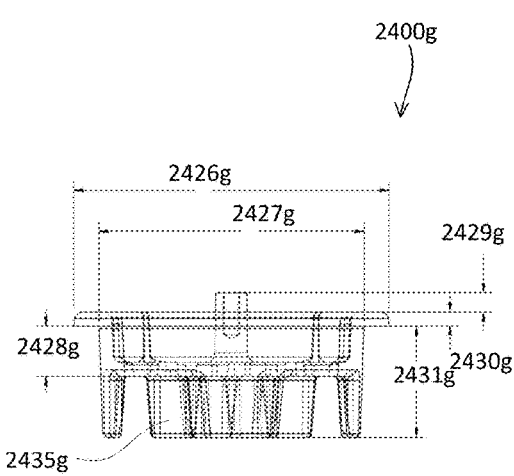
Fig. 24G

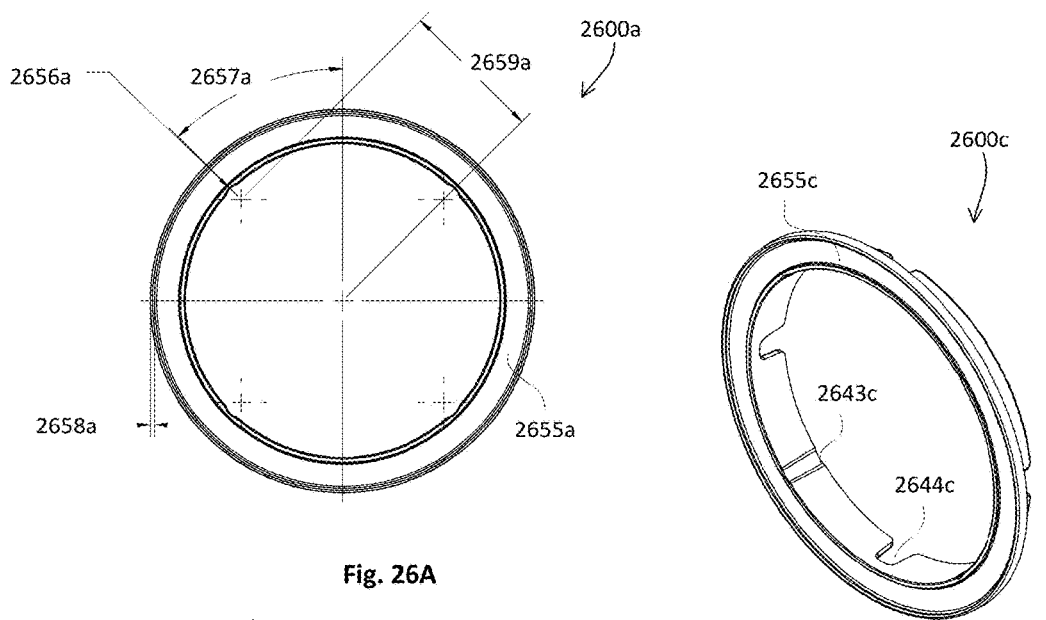
Fig. 26A
Fig. 26C
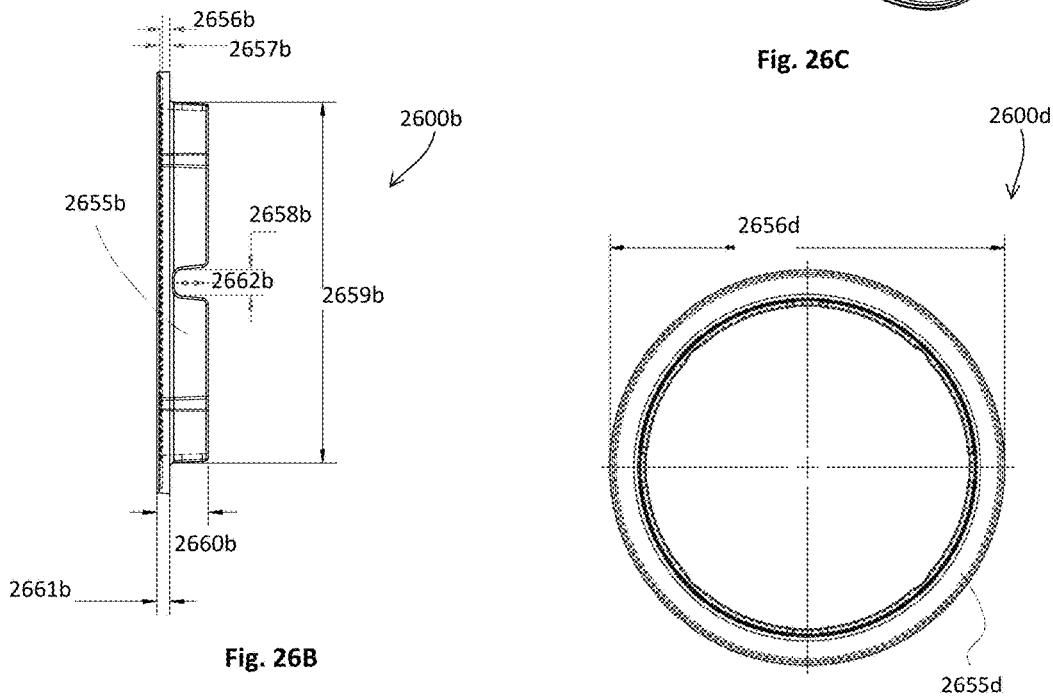
Fig. 26B
Fig. 26D

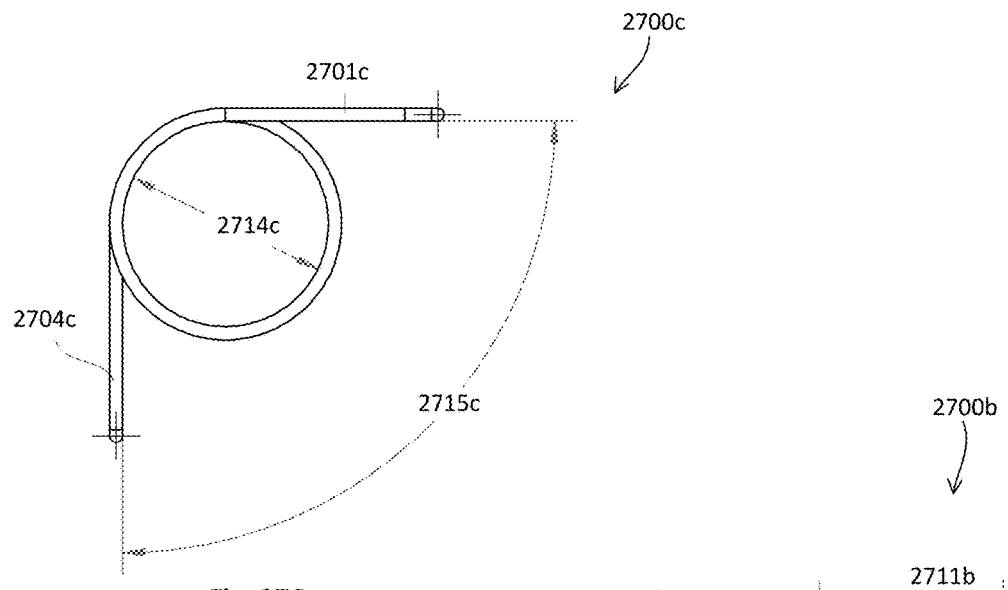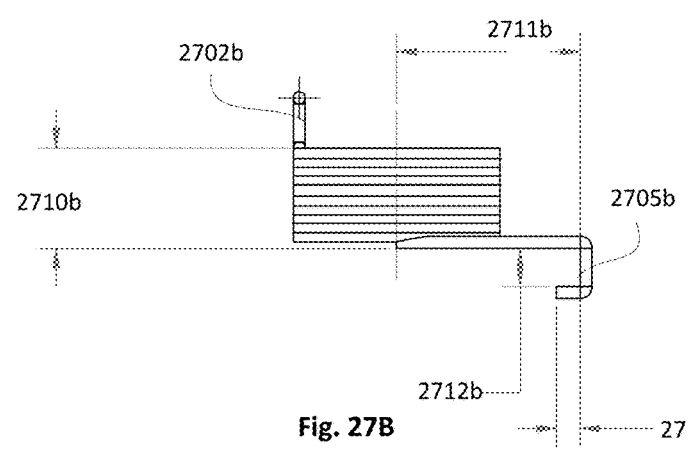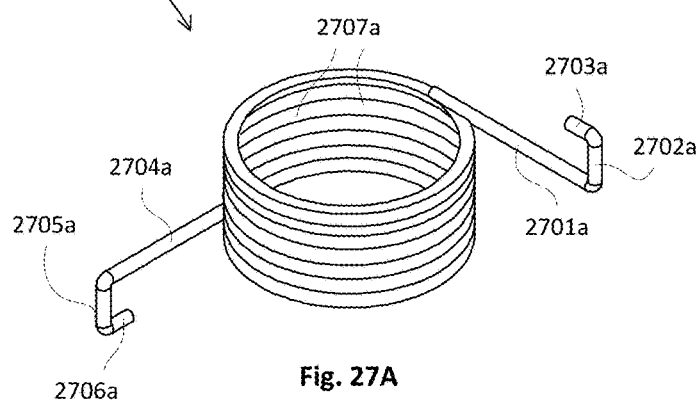

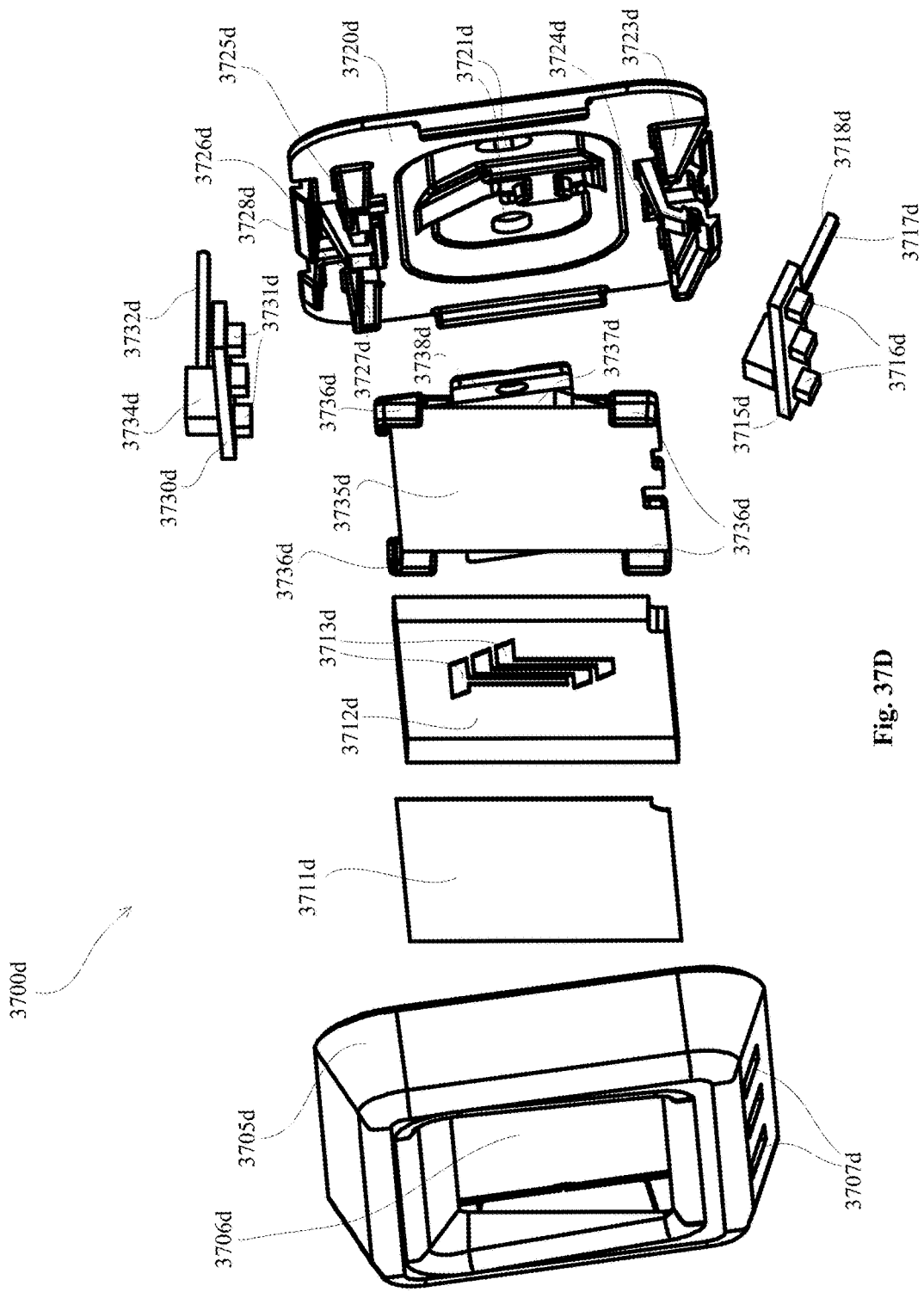

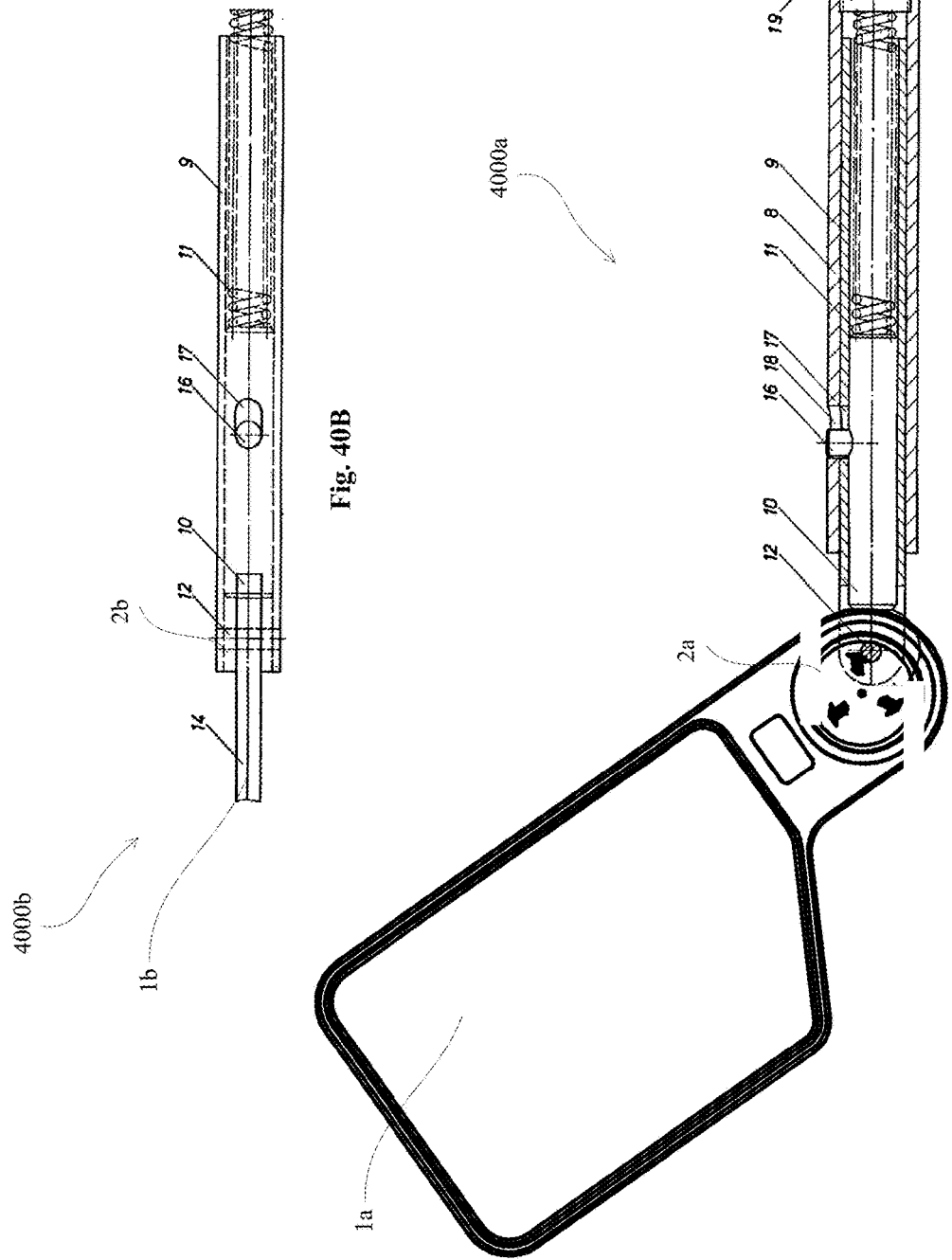

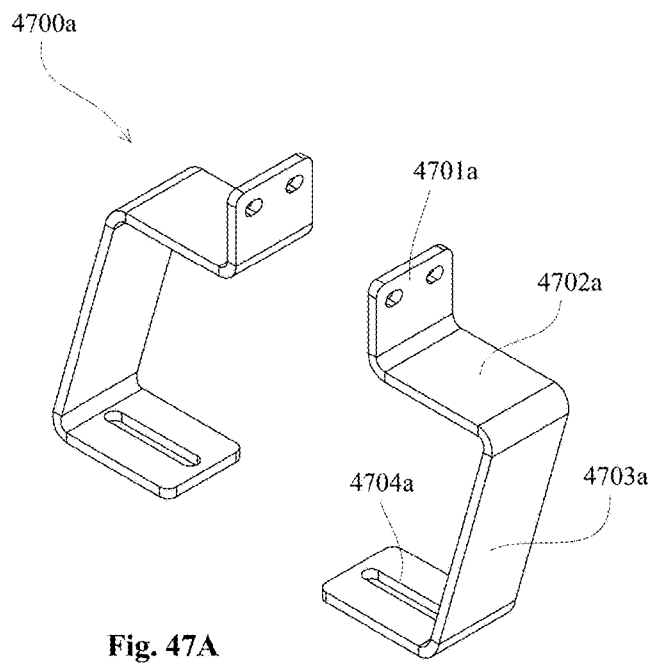
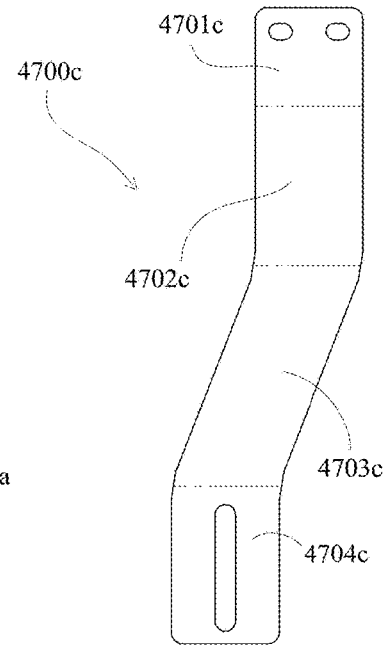
Fig. 47A
Fig. 47C
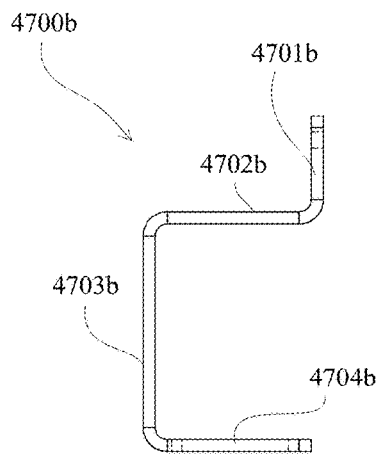
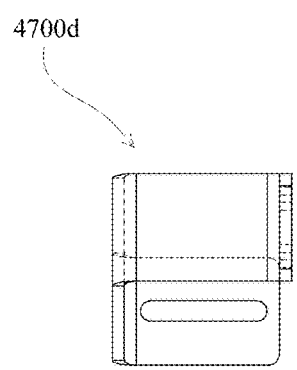
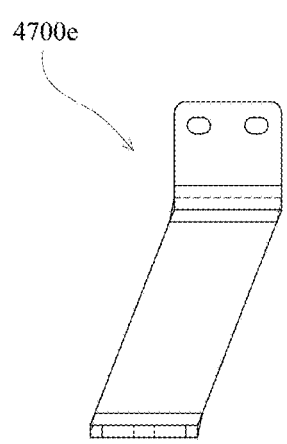
Fig. 47B
Fig. 47D
Fig. 47E

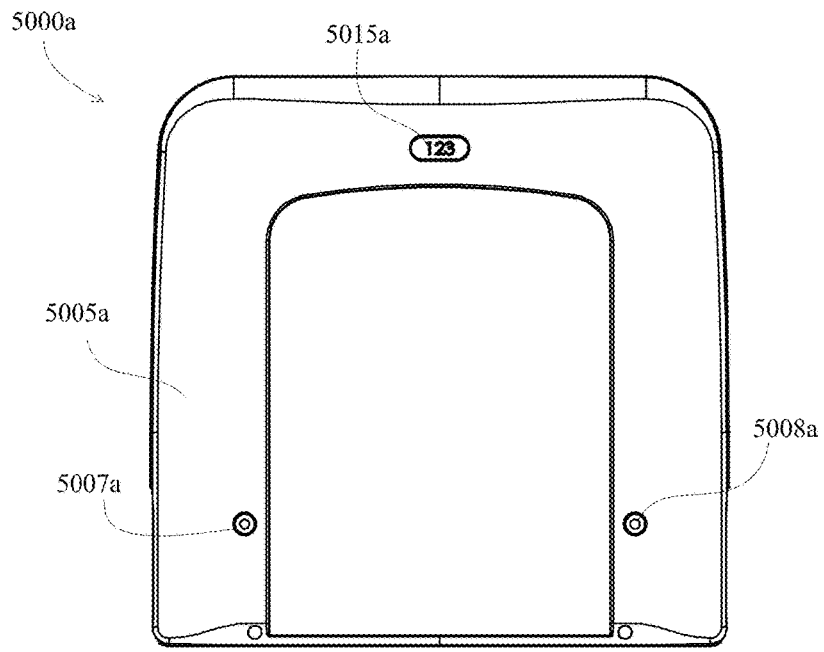
Fig. 50A
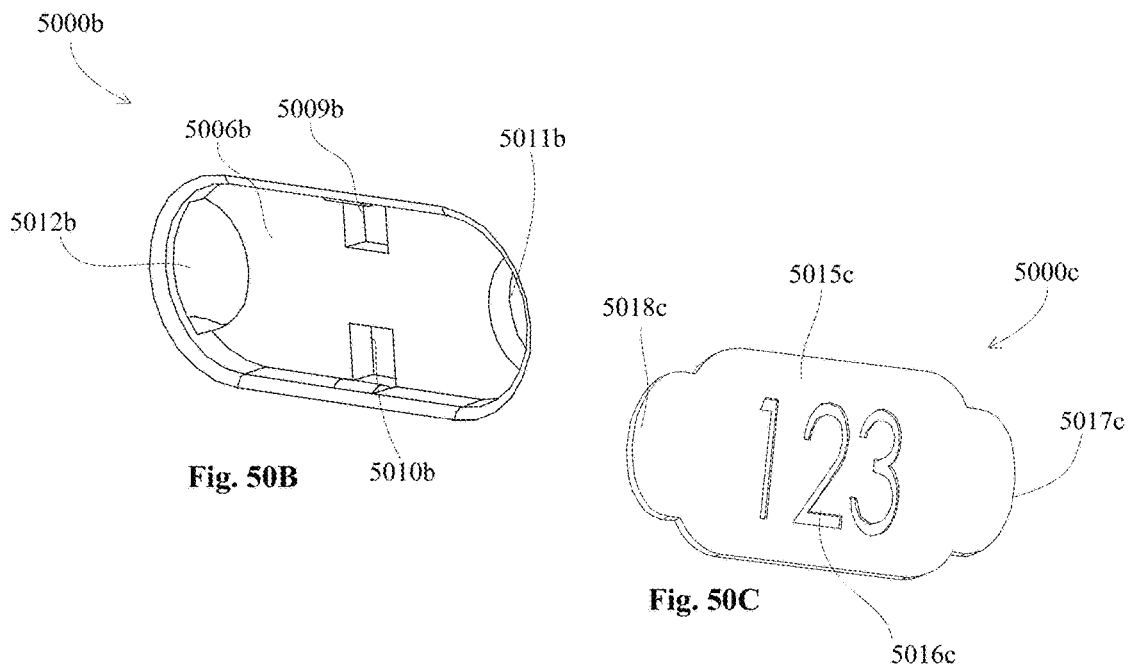
Fig. 50B
Fig. 50C

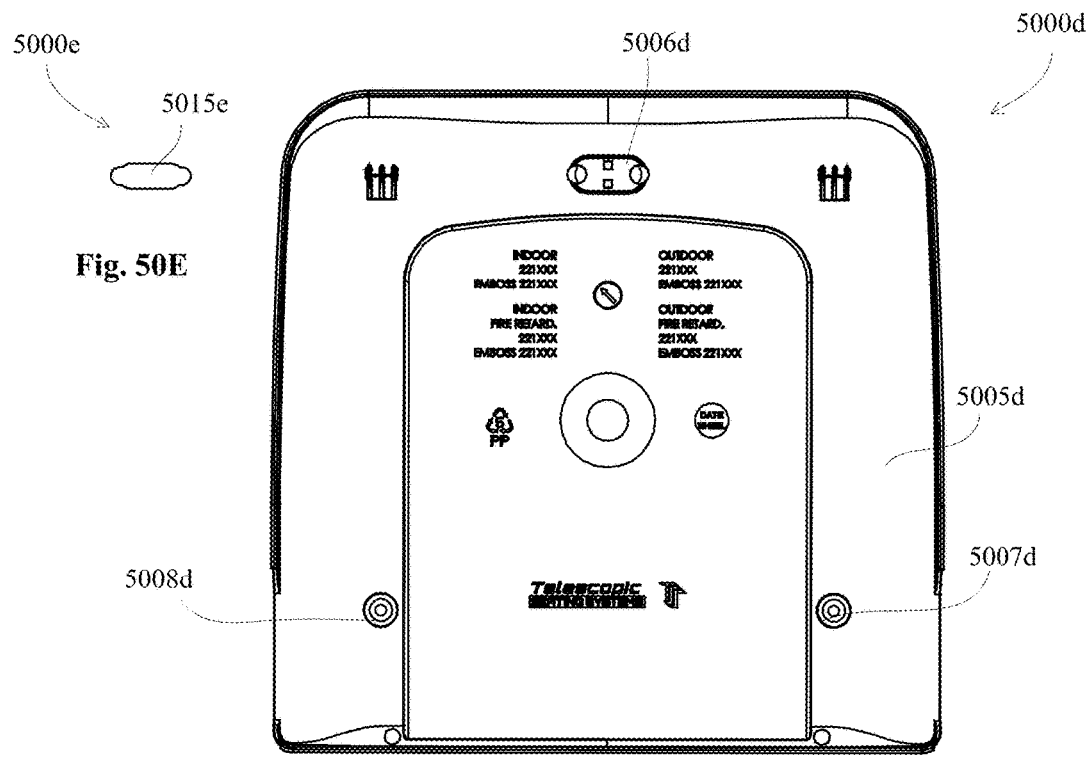
Fig. 50E
Fig. 50D
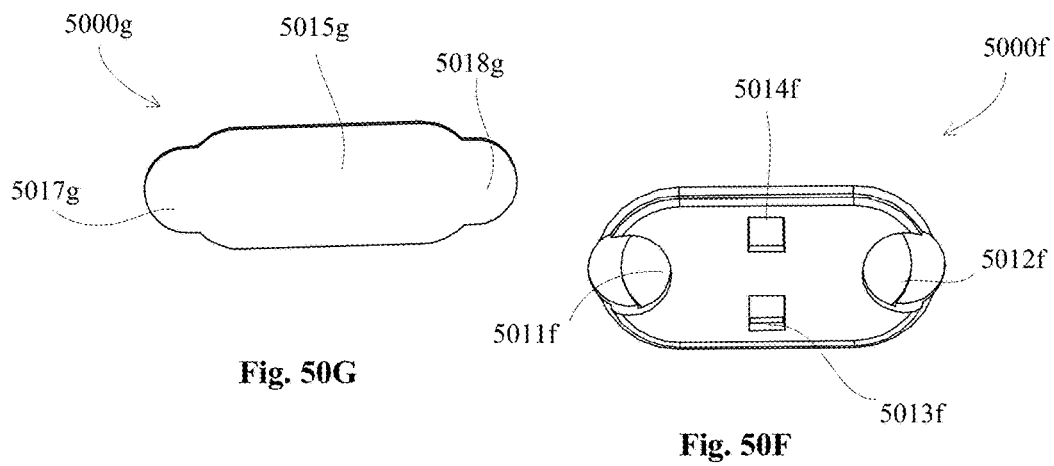
Fig. 50G
Fig. 50F

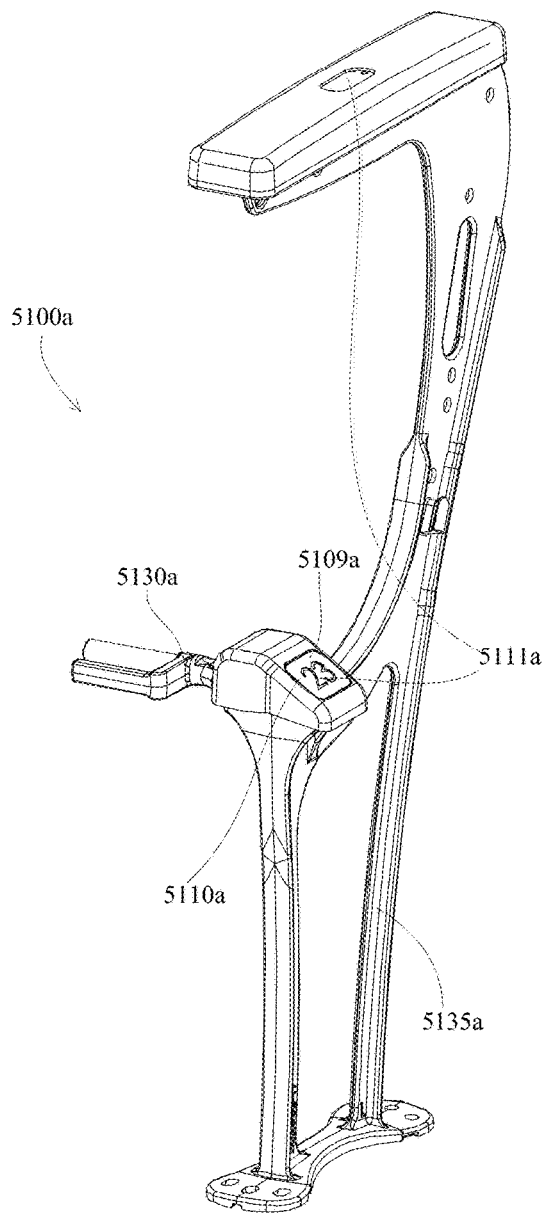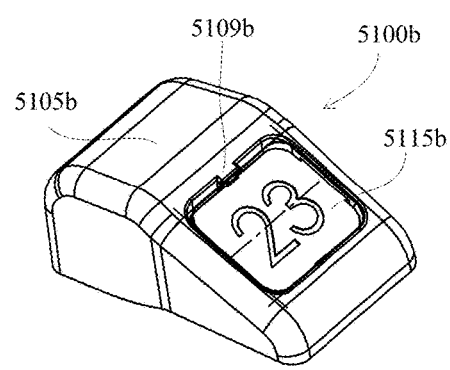
Fig. 51A
Fig. 51B

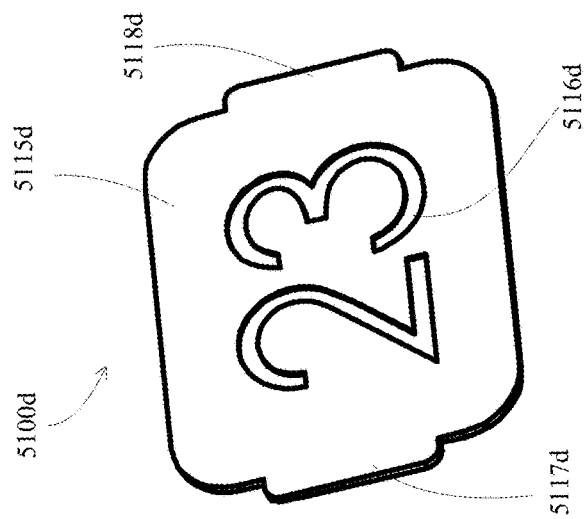
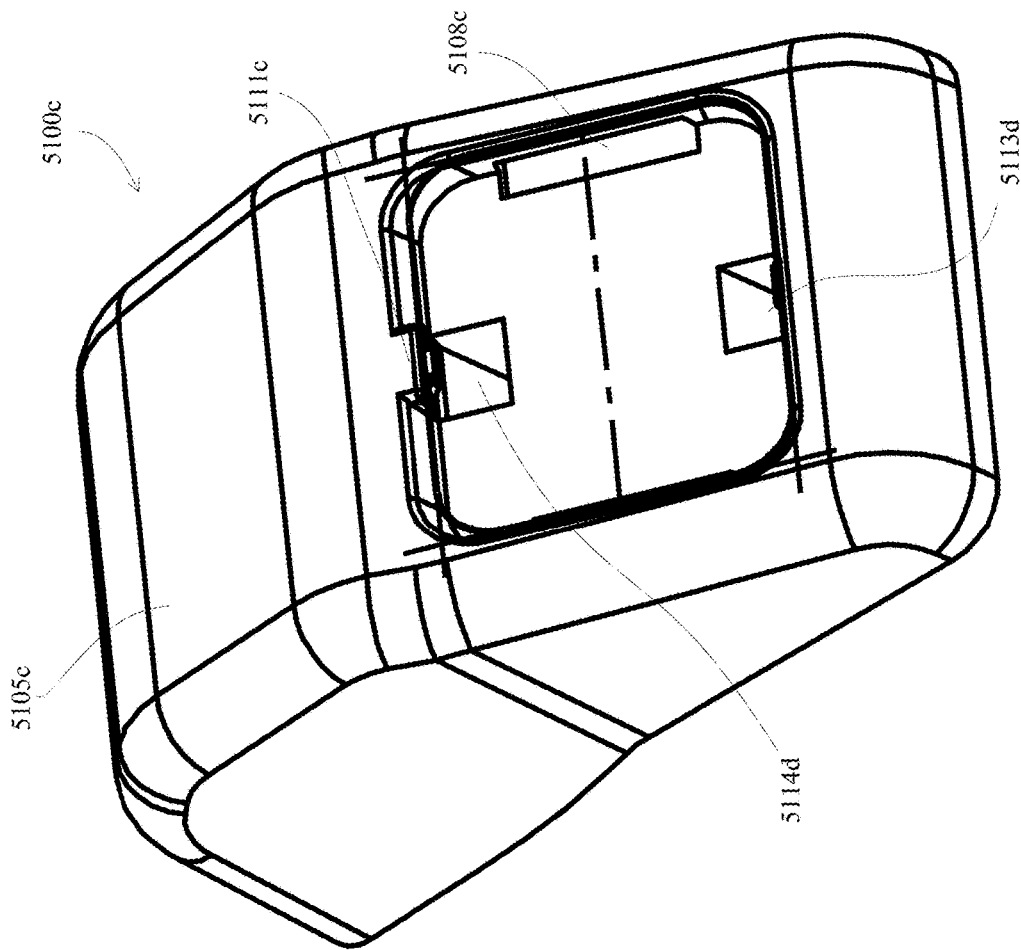

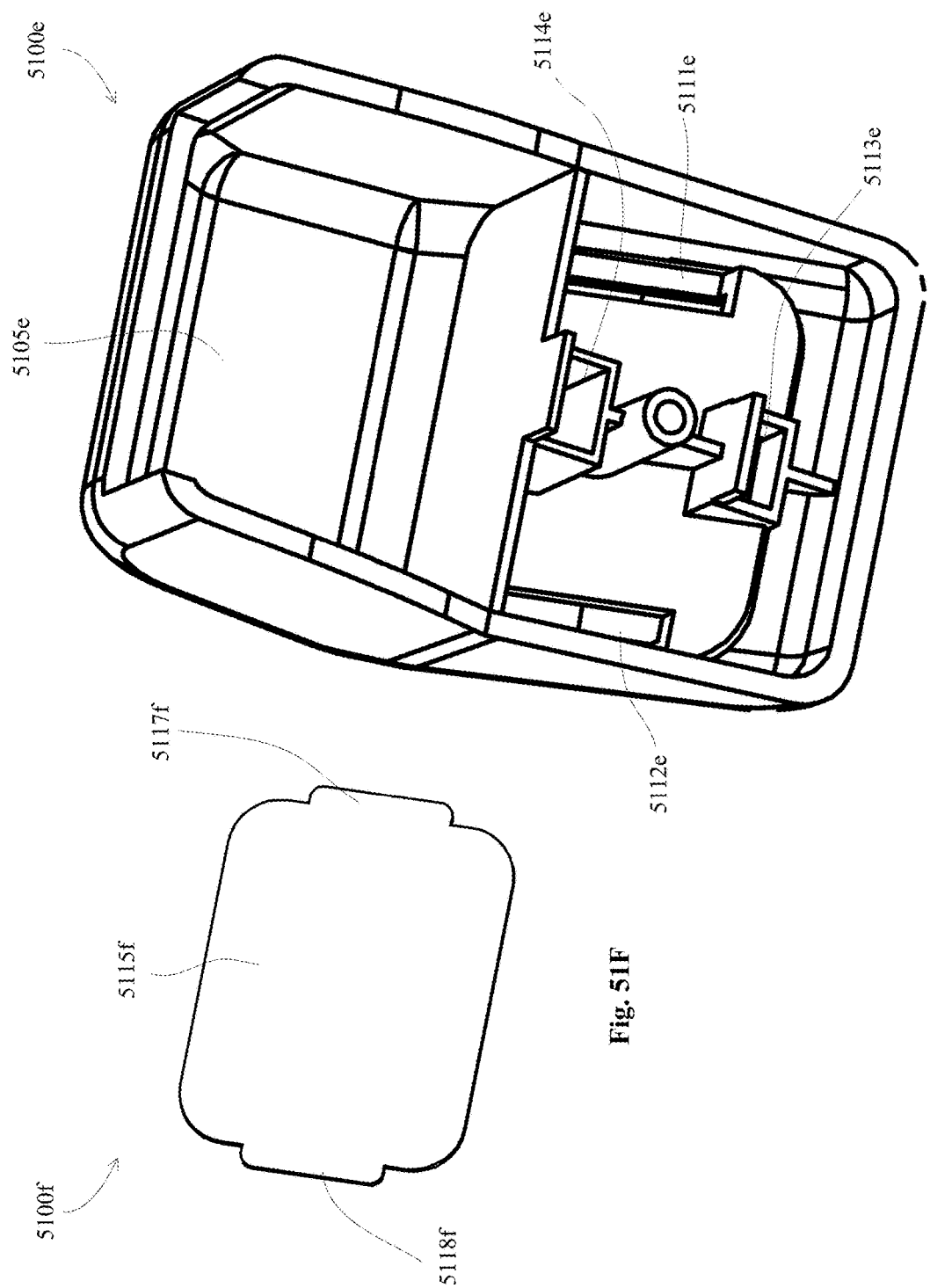

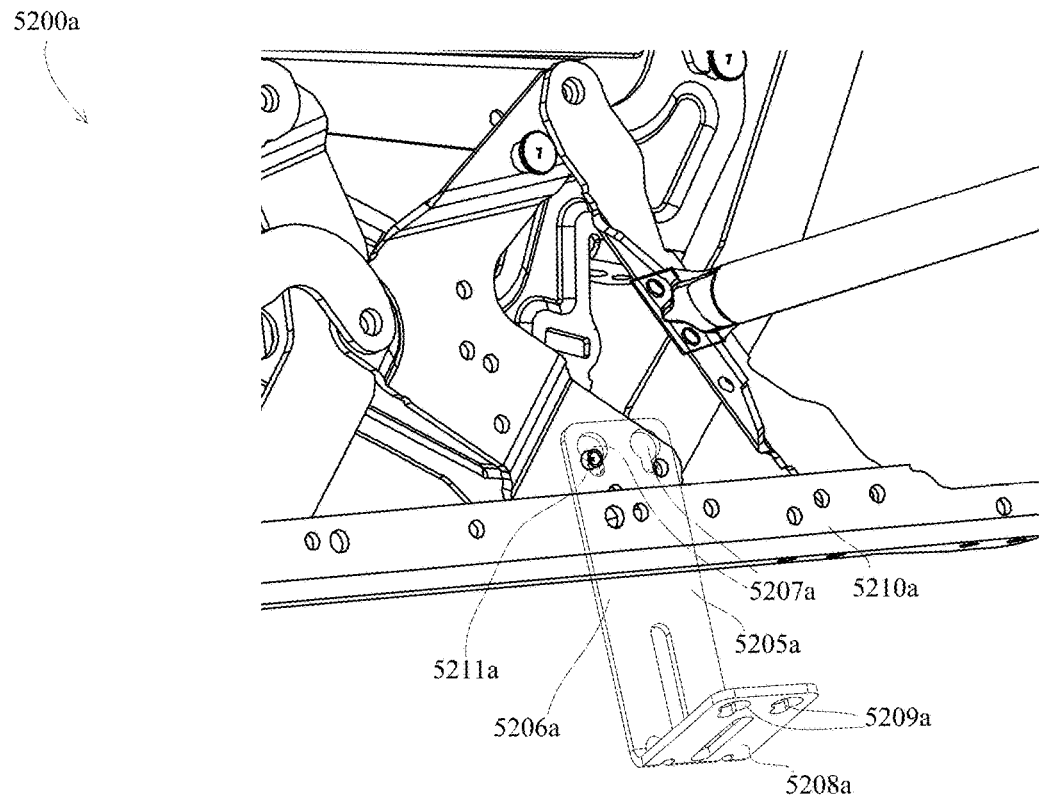
Fig. 52A
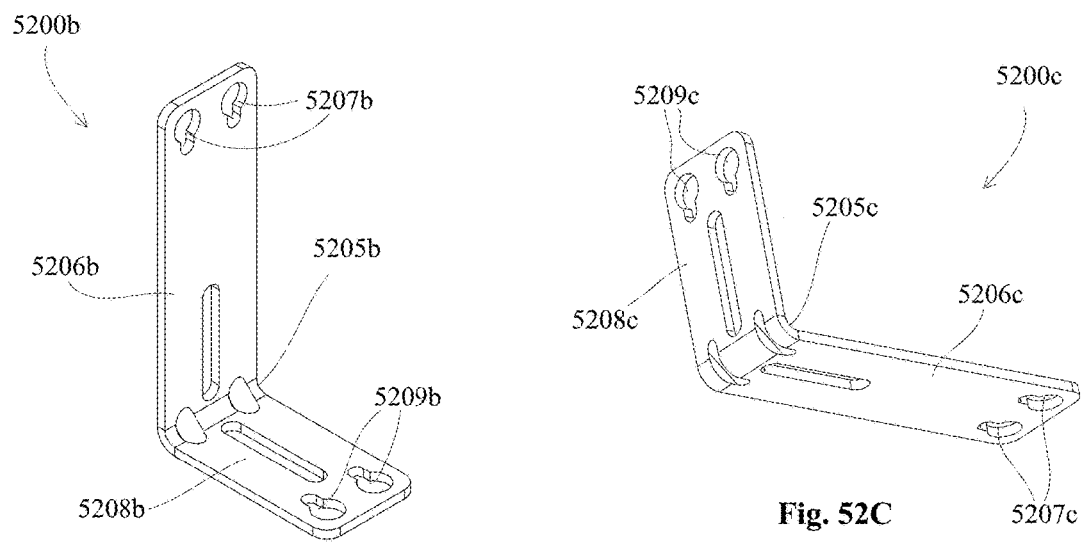
Fig. 52B
Fig. 52C

POWERED CHAIRS FOR PUBLIC VENUES, ASSEMBLIES FOR USE IN POWERED CHAIRS, AND COMPONENTS FOR USE IN ASSEMBLIES FOR USE IN POWERED CHAIRS

CROSS REFERENCE TO RELATED APPLICATIONS

The present application is a continuation-in-part of U.S. patent application Ser. No. 15/800,182 (U.S. Pat. No. 9,993,080), filed Nov. 1, 2017, U.S. patent application Ser. No. 15/675,865 (U.S. Pat. No. 9,943,174), filed Aug. 14, 2017, and Ser. No. 15/710,768, filed Sep. 20, 2017, the entire disclosures of which are incorporated herein by reference thereto. The present application claims priority to U.S. Provisional Patent Application Ser. No. 62/631,457, filed Feb. 15, 2018, and 62/477,421, filed Mar. 27, 2017, the entire disclosures of which are incorporated herein by reference thereto.

The present application is related to commonly assigned patent application Ser. No. 61/287,418, filed Jan. 26, 2016; Ser. No. 62/366,006, filed Jul. 23, 2016; Ser. No. 62/394,281, filed Sep. 14, 2016; and Ser. No. 62/432,600, filed Dec. 11, 2016, the entire disclosures of which are incorporated herein by references thereto. The present application is also related to U.S. patent application Ser. No. 14/331,404, filed Jul. 15, 2014; Ser. No. 14/636,045, filed Mar. 2, 2015; Ser. No. 14/728,401, filed Jun. 2, 2015; Ser. No. 14/788,767, filed Jun. 30, 2015; and PCT/US16/25803, filed Apr. 3, 2016, the entire disclosures of which are incorporated herein by references thereto.

TECHNICAL FIELD

The present disclosure generally relates to powered chairs. More particularly, the present disclosure relates to locally and/or remotely controlled powered recliner chairs for use within an associated venue.

BACKGROUND

Powered recliner chairs are currently available that operate individually, such that an occupant of the respective chair may reorient the respective chair between an upright orientation and a reclined orientation via a local control. Similarly, known power-assisted chairs may include a motor-operated lift mechanism for aiding persons that require assistance in entering or exiting the chair. Motor-operated lift mechanisms may be interconnected between a stationary base assembly and a moveable chair frame. Alternatively, some power-assisted chairs include separate linkage mechanisms for permitting the seat occupant to selectively extend and retract a leg rest assembly and/or produce reclining angular movement between an upright first orientation and a reclined second orientation.

Conventional rocking chairs may include a chair body and a substantially arc-shaped support bracket mounted on a bottom of the chair body. Thus, when a user applies a force on the chair body by his/her own gravity, the support bracket may function as a rocking fulcrum of the chair body so that the rocking chair is rocked forward and backward. However, the user has to exert a force on the chair body so as to rock the rocking chair, so that the user seated on the rocking chair cannot relax himself/herself, thereby easily causing an uncomfortable sensation to the user.

Power-assisted chairs may be adapted to provide the lift and tilt function in combination with a leg rest and/or reclining function. Chairs which provide such a combination of multi-positional functions generally require use of multiple motors for driving separate linkages, which results in extremely large and expensive chair units. In addition, most power-assisted chairs incorporate a drive mechanism that employs both a power drive function for extending the leg rest, lifting the chair, and reclining the chair, and a power return function for returning the chair to the normal seated position (e.g., an upright orientation).

An important characteristic of power-assisted chairs is the ability to support heavy loads during the lift and tilt functions. More specifically, power-assisted chairs are designed to support individuals of a particular weight. Typically, power-assisted chairs that are adapted to support weight above a particular threshold, such as 300 pounds, require multiple motors.

In any event, known powered chair are, at most, controlled via a local controller.

SUMMARY

A venue seating management system may include a chair controller including at least one input selected from the group: a local user chair control input, a remote chair control input, a movie queue input, a venue sound system input, an emergency electric power source input, a chair ticket purchase input, a manually operated fire alarm input, an automatically operated fire alarm input, a carbon monoxide sensor input, a smoke sensor input, a sound detector input, a gunshot detector input, a scream detector input, a personal electronic device input, a mobile telephone input, a portable data assistant input, a laptop computer input, a computer input, a proximity sensor input, a universal serial bus (USB) port input, a capacitance sensor input, an ultra-sonic sensor input, a light sensor input, a touch sensor input, a proximity switch input, a limit switch input, an actuator electric current sensor input, a chair heater electric current sensor input, a chair cooling unit current sensor input, an electric power outlet current sensor input, a lighting unit current sensor input, a chair massage unit current sensor input, a pressure sensor input, a strain gauge sensor input, a microphone input, a motion sensor input, a temperature sensor input, a sonar sensor input, a WiFi communications input, a local area network communications input, a Bluetooth wireless communications input, a near field communications input, or a venue concessions input. The chair controller may also include at least one output selected from the group: a chair actuator output, a chair information display output, a chair lighting unit output, an electric power output, a chair heater output, a chair cooling unit output, a chair massage unit output, a USB port output, a Bluetooth wireless communications output, a local area network communications output, a near field communications output, a venue sound system output, a venue concessions output, or an electric power outlet output. At least one of: an electric power supply, an electric power demand, a venue business function, or a venue maintenance function, may be managed by controlling the at least one output based upon the at least one input.

In another embodiment, a venue seating management system may include a chair controller including at least one input selected from the group: a local user chair control input, a remote chair control input, a movie queue input, an emergency electric power source input, an actuator electric current sensor input, a chair heater electric current sensor input, a chair cooling unit current sensor input, a lighting unit current sensor input, an electric power outlet current sensor input, a chair massage unit current sensor input. The chair controller may also include at least one output selected from the group: a chair actuator output, a chair lighting unit output, an electric power output, a chair heater output, a chair cooling unit output, a chair massage unit output, a USB port output, or an electric power outlet output. At least one of: an electric power supply or an electric power demand, may be controlled by controlling the at least one output based upon the at least one input.

In a further embodiment, a venue seating management system may include a chair controller including at least one input selected from the group: a local user chair control input, a remote chair control input, a movie queue input, a venue sound system input, an emergency electric power source input, a chair ticket purchase input, a manually operated fire alarm input, an automatically operated fire alarm input, a carbon monoxide sensor input, a smoke sensor input, a sound detector input, a gunshot detector input, a scream detector input, a personal electronic device input, a mobile telephone input, a portable data assistant input, a laptop computer input, a computer input, a proximity sensor input, a universal serial bus (USB) port input, a capacitance sensor input, an ultra-sonic sensor input, a light sensor input, a touch sensor input, a proximity switch input, a limit switch input, an actuator electric current sensor input, a chair heater electric current sensor input, a lighting unit current sensor input, a chair cooling unit current sensor input, an electric power outlet current sensor input, a chair massage unit current sensor input, a pressure sensor input, a strain gauge sensor input, a microphone input, a motion sensor input, a temperature sensor input, a sonar sensor input, a WiFi communications input, a local area network communications input, a Bluetooth wireless communications input, a near field communications input, or a venue concessions input. The chair controller may include at least one output selected from the group: a chair actuator output, a chair information display output, a chair lighting unit output, an electric power output, a chair heater output, a chair cooling unit output, a chair massage unit output, a USB port output, a Bluetooth wireless communications output, a local area network communications output, a near field communications output, a venue sound system output, a venue concessions output, or an electric power outlet output. A venue maintenance function may be managed by controlling the at least one output based upon the at least one input.

In yet a further embodiment, a venue seating management system may include a chair controller including at least one input selected from the group: a local user chair control input, a remote chair control input, a movie queue input, a venue sound system input, an emergency electric power source input, a chair ticket purchase input, a manually operated fire alarm input, an automatically operated fire alarm input, a carbon monoxide sensor input, a smoke sensor input, a sound detector input, a gunshot detector input, a scream detector input, a personal electronic device input, a mobile telephone input, a portable data assistant input, a laptop computer input, a computer input, a proximity sensor input, a universal serial bus (USB) port input, a capacitance sensor input, an ultra-sonic sensor input, a light sensor input, a touch sensor input, a proximity switch input, a limit switch input, an actuator electric current sensor input, a chair heater electric current sensor input, a chair cooling unit current sensor input, an electric power outlet current sensor input, a lighting unit current sensor input, a chair massage unit current sensor input, a pressure sensor input, a strain gauge sensor input, a microphone input, a motion sensor input, a temperature sensor input, a sonar sensor input, a WiFi communications input, a local area network communications input, a Bluetooth wireless communications input, a near field communications input, or a venue concessions input. The chair controller may include at least one output selected from the group: a chair actuator output, a chair information display output, a chair lighting unit output, an electric power output, a chair heater output, a chair cooling unit output, a chair massage unit output, a USB port output, a Bluetooth wireless communications output, a local area network communications output, a near field communications output, a venue sound system output, a venue concessions output, or an electric power outlet output. A venue business function may be managed by controlling the at least one output based upon the at least one input.

An electrical system for a plurality of powered recliner chairs may include an electric supply connected to an input of an electric power source. A first rated voltage of the input to the electric power supply may be higher than a second rated voltage of an output of the electric power supply. The system may also include a first electrical interconnection extending from the output of the electric power supply to a first actuator in a first chair, a second electrical interconnection extending from the output of the electric power supply to a second actuator in a second chair, and a power demand management device. The power demand management device may control a power flow from the electric power supply.

In another embodiment, an electrical system for a plurality of powered recliner chairs may include a first electric power supply connected to an input of a first electric power source. A first rated voltage of the input to the first electric power supply may be higher than a second rated voltage of an output of the electric power supply. The system may also include a first electrical interconnection extending from the output of the first electric power supply to a first actuator in the first chair, a second electrical interconnection extending from the output of the first electric power supply to a second actuator in the second chair, and a third electrical interconnection extending from the first electric power source to a second electric power supply. The second electric power supply may provide electric power to at least one of: an aisle light, a user interface, a row light, or a seat identification.

In a further embodiment, an electrical system for a plurality of powered recliner chairs may include an electric supply connected to an input of an electric power source. A first rated voltage of the input to the electric power supply may be higher than a second rated voltage of an output of the electric power supply. The system may also include a first electrical interconnection extending from the output of the electric power supply to a first actuator in a first chair, a second electrical interconnection extending from the output of the electric power supply to a second actuator in a second chair, a local user interface mounted in the first chair, and a remote user interface physically separated from the first chair and the second chair. Activation of the local user interface may reorient the first chair from a first orientation to a second orientation. Activation of the remote user interface may reorient both the first chair and the second chair.

In yet a further embodiment, an electrical system for a plurality of powered recliner chairs may include an electric supply connected to an input of a first electric power source. A first rated voltage of the input to the electric power supply may be higher than a second rated voltage of an output of the electric power supply. The system may also include a first electrical interconnection extending from the output of the electric power supply to a first electric actuator motor of a first actuator of a first chair, a second electrical interconnection extending from the output of the electric power supply to a second electric motor of a second actuator of a second chair, and at least one energy storage device connected to the output of the electric power supply or incorporated within an uninterruptible power supply connected to the input of the electric power supply. The at least one energy storage device may include at least one of: a battery or a capacitor. The electric power supply and the at least one energy storage device may provide electric power to the first electric motor and the second electric motor.

A powered recliner chair system may include at least one first powered recliner chair assigned to a first control group. The at least one first powered recliner chair may be assigned to the first control group by at least one of: a first pin and shorting block, a first push button, or a first entry in a memory. The system may also include at least one second powered recliner chair assigned to a second control group. The at least one second powered recliner chair may be assigned to the second control group by at least one of: a second pin and shorting block, a second push button, or a second entry in a memory. The system may further include a first remote control input to reorient the at least one first powered recliner chair to a first orientation. The system may yet further include a second remote control input to reorient the at least one second powered recliner chair to a second orientation. The first orientation is independent of the second orientation. Data representative of the first remote control input and the second remote input may be transmitted via at least one of: a hardwired communication network, or a wireless network connection.

In another embodiment, a powered recliner chair may include at least one actuator having a first input and a second input. The actuator may be configured to reorient at least a portion of the powered recliner chair between an upright orientation and a reclined orientation in response to the first input. The actuator may be configured to reorient at least the portion of the powered recliner chair between the recline orientation and the upright orientation in response to the second input. The powered recliner chair may also include a control module having a local input, a remote input, a first output, and a second output. The first output may be connected to the first input. The second output may be connected to the second input. The local input may be connected to a chair occupant user interface that may enable a chair occupant to reorient the powered recliner chair while the chair occupant is seated in the chair. The remote input may be connected to a remote user interface that may be physically separate from the powered recliner chair and may enable a remote operator to reorient the powered recliner chair remote from the powered recliner chair.

In a further embodiment, a method for controlling a plurality of powered recliner chairs may include assigning at least one first powered recliner chair to a first control group, and assigning at least one second powered recliner chair to a second control group. The method may also include causing the at least one first powered recliner chair to reorient to a first orientation in response to a first remote control input. The method may further include causing the at least one second powered recliner chair to reorient to a second orientation in response to a second remote control input. The first orientation may be independent of the second orientation.

In yet another embodiment, a powered recliner chair system may include at least one of: a channel or an arm box; and at least one of: power wiring or data wiring. The at least one of: the power wiring or the data wiring may be routed through the at least one of: the channel or the arm box from a first powered recliner chair to a second powered recliner chair.

In yet a further embodiment, a powered recliner chair system may include a smart power supply. The smart power supply automatically may prohibit a second powered recliner chair from starting to reorient at the same time that a first chair starts to reorient.

In another embodiment, a powered recliner chair may include a battery, a power supply and an electric actuator motor. The power supply and the battery may be configured to provide a constant voltage to the electric actuator motor.

Further benefits and advantages of the present invention will become apparent after a careful reading of the detailed description with appropriate reference to the accompanying drawings.

BRIEF DESCRIPTION OF THE DRAWING

FIGS. 5A-D depict various powered reclining chair positions;

FIGS. 9A-C depict an example controller assembly for a powered reclining chair;

FIGS. 16A-F depict example powered reclining chair electrical interconnections;

FIGS. 22A-22D depict various views of an example accessory tray assembly support;

FIGS. 24A-24G depict various views of an example accessory tray assembly support and tray base;

FIGS. 26A-26D depict various views of an example outer bearing for use within accessory tray assemblies;

FIGS. 27A-27C depict various views of an example biasing spring for use within accessory tray assemblies;

FIGS. 37A-D depict various views of an example display assembly;

FIGS. 40A and 40B depict various views of an example pivotally stowaway tray assembly with accessory compartment;

FIGS. 47A-E depict various views of example mounting feet for use with powered recliner chairs;

FIGS. 50A-G depict various views of an example display assemblies;

FIGS. 51A-F depict various views of an example display assemblies;

FIGS. 52A-C depict various views of an example mounting foot for use in a powered recliner chair assembly;

DETAILED DESCRIPTION

Figure 1:
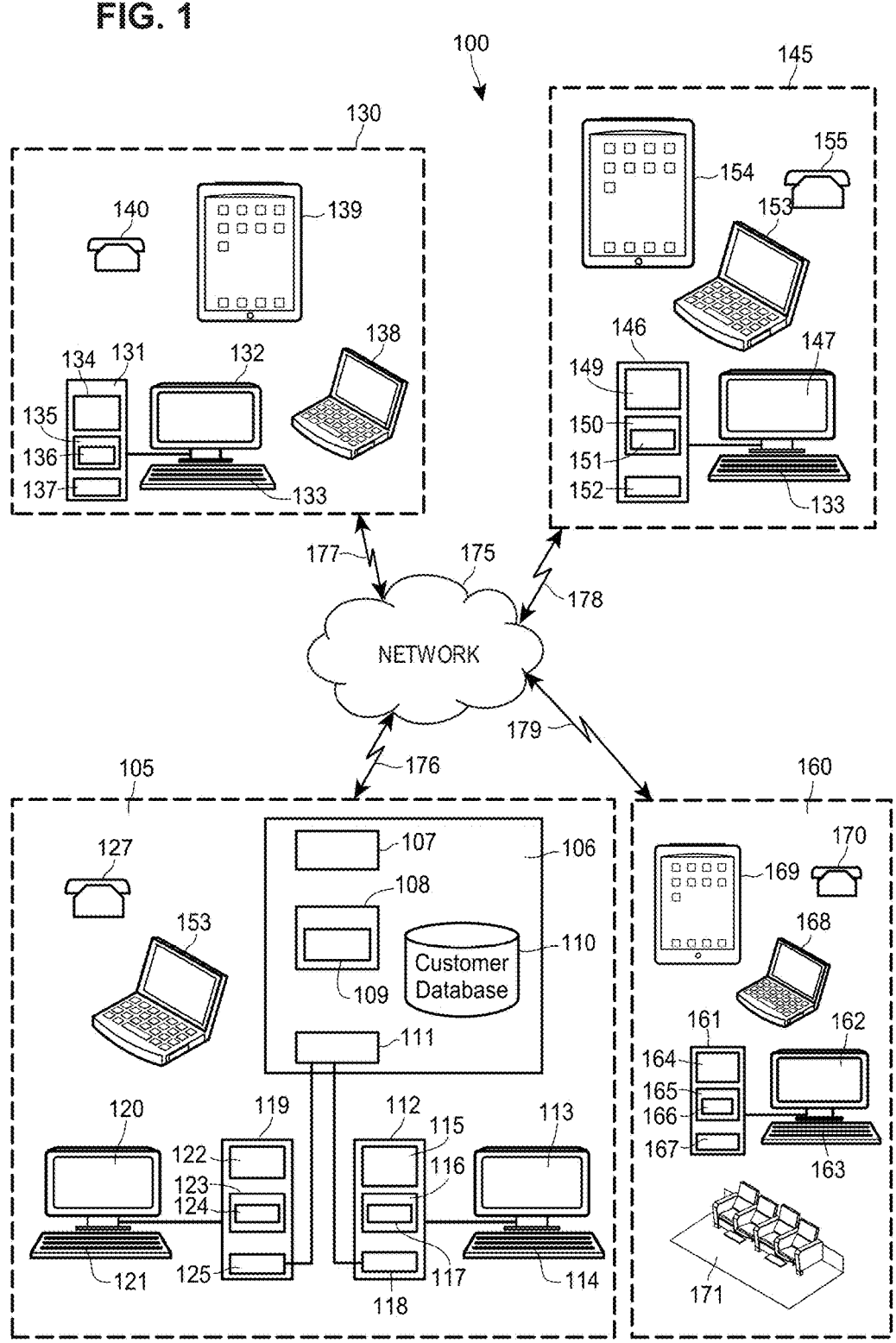
FIG. 1 depicts a high-level block diagram of a computer system for managing powered reclining chairs and venues that include powered reclining chairs.

Powered recliner chairs, assemblies for use in the powered recliner chairs, and components for use in the assemblies are provided. Related systems and methods may enable remote operation of the powered recliner chairs, thereby, may lower cost of associated routine maintenance and associated venue cleaning.

For example, a remote master controller may control multiple powered chairs. The master controller may be controlled/operated by venue management to ensure safe and efficient operation of a plurality of powered recliner chairs. A master controller may contain security features such as a key lock, password protection, security handshake access, etc.

A local master controller may be, for example, located at an end of a row of chairs, within a section of chairs, or in a secured location selected by venue management. A remote master controller may be accessed wirelessly, via a hard wired connection, and/or locally. A master controller may interact with other systems (e.g., emergency systems, food/drink vending operations, venue lighting, maintenance, etc.) to improve venue operations. A master controller may have output(s)/circuit(s) to control chairs via a respective chair circuit. Alternatively, a group of chairs may be mechanically interconnected, such that a single master controller may control a group of chairs.

Controlling multiple chairs at once may save time in performing venue related tasks, such as cleaning or maintenance that require chairs to be extended and/or retracted. A controller, having multiple output circuits, may allow for pre-select chairs to be extended or retracted in a defined order to facilitate a desired task. For example, cleaning may be facilitated by have every other chair extended and/or retracted to provide an operator better access to an extended recliner chair in narrow rows.

Alternate patterns of chair positioning may be achieved to aid in different tasks. For example, an entire venue of chairs may automatically reorient at a prescribed time sequence with a single initiation. While a controller may have multiple outputs, any given controller may only have one output circuit and associated chairs may include individual ID's or addresses such that a communication protocol of the controller may allow control of an individual chair and/or banks of chairs.

Controller output(s) may control chairs wirelessly using available technologies such as Bluetooth®, and/or the controllers may be hard wired. Controller outputs may drive chair actuator(s) to respective internal stops, which may be settable by time such that chairs may be partially extended and/or retracted. Alternatively, or additionally, a controller may be sequenced to extend/retract chairs such that all chairs in a control group may be fully extended and/or retracted to a position before being extended and/or retracted to a desired position.

Master controller circuits may control a slave control unit at each powered chair allowing parallel operation of a local user control switch or a master control circuit. Possible scenarios for parallel chair control may include, but are not limited to, an operator control switch and the control circuit that plug into a slave controller, allowing control of a powered chair by the operator or by the master control box, an operator control switch and a control circuit may connect wirelessly to a slave controller, allowing control of a powered chair by the operator or by the master controller. A control circuit connected (wired or wirelessly) to a powered chair switch which may allow parallel operation. A control circuit connected (wired or wirelessly) to a powered chair actuator, which may allow parallel chair operation.

Power to a powered chair may be extended directly from a transformer to a master controller, and/or slave controller(s) as needed. A slave controller may be powered via respective input circuits or switch circuits as required.

Lights (e.g., light emitting diodes (LEDs)) may be incorporated into the individual chairs. For example, a light may be incorporated under each chair to illuminate an area of a floor in proximity to the respective chair. The systems and methods of the present disclosure may notify a remote location of activity (e.g., venue cleaning, chair occupancy, chair reorientation, etc.). This lighting may be turned on, for example, during cleaning and/or prior to and/or after a movie to provide entrance and/or exit lighting. Similar to remote chair reorientation, the lighting may be remotely controlled. For example, all powered recliner chairs may automatically return to an upright position (or any other predetermined position) and/or all chair lights may be turned on in an event of an emergency situation in the associated venue. Notably, notification of an emergency situation within a venue may be initiated via a central alarm (e.g., a manually operated fire alarm, an automatically operated fire alarm input, a carbon monoxide sensor, a smoke sensor, etc.), a sound detector (e.g., a gunshot detector, a scream detector, etc.), and/or via a personal electronic device (e.g., a mobile telephone, a portable data assistant, a laptop computer, a computer, or any other portable electronic device that is communicatively coupled to a venue emergency notification system).

Sensors (e.g., a proximity sensor, a capacitance sensor, an ultra-sonic sensor, a light sensor, a touch sensor, a proximity switch, a limit switch, an electric current sensor, a pressure sensor, a strain gauge, a microphone, a motion sensor, a temperature sensor, a sonar sensor, etc.) may be incorporated into a respective chair for safety purposes. For example, a sensor may indicate that reorientation of a chair has been inhibited (in at least one direction) because an object (e.g., an individual, or an individual's possession) would be in jeopardy of being damaged. A capacitance sensor may be configured such that if an object (e.g., an individual, or an individual's possession) touches, or comes close to a predetermined, part of a respective chair (e.g., a metallic part of the chair), a capacitance value will change and the object may be detected. The systems and methods of the present disclosure may provide a remote indication of corresponding events.

Sensors and/or actuators may be incorporated into a chair that record chair reorientations and/or any other events associated with the respective chair. Associated data may be automatically recorded and logged to provide information for use with preventive chair maintenance and/or routine chair maintenance.

Actuator drive motor momentum may generate electrical energy after a chair limit switch is activated to stop chair movement. The actuator drive motor momentum may cause transients in associated electrical circuits. In order to reduce, or eliminate transients, an armature of an actuator motor may be shorted when turned off, a limit switch may be omitted and a "soft stop" may be implemented via, for example, a processor/software or a dedicated circuit, an isolation relay may be incorporated, a zener-diode may be incorporated in parallel with the an armature, a silicon control rectifier (SCR) may be incorporated in parallel with the an armature, twisted wires may be incorporated to eliminate inductance, etc.

A user interface may be provided that includes, for example, an overhead plan view map of a venue with each chair having alpha-numeric, color, graphical, etc. information related to respective chair status (e.g., need of maintenance, occupied, reclined, malfunction, number of reorientations since last maintenance, number of times occupied, length of time occupied, etc.). The information related to respective chair status may be, for example, historical status information, current status information, or predicative status information.

The remote control system may automatically control other lighting in a venue. The systems and methods of the present disclosure may automatically record cleaning times and dates. For example, positions of each chair may be recording along with a time stamp for each chair orientation and/or chair reorientation. Occupancy sensors may be incorporated into a chair and may be used to record dates and times associated with when the respective chair was occupied. A weight sensor may be included that records a weight of an individual occupying a respective chair. Activation of a remote chair control may open chairs that were occupied during a previous event, while chairs that were not occupied during the previous event may remain in an upright orientation.

Local controls, located on each powered recliner chair, may allow a chair occupant to reposition the powered reclining chair while seated in the respective chair. For example, a first button may be provided to reorient a powered reclining chair from an upright position toward a reclined position. A second button may be provided to reorient the powered reclining chair from a reclined position toward an upright position. Any number of buttons may be provided to reorient individual parts (e.g., a back, a lower lumbar support, a chair seat, an armrest, a foot rest, a calf rest, etc.) of a powered reclining chair independent of any other part. As described in more detail elsewhere herein, a powered reclining chair may be controlled via a cellular phone (e.g., a smartphone) implementing a powered reclining chair application.

Any given powered reclining chair may include speakers and/or a headphone connector plug. The speakers and/or the headphone connector may be hardwired to a venue sound system and/or may include a wireless connection to a venue sound system. Any given powered reclining chair may include a power and/or data connector, such that an occupant can plug in their cellular telephone and/or portable computer device. Thereby, an occupant may use the forgoing features to order a drink and/or food from a venue delivery. The occupant may be enabled to pay for their drinks and/or food via their own device and/or via an interface attached to the powered reclining chair. A theater control system may be interconnected with a theater speaker system (e.g., a speaker system as provided by QSC, a Qsys speaker system, etc.).

Turning to FIG. 1, a high-level block diagram of an example computer system 100 for managing powered reclining chairs is depicted. The computer system 100 may include a central venue operations center 105 and a powered reclining chair site 160 (e.g., a movie theater, a sports venue, an auditorium, an arena, a theater, or any other venue) communicatively couple via a communications network 175. The computer system 100 may also include a powered reclining chair technician site 145 and a powered reclining chair supplier site 130. While, for convenience of illustration, only a single central venue operations center 105 is depicted within the computer system 100 of FIG. 1, any number of central venue operations centers 105 may be included within the computer system 100. While, for convenience of illustration, only a single powered reclining chair site 160 is depicted within the computer system 100 of FIG. 1, any number of powered reclining chair sites 160 may be included within the computer system 100. Indeed, the computer system 100 may accommodate thousands of powered reclining chair sites 160. While, for convenience of illustration, only a single powered reclining chair technician site 145 is depicted within the computer system 100 of FIG. 1, any number powered reclining chairs of technician sites 145 may be included within the computer system 100. Any given powered reclining chair technician site 145 may be a mobile site. While, for convenience of illustration, only a single powered reclining chair supplier site 130 is depicted within the computer system 100 of FIG. 1, any number of powered reclining chair supplier sites 130 may be included within the computer system 100.

The communications network 175, any one of the network adapters 111, 118, 125, 137, 152, 167 and any one of the network connections 176, 177, 178, 179 may include a hardwired section, a fiber-optic section, a coaxial section, a wireless section, any sub-combination thereof or any combination thereof, including for example a wireless LAN, MAN or WAN, WiFi, WiMax, the Internet, a Bluetooth connection, a Zigbee internet connection, a Global Cache' internet connection, or any combination thereof. Moreover, a central venue operations center 105, a powered reclining chair site 160, a powered reclining chair technician site 145 and/or a powered reclining chair supplier 130 site may be communicatively connected via any suitable communication system, such as via any publicly available or privately owned communication network, including those that use wireless communication structures, such as wireless communication networks, including for example, wireless LANs and WANs, satellite and cellular telephone communication systems, etc.

Any given central venue operations center 105 may include a mainframe, or central server, system 106, a server terminal 112, a desktop computer 119, a laptop computer 126 and a telephone 127. While the central venue operations center 105 of FIG. 1 is shown to include only one mainframe, or central server, system 106, only one server terminal 112, only one desktop computer 119, only one laptop computer 126 and only one telephone 127, any given central venue operations center 105 may include any number of mainframe, or central server, systems 106, server terminals 112, desktop terminals 119, laptop computers 126 and telephones 127. Any given telephone 127 may be, for example, a land-line connected telephone, a computer configured with voice over internet protocol (VOIP), or a mobile telephone (e.g., a smartphone). Any given server terminal 112 may include a processor 115, a memory 116 having at least on set of computer-readable instructions stored thereon and associated with managing powered reclining chairs and venue operations 117, a network adapter 118 a display 113 and a keyboard 114. Any given desktop computer 119 may include a processor 122, a memory 123 having at least on set of computer-readable instructions stored thereon and associated with managing powered reclining chairs and venue operations 124, a network adapter 125 a display 120 and a keyboard 121. Any given mainframe, or central server, system 106 may include a processor 107, a memory 108 having at least on set of computer-readable instructions stored thereon and associated with managing powered reclining chairs and venue operations 109, a network adapter 111 and a customer (or client) database 110. The customer (or client) database 110 may store, for example, chair operation data and/or associated venue data, related to operation of the chair (or a group of chairs) within an associated venue. Any given lap top computer 126 may include a processor, a memory having at least on set of computer-readable instructions stored thereon and associated with managing powered reclining chairs and venue operations, a network adapter, a display and a keyboard. Any given telephone 127 may include a processor, a memory having at least on set of computer-readable instructions stored thereon and associated with managing powered reclining chairs and venue operations, a network adapter, a display and a keyboard.

Any given powered reclining chair supplier 130 may include a desktop computer 131, a lap top computer 138, a tablet computer 139 and a telephone 140. While only one desktop computer 131, only one lap top computer 138, only one tablet computer 139 and only one telephone 140 is depicted in FIG. 1, any number of desktop computers 131, lap top computers 138, tablet computers 139 and/or telephones 140 may be included at any given powered reclining chair supplier 130. Any given telephone 140 may be a land-line connected telephone or a mobile telephone (e.g., smartphone). Any given desktop computer 131 may include a processor 134, a memory 135 having at least on set of computer-readable instructions stored thereon and associated with managing powered reclining chairs and venue operations 136, a network adapter 137 a display 132 and a keyboard 133. Any given lap top computer 138 may include a processor, a memory having at least on set of computer-readable instructions stored thereon and associated with managing powered reclining chairs and venue operations, a network adapter, a display and a keyboard. Any given tablet computer 139 may include a processor, a memory having at least on set of computer-readable instructions stored thereon and associated with managing powered reclining chairs and venue operations, a network adapter, a display and a keyboard. Any given telephone 140 may include a processor, a memory having at least on set of computer-readable instructions stored thereon and associated with managing powered reclining chairs and venue operations, a network adapter, a display and a keyboard.

Any given powered reclining chair technician site 145 may include a desktop computer 146, a lap top computer 153, a tablet computer 154 and a telephone 155. While only one desktop computer 146, only one lap top computer 153, only one tablet computer 154 and only one telephone 155 is depicted in FIG. 1, any number of desktop computers 146, lap top computers 153, tablet computers 154 and/or telephones 155 may be included at any given powered reclining chair technician site 145. Any given telephone 155 may be a land-line connected telephone or a mobile telephone (e.g., smartphone). Any given desktop computer 146 may include a processor 149, a memory 150 having at least on set of computer-readable instructions stored thereon and associated with managing powered reclining chairs and venue operations 151, a network adapter 152 a display 147 and a keyboard 148. Any given lap top computer 153 may include a processor, a memory having at least on set of computer-readable instructions stored thereon and associated with managing powered reclining chairs and venue operations, a network adapter, a display and a keyboard. Any given tablet computer 154 may include a processor, a memory having at least on set of computer-readable instructions stored thereon and associated with managing powered reclining chairs and venue operations, a network adapter, a display and a keyboard. Any given telephone 155 may include a processor, a memory having at least on set of computer-readable instructions stored thereon and associated with managing powered reclining chairs and venue operations, a network adapter, a display and a keyboard.

Any given powered reclining chair site 160 may include a desktop computer 161, a lap top computer 168, a tablet computer 169 and a telephone 170. While only one desktop computer 161, only one lap top computer 168, only one tablet computer 169 and only one telephone 170 is depicted in FIG. 1, any number of desktop computers 161, lap top computers 168, tablet computers 169 and/or telephones 170 may be included at any given powered reclining chair site 160. Any given telephone 170 may be a land-line connected telephone or a mobile telephone (e.g., smartphone). Any given desktop computer 161 may include a processor 164, a memory 165 having at least on set of computer-readable instructions stored thereon and associated with managing powered reclining chairs and venue operations 166, a network adapter 167 a display 162 and a keyboard 163. Any given lap top computer 168 may include a processor, a memory having at least on set of computer-readable instructions stored thereon and associated with managing powered reclining chairs and venue operations, a network adapter, a display and a keyboard. Any given tablet computer 169 may include a processor, a memory having at least on set of computer-readable instructions stored thereon and associated with managing powered reclining chairs and venue operations, a network adapter, a display and a keyboard. Any given telephone 170 may include a processor, a memory having at least on set of computer-readable instructions stored thereon and associated with managing powered reclining chairs and venue operations, a network adapter, a display and a keyboard. While not shown in FIG. 1, any given set of powered reclining chairs 171, or individual powered reclining chair, may include a programmable controller (e.g., controller 860, 960a, 960b, 1060a, 1060b of FIGS. 8, 9A-B, 10A-B, respectively), a powered reclining chair local control (e.g., local control 270, 370, 470, 870, 970c, 1070c, 1170a-c of FIGS. 2, 3, 4, 8, 9c, 10c, 11A-11C, respectively), and/or any number of linear and/or rotary actuators (e.g., actuator 655, 660, 760, 960b, 1060b, 1065b of FIGS. 6, 7, 9B, 10B, respectively). Furthermore, while not shown in FIG. 1, any given set of powered reclining chairs 171, or individual powered reclining chair, may include a plurality of sensors (e.g., temperature sensor, pressure sensor, limit switch, motion sensor, strain gauge, position sensor, occupancy sensor, load sensor, etc.).

Figure 2:
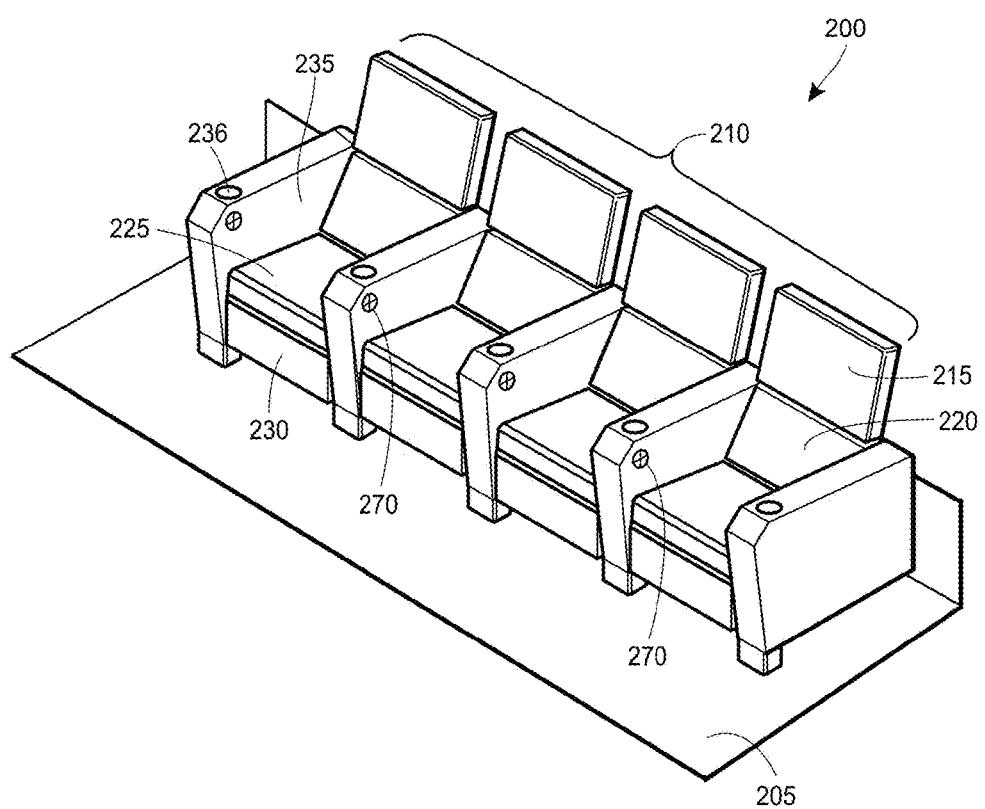
FIGS. 2-4 depict perspective views of powered reclining chairs.
Figure 3:
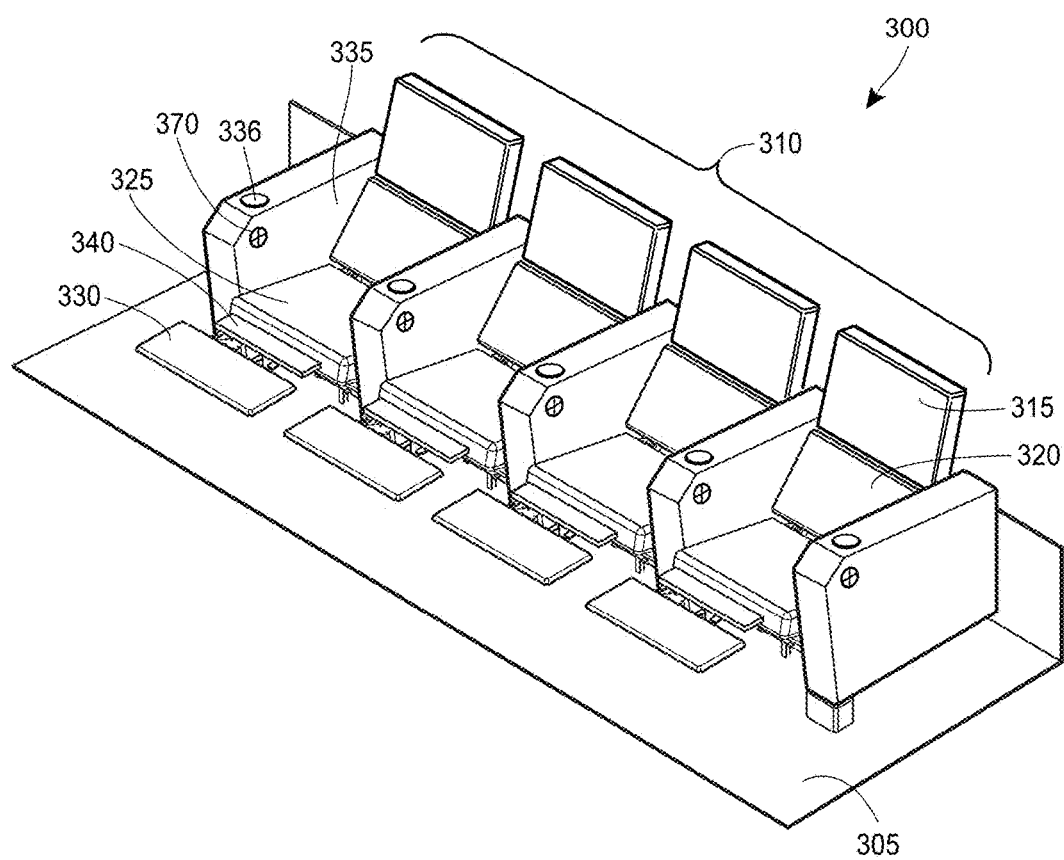

With reference to FIG. 2, a venue 200 may include a plurality of powered recliner chairs 210 supported on a base (e.g., a floor or a structure) 205. The powered recliner chairs 210 may be similar to the powered chairs 171 of FIG. 1. Any given powered recliner chair may include a chair back 215, a lower lumbar support 220, a chair seat 225, a foot-rest 230, and an arm-rest 235. The arm-rest 235 may include a cup-holder 236 and/or a chair controller 270. The chair controller 270 may include, for example, a first button to reorient the respective chair between an upright position (e.g., a chair position as illustrated in FIG. 2) and a reclined position (e.g., a chair position as illustrated in FIG. 3). Alternatively, a chair controller 270 may include a plurality of functions, such as, individual buttons associated with independently controlling a chair back 215, a lower lumbar support 220, a chair seat 225, a foot-rest 230, and/or an arm-rest 235. Additionally, a chair controller 270 may include an audio output connector, a power output connector, lighting, a microphone, a speaker, etc. Alternatively, a chair controller 270 may be similar to a portable computing device (e.g., portable computing device 169 of FIG. 1) that facilitates a plurality of chair controls and/or venue interaction. A chair controller 270 may include a docking station and/or connection for a smartphone.

An associated powered recliner chair system may include at least one emergency power input selected from a group including: a battery, a capacitor, a photovoltaic cell, an internal combustion engine driven electrical generator, a wind-turbine driven electrical generator, or a hydrogen fuel cell. The at least one emergency power input may be configured to provide electric power to the powered recliner chair in an event of an associated venue power outage.

Any given powered recliner chair may be a modular assembly having, for example, a single plug in power connection. The powered recliner chair may be fully operable with only the plug in power connection connected to the modular powered recliner chair. Any given modular assembly may include one, two, or more chair assemblies, including, for example, associated RMS(s), associated arm box(es), associated chair seat(s), associated chair ottoman(s), associated chair back(s), associated headrest(s), associated electrical control(s), associated actuator(s), associated lighting, associated snack tray(s) and/or associated cub holder(s). As a particular example, a modular assembly may include a first chair assembly having a snack tray pivotally attached to a right-hand arm box and a second chair assembly having a snack tray pivotally attached to a left-hand arm box. A left-hand arm box of the first chair assembly may be fixed to a right-hand arm box of the second chair assembly. All local chair control and/or remote chair control may be, for example, communicated to a modular assembly via a wireless communication network. A modular assembly may be assembled at a manufacturing facility remote from an associated venue, delivered to the associated venue, set in place, and plugged into, for example, a electrical outlet.

Any given reclining chair may be installed such that a surface under the reclining chair is not coplanar with an adjacent walking surface. Examples of such an installation may include: an area directly behind the ottoman raised to make it harder for items to be reoriented (e.g., kicked or pushed) under the reclining chair; an area directly in front of the reclining chair's rear closure panel may be raised to make it harder for items to be moved (e.g., kicked or pushed) under the reclining chair; and an area under the recliner may be sloped to promote movement of items under the reclining chair moving out from under the reclining chair.

Turning to FIG. 3, a venue 300 may include a plurality of powered recliner chairs 310 supported on a base (e.g., a floor or a structure) 305. The powered recliner chairs 310 may be similar to the powered recliner chairs 210 of FIG. 2. Any given powered recliner chair may include a chair back 315, a lower lumbar support 320, a chair seat 325, a foot-rest 330, and an arm-rest 335. The arm-rest 335 may include a cup-holder 336 and/or a chair controller 370. The chair controller 370 may include, for example, a first button to reorient the respective chair between an upright position (e.g., a chair position as illustrated in FIG. 2) and a reclined position (e.g., a chair position as illustrated in FIG. 3). Alternatively, a chair controller 370 may include a plurality of functions, such as, individual buttons associated with independently controlling a chair back 315, a lower lumbar support 320, a chair seat 325, a foot-rest 330, and/or an arm-rest 335. Additionally, a chair controller 370 may include an audio output connector, a power output connector, lighting, a microphone, a speaker, etc. Alternatively, a chair controller 370 may be similar to a portable computing device (e.g., portable computing device 169 of FIG. 1) that facilitates a plurality of chair controls and/or venue interaction. A chair controller 370 may include a docking station and/or connection for a smartphone.

Figure 4:
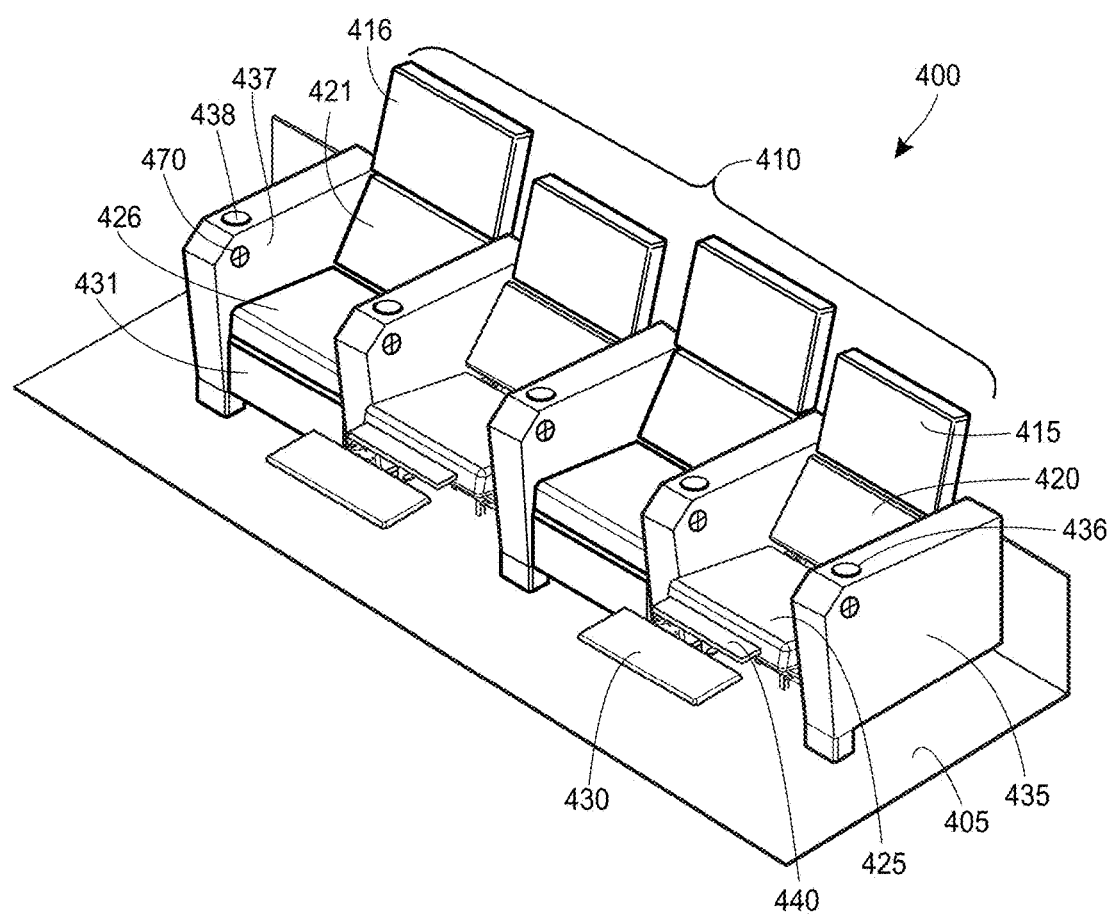

With reference to FIG. 4, a venue 400 may include a plurality of powered recliner chairs 410 supported on a base (e.g., a floor or a structure) 405. The powered recliner chairs 410 may be similar to the powered recliner chairs 310 of FIG. 3. Any given powered recliner chair may include a chair back 415, a lower lumbar support 420, a chair seat 425, a foot-rest 430, and an arm-rest 435. The arm-rest 435 may include a cup-holder 436 and/or a chair controller 470. The chair controller 470 may include, for example, a first button to reorient the respective chair between an upright position (e.g., a chair position as illustrated in FIG. 2) and a reclined position (e.g., a chair position as illustrated in FIG. 3). Alternatively, a chair controller 470 may include a plurality of functions, such as, individual buttons associated with independently controlling a chair back 415, a lower lumbar support 420, a chair seat 425, a foot-rest 430, and/or an arm-rest 435. Additionally, a chair controller 470 may include an audio output connector, a power output connector, lighting, a microphone, a speaker, etc. Alternatively, a chair controller 470 may be similar to a portable computing device (e.g., portable computing device 169 of FIG. 1) that facilitates a plurality of chair controls and/or venue interaction. A chair controller 470 may include a docking station and/or connection for a smartphone. While remote control of reclining chair extend/retract functions may be performed, any given remote control function may similarly be used to control other functions such as massagers, heaters, cooling devices, etc.

Any given reclining chair system may include blower and/or vacuum features, which may aid in cleaning under reclining chairs. Examples of blower and/or vacuum features may include, but are not limited to: systems located in a reclining chair arm box; systems located in a reclining chair recliner mechanism; systems located in an associated floor area, or rear riser(s).

Turning to FIGS. 5A-5D, powered chairs 500a-d may include a chair back 515a-d, a chair seat 525a-d, a foot-rest 530a-d, and an arm-rest 535a-d. The powered chairs 500a-d may be similar to the powered chairs 171, 210, 310, 410 of FIGS. 1-4, respectively. As illustrated in FIGS. 5A and 5D, a chair back 515a, 515d, a chair seat 525a, 525d, a foot-rest 530a, 530d, and/or an arm-rest 535a, 535d may be repositioned throughout a plurality of various positions, shown as dashed lines.

Figure 6:
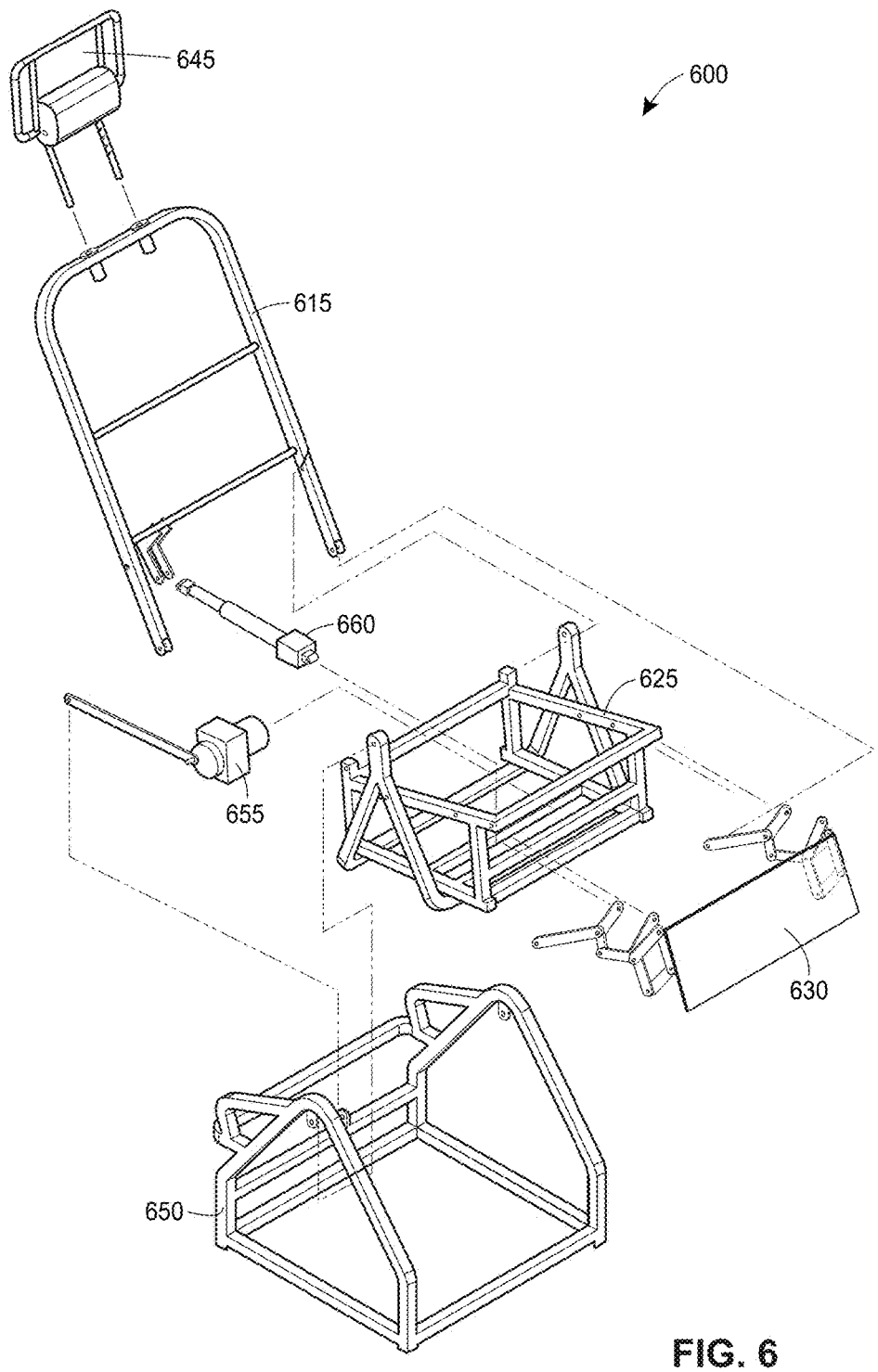
FIG. 6 depicts an example powered reclining chair with a rocking feature.

With reference to FIG. 6, a powered reclining/rocking chair 600 may include a support frame 650, a seat frame 625 pivotally mounted on the support frame 650, a rotary actuator 655 mounted between the support frame 650 and the seat frame 625 to drive the seat frame 625 to move relative to the support frame 650, a chair back 615 pivotally mounted on the seat frame 625, a linear actuator 660 mounted between the seat frame 625 and the chair back 615 to drive the chair back 615 to move relative to the seat frame 625, a head support 645 mounted on the chair back 615, two link mechanisms mounted between the chair seat 625 and the chair back 615 to move in concert with the chair back 615, and a foot support 630 mounted between the two link mechanisms to move in concert with the two link mechanisms. The seat frame 625 may have an upper end provided with two opposite pivot ears and a lower end provided with a plurality of castors. The seat frame 625 has a rear end provided with a stop portion.

The powered reclining/rocking chair may further include two suspension arms each secured on the seat and each pivotally mounted on the support frame, and at least two reinforcing members located between the seat and the two suspension arms respectively to enhance the structural strength of the seat. Each of the two suspension arms extends upwardly from the seat and has an upper end provided with a pivot portion pivotally mounted on a respective one of the pivot ears of the support frame.

The seat is pivotable relative to the support frame in a pendulum manner. The seat and has an upper portion and a lower portion. The upper portion of the seat has a front end provided with two first through holes and second through holes and a rear end provided with two through bores. The lower portion of the seat has a side provided with a support base.

The rotary actuator may include a drive member secured on the lower portion of the seat, a rotation member rotatably mounted on the drive member, and a drive lever having a first end pivotally connected with the rotation member to move in concert with the rotation member and a second end pivotally connected with the stop portion of the support frame. The drive member of the rotary actuator is a drive motor to rotate the rotation member. The rotation member of the rotary actuator has a disk shape. The first end of the drive lever is arranged on the rotation member eccentrically and is deviated from a central shaft of the rotation member.

The two link mechanisms are located at two opposite sides of the seat symmetrically. Each of the two link mechanisms has a mediate portion provided with a first pivot hole pivotally connected with a respective one of the first through holes of the seat and a second pivot hole pivotally connected with a respective one of the second through holes of the seat. Each of the two link mechanisms has a first end provided with a driven portion that is movable in concert with the backrest and a second end provided with a support portion that is movable in concert with the driven portion. The foot support is mounted between the support portions of the two link mechanisms.

The backrest has a lower end provided with two pivot bores each pivotally connected with a respective one of the through bores of the seat and two push portions each pivotally connected with the driven portion of a respective one of the two link mechanisms. Each of the two pivot bores of the backrest is located above each of the two push portions. The backrest has an upper end provided with two mounting sleeves. The backrest has a side provided with a drive arm which is substantially V-shaped.

The linear actuator has a first portion pivotally connected with the support base of the seat and a second portion retractably mounted in the first portion and pivotally connected with the drive arm. Preferably, the drive arm has an upper end secured on the backrest and a lower end pivotally connected with the second portion of the linear actuator. Thus, when the second portion of the linear actuator is moved relative to the first portion of the linear actuator, the drive arm is moved in concert with the second portion of the linear actuator to drive the backrest to pivot relative to the seat.

The head support may include a resting cushion and two adjusting rods each mounted on a bottom of the resting cushion and each adjustably mounted in a respective one of the mounting sleeves of the backrest.

In adjustment, when the second portion of the linear actuator is moved toward the first portion of the linear actuator, the drive arm is moved in concert with the second portion of the linear actuator to drive the backrest to pivot downward relative to the seat, so that the pivot bores of the backrest are pivoted about the through bores of the seat, and the backrest is moved rearward and downward. At the same time, when the backrest is moved relative to the seat, the driven portion of each of the two link mechanisms is pushed by the respective push portion of the backrest to drive each of the two link mechanisms to pivot forward relative to the seat, so that the support portion of each of the two link mechanisms is moved forward and upward, and the foot support is also is moved forward and upward until the foot support is disposed at a horizontal state. In such a manner, the inclined angle of the backrest and the foot support is adjusted by operation of the linear actuator according to the user's requirement so as to provide a comfortable sensation to the user.

On the contrary, when the second portion of the linear actuator is moved outward relative to the first portion of the linear actuator, the drive arm is moved in concert with the second portion of the linear actuator to drive the backrest to pivot upward relative to the seat, so that the pivot bores of the backrest are pivoted about the through bores of the seat, and the backrest is moved forward and upward. At the same time, when the backrest is moved relative to the seat, the driven portion of each of the two link mechanisms is pulled by the respective push portion of the backrest to drive each of the two link mechanisms to pivot rearward relative to the seat, so that the support portion of each of the two link mechanisms is moved rearward and downward, and the foot support is also is moved rearward and downward so as to fold the foot support.

In operation, the drive member of the rotary actuator is secured on the lower portion of the seat, the first end of the drive lever is pivotally connected with and arranged on the rotation member eccentrically, and the second end of the drive lever is limited by the stop portion of the support frame, so that when the rotation member is rotated by the drive member, the rotation member is driven by the drive lever to move relative to the support frame, and the drive member is moved by the rotation member to drive the seat to move relative to the support frame. At this time, each of the two suspension arms secured on the seat is pivotally mounted on the support frame, so that the seat is pivoted relative to the support frame by operation of the rotary actuator. In such a manner, the seat is pivoted rightward and leftward so that the seat is pivoted reciprocally relative to the support frame in a pendulum manner.

The powered reclining/rocking chair further comprises an electrically control device connected with the rotary actuator and the linear actuator to control operation of the rotary actuator and the linear actuator, an overload protection device connected with the electrically control device to shut an electric power to the electrically control device when an overload occurs, and a timer connected with the electrically control device to automatically preset the operation time of the electrically control device. In such a manner, the linear actuator is controlled by the electrically control device to adjust the inclined angle of the backrest and the foot support, and the rotary actuator is controlled by the electrically control device to drive the seat to pivot relative to the support frame in a pendulum manner.

The resting cushion of the head support may include a main adjusting bracket and a secondary adjusting bracket pivotally mounted on the main adjusting bracket. The main adjusting bracket of the resting cushion is provided with a main toothed portion. The secondary adjusting bracket of the resting cushion is provided with a secondary toothed portion adjustably meshing with the main toothed portion of the main adjusting bracket.

Thus, the secondary adjusting bracket of the resting cushion is pivoted relative to the main adjusting bracket of the resting cushion to adjust the inclined angle of the head support. Each of the adjusting rods of the head support is provided with a plurality of adjusting detents adjustably mounted in the respective mounting sleeve of the backrest to adjust the height of the head support.

Accordingly, the rotary actuator is controlled by the electrically control device to drive the seat to pivot relative to the support frame reciprocally in a pendulum manner so that the seat is pivoted relative to the support frame automatically, and the user needs not to rock the seat manually. In addition, the linear actuator is controlled by the electrically control device to adjust the inclined angle of the backrest and the foot support according to the user's requirement so as to provide a comfortable sensation to the user.

Figure 7:
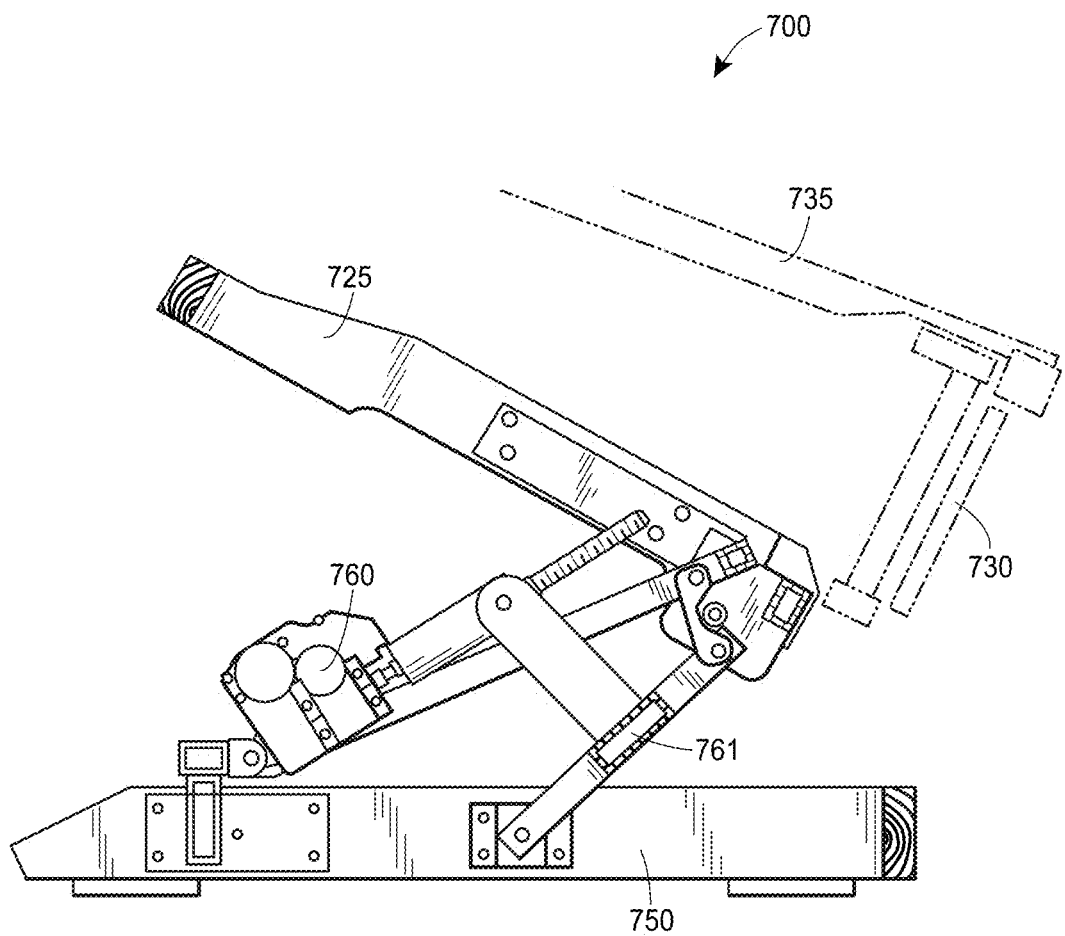
FIG. 7 depicts an example powered lifting mechanism for powered reclining chair.

Turning to FIG. 7, a powered lift chair 700 may include a lift base assembly 750 and a chair support frame 725. The lift base assembly 750 supports the chair 700 in a normal seated position. The lift base assembly 750 lifts the chair 700 to a tilted position that makes it easier for a person to enter or leave the chair 700. Any of a wide variety of chair constructions can be used with the lift base assembly. The chair 700 may include a frame 761, side arms 735, a seat back 730, and a seat portion 725. The seat back 730 may recline in response to pressure from the back of an occupant and the seat portion 725 may move simultaneously with the seat back 730. The chair 700 also may include an extensible leg rest assembly. Additionally, the seat back 730 and/or the seat portion 725 may include a heat pad and/or a cooling device. The heat pad and/or cooling device may be selectively energized to provide heat and/or cooling to person using the chair.

An exemplary lift base assembly may include a stationary, rectangular bottom frame member that rests on the floor and a movable, rectangular upper frame member on which the chair is removably but securely attached by suitable fasteners. The bottom frame member may include left and right hand side members, respectively, that are rigid with a front cross member. Side members may have suitable pads that engage the surface of a floor. Upper frame member may include left and right side members that are rigid with a rear cross member. A linear actuator 760 may nest inside of the bottom from member 750, the upper frame member 761, and the chair seat 725.

Alternatively, a lift mechanism may include a power-assist means, such as an electric motor, a rotary screw shaft, and an internally threaded sleeve or nut. The motor may be selectively operable to rotate the screw shaft in either a first direction or second direction. Both the motor and the screw shaft can arcuately swing up and down in a generally vertical plane about a pivot. The screw shaft extends through and drives the sleeve so that the sleeve moves forwardly or rearwardly along the length of the screw shaft upon rotation of the screw shaft in one of the first and second directions. In the seated or lowered position of the chair, the sleeve may be positioned near the front or outer end of the screw shaft. Lifting of the chair is accomplished by energizing the motor to rotate the screw shaft in a direction that pulls the sleeve toward the motor. To lower the chair, rotation of the screw shaft is reversed, which draws the sleeve away from the motor. An exemplary lift base assembly and lift mechanism are described in more detail in U.S. Pat. No. 5,061,010, assigned to La-Z-Boy Chair Co., which is hereby incorporated by reference in its entirety. Although the above lift base assembly and lift mechanism are described for illustrative purposes, it is to be understood that other suitable lift base assemblies and lift mechanisms may be used with the present invention as it is described below.

An electrical control system for the motor may include two-prong attachment plug that fits into an electrical receptacle in the general proximity to where the lift base assembly is used for providing electrical current to operate the lift assembly. Alternatively, the attachment plug may be a three-prong grounding plug that fits into a grounding-type receptacle. The plug may include an insulated cable or power cord of suitable length. The electrical control system also may include a transformer, an electrical controller, a control wand, heating pads, cooling device, massage device, a motor actuator, and various male and female socket connectors for connecting the components of the electrical control system as described below.

The transformer may include a power cord with three current-carrying inductors that terminate in a male socket connector. The male socket mates with a female socket connector so that the transformer is electrically connected to the electrical controller through a power cord. The electrical controller further may include power cords. The power cord may include four current-carrying conductors that terminate in a male socket connector and a female socket connector. The power cord may include eight current-carrying conductors that terminate in a female socket connector. The power cord may include five current-carrying conductors that terminate in a male socket connector. The socket connectors may mate with counterpart socket connectors to electrically connect the electrical controller to the control wand, the heating pads, cooling device, massage device, and the motor actuator.

The transformer may receive AC power from a standard electrical receptacle via the power cord. The transformer may step down the input power, for example 120 volts of AC, to an output power. For example, the transformer outputs an AC voltage of 12 volts and a constant DC voltage of 27 volts. The transformer may include batteries, such as 9 volt batteries, which may provide backup power to the electrical system in the event of a power failure. The heating pads, cooling devices, and message devices may be powered by the 12 volts AC and the motor actuator may be powered by the 27 volts DC.

The electrical controller may receive both the 12 volts AC and the 27 volts DC from the transformer. The electrical controller may distribute the power from the transformer to the heating pads, cooling devices, massage device, the motor actuator, and the control wand. The electrical controller may direct the 12 volts AC to the heating pads, cooling device, and/or massage device, and may direct the 27 volts DC to the motor actuator. The control wand may also receive power from the 27 volt DC supply.

The control wand may include a control cord for receiving power from the electrical controller. The control wand may be mounted to a side arm of the chair or, alternatively, held and operated by a person using the chair. Additionally, the control cord communicates commands from the control wand to the electrical controller. For example, the control wand may include indicator means, such as an LED array, and one or more control switches. The user may control the various operations of the chair with the switches, such as lifting and lowering functions, reclining functions, and "on" or "off" status of the heating pads, cooling devices, message devices, etc. When the user operates the switches to lift the chair, electrical power is supplied to the motor actuator to rotate the screw shaft, rotary actuator, or linear actuator in a direction to cause the chair to lift. When the user operates the switches to lower the chair, electrical power is supplied to the motor actuator to rotate the screw shaft, rotary actuator, or linear actuator in the opposite direction for lowering the chair. The user may view status information for the chair at the indicator means, such as "on" or "off" status or relative temperature indicators of the heating pads and/or cooling devices.

The control wand may be powered by the 27 volt DC supply. However, the control wand does not directly switch the current load of the motor actuator. Instead, the control wand switches relays located in the electrical controller in order to control power to the motor actuator. In this manner, the high current draw of the motor actuator does not pass through the control wand. In an alternative embodiment, the indicator means and/or the switches are located directly on the chair rather than on the control wand. For example, the indicator means and switches may be located on a side arm of the chair.

The motor actuator may receive electrical power from the electrical controller through the electrical connection of the power cord, the male socket connector, and the female socket connector. The motor actuator may provide rotational power to the screw shaft according to the electrical power received from the electrical controller. For example, if the user operates the switches to lift the chair, the motor actuator receives electrical power of a first polarity to rotate the screw shaft in a first direction. If the user operates the switches to lower the chair, the motor actuator receives electrical power of a second polarity to rotate the screw shaft, the rotary actuator, or linear actuator in a second direction.

The rate at which the motor actuator lifts and lowers the chair may be directly dependent upon the DC voltage received from the transformer through the electrical controller. In the preferred embodiment, the DC voltage is 27 volts. The current drawn by the motor actuator, however, may be proportional to the load upon the chair. If the chair is empty, the motor actuator requires relatively low current. If the chair is loaded with a person, the motor actuator requires higher current. Conventionally, motor actuators receive a particular power input to control the lift and lowering functions. As the load upon the chair increases, the motor actuator draws more current. Because power is a product of voltage and current (P=VI), the voltage of the motor actuator decreases proportionately as current draw increases. As voltage decreases, the lift rate of the chair decreases proportionately. Therefore, it can be seen that the lift and/or lower rates of conventional power-assisted chairs were extremely dependent upon the load on the chair at any particular time.

In contrast, the transformer of the present invention is operable to output a generally constant DC voltage regardless of the current draw from the motor actuator. One such transformer available is InSeat Solutions' AC/DC adaptor, model number 15541 Class II power transformer, which outputs a 12 volt AC supply and a 27 volt DC supply. If the motor actuator draws more current due to a heavier load upon the chair, the transformer adjusts automatically to maintain a generally constant DC voltage output of 27 volts to the motor actuator. The motor actuator receives a constant voltage regardless of the current draw. Therefore, the motor actuator may provide constant rotational power to the screw shaft, rotary actuator, or linear actuator. In this manner, the power-assisted chair of the present invention may provide generally constant lift and lowering rates independent of the load on the chair. Further, the power-assisted chair of the present invention is able to provide constant lift and lowering rates for loads up to 500 hundred pounds with a single motor.

The required time to complete a full lift or lower cycle is dependent upon the lift or lower rate of the motor, and therefore is further dependent upon the voltage output of the transformer. Because the DC voltage supply of the transformer is generally constant, lift and lower cycles will be consistent regardless of the weight of the person using the chair. For example, slight voltage drops due to extremely heavy loads may cause the lift cycle to have a slightly longer duration, and the lower cycle to have a slightly shorter duration. Although cycle times may vary slightly due to factors such as increased heat due to higher current draw and other process variables, a person using the chair may expect generally uniform lift and lower cycle times.

Additionally, the electrical control system is operable to selectively control power to the heating pads, cooling devices, and/or massage devices during lift and lower operations of the motor actuator, which allows the transformer to maintain a Class II rating. For example, if the user operates the switches to lift or lower the chair while the heating pads, cooling devices, and/or message devices are "on," the electrical controller may turn off power to the heating pads, cooling devices and/or massage devices. Once the lift or lower operation is complete, the electrical controller will restore power to the heating pads, cooling devices and/or massage devices. In this manner, the electrical controller directs power solely to the motor actuator during lift and lower operations, which allows the motor actuator to receive the maximum power available.

The electrical control system may include other electrical components, such as a vibratory massage device, an air pillow massage device, or other devices as are known in the art. The additional devices may operate on the 12 volt AC supply in a fashion similar to the heating pads, cooling devices and/or massage devices. Correspondingly, the electrical controller may disable power to the additional devices during motor lift and lower operations.

An electrical power supply may be configured as "smart" power supply such that, for example, a maximum power, drawn from a power supply, may be automatically limited by controlling a number of recliner chairs that can be operated at any given time. For example, when a power supply is being operated near a maximum limit, recliner chairs, that are connected to the power supply and not yet being operated, are disabled until a power draw from an associated power supply is reduced (e.g., operation of a previously operated recliner chair is ceased). Alternatively, or additionally, operation of a previously operated recliner chair may be automatically suspended if, for example, an occupant of another recliner chair, that is connected to the power supply, initiates return of the chair to an upright position. Accordingly, if an occupant of a recliner chair needs to exit the chair for any reason (e.g., an emergency) that chair will operate and any other chair that is being reclined may cease to operate. Alternatively, or additionally, any given powered recliner chair within a venue, or all powered recliner chairs within the venue, may be configured to automatically move to any predetermined position (e.g., a fully upright position, a fully reclined position, or any position there between) in the event of an emergency. Notably, notification of an emergency situation within a venue may be initiated via a central alarm (e.g., a manually operated fire alarm, a carbon monoxide sensor, a smoke sensor, etc.), a sound detector (e.g., a gunshot detector, a scream detector, etc.), and/or via a personal electronic device (e.g., a mobile telephone, a portable data assistant, a laptop computer, or any other portable electronic device that is communicatively coupled to a venue emergency notification system).

Similarly, operation of a group of recliner chairs, that are connected to a common power supply, may be automatically staggered such that any given sub-group of recliner chairs may be automatically delayed (e.g., to reduce inrush current—10 mS delay), or operation may be alternated, such that a maximum power limit of the associated power supply is not exceeded. Thereby, a group of recliner chairs, that are connected to a smart power supply, may be automatically controlled to not exceed a power supply maximum.

A "smart power supply system" may include a power supply (e.g., transformer 1496a, 1496c, 1496d) and a controller (e.g., controller 800, 990a, 990b, 1090a, 1090b), and may include controlling/activating/deactivating any given recliner chair(s) by communicating between chairs, monitoring chair(s) status, (e.g., such things as recline position and travel direction) and may predict/anticipate chair(s) power requirements including accessories such as heat, message, etc. to enable/disable/prioritize recliner chair power consumption. Such a smart power supply system may control inherent power peaks, that may occur during normal operation, or less critical action in a manner to minimize power consumption while optimizing associated recliner chair user experience.

Figure 8:
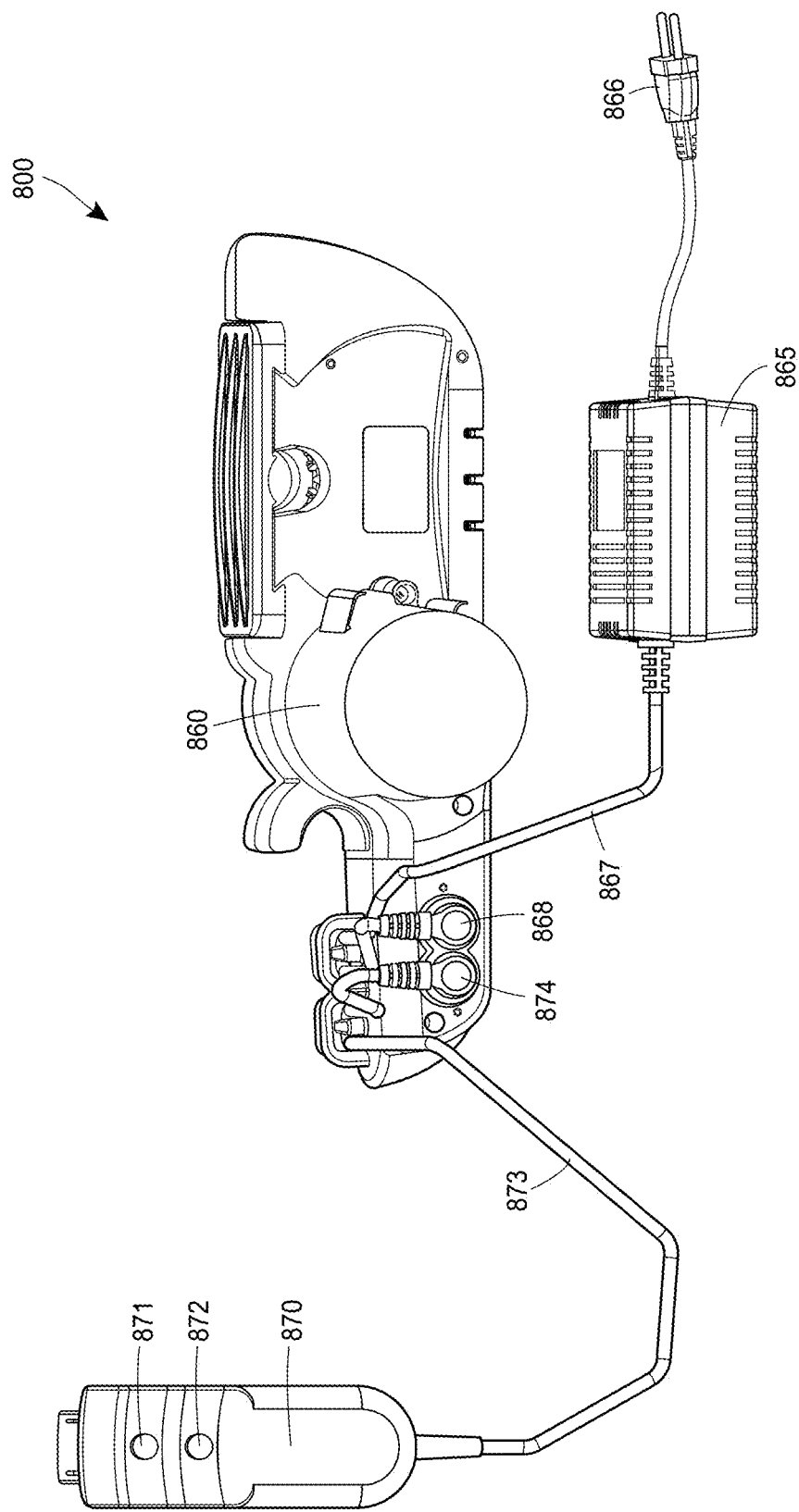
FIG. 8 depicts an example controller assembly for a powered reclining chair.

With reference to FIG. 8, a powered chair control assembly 800 may include a controller (e.g., a programmable logic controller (PLC), an application specific integrated circuit (ASIC), a discrete component electrical circuit, a field-programmable gate array (FPGA), a micro-controller, etc.)/actuator 860, a power connection 866, a power transformer 865, a power connection cable 867, a transformer connection 868, a local controller 870, a local controller cable 873, and a local controller connector 874. The controller/actuator 860 may be either a controller/linear actuator or a controller/rotary actuator. The local controller 870 may be similar to the local controller 270, 370, 470 of FIGS. 2-4, respectively. The local controller 870 may include, for example, a chair recline button 871 and a chair upright button 872. Alternatively, the chair controller 870 may include, for example, a first button to move the respective chair between an upright position (e.g., a chair position as illustrated in FIG. 2) and a reclined position (e.g., a chair position as illustrated in FIG. 3). As another alternative, a chair controller 870 may include a plurality of functions, such as, individual buttons associated with independently controlling a chair back 215, a lower lumbar support 220, a chair seat 225, a foot-rest 230, and/or an arm-rest 235. Additionally, a chair controller 870 may include an audio output connector, a power output connector, lighting, a microphone, a speaker, etc. Alternatively, a chair controller 870 may be similar to a portable computing device (e.g., portable computing device 169 of FIG. 1) that facilitates a plurality of chair controls and/or venue interaction. While not shown in FIG. 8, the controller/actuator 860 may also include a battery. While not shown in FIG. 8, the controller/actuator 860 may include a plurality of sensors (e.g., limit switches, proximity sensors, motion sensors, temperature sensors, occupancy sensors, pressure sensors, strain gauges, etc.) and/or lighting (e.g., light emitting diodes). While a control module may be places between a switch and motor/actuator, a "smart switch" may be provided, which may incorporate the function of a control module and switch into one unit; communication lines may then plug directly into the smart switch.

Turning to FIGS. 9A-9C, a powered chair control assembly 900a-c may include a controller (e.g., a programmable logic controller (PLC), an application specific integrated circuit (ASIC), a discrete component electrical circuit, a field-programmable gate array (FPGA), a micro-controller, etc.) 990a, 990b, a local controller 970c, a wireless data receiver 985b, and an actuator 960b. The actuator 960b may be either a linear actuator or a rotary actuator. The local controller 970c may be similar to the local controller 270, 370, 470 of FIGS. 2-4, respectively. The local controller 970c may include, for example, a chair back upright button 971c, a chair back recline button 977c, a chair seat upright button 972c, a chair seat upright button 976c, a chair foot-rest upright button 974c, and/or a chair foot-rest recline button 975c. The chair controller 970c may include, for example, a first button to move the respective chair between an upright position (e.g., a chair position as illustrated in FIG. 2) and a reclined position (e.g., a chair position as illustrated in FIG. 3). Alternatively, a chair controller 970c may include a plurality of functions, such as, individual buttons associated with independently controlling a chair back 215, a lower lumbar support 220, a chair seat 225, a foot-rest 230, and/or an arm-rest 235. Additionally, a chair controller 970c may include an audio output connector, a power output connector, lighting, a microphone, a speaker, etc. Alternatively, a chair controller 970c may be similar to a portable computing device (e.g., portable computing device 169 of FIG. 1) that facilitates a plurality of chair controls and/or venue interaction.

The controller 990a, 990b may include a reclined chair position indicator 997a, 997b and/or an upright chair position indicator 998a, 998b. The controller 990a, 990b may further include a first connector receptacle 991a, a second connector receptacle 992a, a third connector receptacle 993a, a forth connector receptacle 991b, a fifth connector receptacle 992b, a sixth connector receptacle 993b, a seventh connector receptacle 994b, and/or an eighth connector receptacle 995b. The controller 990a, 990b may also include a battery 996b. While not shown in FIG. 9A or 9B, the controller 990a, 990b and/or the actuator 960b may include a plurality of sensors (e.g., limit switches, proximity sensors, motion sensors, temperature sensors, occupancy sensors, pressure sensors, strain gauges, etc.) and/or lighting (e.g., light emitting diodes).

Figure 10A:
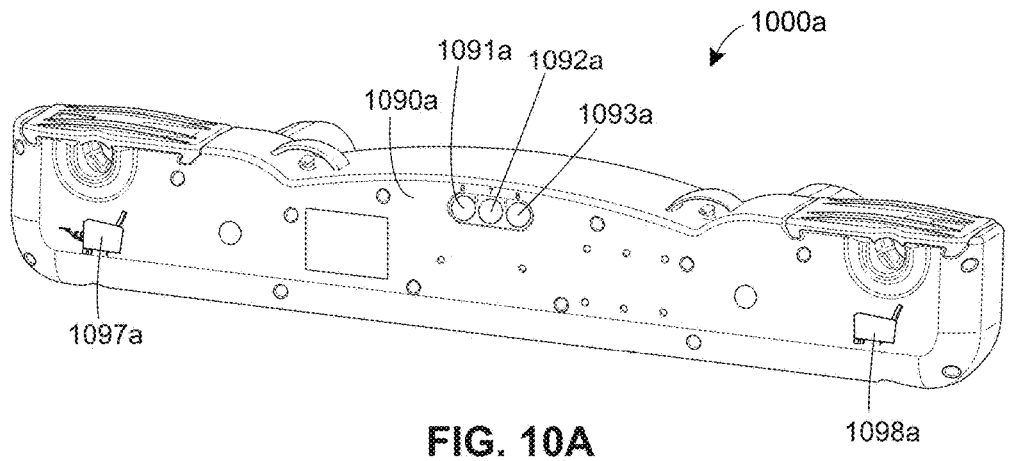
FIGS. 10A-C depict an example controller assembly for a powered reclining chair.
Figure 10B:
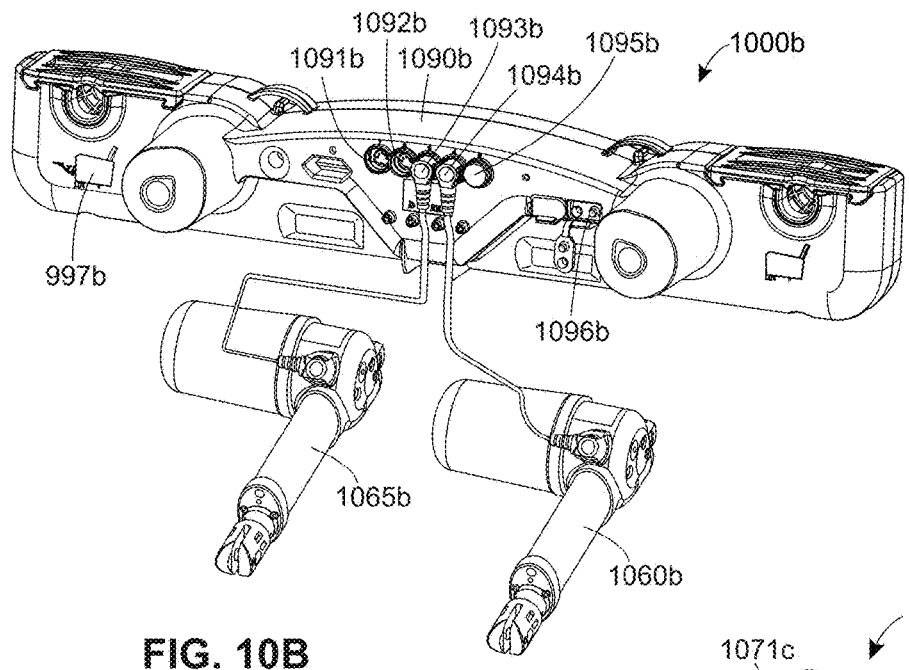
Figure 10C:
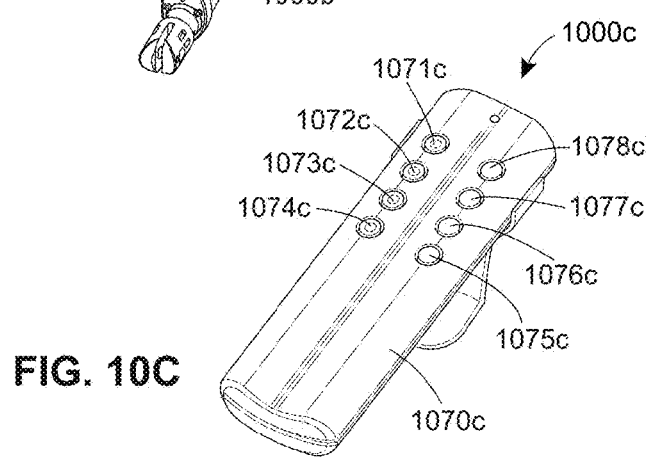

With reference to FIGS. 10A-10C, a powered chair control assembly 1000a-c may include a controller (e.g., a programmable logic controller (PLC), an application specific integrated circuit (ASIC), a discrete component electrical circuit, a field-programmable gate array (FPGA), a micro-controller, etc.) 1090a, 1090b, a local controller 1070c, a wireless data receiver 1085b, a first actuator 1060b, and a second actuator 1065b. The first actuator 1060b and/or the second actuator 1065b may be either a linear actuator or a rotary actuator. The local controller 1070c may be similar to the local controller 270, 370, 470 of FIGS. 2-4, respectively. The local controller 1070c may include, for example, a chair back upright button 1071c, a chair back recline button 1078c, a chair seat upright button 1072c, a chair seat upright button 1077c, a chair foot-rest upright button 1073c, a chair foot-rest recline button 1076c, a head-rest upright button 1074c, and/or a head-rest recline button 1075c. The chair controller 1070c may include, for example, a first button to move the respective chair between an upright position (e.g., a chair position as illustrated in FIG. 2) and a reclined position (e.g., a chair position as illustrated in FIG. 3). Alternatively, a chair controller 1070c may include a plurality of functions, such as, individual buttons associated with independently controlling a chair back 215, a lower lumbar support 220, a chair seat 225, a foot-rest 230, and/or an arm-rest 235. Additionally, a chair controller 1070c may include an audio output connector, a power output connector, lighting, a microphone, a speaker, etc. Alternatively, a chair controller 1070c may be similar to a portable computing device (e.g., portable computing device 169 of FIG. 1) that facilitates a plurality of chair controls and/or venue interaction.

The controller 1090a, 1090b may include a reclined chair position indicator 1097a, 1097b and/or an upright chair position indicator 1098a, 1098b. The controller 1090a, 1090b may further include a first connector receptacle 1091a, a second connector receptacle 1092a, a third connector receptacle 1093a, a forth connector receptacle 1091b, a fifth connector receptacle 1092b, a sixth connector receptacle 1093b, a seventh connector receptacle 1094b, and/or an eighth connector receptacle 1095b. The controller 1090a, 1090b may also include a battery 1096b. While not shown in FIG. 10A or 10B, the controller 1090a, 1090b and/or the actuator 1060b may include a plurality of sensors (e.g., limit switches, proximity sensors, motion sensors, temperature sensors, occupancy sensors, pressure sensors, strain gauges, etc.) and/or lighting (e.g., light emitting diodes).

Figure 11A:
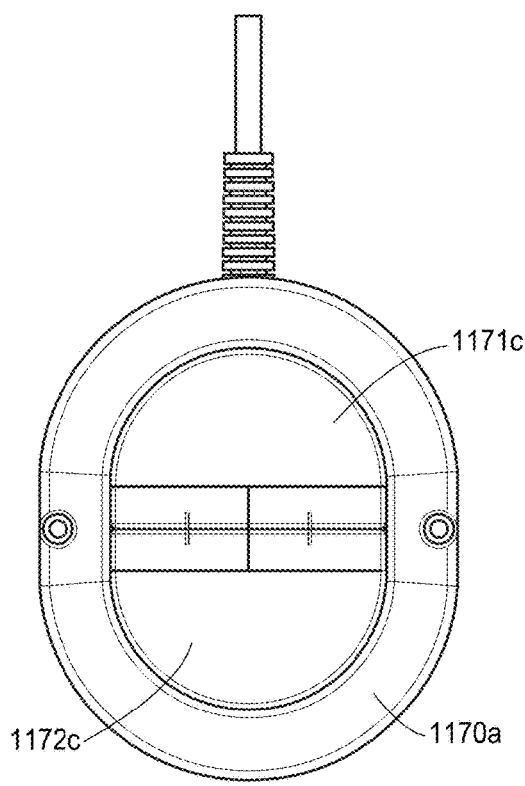
FIGS. 11A-C depict an example local control for a powered reclining chair.
Figure 11B:
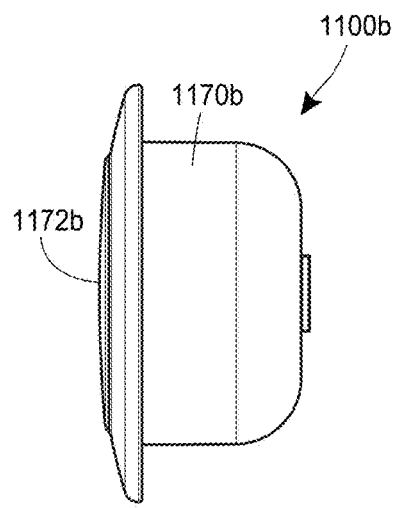
Figure 11C:
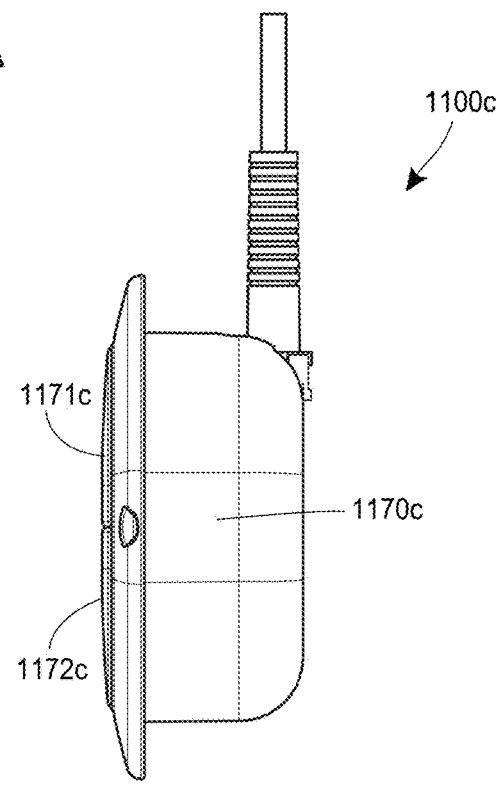

Turning to FIGS. 11A-11C, a local chair control assembly 1100a-c may include a chair control housing 1170a-c, a chair recline button 1171a-c, and/or a chair upright button 1172a-c. The local chair control assembly 1100a-c may include, for example, a first button to move the respective chair between an upright position (e.g., a chair position as illustrated in FIG. 2) and a reclined position (e.g., a chair position as illustrated in FIG. 3). Alternatively, a local chair control assembly 1100a-c may include a plurality of functions, such as, individual buttons associated with independently controlling a chair back 215, a lower lumbar support 220, a chair seat 225, a foot-rest 230, and/or an arm-rest 235. Additionally, a local chair control assembly 1100a-c may include an audio output connector, a power output connector, lighting, a microphone, a speaker, etc. Alternatively, a local chair control assembly 1100a-c may be similar to a portable computing device (e.g., portable computing device 169 of FIG. 1) that facilitates a plurality of chair controls and/or venue interaction. The local chair control assembly 1100a-c may be similar to, for example, the local chair control 270, 370, 470.

Figure 12A:
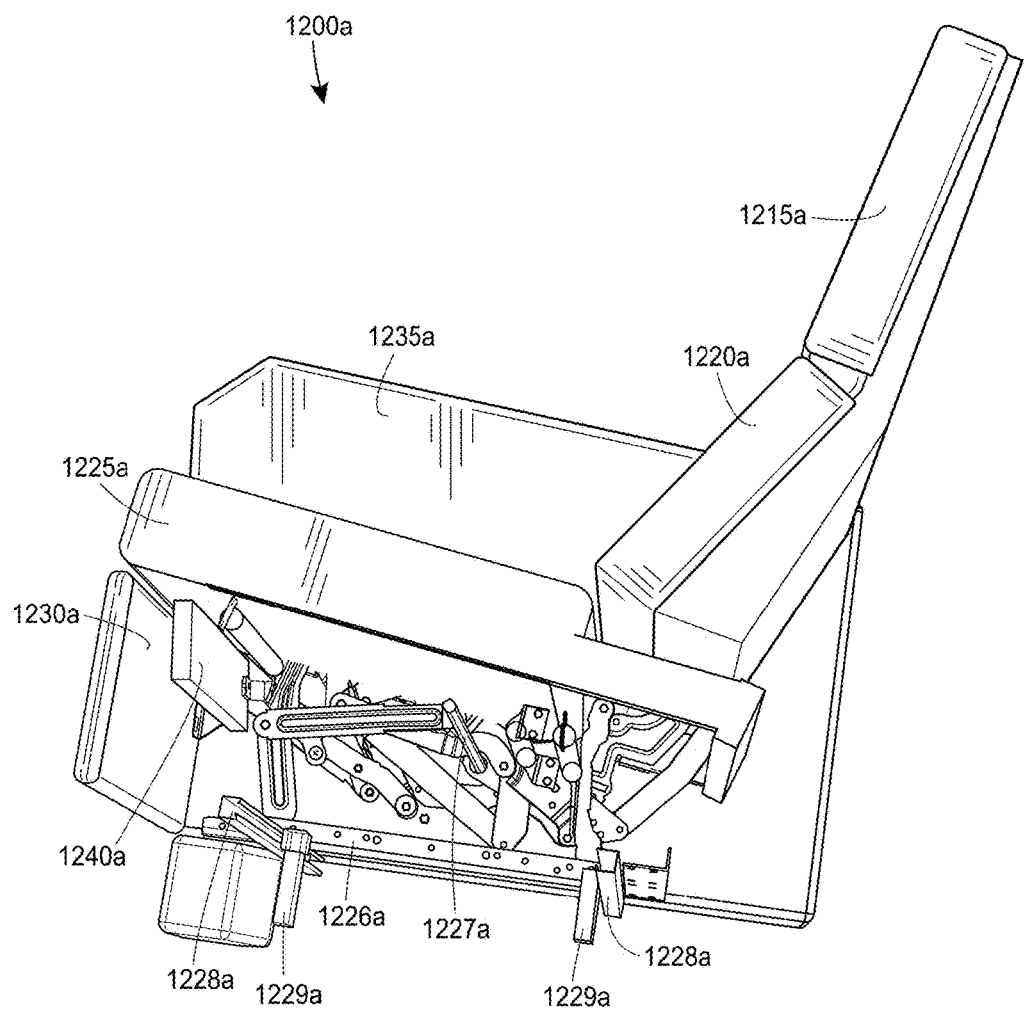
FIGS. 12A-B depict bottom perspective views of an example powered reclining chair.
Figure 12B:
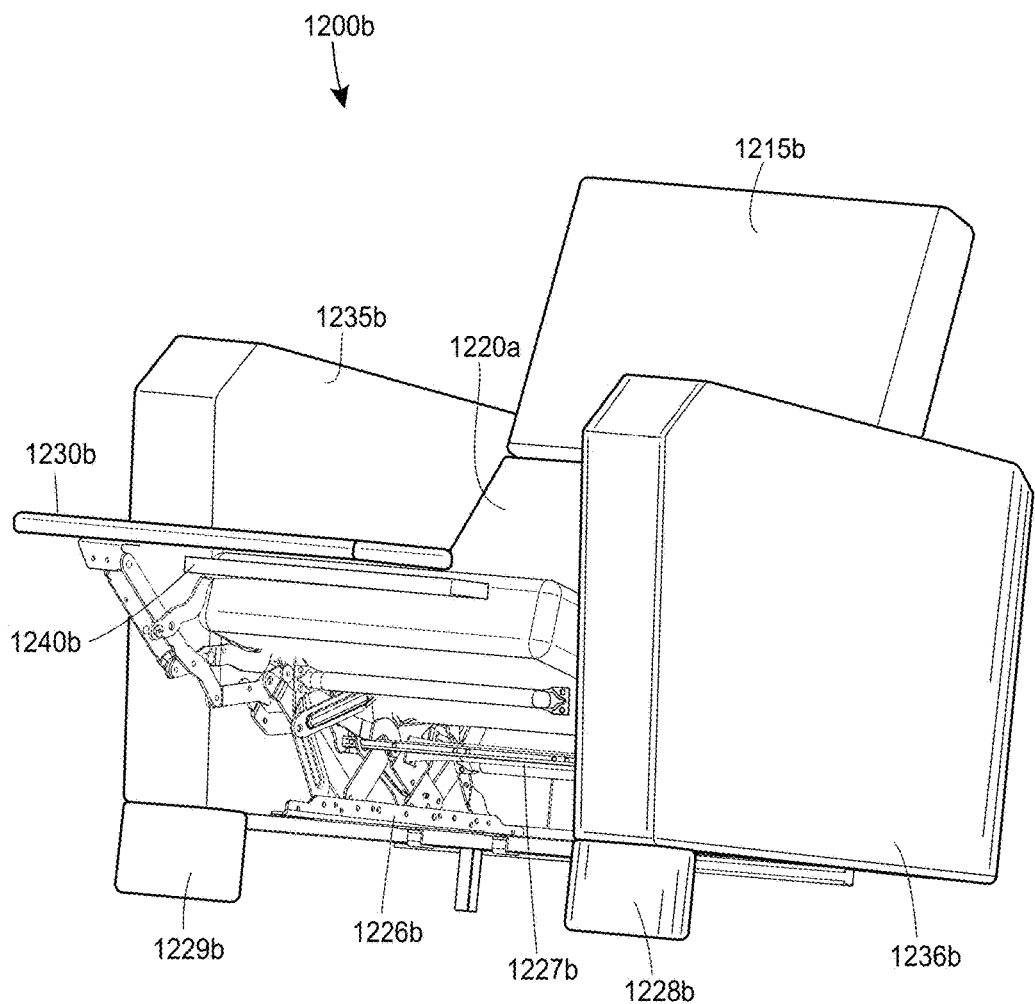

With reference to FIGS. 12A and 12B, a powered recliner chair 1200a, 1200b may include a chair back 1215a, 1215b, a lower lumbar support 1220a, 1220b, a chair seat 1225a, 1225b, a foot-rest 1230a, 1230b, at least one arm-rest 1235a, 1235b (in some embodiments a chair may include two arm-rests that are mirror images of one another), a calf-rest 1240a, 1240b, a support structure 1226a, 1226b, and/or a chair reclining mechanism 1227a, 1227b. The powered recliner chair 1200a, 1200b may be similar to, for example, any one of the powered chairs 171, 200, 300, 400. The powered recliner chair 1200a, 1200b may incorporate any one of the controllers and/or actuators as shown and described with respect to FIGS. 6-10. Power and/or data wiring may be routed through cross-channels 1228a. Legs 1229a and the channels 1228a may be mounted to an associated floor and a modular powered recliner chair may subsequently set in place on the legs 1229a and channels 1228a. The legs 1229a may be of pre-determined lengths in proportion to a floor slope such that the chairs set level.

Figure 13A:
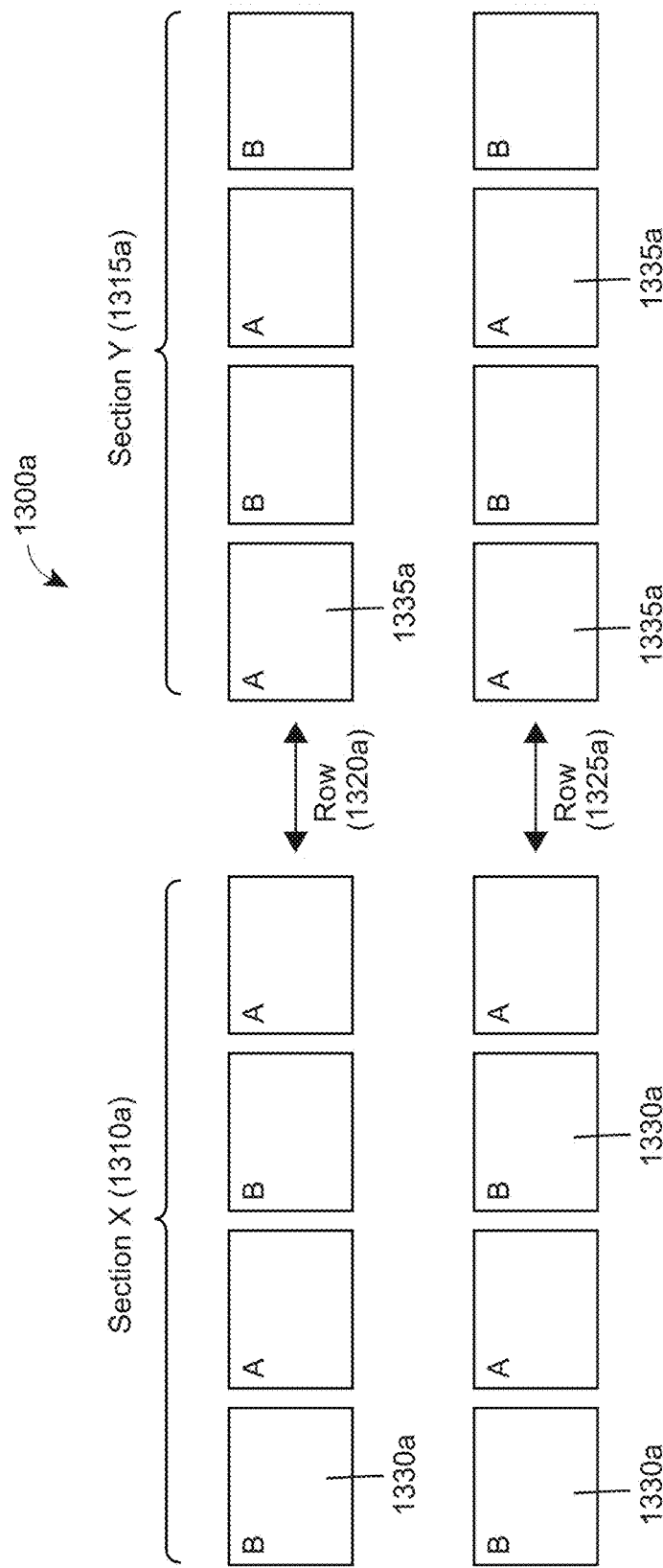
FIGS. 13A-B depict block diagrams for example recliner chair control systems.
Figure 13B:
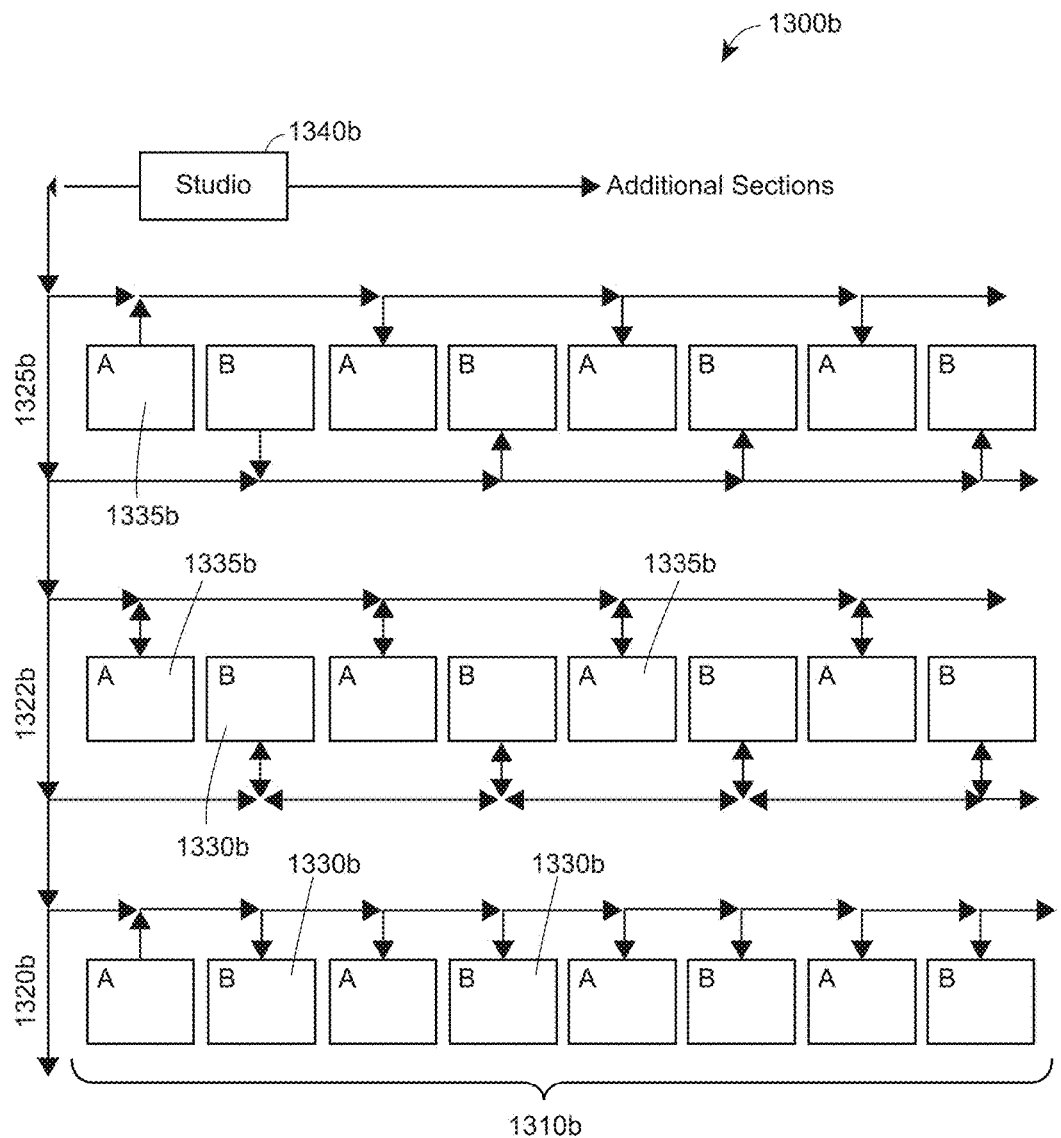

Turning to FIGS. 13A and 13B, block diagrams for example recliner chair control systems 1300a, 1300b are depicted. FIG. 13A depicts a controller 1305a, that may be included in one or more locations per row 1320a, 1325a, per section 1310a, 1315a, and may be set to control all A chair 1335a locations in a respective row 1320a, 1325a and section 1310a, 1315a. Alternatively or additionally, a controller 1305a may be included in one or more locations per row 1320a, 1325a per section and may be set to control all A and B chair 1335a, 1330a, respectively, locations in that row 1320a, 1325a and section 1310a, 1315a. Any given chair may be, for example, similar to any one of the recliner chairs 210 of FIG. 2, or a group of recliner chairs 210. Control Z 1305a may control all configurations. Various controller 1305a location and control options are depicted in FIG. 13B. The related control may extend and/or retract associated reclining chair mechanism (e.g., chair mechanism 1227a of FIG. 12A). For example, individual chair location control may be provided using an electrical switch (e.g., switch 270 of FIG. 2) per chair. Alternatively or additionally, a row 1320a, 1325a control may be provided by way of an assigned master or multiple master controllers 1305a in the row 1320b, 1322b, 1325b. A studio control 1340b may be proved to control of all chairs 1330b, 1335b by a central control 1305a. Alternatively, a studio control 1340b may control any and all locations in all rows 1320b, 1322b, 1325b and sections 1310a, 1315a. Optionally, an end of row controller 1305a A location may control all A locations in the row 1320b, 1322b, 1325b per section 1310b. Yet optionally, a second from end controller 1305a may control all B locations in the row 1320b, 1322b, 1325b per section 1310b. Yet alternatively, one or more A controller 1305a locations may control all other A locations in a row 1320b, 1322b, 1325b per section 1310b. Yet further optionally, one or more B controller 1305a locations may control all other B locations in the row 1320b, 1322b, 1325b per section 1310a, 1315a. Even further, an end of row controller 1305a location may control all locations in the row 1320b, 1322b, 1325b per section 1310a, 1315a.

Figure 14A:
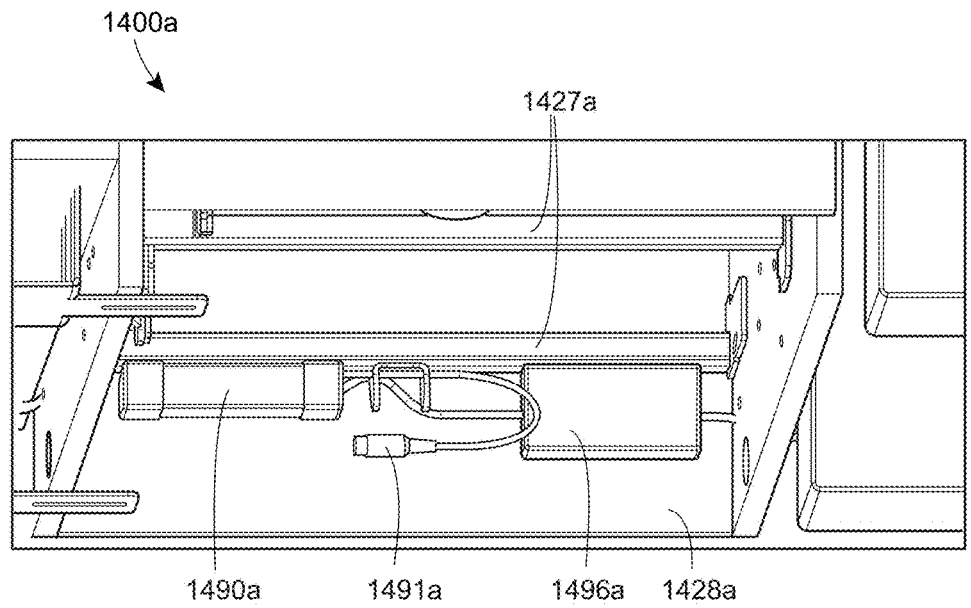
FIGS. 14A-H and 14J-K depict example recliner chairs and related control components.
Figure 14B:
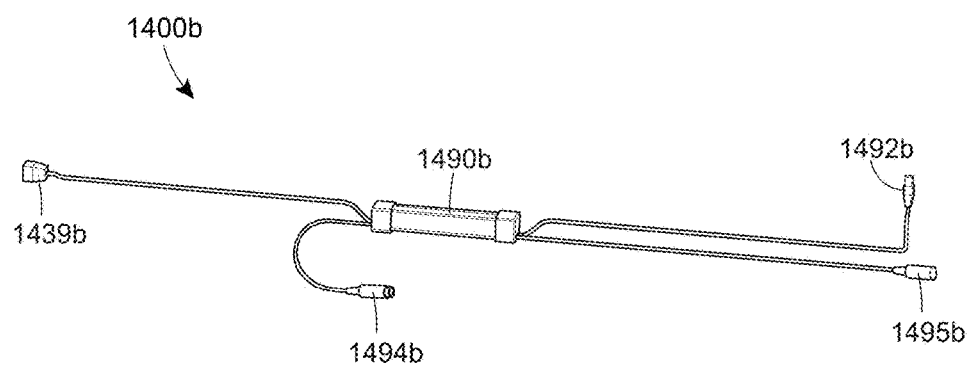
Figure 14C:
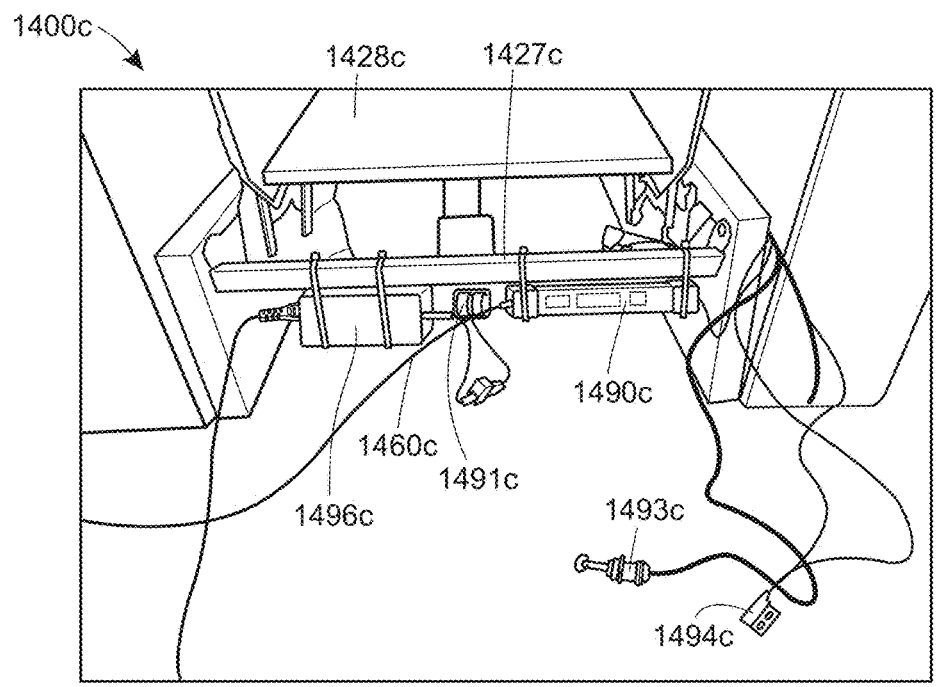
Figure 14D:
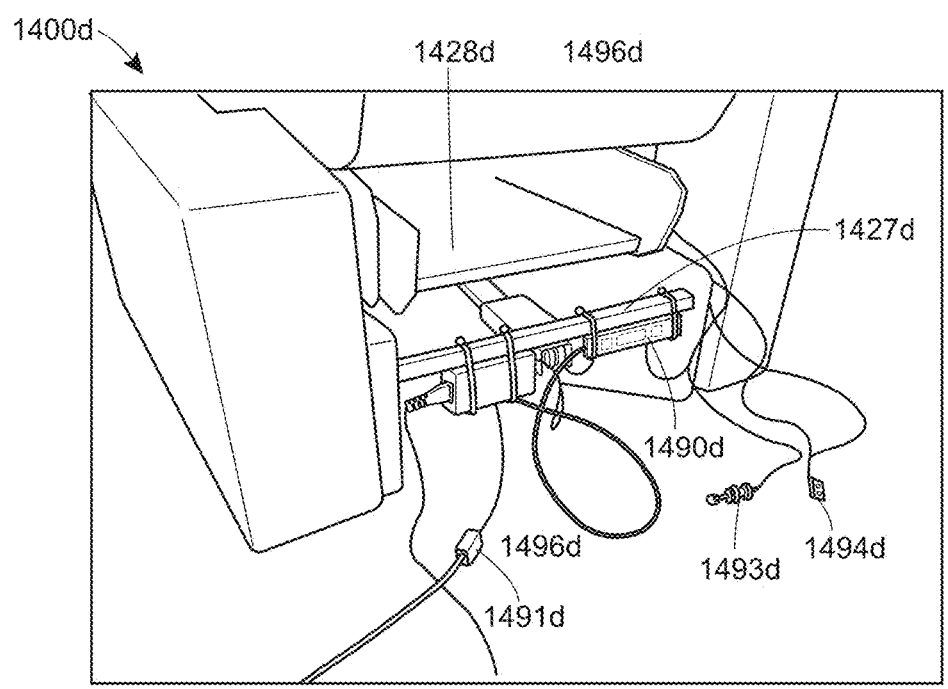
Figure 14E:
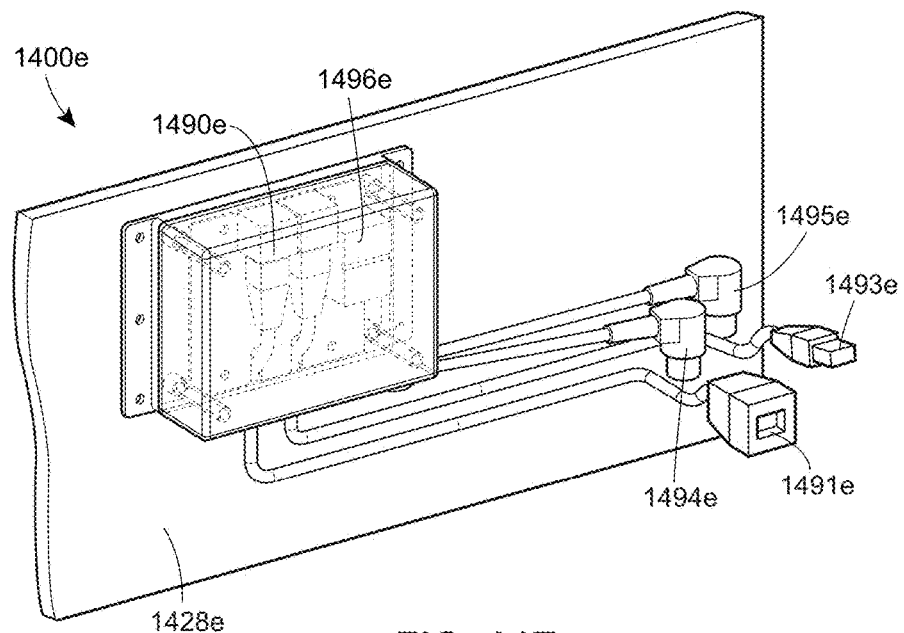
Figure 14F:
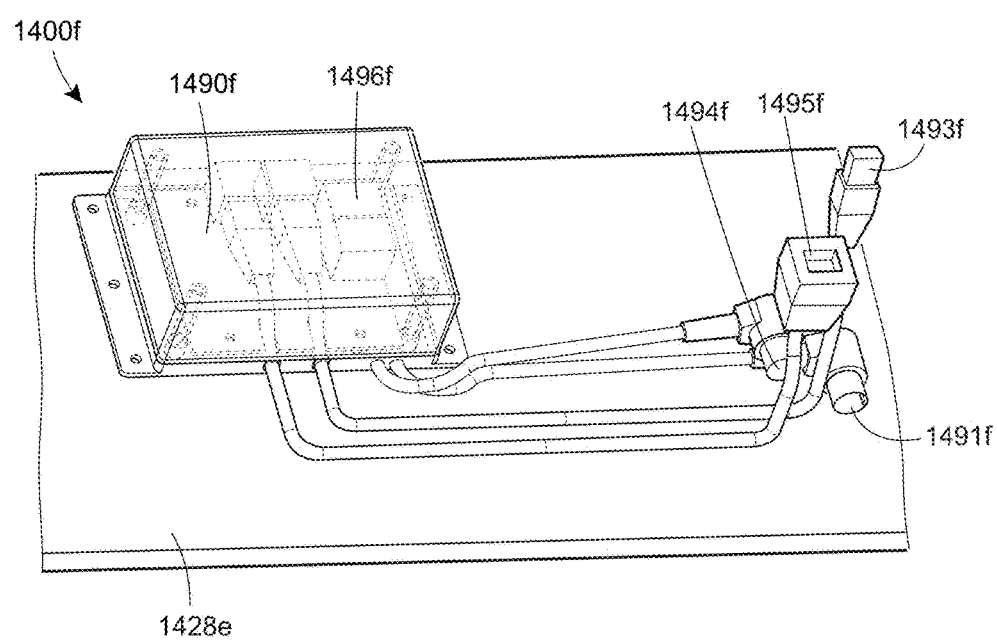
Figure 14G:
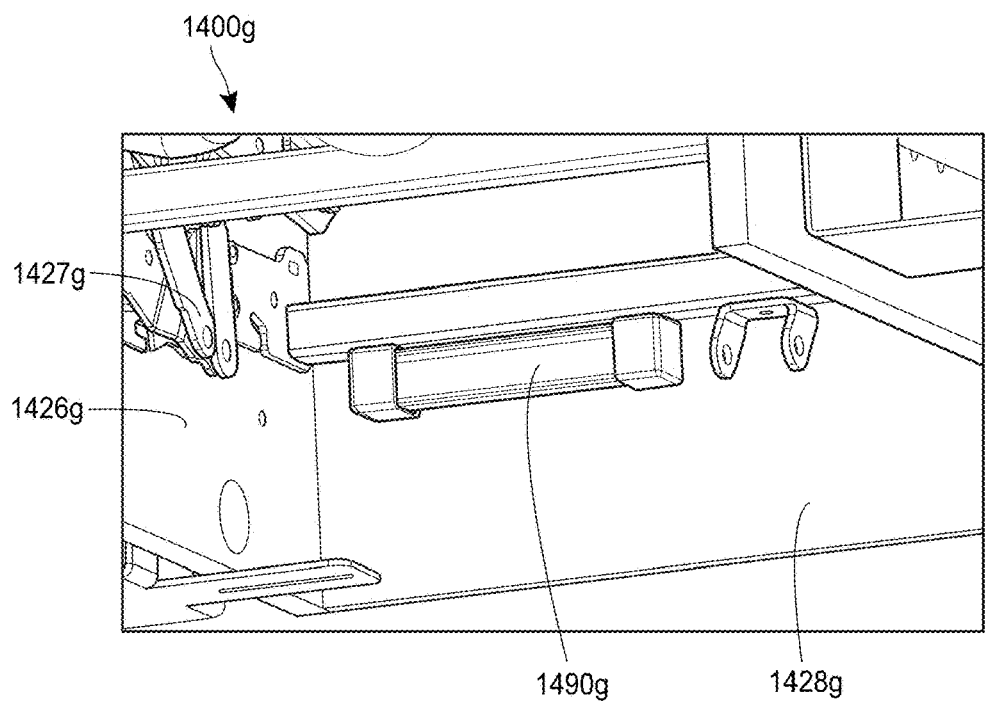

A remote controller (e.g., a studio control 1340b) may be communicatively connected to a local control (e.g., an A controller, a B controller, or a controller located within each chair) via a hardwired network and/or a wireless network. A hardwired network and/or a wireless network may be bi-directional (i.e., the remote controller may send data to the A controller, the B controller, or the controller located within each chair, and the A controller, the B controller, or the controller located within each chair may send data to the remote controller). Alternatively, each chair may include a control module (e.g., control module 1490e of FIG. 14E) that is in unidirectional communication with a master controller (e.g., a studio controller, an A controller, or a B controller).

At least one first powered recliner chair may be assigned to a first control group (e.g., control group A) by at least one of: a first pin and shorting block, a first push button, a first hardwired connection, a first circuit board with a hardwired connection, or a first entry in a memory (e.g., an IP address). At least one second powered recliner chair may be assigned to a second control group (e.g., control group A) by at least one of: a second pin and shorting block, a second push button, a second hardwired connection, a second circuit board with a hardwired connection, or a second entry in a memory. A pin and shorting block may be included within a control module (e.g., control module 1490e of FIG. 14E). A push button may be, for example, part of a chair retract/recline push button assembly (e.g., push button 1171c or push button 1172c of FIG. 11C) or may be a push button incorporated into a control module (e.g., control module 1490e of FIG. 14E). For example, a hole may be provided in a cover of the control module 1490e and a push button may be incorporated on an associated circuit board within the control module 1490e. In any event, each powered recliner chair, within any given venue, may be provided with a unique identification relative to any other chair within the venue. While both control group A and control group B may be located in a common room (e.g., a single theater), control group A may be in a first room (e.g., a first theater) and control group B may be in a second room (e.g., a second theater).

Figure 14H:
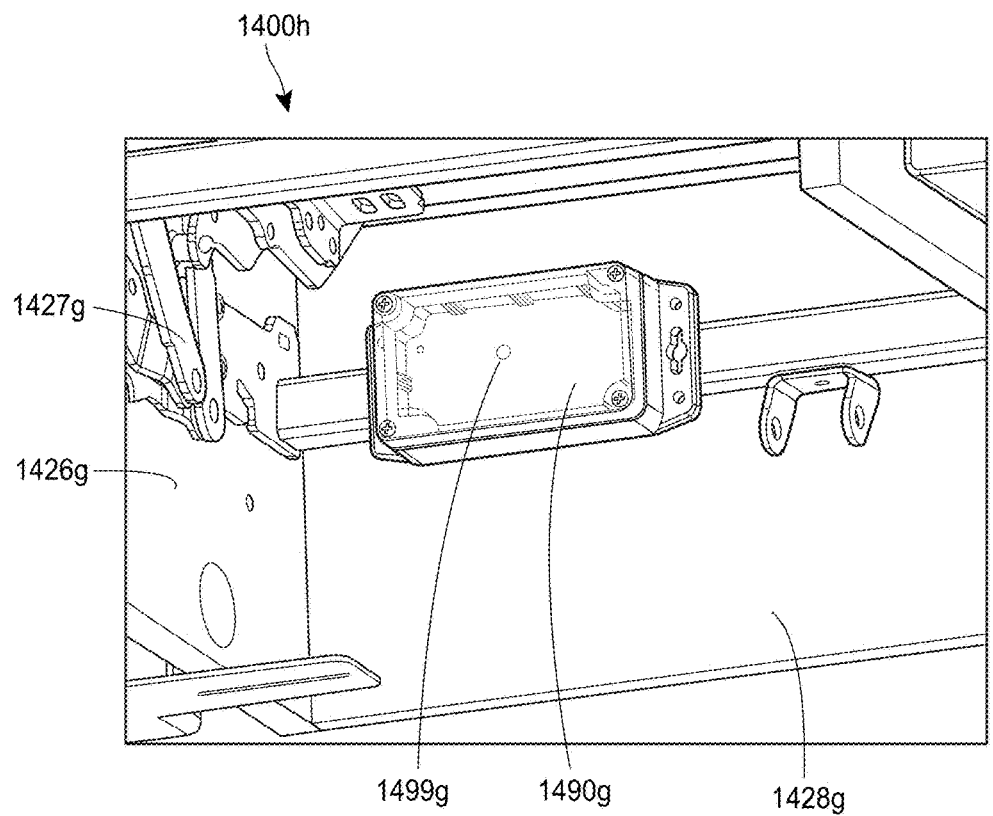

With reference to FIGS. 14A-H, example recliner chairs and related control components 1400a-1400h are depicted. Any given recliner chair 1400a-1400h may be similar to, for example, any one of the recliner chairs from the group of recliner chairs 210 of FIG. 2, or a group 210 of recliner chairs. The recliner chair 1400a may include a reclining control mechanism 1427a, a control module 1490a, and a transformer 1496a having an electrical connector 1491a. The recliner chair 1400b may include a control module 1490b having proximate chair interconnections 1493b, 1495b, a remote control module connection 1492b, and a local control switch connection 1494b. The recliner chair 1400c may include an electric power transformer 1496c, an actuator 1460c, a control module 1490c, a control module/actuator connector 1493c, a transformer/control module connector 1491c, and a local control switch connector 1494c. The recliner chair 1400d may include an electric power transformer 1496d, an actuator 1460d, a control module 1490d, a control module/actuator connector 1493d, a transformer/control module connector 1491d, and a local control switch connector 1494d. The recliner chair 1400e may include a control module 1490e having a battery 1496e, a first actuator connector 1494e, a second actuator connector 1495e, a first proximate chair connector 1493e, and a second proximate chair connector 1491e. The recliner chair 1400f may include a control module 1490f having a battery 1496f, a first actuator connector 1494f, a second actuator connector 1495f, a first proximate chair connector 1493f, and a second proximate chair connector 1491f. The recliner chair 1400g may include a chair frame 1426g, a chair recliner mechanism 1427g, and an actuator 1460g. The recliner chair 1400h may include a chair frame 1426*h*, a chair recliner mechanism 1427*h*, and a control module 1490*h*. As shown in FIG. 14H, the control module 1490*h* may include a transparent cover and a light 1499*h*. The light 1499*h* may, for example, be illuminated while the associated chair 1400*h* is in a theater cleaning position. Any given control module 1490*a*, 1490*c*, 1490*h* may be, for example, similar to any one of the control modules 800, 990*a*, 990*b*, 1090*a*, 1090*b*. Any given actuator 1460*a*, 1460*b*, 1460*c*, 1460*d*, 1460*e*, 1460*f*, 1460*g* may be, for example, similar to any one of the actuators 660, 665, 760, 860, 960*b*, 1060*b*, 1065*b*. Any given control module 1490*a*, 1490*c*, 1490*h* may include a chair recline relay output, a chair upright relay output, an emergency relay output, a lighting relay output, a combination thereof, or any sub-combination thereof.

Any given controller may be configured to control a single chair row, such that all chairs extend and/or retract via a single input. Alternatively or additionally, any given controller may be configured to control a single chair row, such that every other chair extend and/or retract via a single input. Alternatively or additionally, any given controller may be configured to control an entire theater control, such that all chairs in a theater extend and/or retract via a single input. Alternatively or additionally, any given controller may be configured to control an entire theater, such that every other chair extend and/or retract via a single input.

An associated power supply may be configured to provide daisy chained high voltage power between recliner chairs to facilitate ease of installation. For example, a single chair may be plugged into the high voltage power and then extended to proximate chairs. A chair may have multiple powered outlets, such as an extension cord or power strip that other chairs may be plugged into. This may allow a chair to feed power to other chairs, for example, in a row of chairs, thereby, eliminating multiple and expensive power outlets for each individual chair. An electrical power outlet may be incorporated into a chair, for example, in a top of an arm box, on a front vertical surface of the chair or arm box, on an inside surface of an arm box adjacent to a local chair control switch, etc. An associated electrical power circuit may be routed down a row of chairs and may be T'ed into chair power outlets/isle lights.

A mechanical mechanism may be provided in addition to, or in lieu of, the automatic mechanisms (e.g., controller/actuator) to reclining any given chair or a group of chairs via an interlocked mechanical mechanism. For example, a "C" clamp may be include that may be positioned over an arm of a chair and may activate a switch (extend or retract based on clamp position). Thus, a system for applying a force to activate the switch may be provided, such that a reactive force may be contained within the arm that contains the switch. Alternatively, a rod may be provided that may extend between chair arms to activate a switch (extend or retract based on rod position). Thus, a system may be provided for applying a force to activate the switch such that a reactive force is contained within the chair. Such a system may make it unnecessary for the operator to wait while each chair extends/retracts.

A less sophisticated mechanical system may be provided where a person walks down a row of chairs and applies a mechanical device to extend/retract each chair. The less sophisticated mechanical system may be a standalone system or may be integrated along with a powered extend/retract system.

Figure 14J:
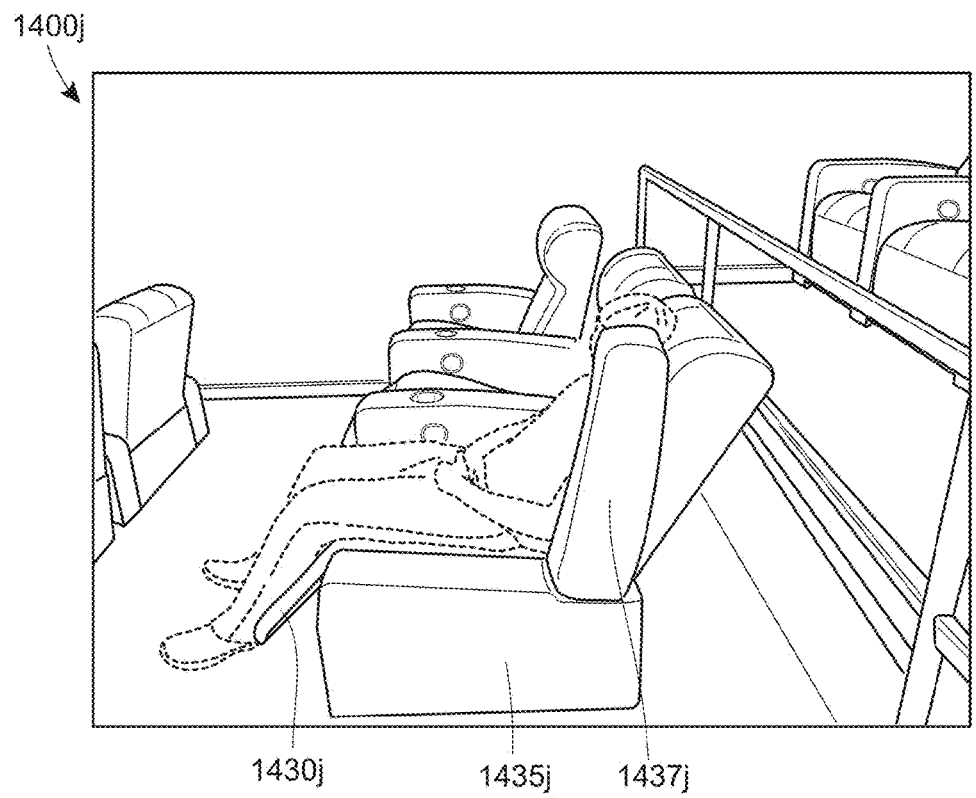

Turning to FIG. 14J, a reclining chair 1400*j* may include a leg rest 1430, a first arm rest 1435*j*, and a second arm rest 1437*j*. The second arm rest 1437*j* may be movable (flip up arm) attached to, for example, the back of the chair and/or an associated arm box. Alternatively, a chair may have a movable arm 1437*j* attached to an arm box. Attaching the second armrest 1437*j* to the back may keep the arm rest in line with the back preventing the interference with an adjacent chair occupant. A reclining chair 1400*j* may, for example, be installed at an end of a row, next to an aisle, to facilitate use of the reclining chair 1400*j* by a physically impaired individual (i.e., by incorporating a reclining chair 1400*j*, an associated installation may satisfy, for example, adults with disability (ADA) requirements). As an alternative to connecting a pivotal arm rest to a chair back, any given arm rest may be hingedly attached to an associated arm box and/or chair assembly at a front or rear of the arm box. Any given arm rest may include a quick removal feature such that the arm rest may be replaced in an event where the arm rest, or an arm rest covering, is, for example, damaged.

Any given reclining chair may include a "pillow top" configured to cover at least a portion of a respective chair (e.g., a foot rest, a leg rest, a chair seat, a chair arm, a chair back, and/or a head rest). A seat and/or back pillow top may be attached to an adjacent seat or back, respectively, thereby, creating a gap filler between the seat and back which may prevent items (e.g., personal items or trash) from falling below the seating surfaces. Alternatively, a gap filler(s) may not be part of a pillow top. A gap filler may be configures as: a gap filler with a temporary or permanent connection between a seat and/or back; a gap filler with a temporary or permanent connection between the chair arm boxes and/or other members; or a gap filler as made from an at least partially permeable member which may be configured to assist in determining which items are allowed to fall thru the chair while other items are limited from falling. An example of items that may be permitted to fall through are popcorn kernels or liquids, while keeping items of such as cell phones, money, etc. from falling below the seating surface. An alternative gap filler example may allow liquids to pass thru, while items such as popcorn kernels, cell phones, etc. are not allowed to fall thru. Any given reclining chair theater system may include passages or openings under the reclining chairs that allow items to move to an area of easier access.

A pillow top (e.g., a foot rest pillow top, a leg rest pillow top, a chair seat pillow top, a chair arm pillow top, a chair back pillow top, and/or a head rest pillow top) may be removable. Alternatively, or additionally, any/all pillow tops may include a fireproof (or fire resistant) and/or bullet proof material (e.g., carbon fiber composite material, Kevlar, Lexan, grapheme, composite material, wire mesh, anti-ballistic material, etc.). Thus, in emergency circumstances a chair occupant may remove a respective pillow top (or pillow tops) and use the pillow top(s) for personal protection. Notably, notification of an emergency situation within a venue may be initiated via a central alarm (e.g., a manually operated fire alarm, a carbon monoxide sensor, a smoke sensor, etc.), a sound detector (e.g., a gunshot detector, a scream detector, etc.), and/or via a personal electronic device (e.g., a mobile telephone, a portable data assistant, a laptop computer, or any other portable electronic device that is communicatively coupled to a venue emergency notification system).

In addition to including a fireproof and/or anti-ballistic material as described above, a removable pillow top may include arm sleeves, straps, handholds, etc. such that the removable pillow top is easy for an individual to carry and/or use as a shield. In addition to, or as an alternative to, a removable pillow top a chair seat, a chair back, and/or a chair arm may include fireproof and/or anti-ballistic material fixed to the chair. Accordingly, the chair itself may provide protection from fires and/or bullets.

As can be seen in FIGS. 14A and 14C-14H, an associated recliner chair 1400a, 1400c-1400h may include a back panel 1428a, 1428c-1428h. The back panel 1428a, 1428c-1428h may be removable, or repositionable (e.g., by comparing FIGS. 14A and C with FIGS. 14D-14H), to provide access under any given recliner chair 1400a, 1400c-1400h. Alternatively, or additionally, a back panel 1428a, 1428c-1428h may be movably attached to a respective recliner chair 1400a, 1400c-1400h, such that the back panel 1428a, 1428c-1428h may be manually/automatically repositioned (e.g., to either a cleaning (access) position or a conceal position), and/or the back panel 1428a, 1428c-1428h may retain the respective position until manually/automatically returned to the other position (e.g., to either a conceal position or a cleaning (access) position).

Any given back panel 1428a, 1428c-1428h may be configured to move in any direction while remaining attached to an associated reclining chair, and may remain in a position that aids cleaning and access. Additional back panel 1428a, 1428c-1428h movement directions may include: a hinged configuration such that the back panel swings like a door (e.g., full swing or Dutch swing); moves upward; or upward and outward; or folds downward, partially at an angle to the floor, or fully, such that the back panel rests on the floor when in an open position. A recliner chair back panel may include portion(s) made of different materials that may conform or allow relative movement to adjacent surfaces. For example, a recliner chair on a inclined floor may include a back panel, hinged like a door, an having a lower edge made from pliable material (e.g., rubber, thin plastic, composite material, etc.) such that, when the back panel is opened, the lower compliant material allows the back panel to swing open and not interfere with the inclined floor. Alternately, or additionally, back panel hinges may allow movement of an associated back panel such that opening of the back panel is not impeded by the floor or floor obstruction/conditions.

Figure 14K:
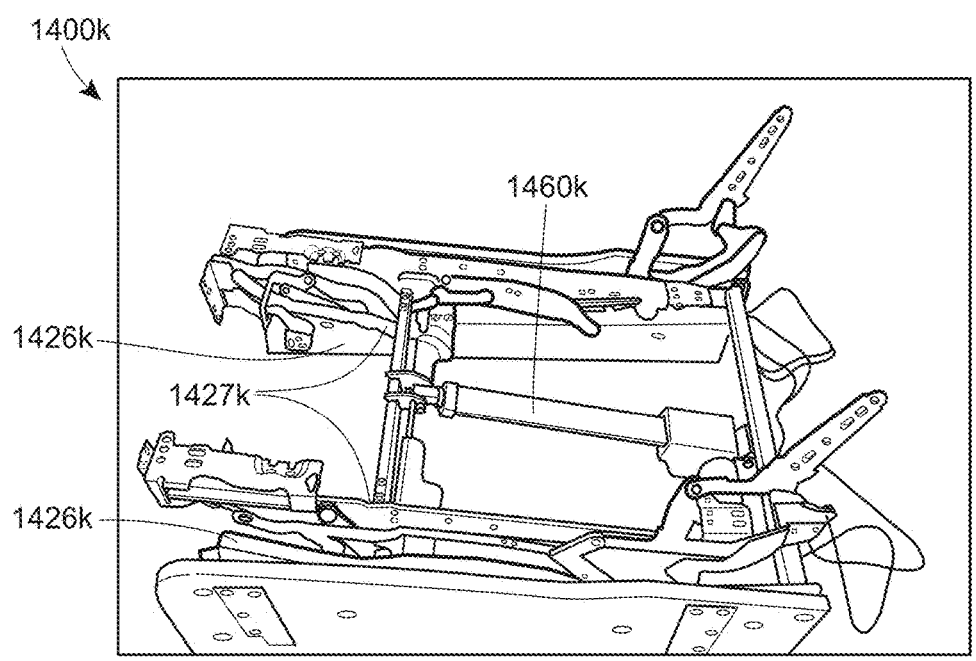
Figure 15A:
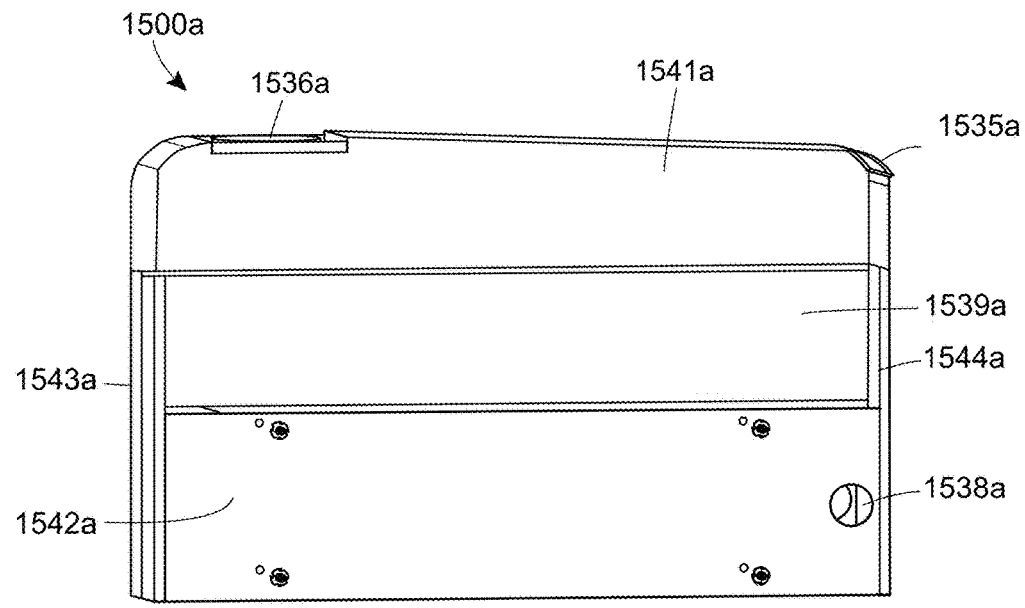
FIGS. 15A-D depict various views of example reclining chair arm structures.
Figure 15B:
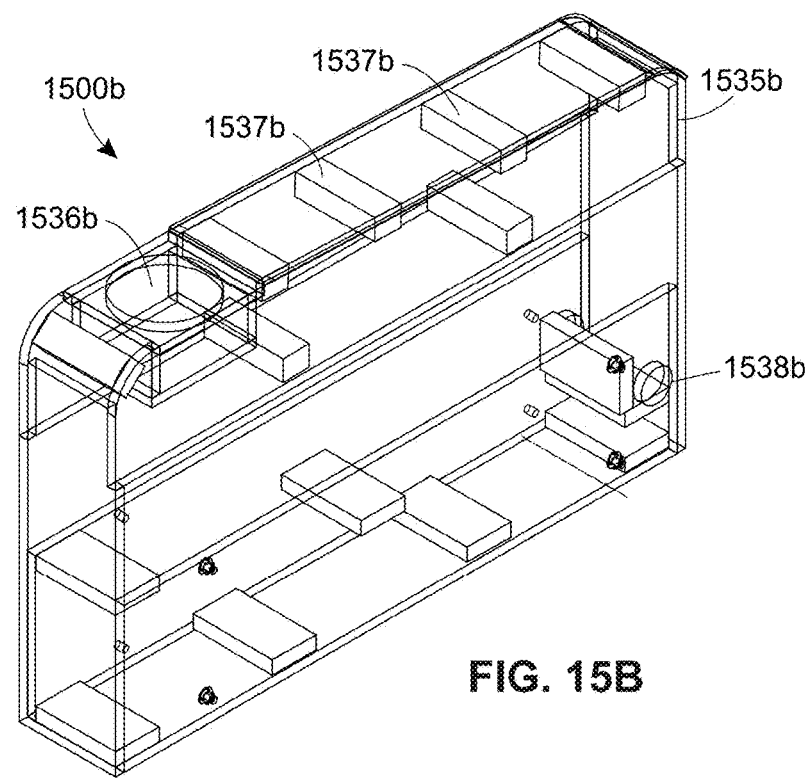
Figure 15C:
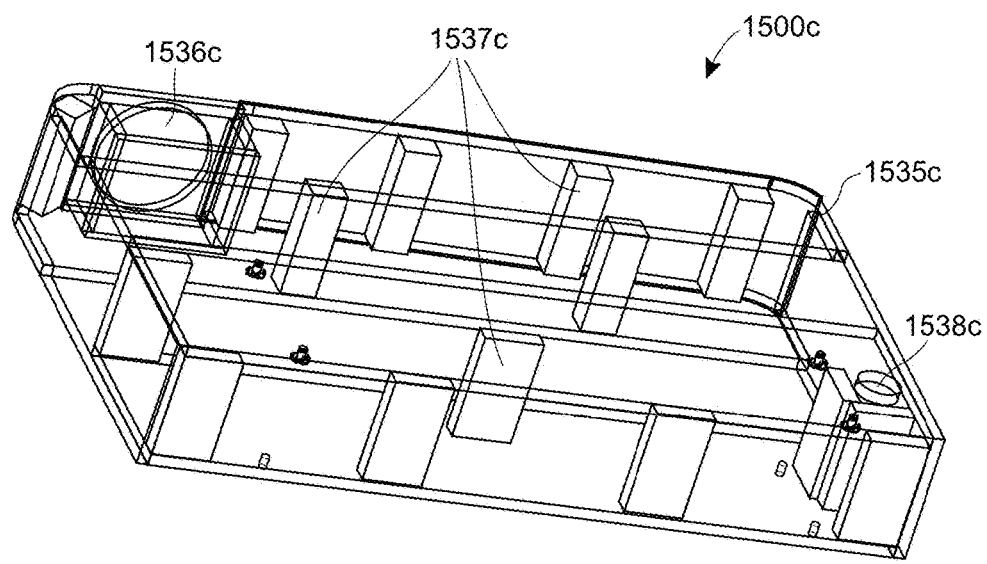
Figure 15D:
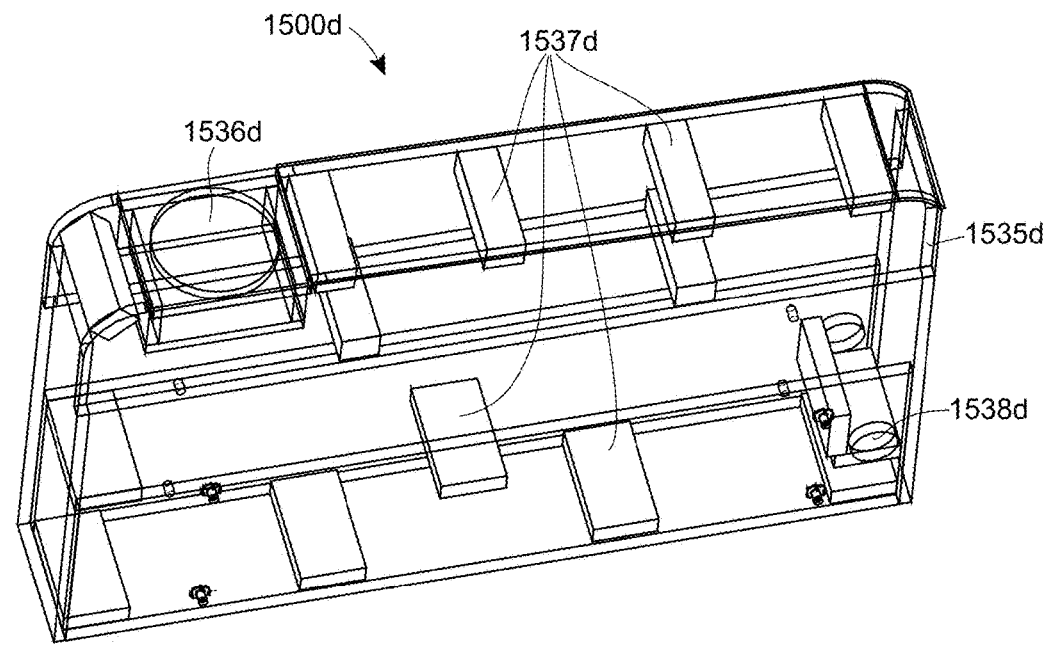
Figure 17A:
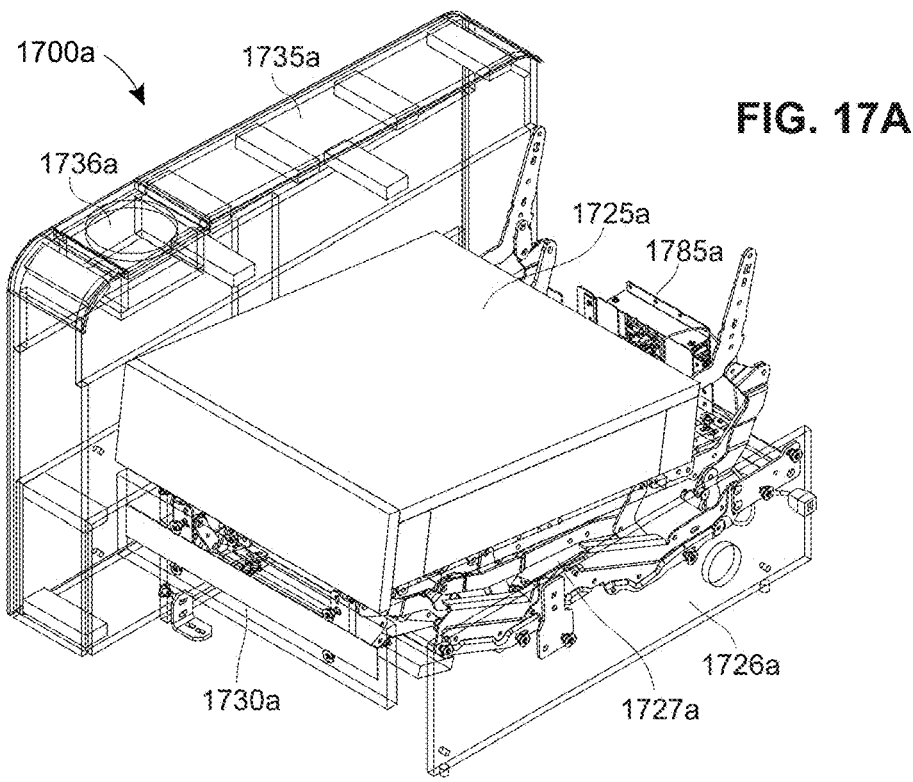
FIGS. 17A-F depict various views of example powered recliner chair assemblies.
Figure 17B:
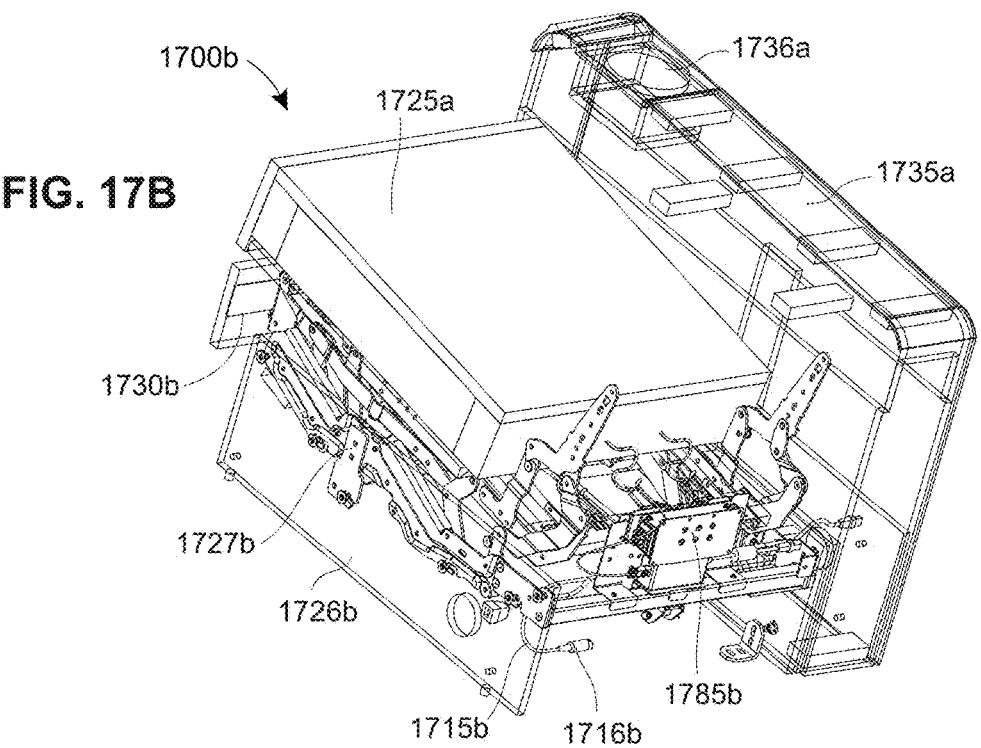
Figure 17C:
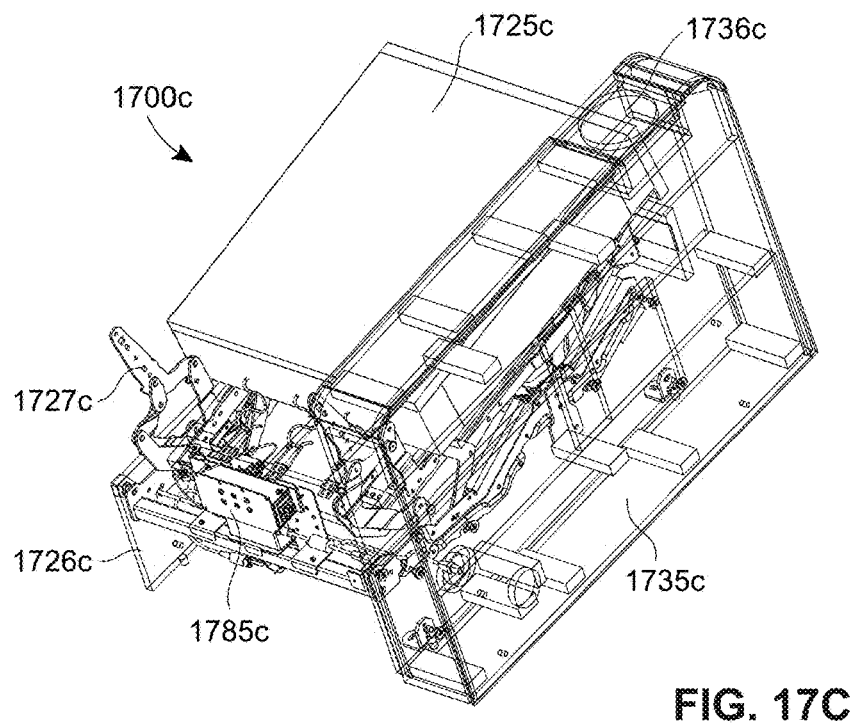
Figure 17D:
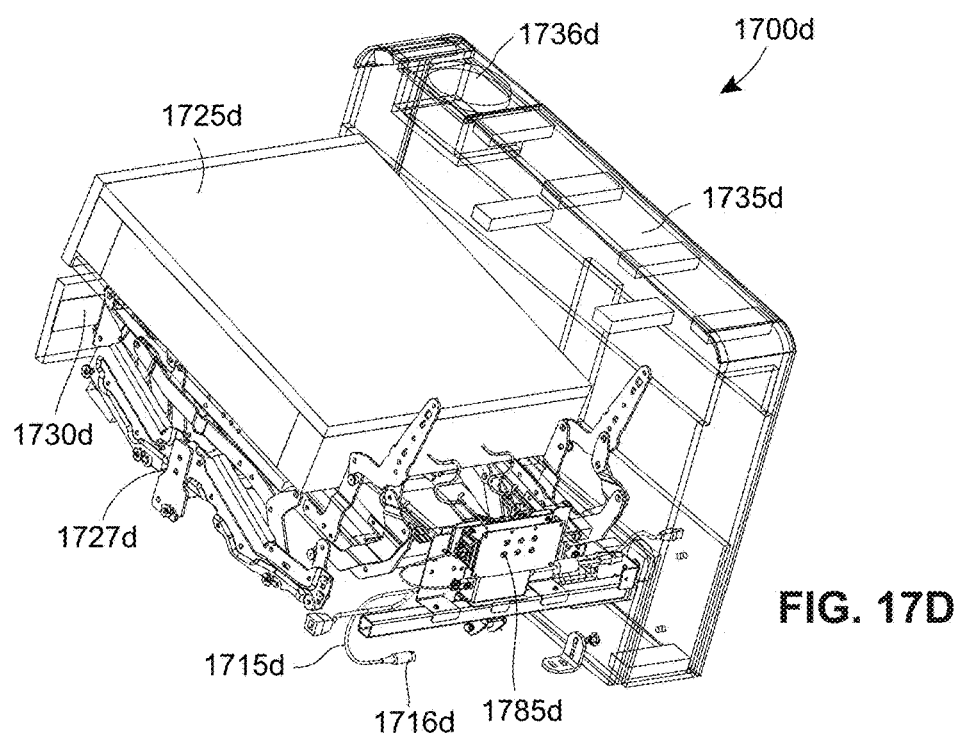
Figure 17E:
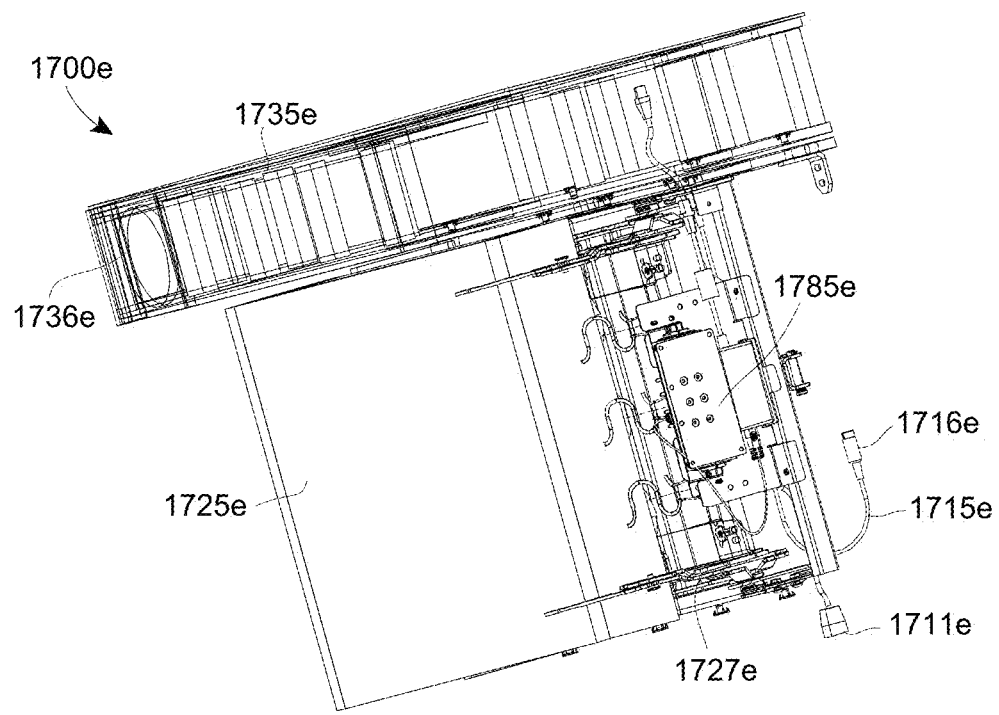
Figure 17F:
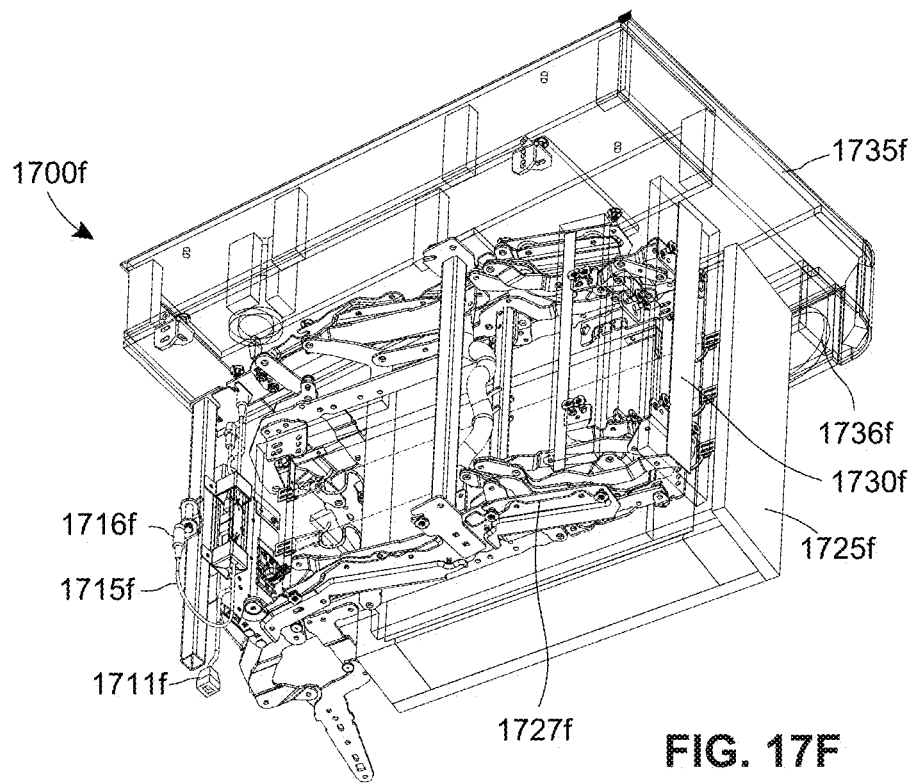

With reference to FIG. 14K, a reclining chair 1400k may include a chair support frame 1426k, a reclining mechanism 1427k, and an actuator 1460k.

Turning to FIGS. 15A-D, recliner chairs 1500a-d may include an arm box 1535a-d having a cub holder 1536a-d, a top side panel 1541a, a front panel 1543a, a bottom side panel 1542a, a back panel 1544a, an access opening 1539a, support structures 1537b-d, and a wire way passage 1538a-d. An arm box 1535a-d with a wire routing channel(s) 1538a-d may include some or all of the following: assist in passage of wires such as switch controls from inside to outside of the arm box; assist in passage of wires from one side of the arm box to the other side; cross brace 1537b-d; constructed of member which do not provide structure; contain members which provide strain relief; members which are inserted from each side of the arm box and thus forming a wire management path; openings on one or more surfaces to allow additional wires or items to enter the wire management path; openings which have movable members; members positions such that the members limit entry of undesirable items such as fluids; provision for a cover over one or more sides to allow an arm box with such wire management path to be covered so the arm box may be used in situations where access from one or both or no sides is required; and/or isolated path ways. A reclining chair may include wire management features to manage wires between arm boxes and with the recliner mechanism. Any given reclining chair system may include a Smart power system mounted either internal to an arm box or external to the arm box.

With reference to FIGS. 16A-F, a powered reclining chair system 1600a-f may include a series of pluggable electrical interconnections having, for example, electrical conductors (e.g, power and/or data conductors) 1605b, 1605c, 1605e, a first plug 1610b-f, a second plug 1615b, 1615d, 1615f, a flexible conduit 1620b-f, and/or a restraining clamp 1625c-e. Any one of the pluggable electrical interconnections may be, for example, Electri-Pak available from Electri-Cable Assemblies, Shelton, Conn. Alternatively, or additionally, a powered reclining chair may include modular wiring system(s) from Electric-Pak or Byrne Electric which allows connection of components (may be UL approved to promote ease of code approval) that may be factory or site installed. Such products may be attached with fasteners or snaps in a fashion that aids assembly, installation or service. Such system(s) may cooperate with the wire management system noted above. Such a system(s) may include low voltage, high voltage or data lines. Such system(s) may cooperate with clean sweep and/or smart power systems described elsewhere herein.

As an alternative to the configuration shown in FIG. 16D, power wiring may be provided to a row of powered chairs via, for example, a plug in cord having a three prong plug on a first end, at least one receptacle on a second end, and a series of "Y" (or "T") female receptacles, connected to the cord, between the three prong plug on the first end and the receptacle on the second end. Each female receptacle may include, for example, a fuse and/or a circuit breaker for electrical protection of chair assemblies, and other electrical devices, that are plugged into the respective receptacle.

A host of different circuit board configurations may be employed in any given recliner chair installation. For example, a circuit board may have 2-inputs and 2-outputs. An interconnection may connect in line between a local control switch and a motor (e.g., actuator) and may carry electric current that controls the motor/actuator. Additionally, CAT-5 cables may be included that carry control signals between chairs when a chair is in normal mode. A patron's local control switch actions (extend or retract) may be passed thru our control module thru the CAT-5 cables. When a chair system is put into "clean/maintenance" mode signals may be passed thru the CAT-5 cable to allow a master chair to control other chairs.

Locations of a circuit board and/or transformer may be attached to a rear chair board. Alternatively, a circuit board and/or transformer may be attached to a rear motor/actuator cross tube. A control circuit may be configured as a serial connection between modules, may be wired in parallel, or wires may be eliminated (or reduced) via wireless communications.

A high voltage power connection may include a power strip/extension cord plugged into a high voltage feed with a receptacle end mounted on a rear cross tube, or a rear board adjacent to a transformer. A transformer may be plugged into one outlet and proximate chair(s) may be plugged into other outlet(s). This approach may reduce a number of expensive outlets hardwired in an associated building, and may, employ an associated high voltage feed line pre-wired in a chair. A rear chair panel may be removable to facilitate cleaning and maintenance of a controller, actuator and/or recliner mechanisms.

Turning to FIGS. 17A-F, various views of example powered recliner chair assemblies 1700a-f are depicted. The powered recliner chair assemblies 1700a-f may be similar to, for example, portions of the powered recliner chair assemblies 210 of FIG. 2. The powered recliner chair assemblies 1700a-f may include a chair seat 1725a-f, a foot rest 1730a-f, a chair arm 1735a-f having a cup holder 1736a-f and a chair controller (not shown in FIGS. 17A-F, however, similar to any one of the chair controllers described elsewhere herein), a chair side panel 1726a-f, chair recliner mechanism structure 1727a-f, a power distribution panel 1785a-f, and power and/or control interconnecting cables 1707a-f, 1711a-f, 1715a-f, 1716a-f.

With references to FIGS. 18A-H and 18J-L, various views of electrical power and control assemblies 1800a-h and 1800j-l for use in powered recliner chairs are depicted. The electrical power and control assemblies 1800a-h and 1800j-l and/or portions thereof may be similar to, for example, any one of the assemblies depicted in FIGS. 8, 9A-C, 10A-C, 14A-H, 14J, 14K, and/or 16A-E. The power and control assemblies 1800a-h and 1800j-l may include a chair controller 1860a-h and j-l, a power supply 1890a-h and j-l, a junction box/distribution panel 1885a-h and j-l, a support panel 1870a-b having brackets 1871a-b, 1872a-b, a junction box/distribution panel to power supply cable 1805a-h and j-l having first and second plug ends 1806a-h and j-l and 1807a-h and j-l, a first chair-to-chair interconnection cable 1810a-h and j-l having a first plug end 1811a-h and j-l and a second plug ends 1812a-h and j-l, a chair controller to chair control interconnection cable 1815a-h and j-l having first plug end 1816a-h and j-l and a second plug end 1817a-h and j-l, a second chair-to-chair interconnection cable 1825a-h and j-l having first plug end 1826a-h and j-l and a second plug end 1827a-h and j-l, and a power supply to actuator/drive motor connecting cable 1830a-h and j-l having a first plug end 1831a-h and j-l and a second plug end 1832a-h and j-l. It should be understood that any one of the interconnecting cables shown in FIGS. 17A-F, 18A-H, and 18J-L may be similar to any one of the interconnecting cables of FIGS. 16A-E. For example, in lieu of a plug end any given interconnecting cable may have a hardwired (e.g., soldered connection) to a circuit board or terminal end. Any given plug end may be a male or female connection in accordance with National Electric Code Standards.

As illustrated in FIGS. 17A-F, 18A-H, and 18J-L, power and/or control wiring may extend under a chair arm box. Alternatively, or additionally, power and/or control wiring may extend into a slot under chair arm box, and may be secured in position using at least one of: brackets holding modular wiring in advantageous positions to avoid being disturbed during associated venue/chair cleaning; via a power supply (e.g., power supply 1890b) being secured in position; a chair control being secured in position; routing wires through chair structural members (e.g., box beams and/or structural channels); and/or by preventing plugs from being un-plugged via restraining clamps. An electrical power and control assembly 1800a-h and j-l may be configured such that the panel is pre-assembled with an associated junction box/distribution panel, a power supply, a chair controller, and associated interconnecting cables, such that the electrical power and control assembly may be quickly installed within an associated powered recliner chair without the need for skilled labor. Thereby, powered recliner chair installation time may be reduced and labor costs may be reduced when compared to powered recliner chairs that do not include pre-assembled electrical power and control panels. A chair arm box may be, for example, installed against a riser without a chair back hitting the chair arm or the riser when the recliner chair is reclined.

Figure 18A:
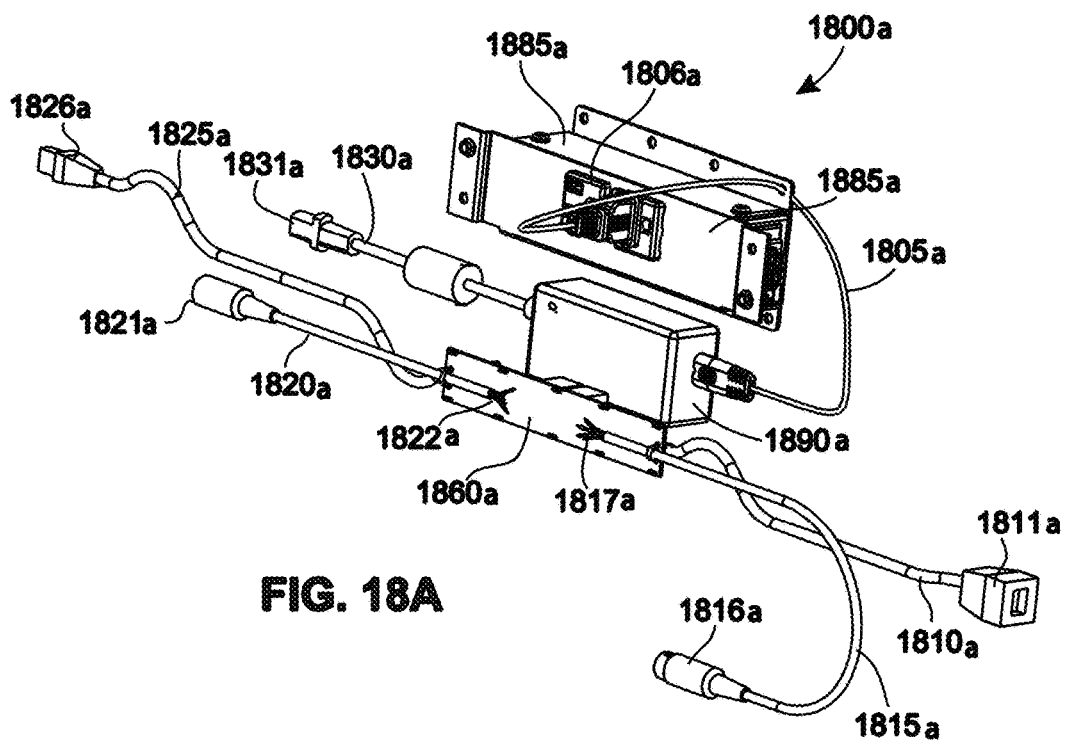
FIGS. 18A-H and 18J-L depict various view of electrical power and control assemblies for use in powered recliner chairs.
Figure 18B:
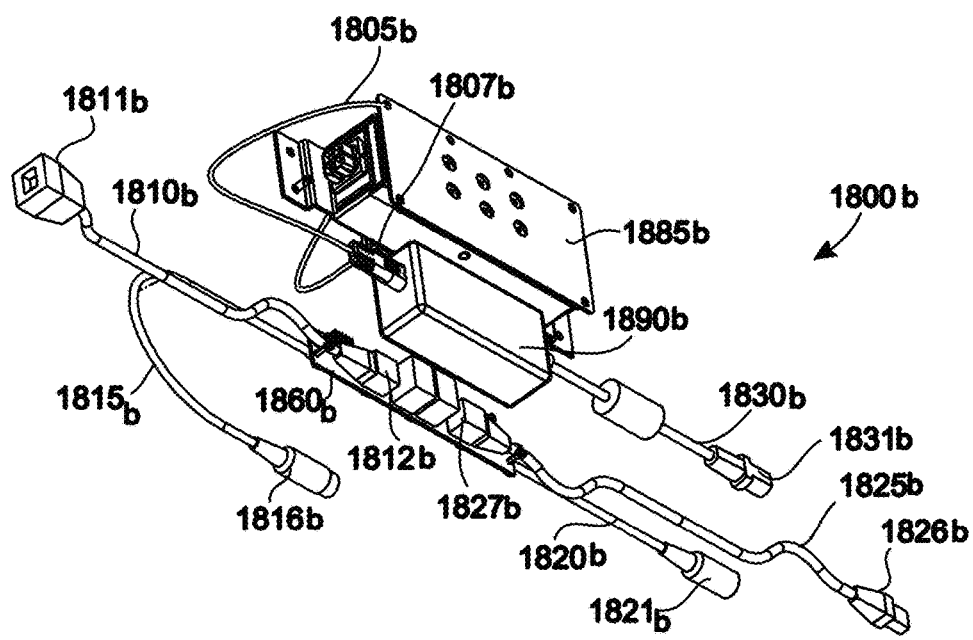
Figure 18C:
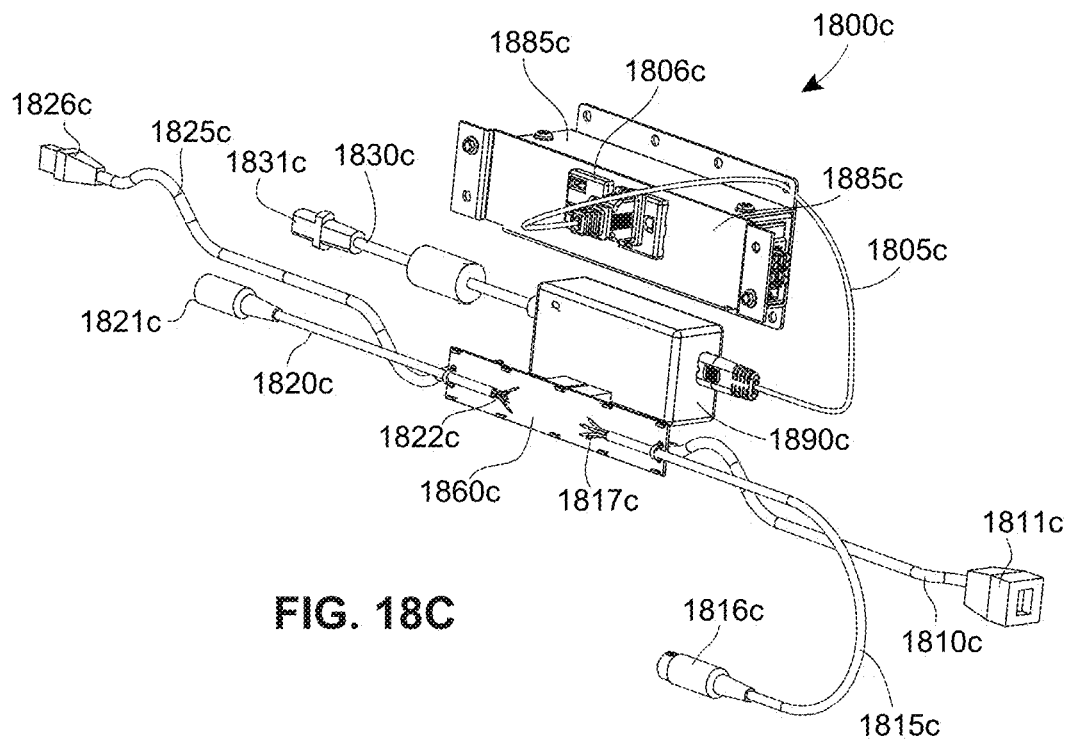
Figure 18D:
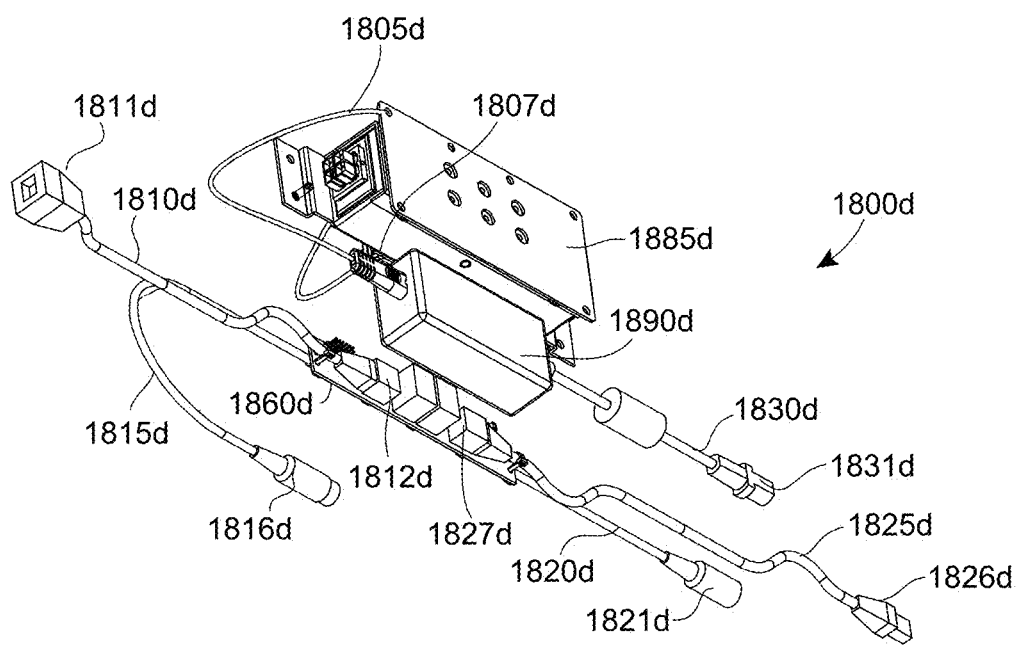
Figure 18E:
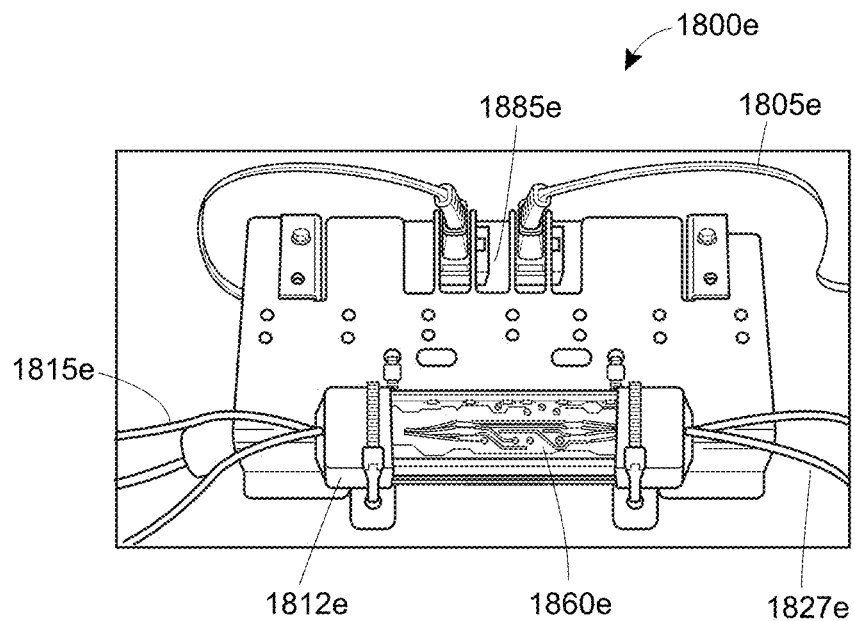
Figure 18F:
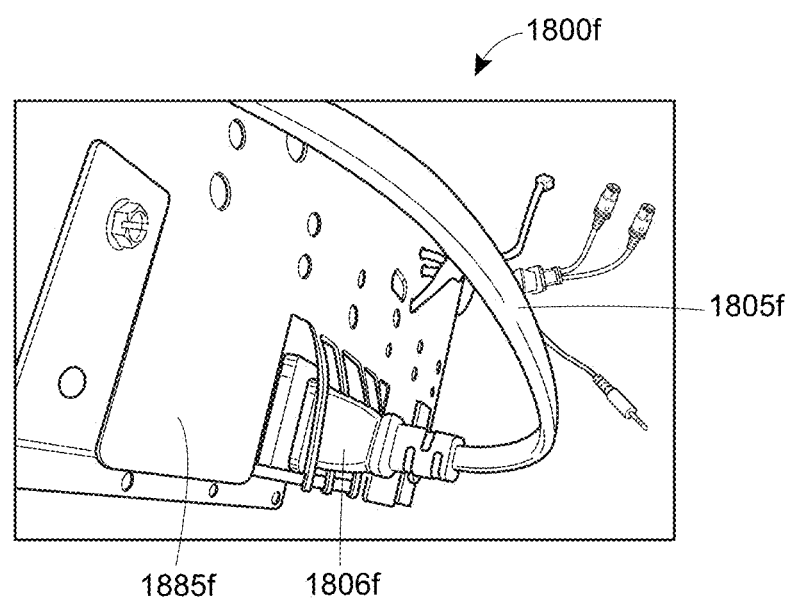
Figure 18G:
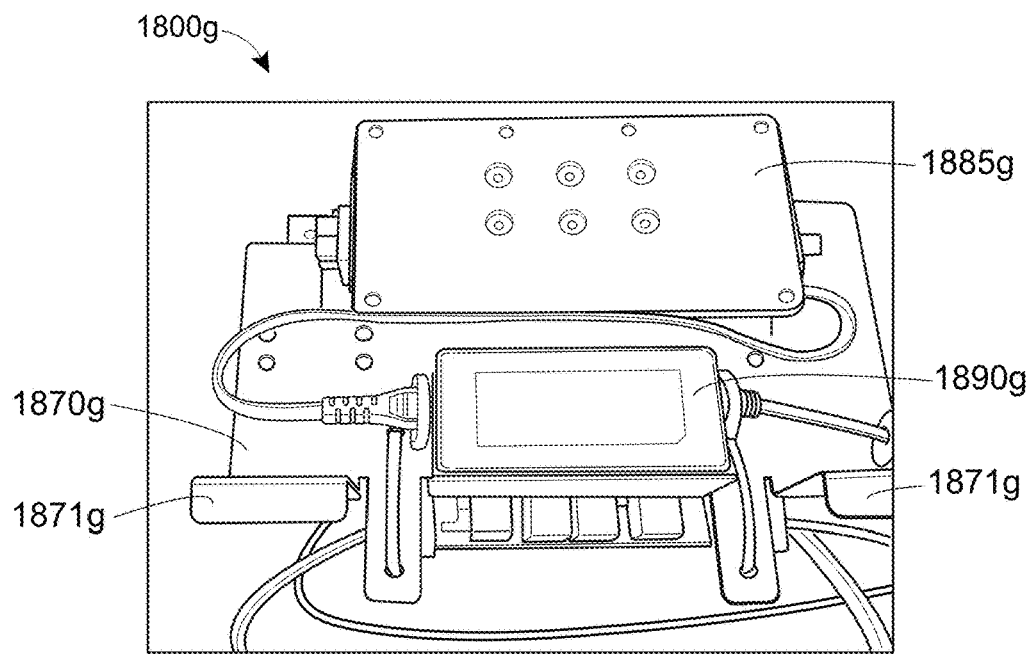
Figure 18H:
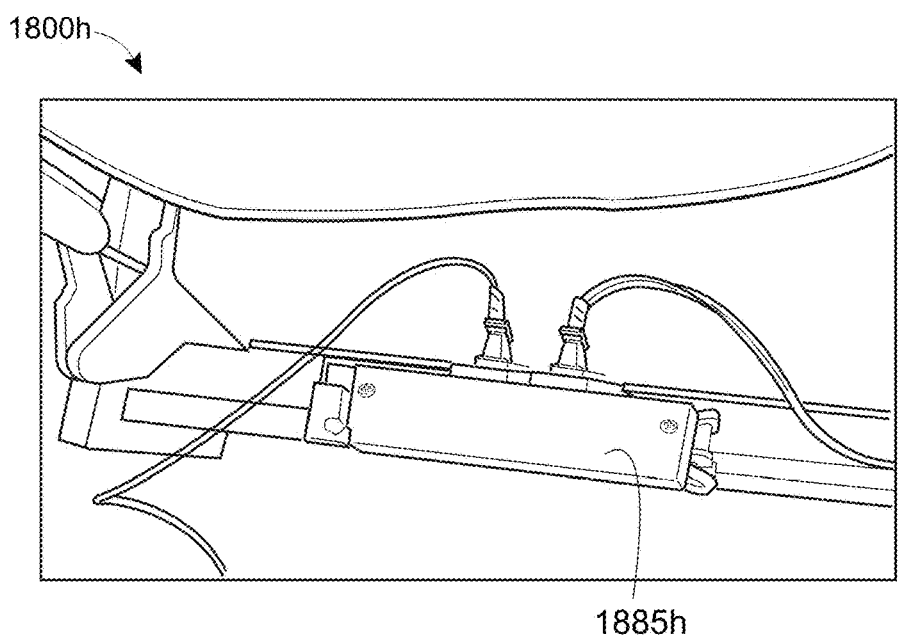
Figure 18J:
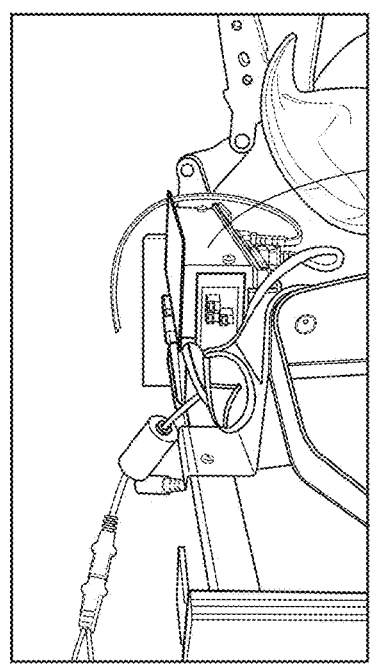
Figure 18K:
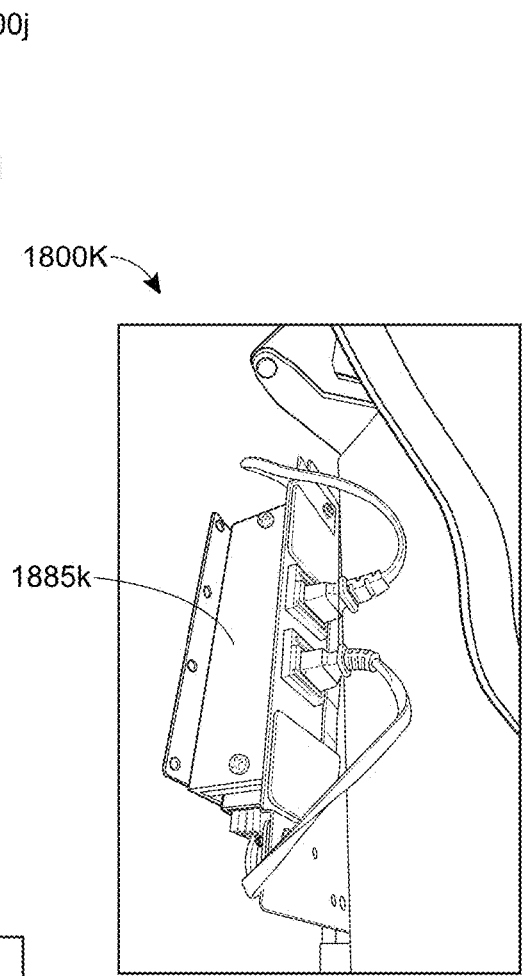
Figure 18L:
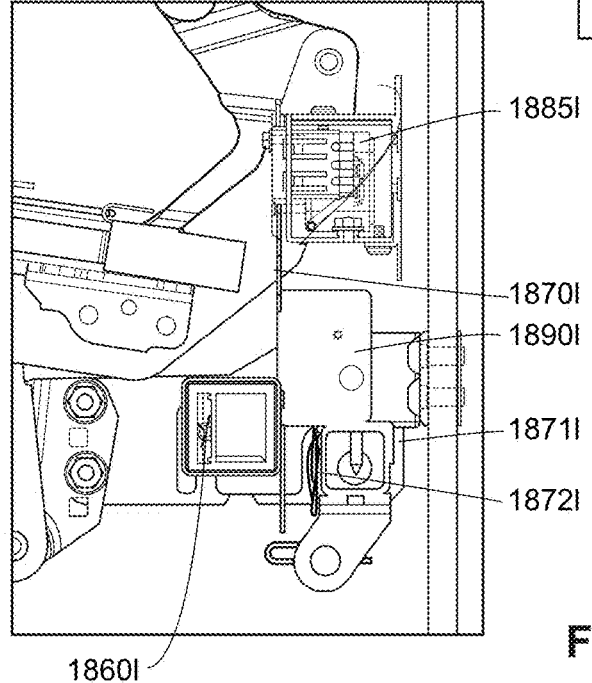

As shown in FIG. 18E, any given power or data connector may be held in place via a finger 1886e, or multiple fingers 1886e. Thereby, screws and/or similar fasteners are not required to retain the connectors in place. A bracket 1885f may be mounted on, for example, a rear of each powered recliner chair.

A first power supply may be configured to, for example, supply electric power to a first actuator in a first chair and a second actuator in a second chair. A second power supply may be configured to, for example, supply electric power to a third actuator in a third chair and a fourth actuator in a fourth chair. First electric power conductors may extend from the first power supply to the second power supply proximate second electric power conductors that extend from, for example, the first power supply to the second actuator. Any given power supply may provide electric power to, for example, up to ten chair assemblies. Electric power conductors extending between individual power supplies may operate at a higher voltage compared to electric conductors that extend from the power supply to associated actuators.

Figure 19:
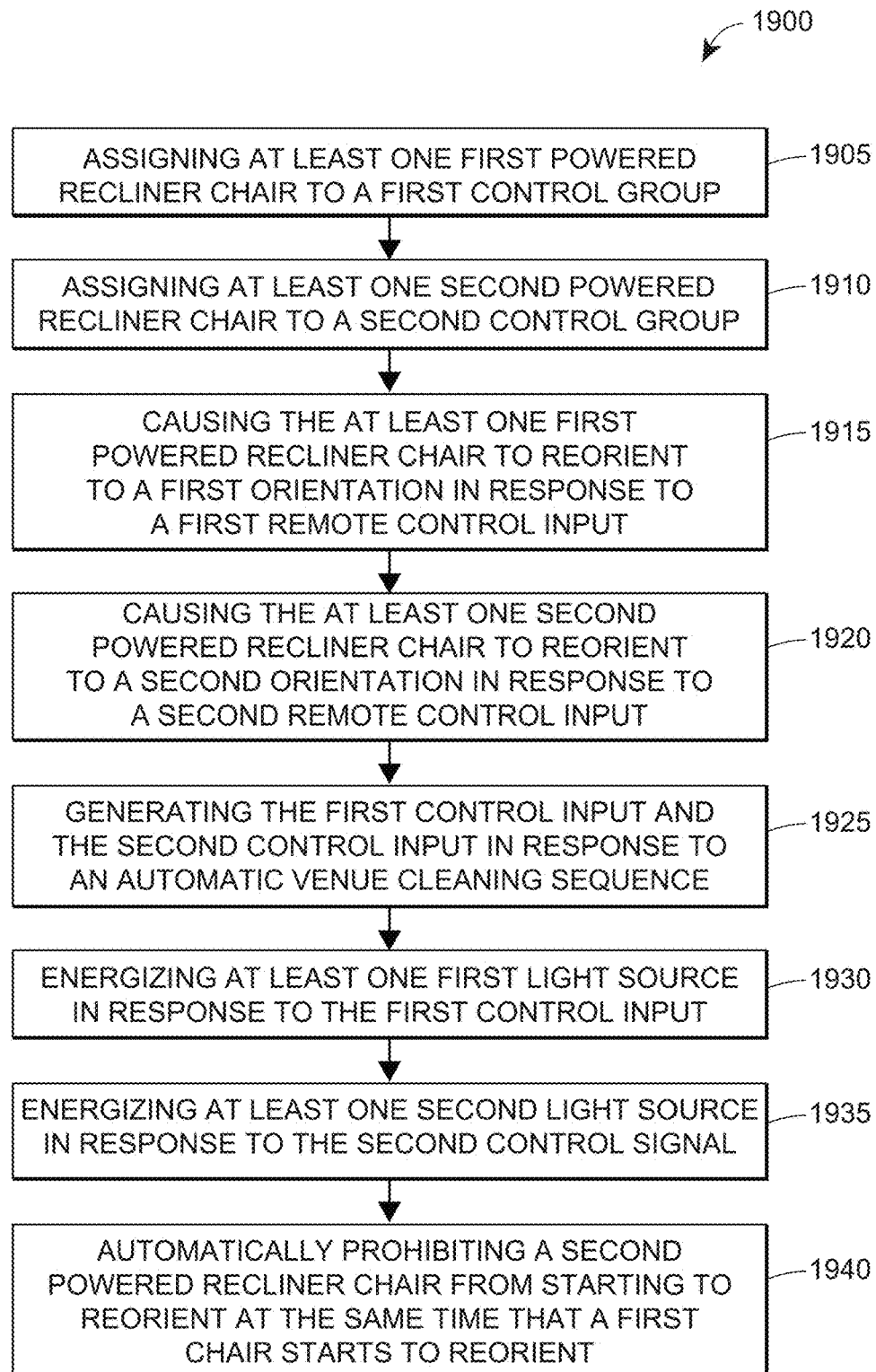
FIG. 19 depicts a flow diagram of an example method for controlling a plurality of powered recliner chairs.

Turning to FIG. 19, a method for controlling a plurality of powered recliner chairs 1900 may include assigning at least one first powered recliner chair to a first control group (block 1905). The at least one first powered recliner chair may be assigned to the first control group by, for example, at least one of: a first pin and shorting block, a first push button, or a first entry in a memory. The method 1900 may further include assigning at least one second powered recliner chair to a second control group (block 1910). The at least one second powered recliner chair may be assigned to the second control group by, for example, at least one of: a second pin and shorting block, a second push button, or a second entry in a memory. The method may also include causing the at least one first powered recliner chair to reorient to a first orientation in response to a first remote control input (block 1915). The method may yet further include causing the at least one second powered recliner chair to reorient to a second orientation in response to a second remote control input (block 1920). The first orientation may be independent of the second orientation. The first orientation may be a reclined orientation and the first control input is a venue cleaning input. The second orientation may be a reclined orientation and the first control input is a venue cleaning input. The first orientation may be an upright orientation and the first control input is a venue emergency input. The second orientation may be an upright orientation and the first control input is a venue emergency input.

The method 1900 may further include generating the first control input and the second control input in response to an automatic venue cleaning sequence (block 1925). The method 1900 may also include energizing at least one first light source in response to the first control input (block 1930). The method 1900 may yet further include energizing at least one second light source in response to the second control signal (block 1935). The method may also include automatically prohibiting a second powered recliner chair from starting to reorient at the same time that a first chair starts to reorient (block 1940).

The method 1900 may be implemented by a processor (e.g., processor 164 of FIG. 1) executing a set of computer-executable instructions (e.g., the set of computer-readable instructions stored memory 165 of FIG. 1). Alternatively, the method 1900 may be implement by dedicated hardware (e.g., one or more discrete component circuits, one or more application specific integrated circuits (ASICs), etc.). Although the method 1900 is described with reference to the flowchart illustrated in FIG. 19, many other methods of implementing the method 1900 may alternatively be used. For example, the order of execution of the blocks illustrated in FIG. 19 may be changed, and/or some of the blocks described may be changed, eliminated, or combined.

Cup holders are often incorporated into venue seating (e.g., theater seating, auditorium seating, sports arena seating, concert hall seating, etc.). A cup holder may be incorporated into an associated chair or may be attached to, for example, a back of chair that is located in front of an associated chair. Cup holders may be retrofitted to an associated seating installation subsequent to the corresponding chairs being installed. The cup holders of the present disclosure may provide flexible installation. A cup holder of the present disclosure may be securely attached to an associated chair or may be attached to, for example, a back of chair that is located in front of an associated chair.

An accessory tray assembly (e.g., a snack tray, a writing tray, a snack tray with cup holder, etc.) of the present disclosure may be attached to a chair, in a field installation, without having to modify an associated chair. For example, an accessory tray assembly of the present disclosure may include a tray base that may drop into a space normally occupied by a cup holder and may be clamped to a chair arm box structure with, for example, lock dogs. Alternatively, attachment of the base may include screws instead of, or in addition to, clamp dogs.

Accessory tray load may be carried by bearings. The bearings may be positioned to carry loads and reduce tray movements. For example, a first bearing may be place outboard of a center portion of a tray base to reduce movement and increase load carrying capabilities.

An accessory tray assembly attachment mechanism may be free of exposed fasteners. For example, associated fasteners may be hidden by a cup holder. An associated cup holder may be retained by a unique center plug and screw arrangement. Associated attachment lock dogs and/or screws may be accesses access holes in a tray support that are aligned with fasteners in a tray base.

An accessory tray assembly may, for example, incorporate ¼ turn locking dogs to simplify installation and removal. An accessory tray assembly may, for example, incorporate access windows to aid installation and tightening of lock dogs and/or screws. An accessory tray assembly may, for example, incorporate features to insure proper position and function of associated lock dogs and/or screws. An accessory tray assembly may, for example, include other items post attached to the arm box to aid attachment of the accessory tray assembly to the associated chair.

An accessory tray assembly may be left-handed, right-handed, or may be ambidextrous. An accessory tray assembly may incorporate stops to limit movement. An accessory tray assembly may incorporate at least one biasing spring, or other devise, to automatically return the tray to a stored or open position. An accessory tray assembly may incorporate at least one locking mechanism configured to temporarily stop an associated tray in a closed, an opened, an intermediate position, any sub-combination thereof, or a combination thereof. An accessory tray assembly may incorporate a complex shaped snack tray support arm to minimize costs while providing superior strength compared to known trays. An accessory tray assembly may include an attachment having at least one attachment mechanism for removably securing the accessory tray within a receptacle of a chair. An accessory tray assembly may include drain holes for draining liquids that enter the assembly. An accessory tray assembly may include drain holes which serve as access holes for snack tray attachment features.

An accessory tray assembly may omit a cup holder, and the cup holder may be replaced with other feature(s). Any of the embodiments described to include a cup holder may similarly apply to these embodiments. An accessory tray assembly may include features to aid orientation of the snack tray during assembly. An accessory tray assembly may include features to aid the orientation of the snack tray during assembly to the chair. An accessory tray assembly may include a snack tray containing a support and table top which may be folded to minimize storage space and maximize use space. An accessory tray assembly may include a snack tray containing a support and table top which may be folded to minimize storage space and maximize use space. An accessory tray assembly may include design to include features to reduce, minimize or prevent spillage when in a closed position. An accessory tray assembly may include a snack tray containing a support and table top which may be folded to minimize storage space and maximize use space.

An accessory tray assembly may include design to include features to communicate tray position to a remote computing device. An accessory tray assembly may include a snack tray containing display devices to communicate with customers and staff. An accessory tray assembly may include a snack tray which incorporates a means to automatically recline or partially recline an associated chair based on position of the snack tray. An accessory tray assembly may include a snack tray which may coordinate a snack tray position and a chair position. For example, cooperation between a tray position and a chair position may be accomplished mechanically, electromechanically, electrically or by other means.

A chair may incorporate a tray which communicates with a chair control, operational system, ticketing systems and/or other entertainment and ordering systems, to enhance venue or customer experience. For example, features may include locking the tray in a closed position if a ticket is not purchased and/or signaling based on position. An accessory tray assembly may include display(s) that welcome customers, advertise specials, etc. An accessory tray assembly may incorporate devices to aid ordering of food or services, etc. An accessory tray assembly may include a tray which may open when an event occurs such as an end of show, a fire alarm sounds and/or may automatically close (partially or fully) when an associated seat is unoccupied.

A snack tray support may include features to aid or conceal wire routing, switches, displays or associated equipment to aid in the implementation of functions described. An accessory tray assembly may include a snack tray which may be powered to an opened, closed or intermediate position. An accessory tray assembly may include a snack tray which may be assisted by an energy storage device such as a spring move to an opened, closed or intermediate position. An accessory tray assembly may include a snack tray which may be assisted or resisted by a damper during movement to an opened, closed or intermediate position.

Figure 20A:
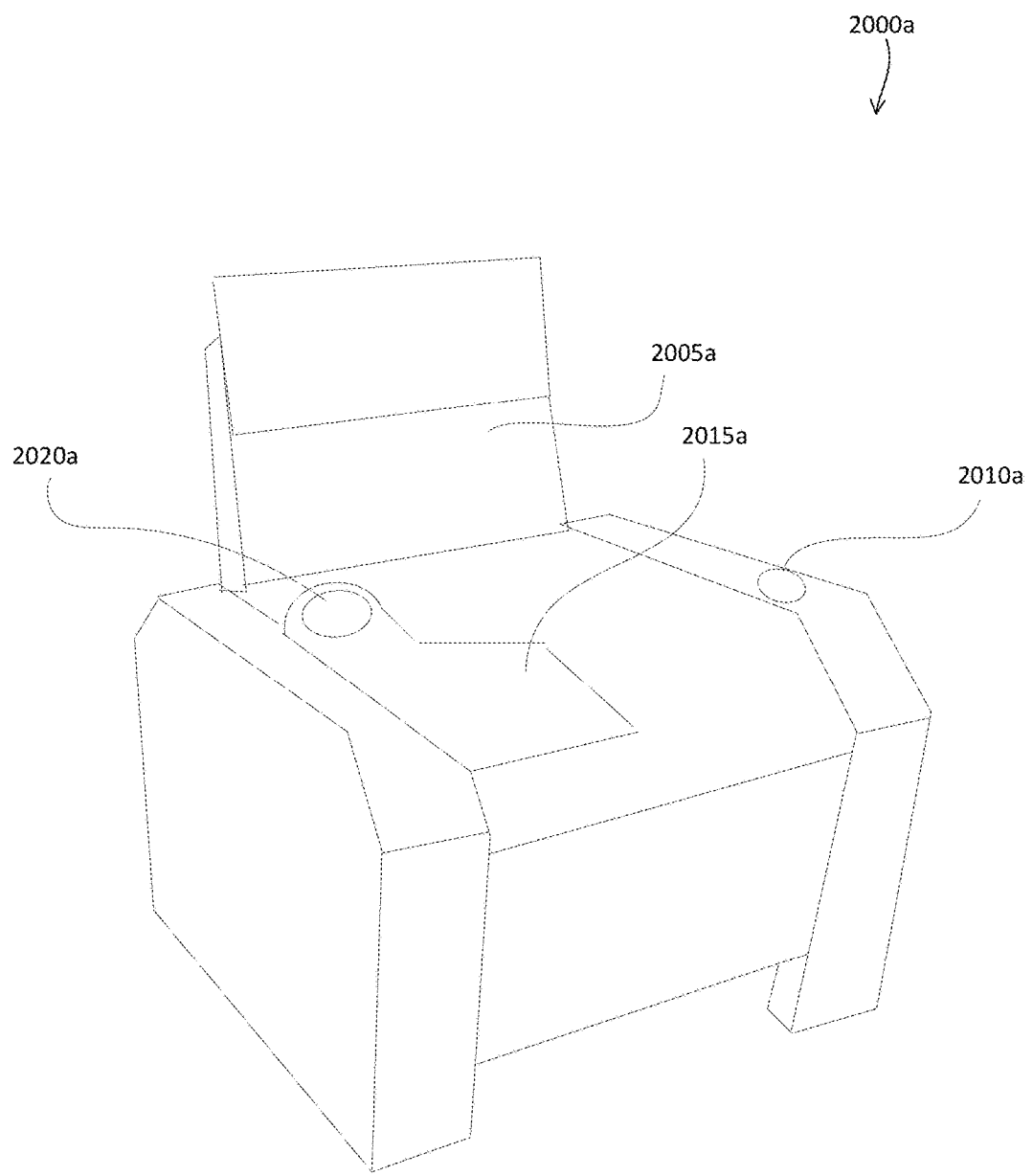
FIG. 20A depicts an example chair with an accessory tray in a non-use position.

Turning to FIG. 20A, a chair assembly 2000a may include a chair 2005a having a first cup holder 2010a and an accessory tray assembly 2015a including a second cup holder 2020a. The accessory tray assembly 2015a is shown in a non-use position. While the chair 2005a is shown as a powered recliner chair (e.g., as described in detail within the commonly assigned patent applications that are incorporated by reference above), any given chair 2005a may be as described in any other commonly assigned patent applications that is incorporated by reference above, or may be any other suitable chair.

Operation of a powered recliner chair may be enabled when a ticket for the particular chair is purchased. Thereby, in venues that include both standard chairs and powered recliner chairs, a patron is unable to occupy a powered recliner chair without buying a corresponding ticket. A venue cleaning system may include a remote control that reorients only chairs that were occupied (i.e., a ticket was purchased for the chair) subsequent to a previous cleaning and/or during a previous event. Thereby, reorientation of the chairs is reduced when compared to reorienting all chairs during each venue cleaning cycle.

A chair assembly may include a touch screen, or an associated device (e.g., a smart phone, a personal data assistant, a lap top computer, etc.) having a touch screen, may be configured to include a drag bar or swipe feature to extend and/or retract a chair a desired distance. All non-occupied powered recliner chairs within a given venue may be automatically partially reclined such that the chair backs do not affect sight lines of patrons seated behind the non-occupied chairs. Alternatively, or additionally, chairs that have not been purchased may be partially reclined when patrons enter behind the un-purchased chair. This may help sight lines and identified purchased chairs.

A touch screen associated with a given chair may be configured to include swipe gestures to control the chair (e.g., half swipe=half open position); a pinch to close the chair; preset chair position buttons; and/or a chair and/or venue may remember customers favorite positions/screen layouts (e.g., color scheme, button layouts etc.). A customer ID may be determined by tying into a point of sale system such that when a customer buys a reserved seat, the chair may be activated and with the given customer's favorite control panel layout and preset position buttons; allow a customer to enter a code (e.g., their frequent movie goer ID) to recall their favorite control panel layout and preset position buttons; a finger print reader; and/or a read card or dongle provided by theater.

A "Welcome message" may be added to a screen (e.g., "This luxury recliner is reserved for CUSTOMER). Screen graphics may change orientation based on whether a given chair is occupied (e.g., graphics facing standing or seated customer). A screen layout may have buttons to tie into non-movie related services (e.g., have valet parking bring my car up, prepare my pre-ordered meal or snacks at local eatery, etc.). Available buttons on a screen may change with movie progress (e.g., during preshow food ordering buttons, during trailers, buttons to advance ordering of tickets of show on trailer, buttons for services, such as described above, at end of show, etc.).

Figure 20B:
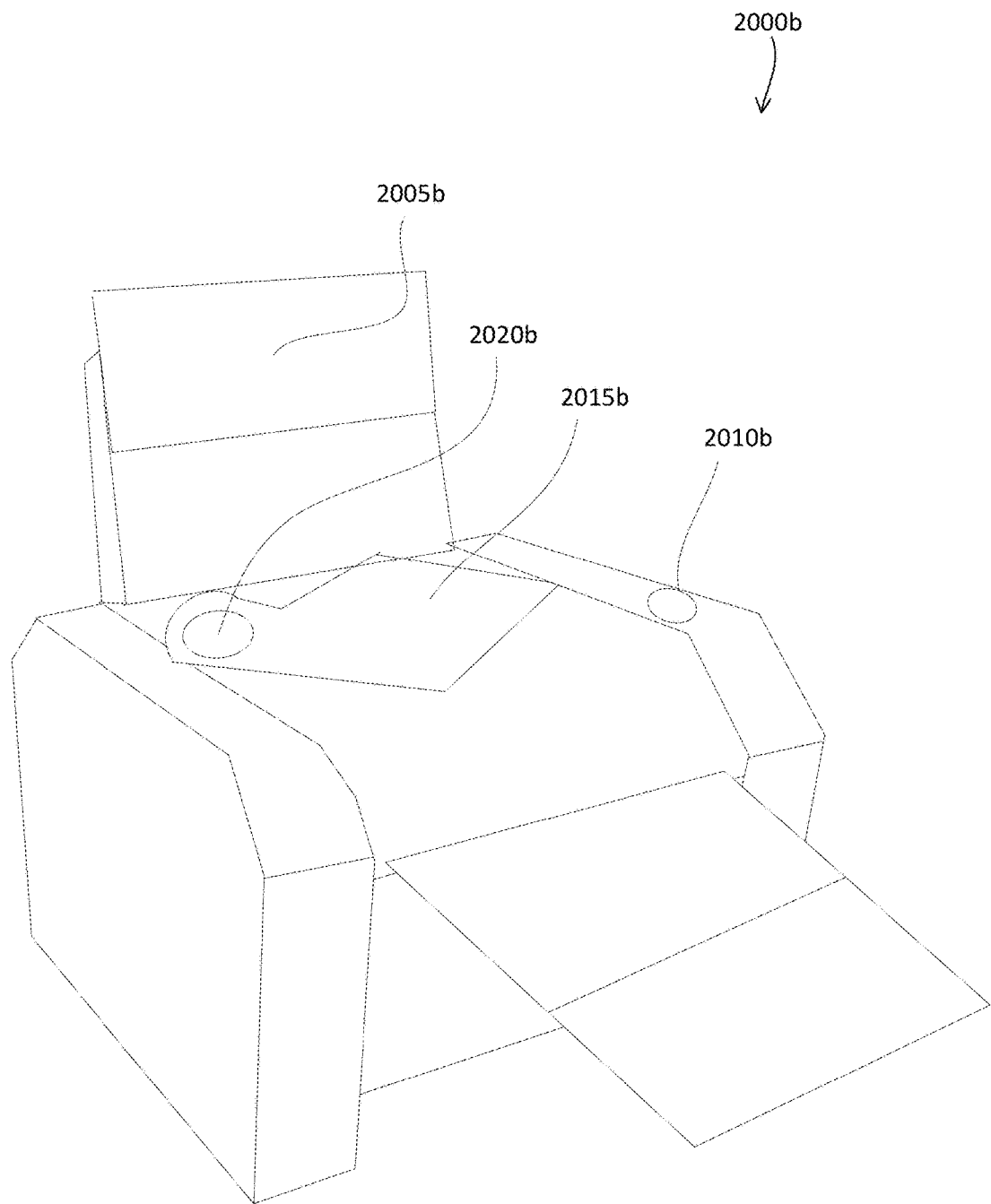
FIG. 20B depicts an example chair with an accessory tray in an in-use position.

With reference to FIG. 20B, a chair assembly 2000$b$ may include a chair 2005$b$ having a first cup holder 2010$b$ and an accessory tray assembly 2015$b$ including a second cup holder 2020$b$. The accessory tray assembly 2015$b$ is shown in an in-use position. While the chair 2005$b$ is shown as a powered recliner chair (e.g., as described in detail within the commonly assigned patent applications that are incorporated by reference above), any given chair 2005$b$ may be as described in any other commonly assigned patent applications that is incorporated by reference above, or may be any other suitable chair.

Figure 21A:
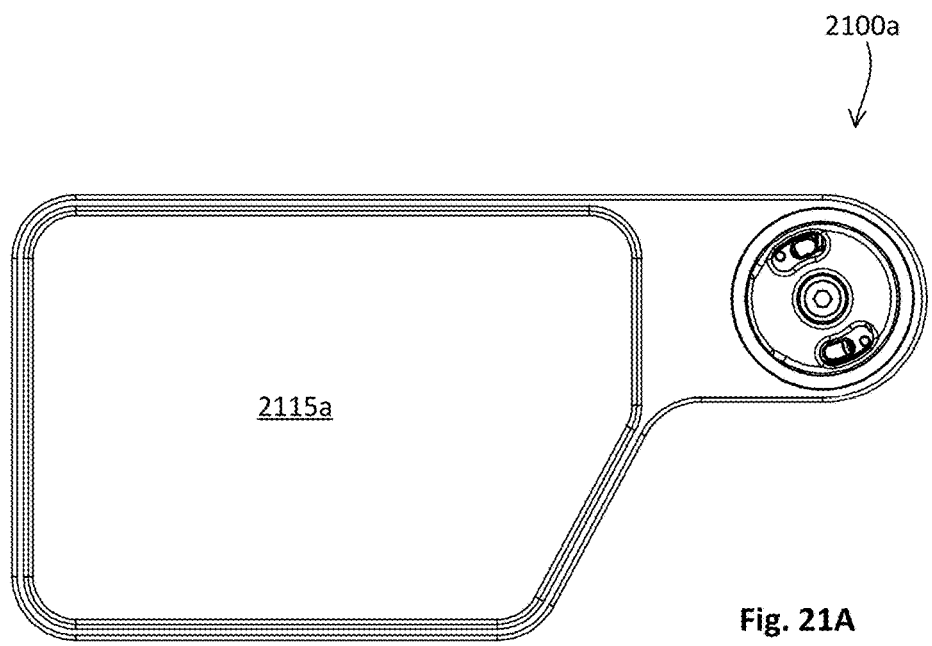
FIGS. 21A-21C depict various views of an example accessory tray assembly.
Figure 21B:
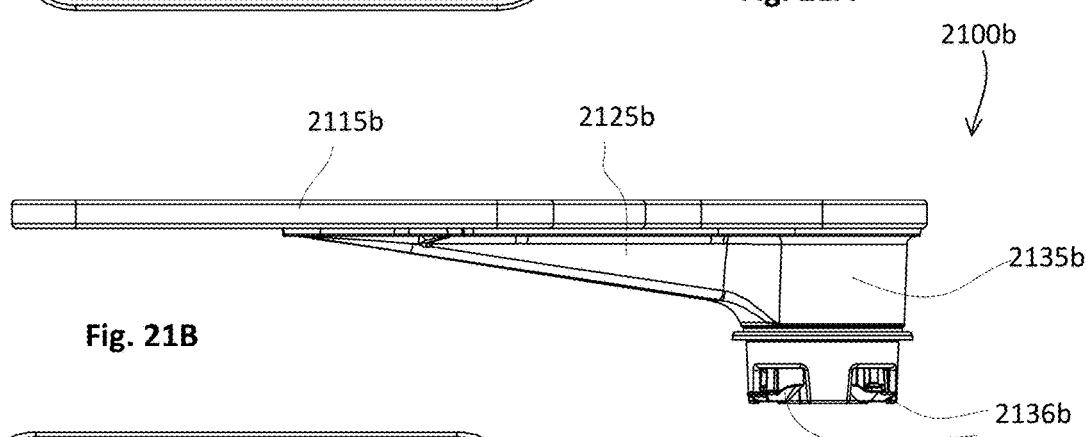
Figure 21C:
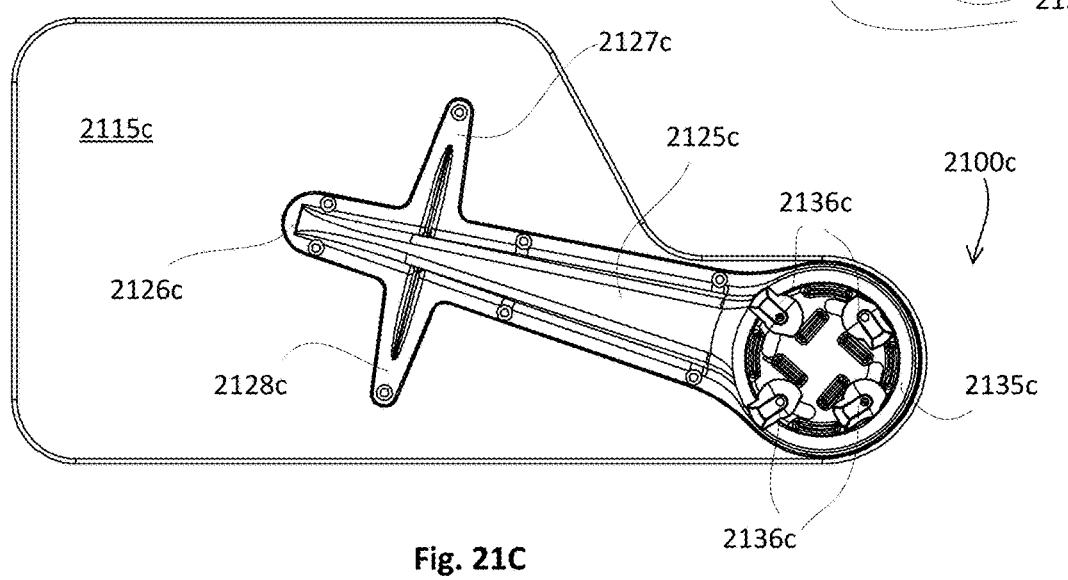
Figure 23A:
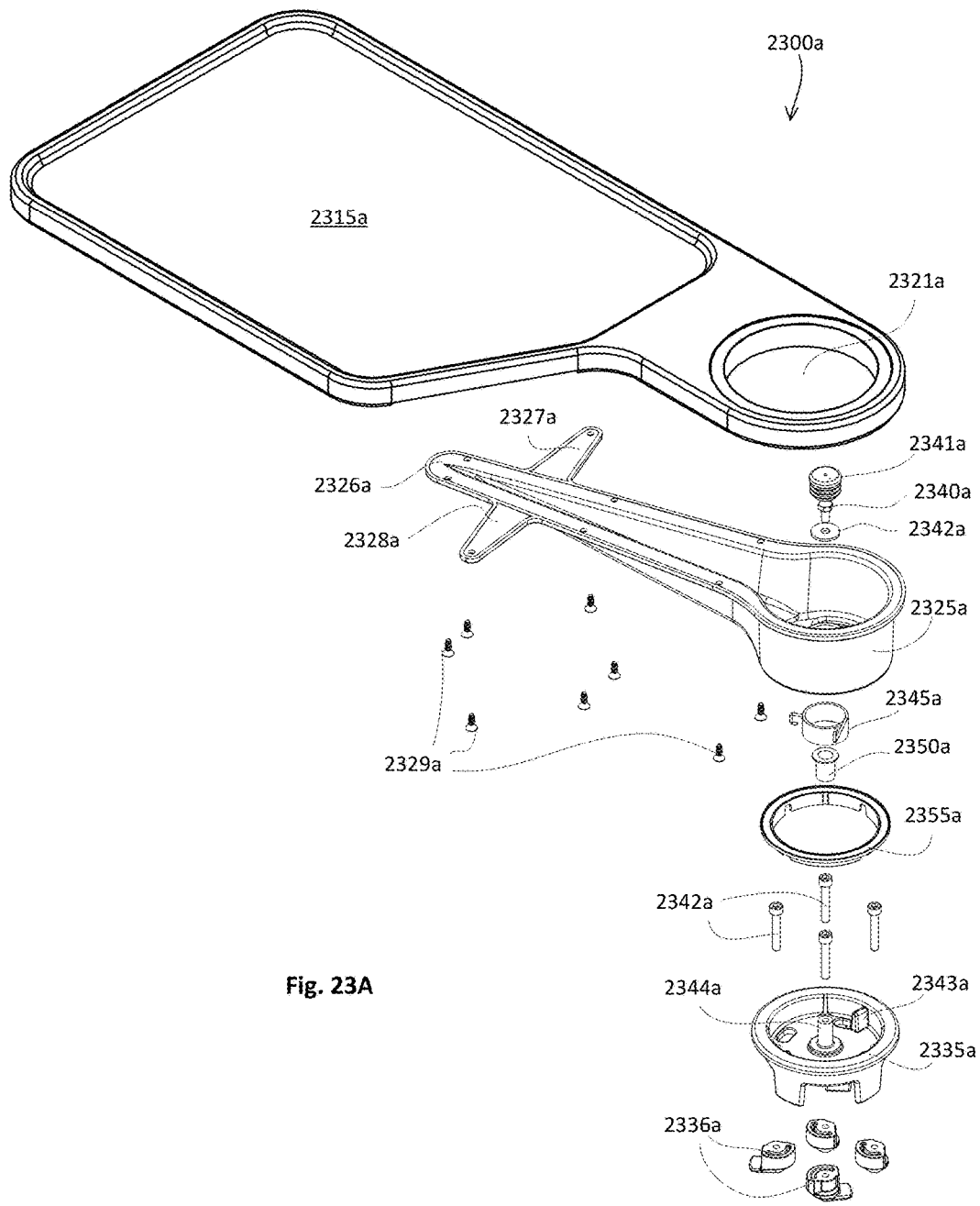
FIG. 23A-23E depict various views of an example accessory tray assembly.
Figure 23B:
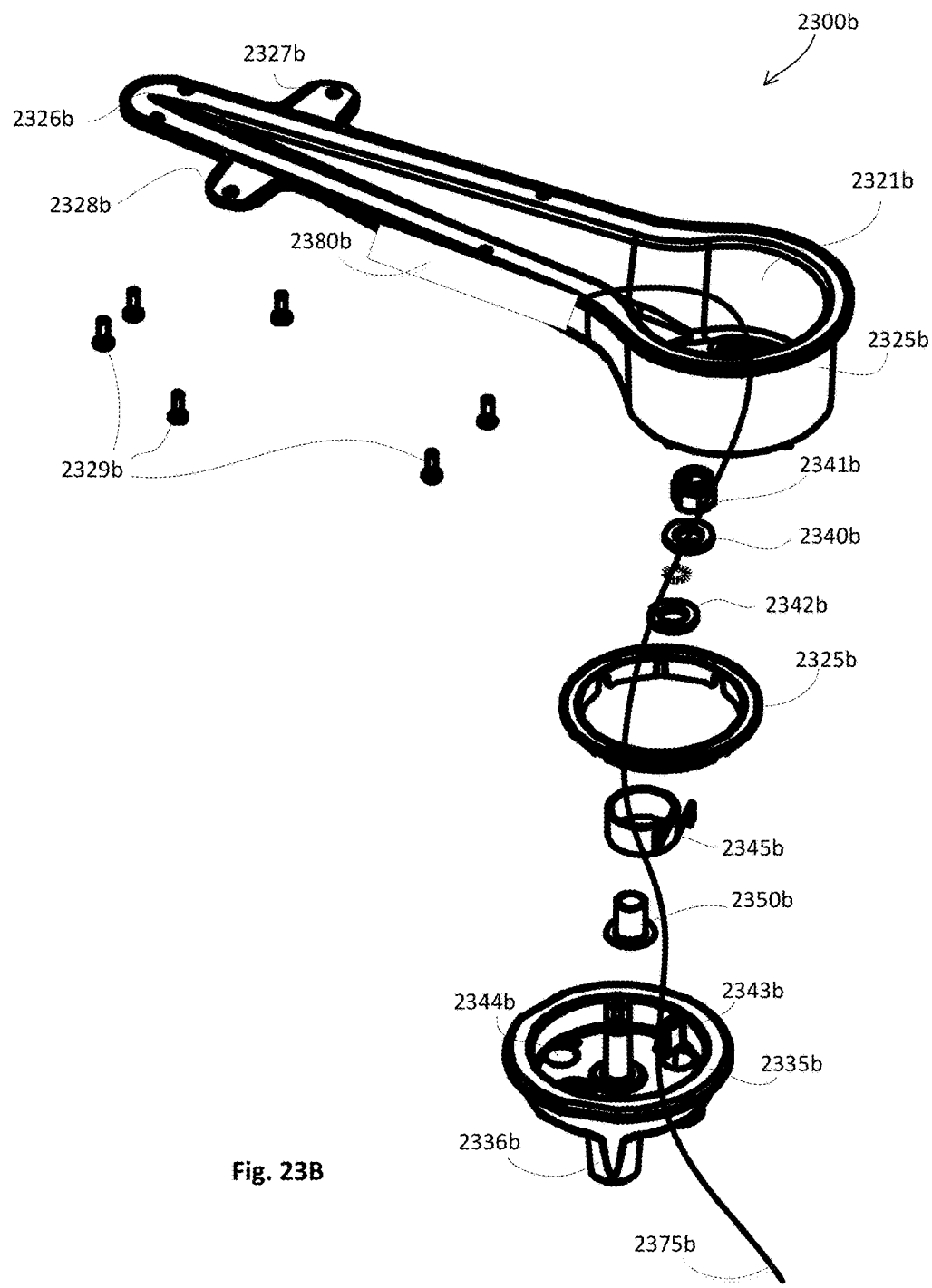
Figure 23C:
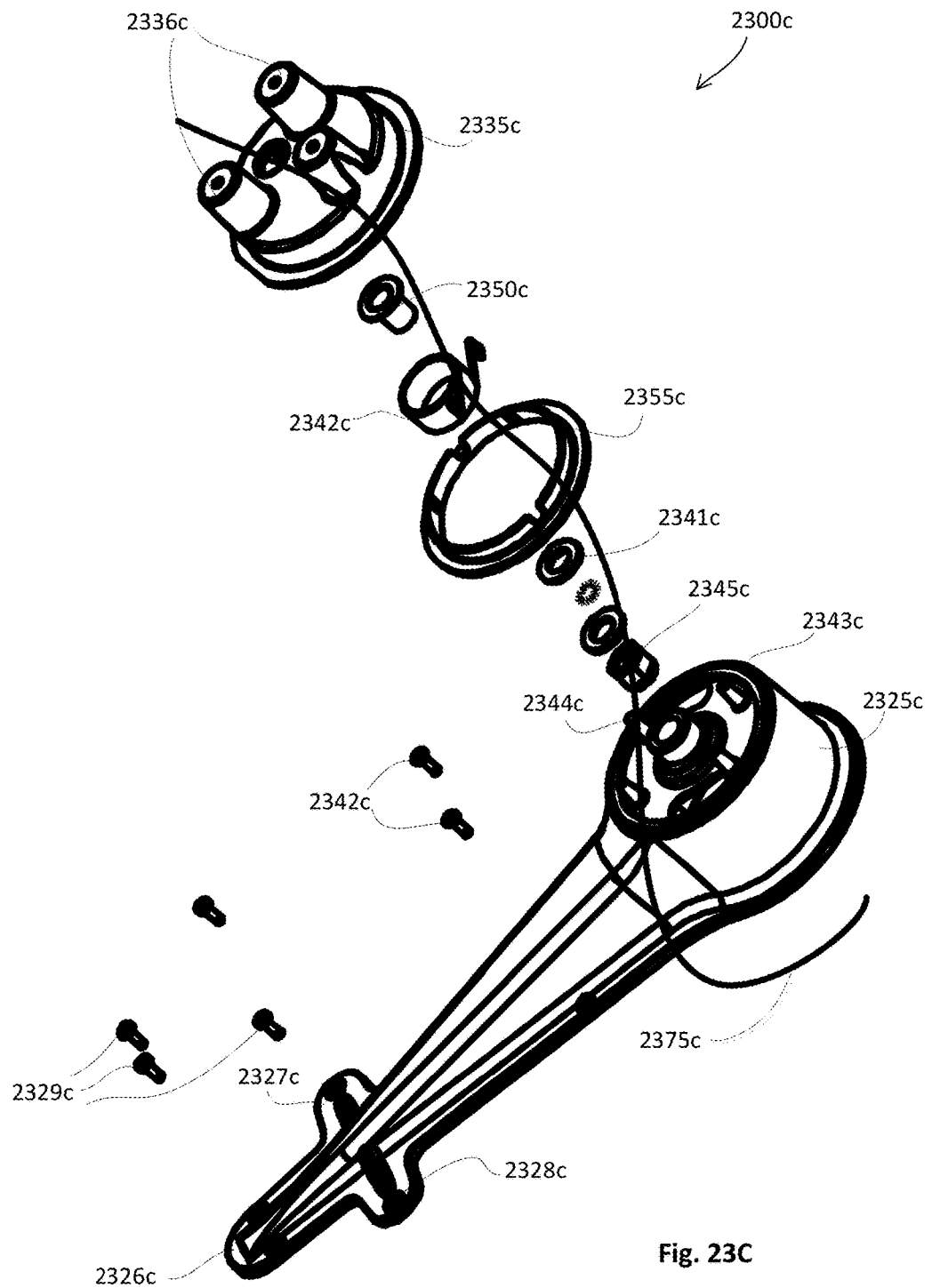
Figure 23D:
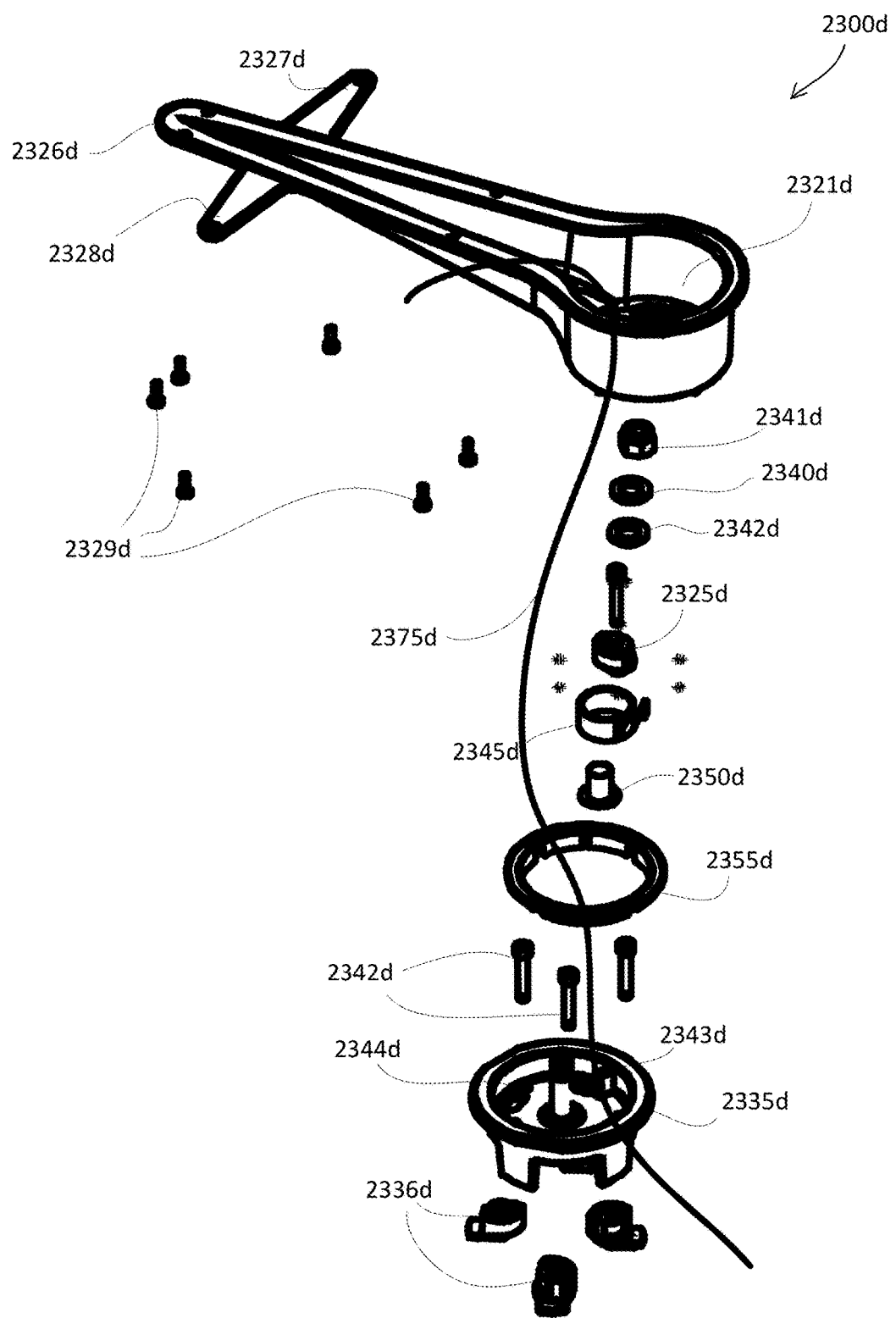
Figure 23E:
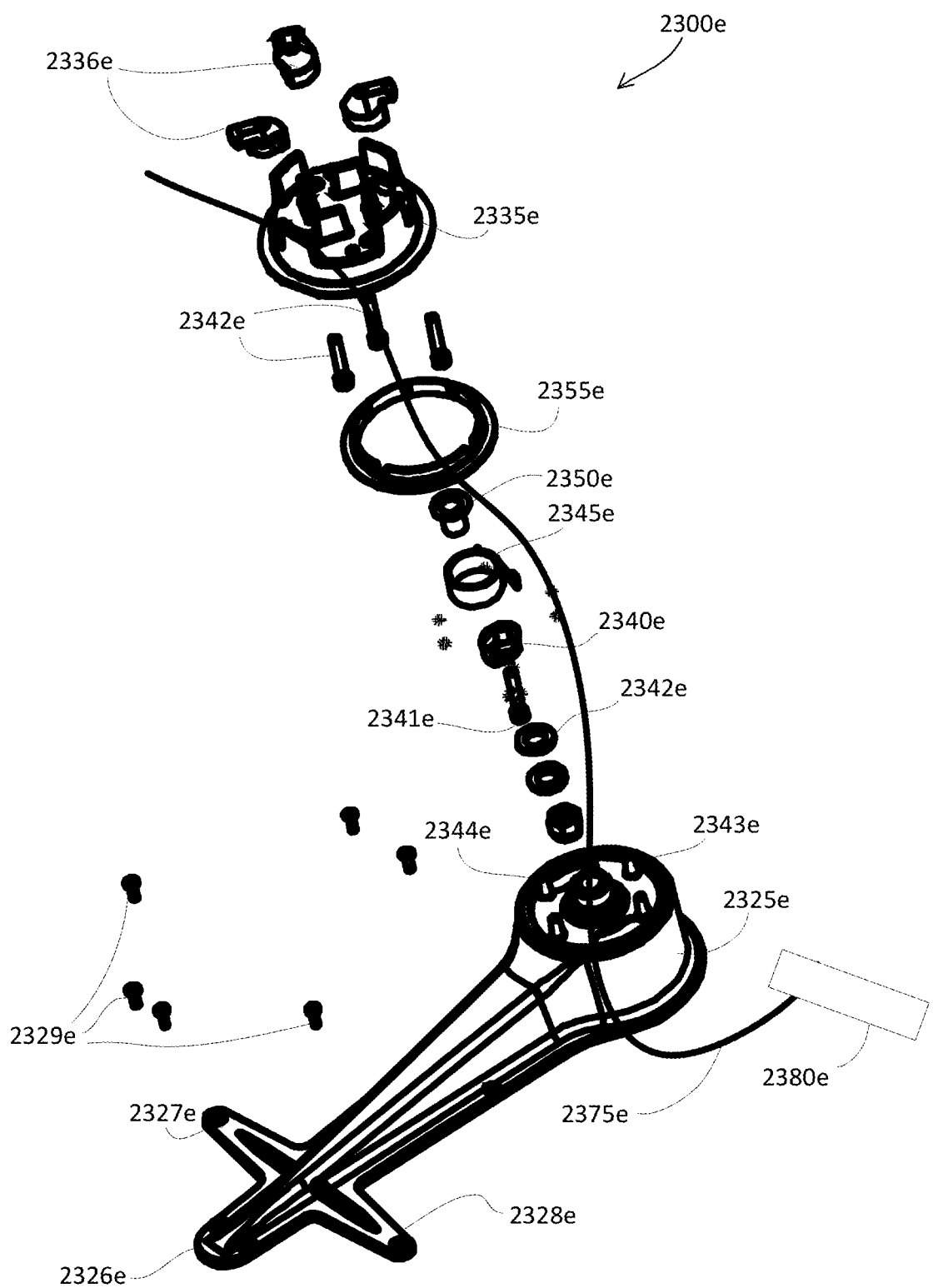
Figure 24A:
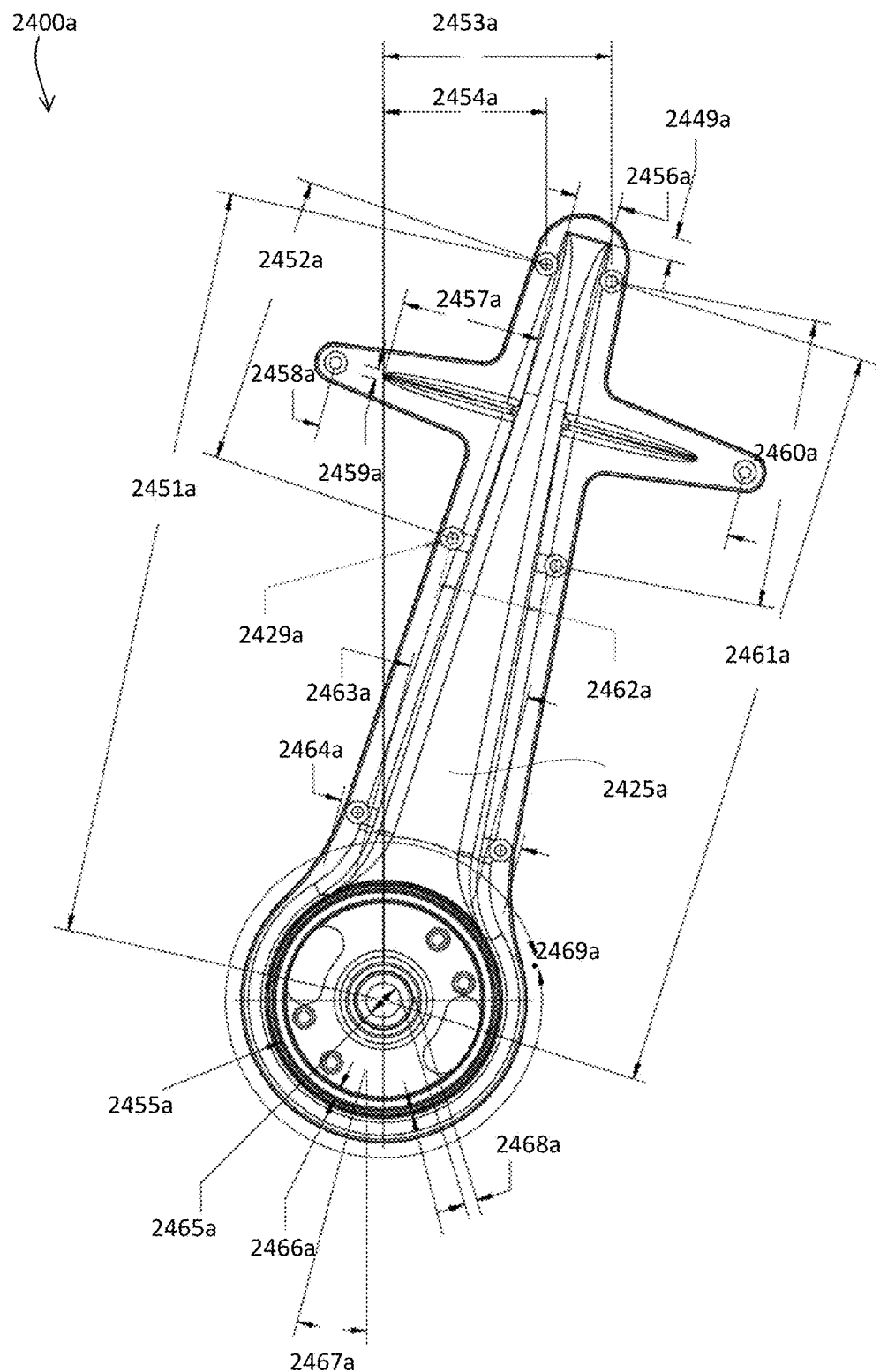
Figure 24B:
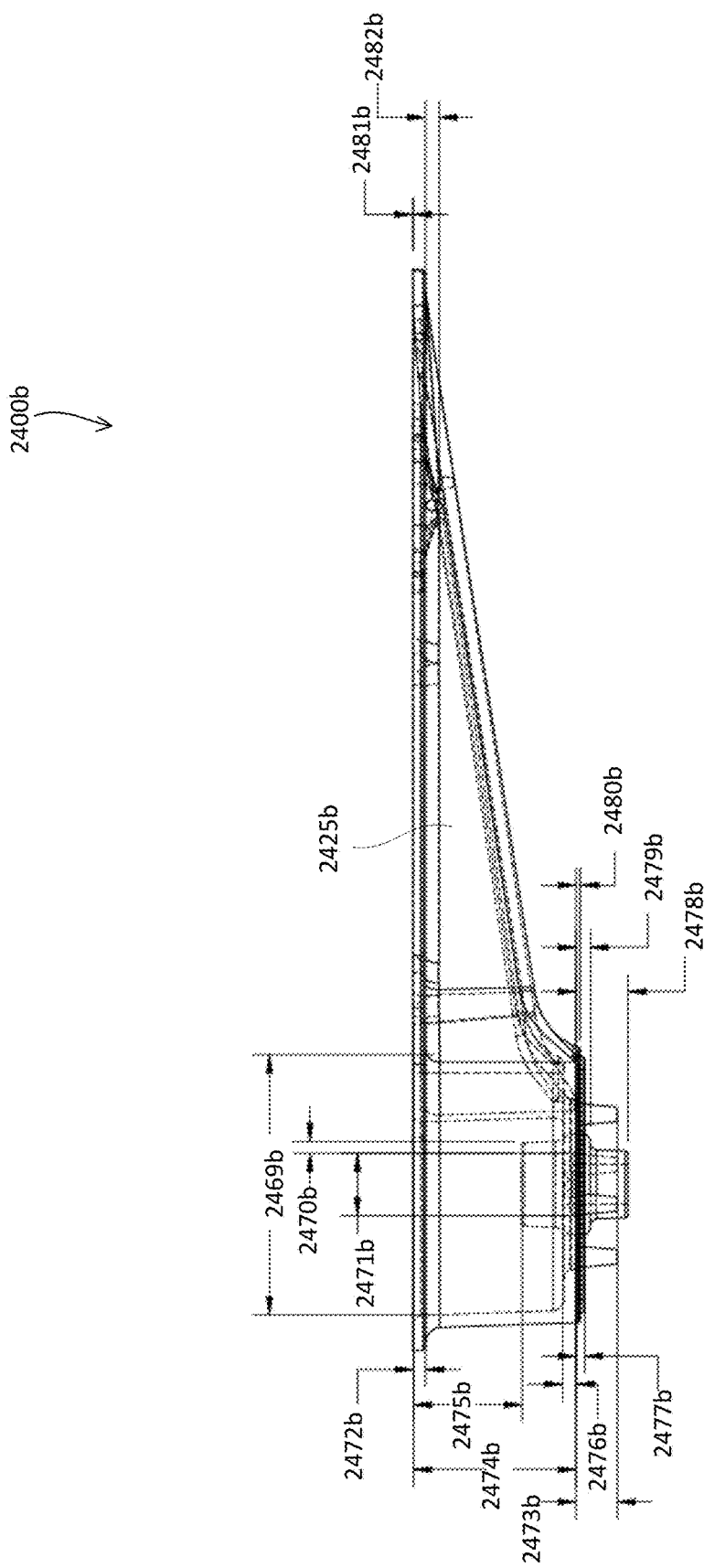
Figure 24C:
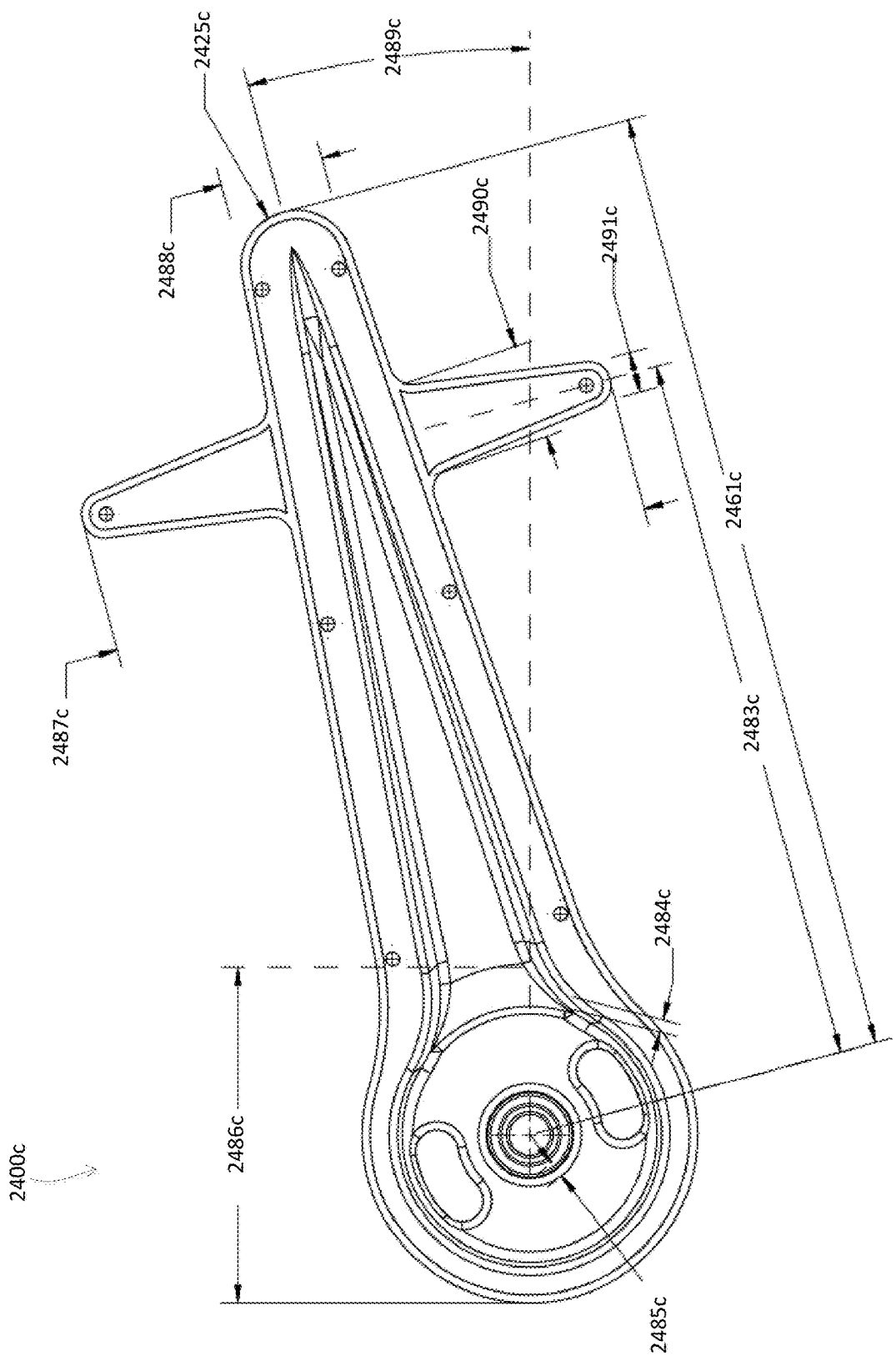
Figure 24D:
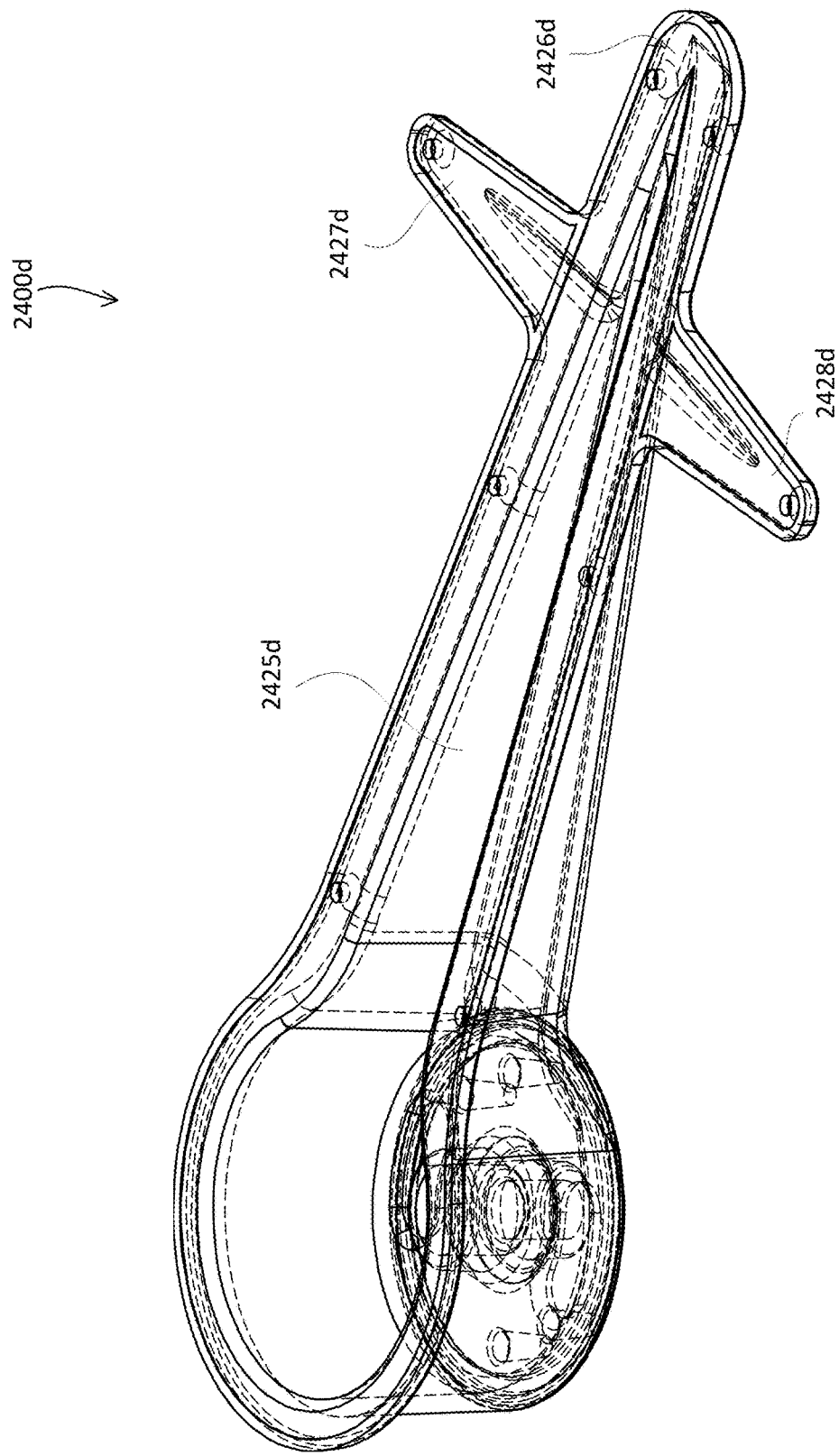

Turning to FIGS. 21A-21C, an accessory tray assembly 2100$a$, 2100$b$, 2100$c$ may include a tray 2115$a$, 2115$b$, 2115$c$ secured to a tray support 2125$b$, 2125$c$ via, for example, fasteners 2129$c$ (e.g., screws, bolts, adhesive, co-molding, etc. The tray support 2125$b$, 2125$c$ may be a casting (e.g., a steel casting, an iron casting, an aluminum casting, a composite material casting, etc.). Alternatively, the tray support 2125$b$, 2125$c$ may be a stamping (e.g., a metal stamping), a molded plastic, or may be a composite structure. The accessory tray assembly 2100$a$, 2100$b$, 2100$c$ may include a tray base 2135$b$, 2135$c$ and lock dogs 2136$b$, 2136$c$.

With reference to FIGS. 22A-22D, an accessory tray assembly 2200$a$, 2200$b$, 2200$c$, 2200$d$ may include a tray support 2225$a$, 2238$b$, 2225$c$, 2225$d$ having a first support extension 2226$a$, 2226$d$, a second support extension 2227$a$, 2227$d$, a third support extension 2228$a$, 2228$d$, and fasteners 2229$c$, 2229$d$. The tray support 2225$a$, 2238$b$, 2225$c$, 2225$d$ may be similar to, for example, the tray support 2125$b$, 2125$c$. The accessory tray assembly 2200$a$, 2200$b$, 2200$c$, 2200$d$ may include a tray base 2235$a$, 2235$b$, 2235$c$ and lock dogs 2236$b$, 2236$c$. As shown in the cross section view 22B-22B of FIG. 22B, the accessory tray assembly 2200$a$, 2200$b$, 2200$c$, 2200$d$ may include screw 2240$b$ to secure the tray support 2225$a$, 2238$b$, 2225$c$, 2225$d$ to the tray base 2235$a$, 2235$b$, 2235$c$. The accessory tray assembly 2200$a$, 2200$b$, 2200$c$, 2200$d$ may include a plug 2241$b$ configured to cover the screw 2240$b$. The tray support 2225$a$, 2238$b$, 2225$c$, 2225$d$ and/or the tray base 2235$a$, 2235$b$, 2235$c$ may include access holes 2239$b$ aligned with lock dog screws 2237$b$ such that, for example, the lock dogs 2236$b$, 2236$c$ may be engaged with a corresponding chair attachment (e.g., chair attachment 2860$a$, 2860$b$ of FIGS. 28A and 28B, respectively).

Turning to FIGS. 23A-E, an accessory tray assembly 2300$a$-$e$ may include a tray 2315$a$, having a cup holder receptacle 2320$a$-$e$, secured to a tray support 2325$a$-$e$, having a first support extension 2326$a$-$e$ a second support extension 2327$a$-$e$, and a third support extension 2328$a$-$e$, via tray fasteners 2329$a$-$e$. The tray support 2325$a$-$e$ may be rotatably secured to a center post 2344$a$-$e$ of a tray base 2335$a$-$e$ via a tray support fastener 2340$a$-$e$ and associated washer 2342$a$-$e$. The accessory tray assembly 2300$a$-$e$ may include an inner bearing 2350$a$-$e$ and an outer bearing 2355$a$-$e$ juxtaposed between the tray support 2325$a$-$e$ and the tray base 2335$a$-$e$ configured to carry loads and reduce tray movements. The accessory tray assembly 2300$a$-$e$ may include at least one biasing spring 2345$a$-$e$, or other devise, to automatically return the tray 2315$a$-$e$ to a stored position (e.g., non-use position) or an open position (e.g., in-use position). The accessory tray assembly 2300$a$-$e$ may include a plug 2341$a$-$e$ to obscure (or hide) the tray support fastener 2340$a$-$e$. The tray support 2325$a$-$e$ and/or the tray base 2335$a$-$e$ may include access holes (e.g., access holes 2239$b$ of FIG. 22B) aligned with lock dog screws 2342$a$-$e$ such that, for example, the lock dogs 2336$a$-$e$ may be engaged with a corresponding chair attachment (e.g., chair attachment 2860$a$, 2860$b$ of FIGS. 28A and 28B, respectively). The accessory tray assembly 2300$a$-$e$ may include at least one stop 2343$a$-$e$ to limit movement of the tray 2315$a$ in at least one of: a closed position, an opened position, an intermediate position, any sub-combination thereof, or a combination thereof.

As illustrated in FIGS. 23B-E, electric power and/or data conductors 2375$b$-$e$ may be routed through portions of the accessory tray assembly 2300$b$-$e$ (e.g., access holes 2239$b$ of FIG. 22B). The electric power and/or data conductors 2375$b$-$e$ may route thru an upper casting 2335$a$-$d$ of an accessory tray assembly 2300$b$-$e$ and/or a cup holder 2321$a$, 2321$b$, 2321$d$. Alternatively, or additionally, the electric power and/or data conductors 2375$b$-$e$ may route thru screw access holes (e.g., access holes 2239$b$ of FIG. 22B). The electric power and/or data conductors 2375$b$-$e$ may exit thru a hole (e.g., access holes 2239$b$ of FIG. 22B) to a light 2380*b*, 2380*d* mounted to, for example, the accessory tray assembly 2300*b*. Alternatively, or additionally, the electric power and/or data conductors 2375*b-e* may route to a light 2380*b*, 2380*d* and/or a user interface display (e.g., user interface display 3600, 3700*a-d*, 4400*a-d*, 4500, 5100*a-e*) could be mounted to the accessory tray assembly 2300*b* and/or a side of an arm box (e.g., arm box 4305*a*, 4305*b*). A tray 2315*a* may define a user interface display and the electric power and/or data conductors 2375*b-e* may route thru screw access holes (e.g., access holes 2239*b* of FIG. 22B) to the tray 2315*a*.

With reference to FIGS. 24A-24G, an accessory tray assembly 2400*a*, 2400*b*, 2400*c*, 2400*d*, 2400*e*, 2400*f*, 2400*g* may include a tray support 2425*a*, 2425*b*, 2425*c*, 2425*d*, 2425*f* pivotally attached to a tray base 2435*e*, 2433*f*, 2435*g* with interposing inner bearing 2465*a* and outer bearing 2455*a*. The accessory tray assembly 2400*a*, 2400*b*, 2400*c*, 2400*d*, 2400*e*, 2400*f*, 2400*g* may be similar to, for example, the accessory tray assembly 2300*a* of FIG. 23A. The tray support 2425*a*, 2425*b*, 2425*c*, 2425*d*, 2425*f* may be similar to, for example, the tray support 2325 of FIG. 23, and may include a first extension 2426*d*, a second extension 2427*d*, and a third extension 2428*d*. The tray base 2435*e*, 2433*f*, 2435*g* may be similar to, for example, the tray base 2335 of FIG. 23. The inner bearing 2465*a* may be similar to, for example, the inner bearing 2350 of FIG. 23. The outer bearing 2455*a* may be similar to, for example, the outer bearing 2355 of FIG. 23. The accessory tray assembly 2400*a*, 2400*b*, 2400*c*, 2400*d*, 2400*e*, 2400*f*, 2400*g* may include at least one access hole 2434*f* for accessing tray base 2435*e*, 2433*f*, 2435*g* fasteners (e.g., lock dogs or screws) and at least one tray stop boss 2426*f* having a radius 2427*f* of, for example, 6 mm.

The inner bearing 2465*a* may have an inside cross section dimension 2465*a* of 15 mm and a cross section thickness dimension 2468*a* of 5.3 mm. The outer bearing 2455*a* may have a radius dimension 2455*a* of 95 mm and a bearing surface dimension 2466*a* of 5 mm. The a tray rest position 2467*a*, 2489*c* (e.g., a tray stop position biased by a spring) of the tray support 2425*a*, 2425*b*, 2425*c*, 2425*d*, 2425*f* may be, for example, 15 degrees with respect to an axis that is perpendicular to an associated chair arm (e.g., as shown in FIG. 20B). Optionally, the tray support 2425*a*, 2425*b*, 2425*c*, 2425*d*, 2425*f* may have a full rotation 2469*a* of 360 degrees with respect to the tray base 2435*e*, 2433*f*, 2435*g*.

The tray support 2425*a*, 2425*b*, 2425*c*, 2425*d*, 2425*f* and tray base 2435*e*, 2433*f*, 2435*g* may include a first dimension 2451*a* of 325 mm, a second dimension 2452*a* of 125 mm, a third dimension 2453*a* of 98 mm, a fourth dimension 2454*a* of 70 mm, a fifth dimension 2449*a* of 10 mm, a sixth dimension 2456*a* of 19 mm, a seventh dimension 2457*a* of 60 mm, an eighth dimension 2458*a* of 182 mm, a ninth dimension 2459*a* of 4.5 mm, a tenth dimension 2460*a* of 125 mm, an eleventh dimension 2461*a* of 325 mm, a twelve dimension 2462*a* of 46.26 mm, a thirteenth dimension 2463*a* of 52 mm, a fourteenth dimension 2464*a* of 80 mm, a fifteenth dimension 2469*b* of 96 mm, a sixteenth dimension 2470*b* of 4.5 mm, a seventeenth dimension 2471*b* of 23 mm, an eighteenth dimension 2472*b* of 4.3 mm, a nineteenth dimension 2473*b* of 15 mm, a twentieth dimension 2474*b* of 60 mm, a twenty-first dimension 2475*b* of 40.1 mm, a twenty-second dimension 2476*b* of 5 mm, a twenty-third dimension 2477*b* of 3 mm, a twenty-fourth dimension 2478*b* of 19 mm, a twenty-fifth dimension 2479*b* of 5 mm, a twenty-sixth dimension 2480*b* of 1.5 mm, a twenty-seventh dimension 2481*b* of 0.25 mm, a twenty-eighth dimension 2482*b* of 5 mm, a twenty-ninth dimension 2461*c* of 350 mm, a thirtieth dimension 2483*c* of 260 mm, a thirty-first dimension 2484*c* of 4.5 mm, a thirty-second dimension 2485*c* of 6 mm, a thirty-third dimension 2486*c* of 12.3 mm, a thirty-fourth dimension 2487*c* of 200 mm, a thirty-fifth dimension 2488*c* of 38 mm, a thirty-sixth dimension 2490*c* of 35 mm, a thirty-seventh dimension 2491*c* of 15 mm, a thirty-eighth dimension 2426*e* of a tray stop of 8 mm and an associated thirty-ninth dimension 2427*e* of a tray stop catch of 11.8 mm, a fortieth dimension 2428*e* of a radius of a temporary tray stop of 10.5 mm, a forty-first dimension 2430*e* of a radius of a tray stop plate of 75 mm, a forty-second dimension 2431*e* of a tray stop plate fastener radius of 6.5 mm, a forty-third dimension 2432*e* of a degree of rotation between a tray stop and a temporary tray stop of 45 degrees, a forty-fourth dimension 2433*e* of a degree of rotation between a tray stop and a temporary tray stop of 45 degrees, a forty-fifth dimension 2430*f* of 35 mm, a forty-sixth dimension 2428*f* of 38 degrees, a forty-seventh dimension 2429*f* of 12 degrees, a forty-eighth dimension 2431*f* of 12 degrees, and a forty-ninth dimension 2432*f* of 36 degrees. The specific dimensions provided above are for illustrative purposes only, it should be understood that the dimensions may be increased, or decreased, in, for example, proportion to one another. Alternatively, any individual dimension may be increased or decreased by, for example, +/−5-10% in proportion to any mating part.

The tray base 2435*e*, 2433*f*, 2435*g* may include a first dimension 2426*g* of 113 mm, a second dimension 2427*g* of 95 mm, a third dimension 2428*g* of 18 mm, a fourth dimension 2429*g* of 7 mm, a fifth dimension 2430*g* of 5 mm, and a sixth dimension 2431*g* of 40 mm. The specific dimensions provided above are for illustrative purposes only, it should be understood that the dimensions may be increased, or decreased, in, for example, proportion to one another. Alternatively, any individual dimension may be increased or decreased by, for example, +/−5-10% in proportion to any mating part.

Figure 25A:
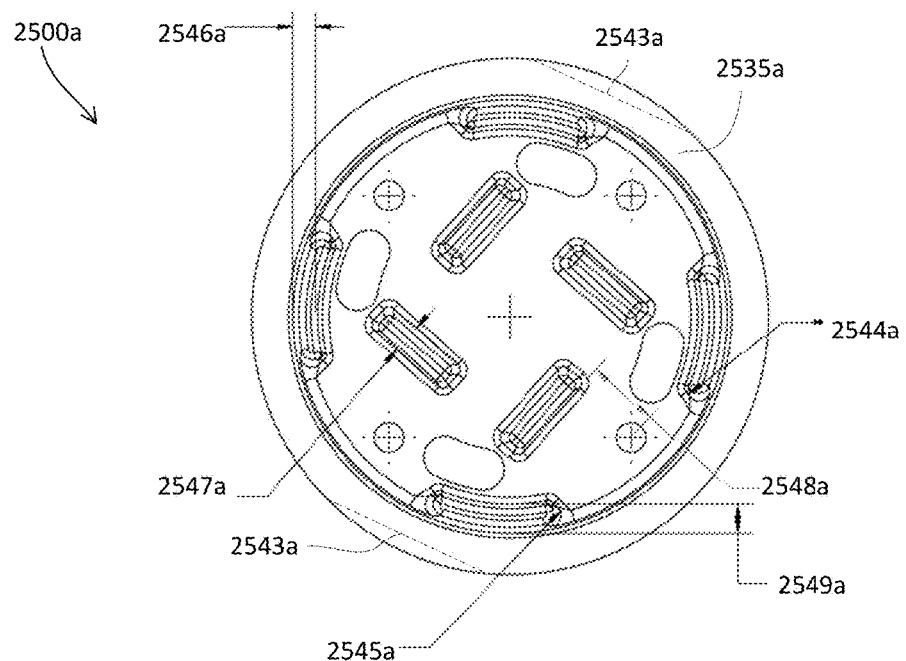
FIGS. 25A and 25B depict an example accessory tray base.
Figure 25B:
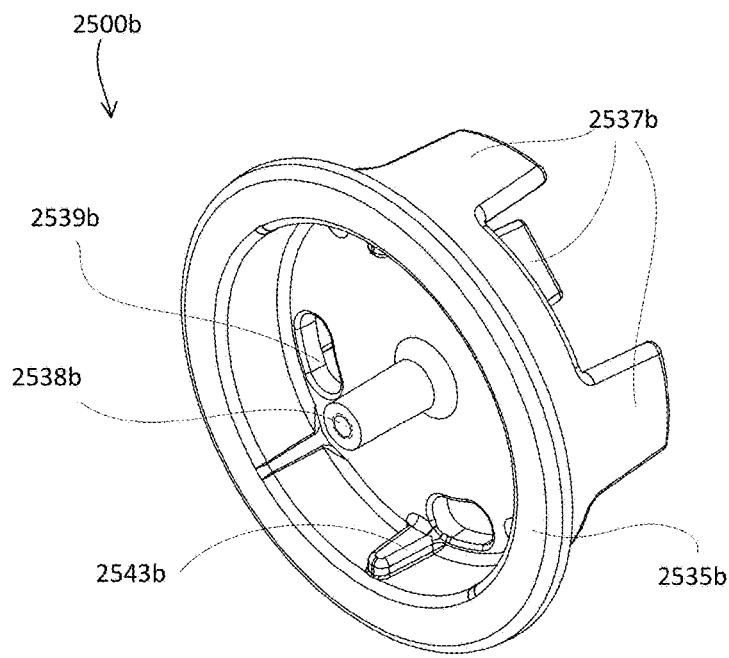

Turning to FIGS. 25A and 25B, a tray base 2535*a*, 2535*b*, for use within accessory tray assemblies 2500*a*, 2500*b*, may include base stand-offs 2537*b*, access holes 2539*b*, a center tray pivot post 2538*b*, and at least one tray stop 2543*b*. The tray base 2535*a*, 2535*b* may be similar to, for example, the tray base 2335 of FIG. 23 or the tray base tray base 2435*e*, 2433*f*, 2435*g* of FIGS. 24E, 24F, 24G, respectively. The tray base 2535*a*, 2535*b* and/or tray base plate may include a first dimension 2544*a* of a radius of a tray stop catch of 31 mm, a second dimension 2545*a* of a tray stop radius of 22 mm, a third dimension 2546*a* of 5 mm, a fourth dimension 2547*a* of 6.5 mm, a fifth dimension 2548*a* of 15.55 mm, and a sixth dimension 2549*a* of 6.5 mm. The specific dimensions provided above are for illustrative purposes only, it should be understood that the dimensions may be increased, or decreased, in, for example, proportion to one another. Alternatively, any individual dimension may be increased or decreased by, for example, +/−5-10% in proportion to any mating part.

An accessory tray assembly may include an attachment having at least one attachment mechanism for removably securing the accessory tray within a receptacle of a chair. An accessory tray assembly may include drain holes 2539*b* for draining liquids that enter the assembly. An accessory tray assembly may include drain holes 2539*b* which serve as access holes for snack tray attachment features. An accessory tray assembly a cup holder may be omitted and replace by other feature(s). All of the embodiments described herein that include cup holders may not include a cup holder. An accessory tray assembly may include features 2543*a* to aid orientation of the snack tray during assembly. An accessory tray assembly may include features to aid the orientation of the snack tray during assembly to the chair.

With reference to FIGS. 26A-26D, an outer bearing 2655a, 2655b, 2655c, 2655d, for use within accessory tray assemblies 2600a, 2600b, 2600c, 2600d, may include at least one stop alignment 2643c, at least one temporary tray stop alignment 2644c having a first dimension 2658b of 6 mm and a second dimension 2662b of 8 mm, a first outside dimension 2656d of 99 mm, a second dimension 2656b of 1.75 mm, a third dimension 2657b of 2.25 mm, a fourth dimension 2660b of 12 mm, a fifth dimension 2661b of 3 mm, a sixth dimension 2656a of a radius of 8 mm, a seventh dimension 2657a of an angle of 45 degrees, an eighth dimension 2658a of 1 mm, and a ninth dimension 2659a of 37 mm. The outer bearing 2655a, 2655b, 2655c,2655d may be similar to, for example, the outer bearing 2355 of FIG. 23 or the outer bearing 2455a of FIG. 24A. The specific dimensions provided above are for illustrative purposes only, it should be understood that the dimensions may be increased, or decreased, in, for example, proportion to one another. Alternatively, any individual dimension may be increased or decreased by, for example, +/−5-10% in proportion to any mating part.

Turning to FIGS. 27A-27C, a biasing spring 2700a, 2700b, 2700c, for use within accessory tray assemblies, may include a first catch 2701a, 2701c having a horizontal section 2702a, 2702b and a vertical section 2703a, a second catch 2704a, 2704c having a horizontal section 2705a, 2705b and a vertical section 2706a, and a spring coil 2707a. The biasing spring 2700a, 2700b, 2700c may be similar to, for example, the biasing spring 2345 of FIG. 23. The biasing spring 2700a, 2700b, 2700c may include a first dimension 2710b of 17 mm, a second dimension 2711b of 31 mm, a third dimension 2712b of 6.5 mm, a fourth dimension 2713b of 4 mm, a fifth dimension 2714c of 31 mm, and a relaxed spring dimension 2715c of 90 degrees. The biasing spring 2700a, 2700b, 2700c may be made from, for example, spring steel having an outside radius dimension of 2 mm. The specific dimensions provided above are for illustrative purposes only, it should be understood that the dimensions may be increased, or decreased, in, for example, proportion to one another. Alternatively, any individual dimension may be increased or decreased by, for example, +/−5-10% in proportion to any mating part.

Figure 28A:
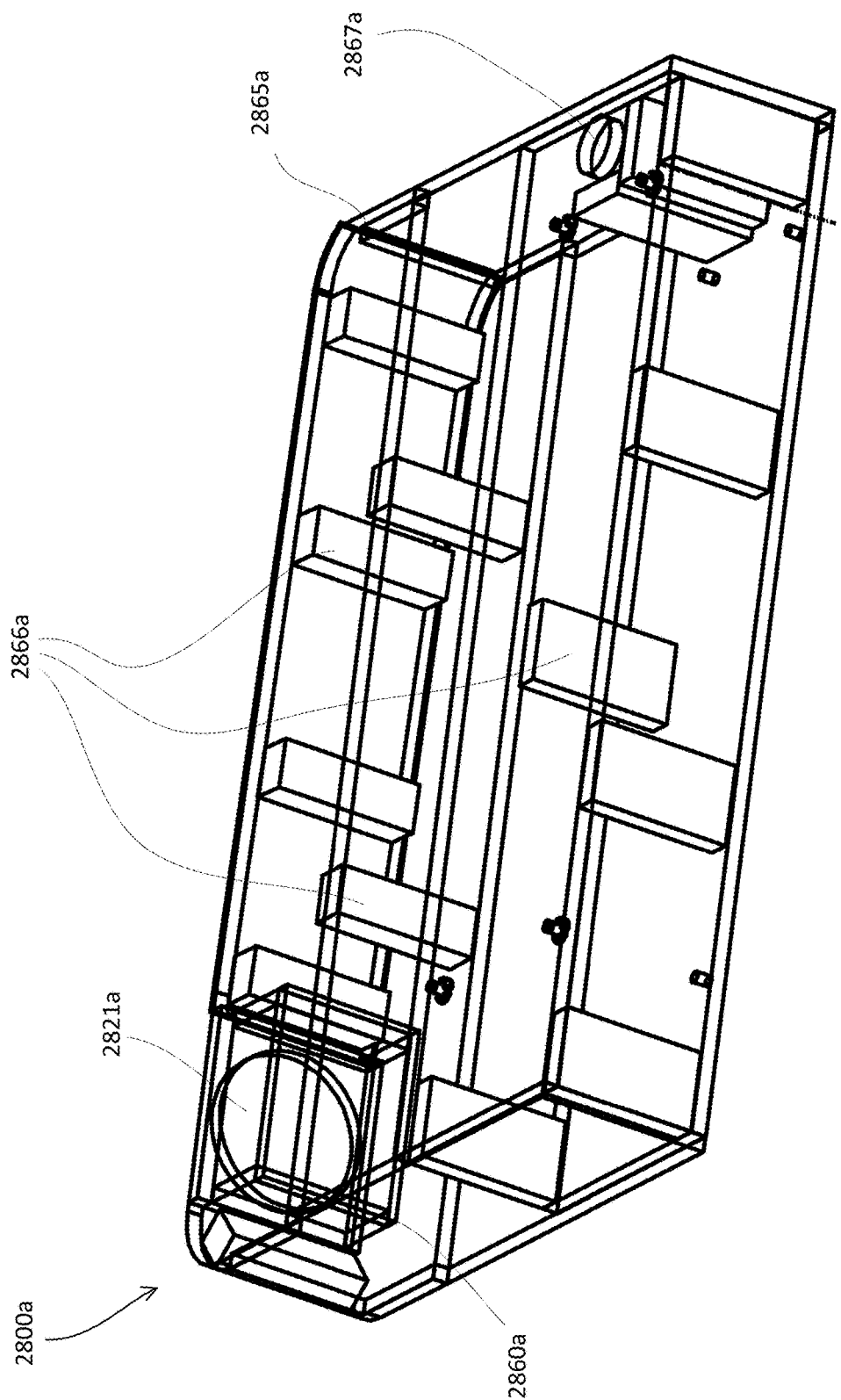
FIGS. 28A and 28B depict various views and components of an example accessory tray assembly and related chair attachment components.
Figure 28B:
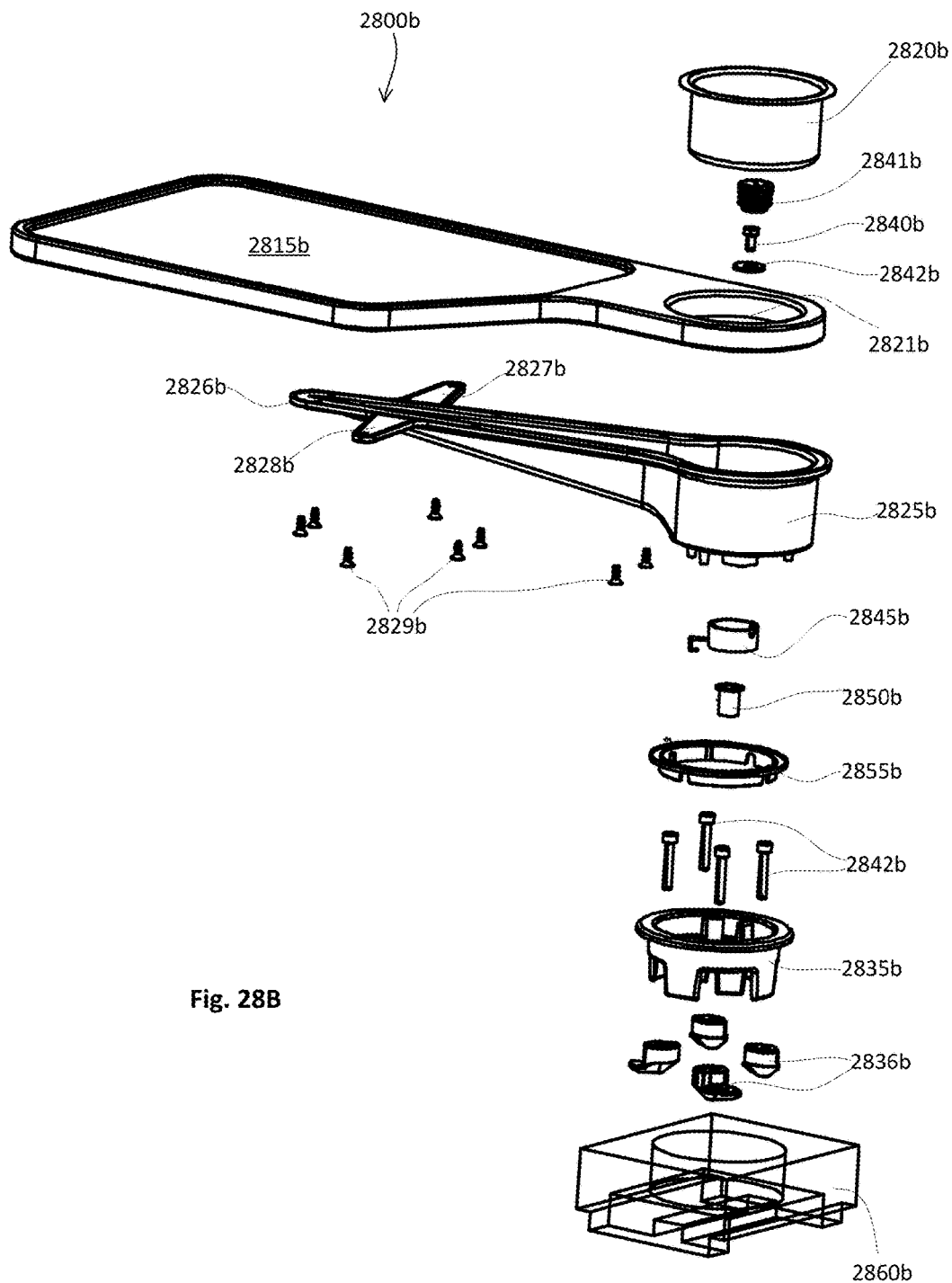

With reference to FIGS. 28A and 28B, components of an accessory tray assembly 2800b and related chair attachment components 2800a may include a tray 2815b, having a cup holder receptacle 2820b, secured to a tray support 2825b, having a first support extension 2826b a second support extension 2827b, and a third support extension 2828b, via tray fasteners 2829b. The accessory tray assembly 2800b may be similar to, for example, the accessory tray assembly 2300 of FIG. 23. The tray support 2825b may be rotatably secured to a center post 2844b of a tray base 2835b via a tray support fastener 2840b and associated washer 2842b. The accessory tray assembly 2800b may include an inner bearing 2850b and an outer bearing 2855b juxtaposed between the tray support 2825b and the tray base 2835b configured to carry loads and reduce tray movements. The accessory tray assembly 2800b may include at least one biasing spring 2845b, or other devise, to automatically return the tray 2815b to a stored position (e.g., non-use position as shown in FIG. 20A) or an open position (e.g., in-use position as shown in FIG. 20B). The accessory tray assembly 2800b may include a plug 2841b to obscure (or hide) the tray support fastener 2840b. The tray support 2825b and/or the tray base 2835b may include access holes (e.g., access holes 2239b of FIG. 22B) aligned with lock dog screws 2842b such that, for example, the lock dogs 2836b may be engaged with a corresponding chair attachment 2860a, 2860b. The accessory tray assembly 2800b may include at least one stop 2843b to limit movement of the tray 2815b in at least one of: a closed position, an opened position, an intermediate position, any sub-combination thereof, or a combination thereof.

The chair attachment 2860a, 2860b may be, for example, configured as an integral structural member of a chair arm 2800a. The chair arm 2800a may include a cup holder receptacle 2821a, a series of structural braces 2865a, 2866a, and at least one wire-way 2867a.

Figure 29A:
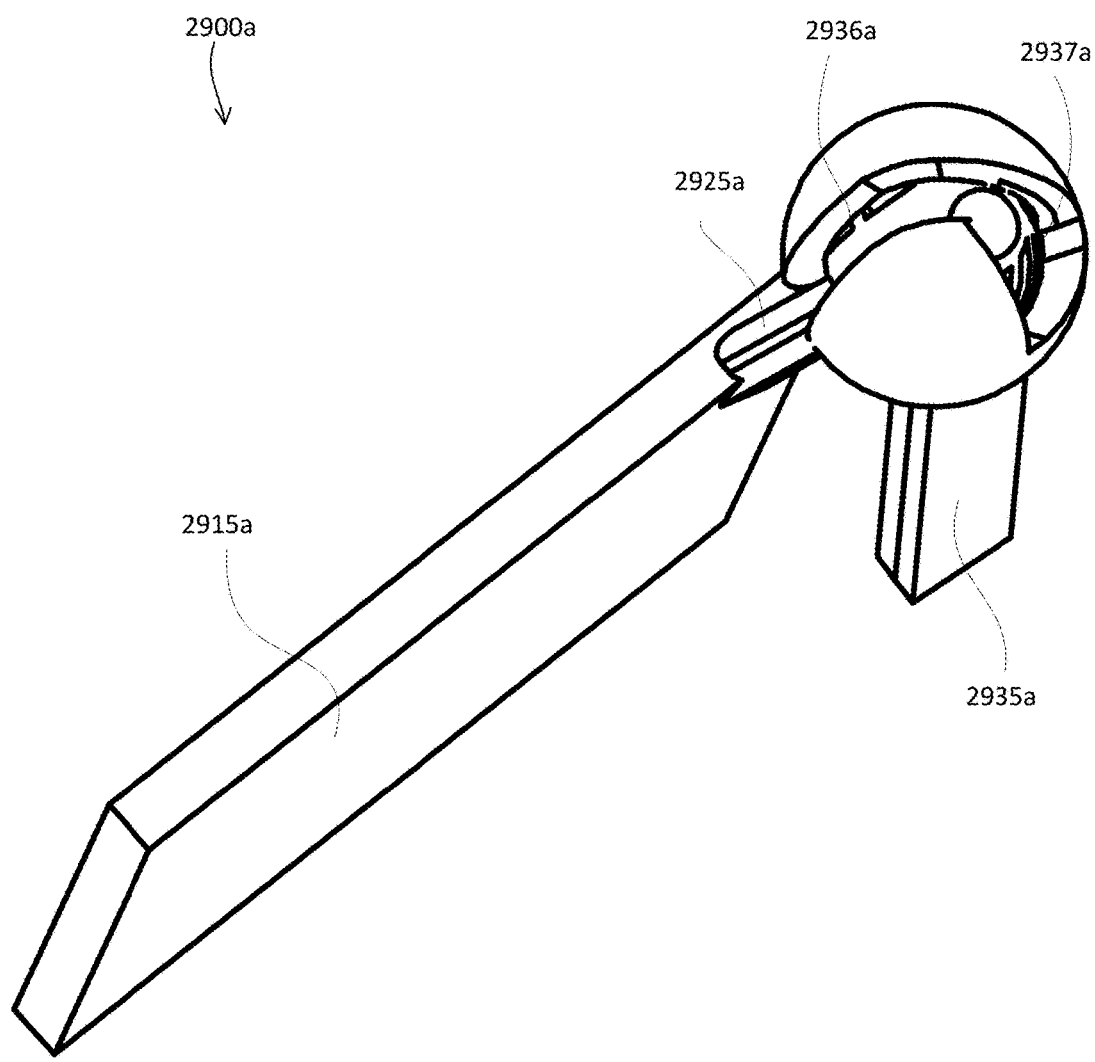
FIGS. 29A and 29B depict various views and components of an example accessory tray assembly and related attachment components.
Figure 29B:
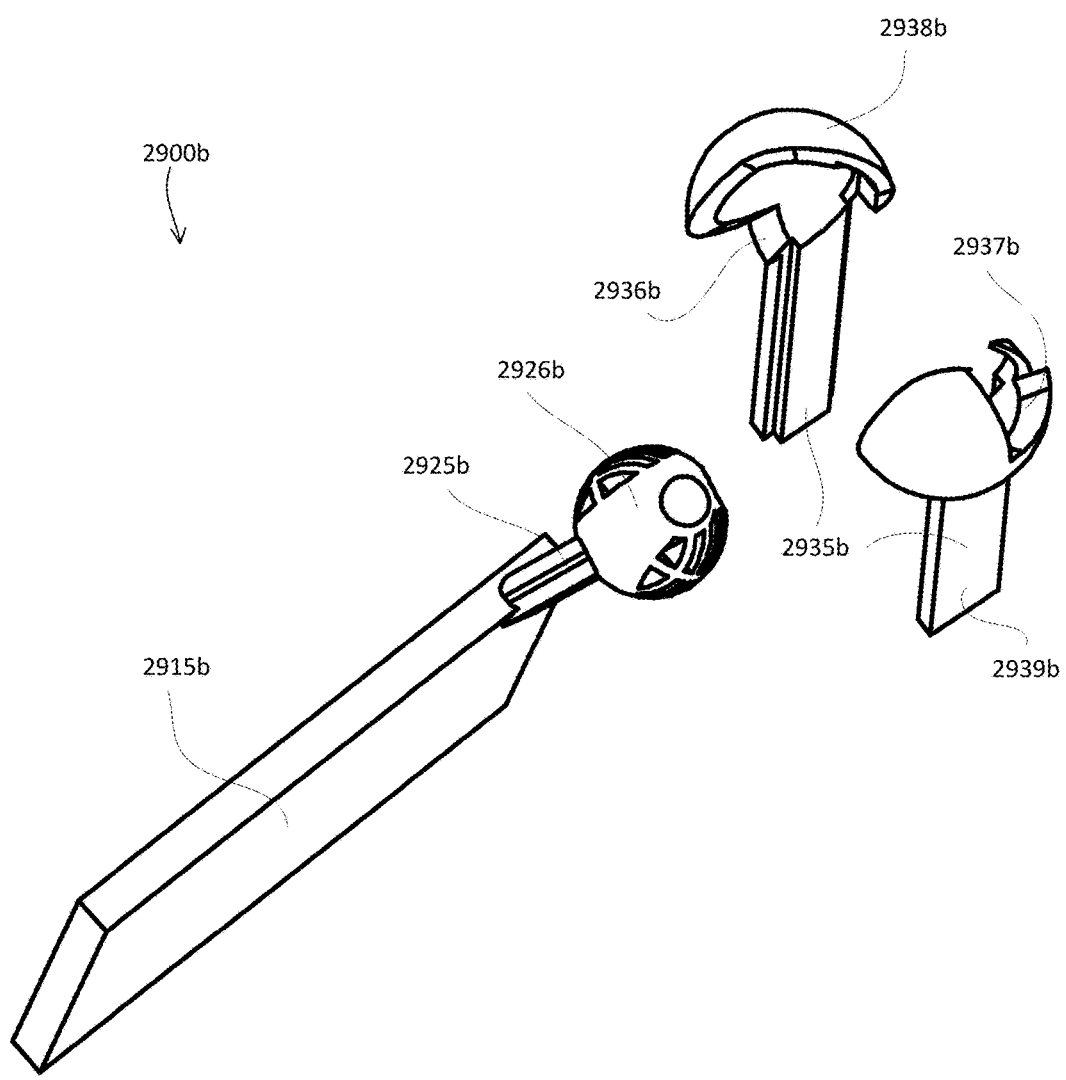

Turning to FIGS. 29A and 29B, an accessory tray assembly and related attachment components. An accessory tray assembly 2900a, 2900b may include a tray 2915a, 2915b that is movable between a generally vertical stored position and a generally horizontal in-use position, a ball and socket (or knuckle) 2925a/2935a, 2925b/2935b disposed between and operably connecting the tray 2915a, 2915b and a mount. The ball and socket (or knuckle) 2925a/2935a, 2925b/2935b may include a first and a second generally planar surfaces 2936a, 2937a, 2936b, 2937b defining an oblique angle with respect to one another. The ball and socket (or knuckle) 2925a/2935a, 2925b/2935b may be pivotably attached to a mount 2935a, 2935b at the first surface which may define a first plane of rotation of the ball and socket (or knuckle) 2925a/2935a, 2925b/2935b with respect to the mount, and the ball and socket (or knuckle) 2925a/2935a, 2925b/2935b may be pivotably attached to the tray at the second surface which may define a second plane of rotation of the ball and socket (or knuckle) 2925a/2935a, 2925b/2935b with respect to the tray. The tray may be movable between a stored position and an in-use position by a rotation between the ball and socket (or knuckle) 2925a/2935a, 2925b/2935b and the mount in the first plane of rotation and between the tray and the ball and socket (or knuckle) 2925a/2935a, 2925b/2935b in the second plane of rotation. During rotation in the first plane of rotation, rotation in the second plane of rotation may be locked. During rotation in the second plane of rotation, rotation in the first plane of rotation may be locked.

An accessory tray assembly may include a tray movable between a generally vertical stored position and a generally horizontal in-use position and a ball and socket (or knuckle) 2925a/2935a, 2925b/2935b operable between the tray and a mount, the ball and socket (or knuckle) 2925a/2935a, 2925b/2935b may include an elbow, a first plate 3038b, and a second plate 3039b. The elbow may include first and second planar surfaces 3036a, 3036b, 3037a, 3037b defining an oblique angle with respect to one another. The first plate may be rotatably attached to the first surface of the elbow and the second plate is rotatably attached to the second surface of the elbow. The first surface may be disposed at an angle of at least sixty degrees with respect to the second surface. The first plate may be fixedly attached to the mount and the second plate is fixedly attached to the tray.

Contact between the first plate and second plate may require the tray to be moveable between the generally vertical stored position and the generally horizontal in-use position in two consecutive movements. The first movement may include the tray and ball and socket (or knuckle) 1025a/2935a, 1025b/2935b rotating at least 100 degrees about a first axis and the second movement may include the tray rotating at least 90 degrees about a second axis.

An accessory tray assembly for attachment to a seat assembly having a frame and two arm rests supported by the frame, each of the two arm rests may include an inner edge defining an inner vertical plane, with the space defined between inner vertical planes of the two arm rests defining a seating space, the accessory tray assembly may include a tray movable between a generally vertical stored position and a generally horizontal in-use position; a ball and socket (or knuckle) 1025*a*/2935*a*, 1025*b*/2935*b* disposed between and operably connecting the tray and the frame, the ball and socket (or knuckle) 1025*a*/2935*a*, 1025*b*/2935*b* pivotably attached to the frame and pivotable about a first axis, and the ball and socket (or knuckle) 1025*a*/2935*a*, 1025*b*/2935*b* pivotably attached to the tray and pivotable about a second axis, the first axis and the second axis being obliquely angled with respect to one another. The tray may be movable between the stored position and the in-use position by rotation between the ball and socket (or knuckle) 1025*a*/2935*a*, 1025*b*/2935*b* and the frame about the first axis and between the tray and the ball and socket (or knuckle) 1025*a*/2935*a*, 1025*b*/2935*b* about the second axis. In the stored position, the tray may be disposed under one of the two arm rests and outside of the seating space of the seat assembly and adjacent seat assemblies. As the tray is moved between the stored position and the in-use position, no part of the tray crosses into the seating space of adjacent seat assemblies. As the tray moves between the in-use position and the stored position, the tray may move under the associated arm rest without displacing the arm rest.

An accessory tray assembly may include a mount having a mount attachment surface; a tray movable between a generally vertical stored position and a generally horizontal in-use position, the tray may include a tray attachment surface; a ball and socket (or knuckle) 1025*a*/2935*a*, 1025*b*/2935*b* operable between the tray and the mount. The mount attachment surface may be rotatably attached to a first surface of the ball and socket (or knuckle) 1025*a*/2935*a*, 1025*b*/2935*b* and the tray attachment surface may be rotatably attached to a second surface of the ball and socket (or knuckle) 1025*a*/2935*a*, 1025*b*/2935*b*. The first and second surfaces of the ball and socket (or knuckle) 1025*a*/2935*a*, 1025*b*/2935*b* may define an oblique angle with respect to one another. During a rotation between the mount and the ball and socket (or knuckle) 1025*a*/2935*a*, 1025*b*/2935*b*, contact between the mount attachment surface and the tray attachment surface may substantially prevent rotation between the tray and the ball and socket (or knuckle) 1025*a*/2935*a*, 1025*b*/2935*b*. During a rotation between the tray and the ball and socket (or knuckle) 1025*a*/2935*a*, 1025*b*/2935*b*, contact between the mount attachment surface and the tray attachment surface may substantially prevent rotation between the mount and the ball and socket (or knuckle) 1025*a*/2935*a*, 1025*b*/2935*b*.

Figure 30A:
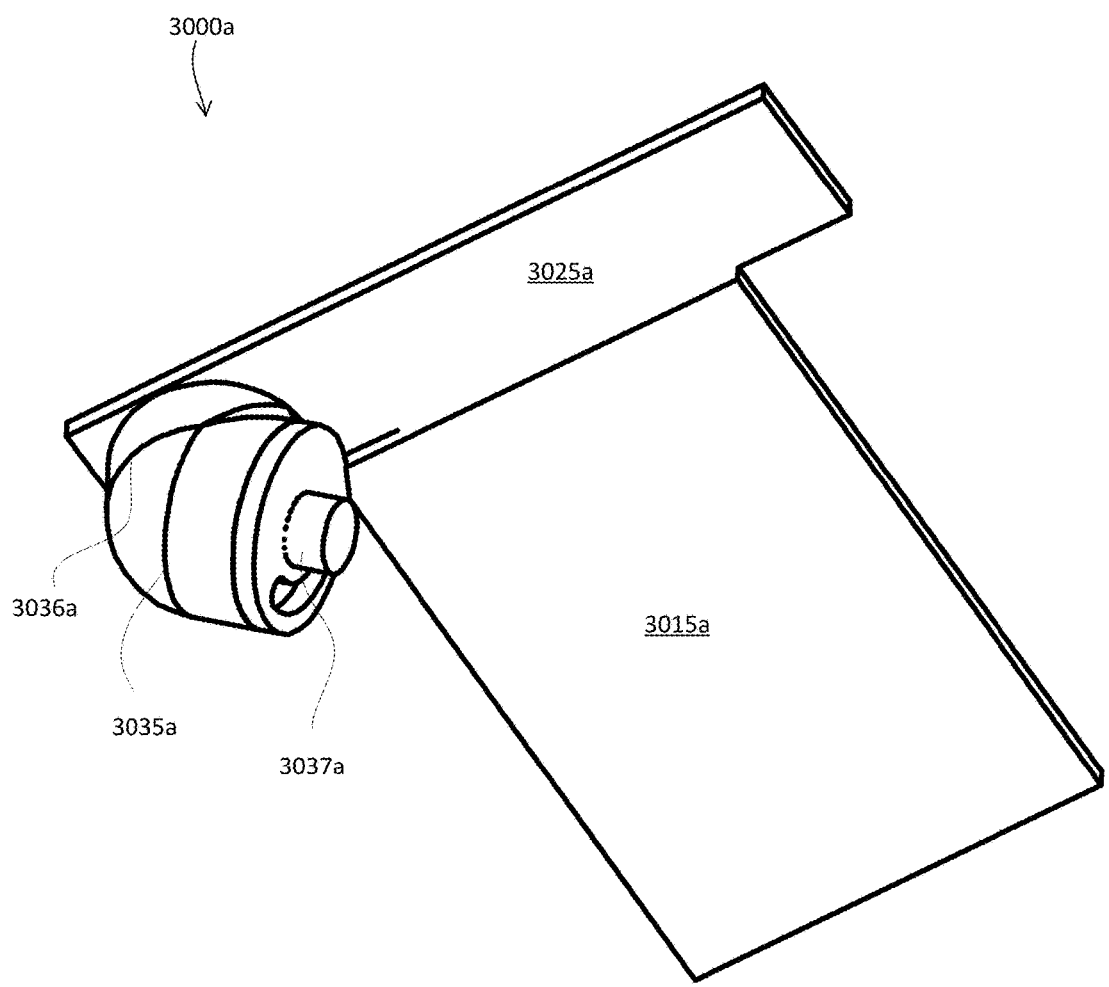
FIGS. 30A-30C depict various views and components of an example accessory tray assembly and related attachment components.
Figure 30B:
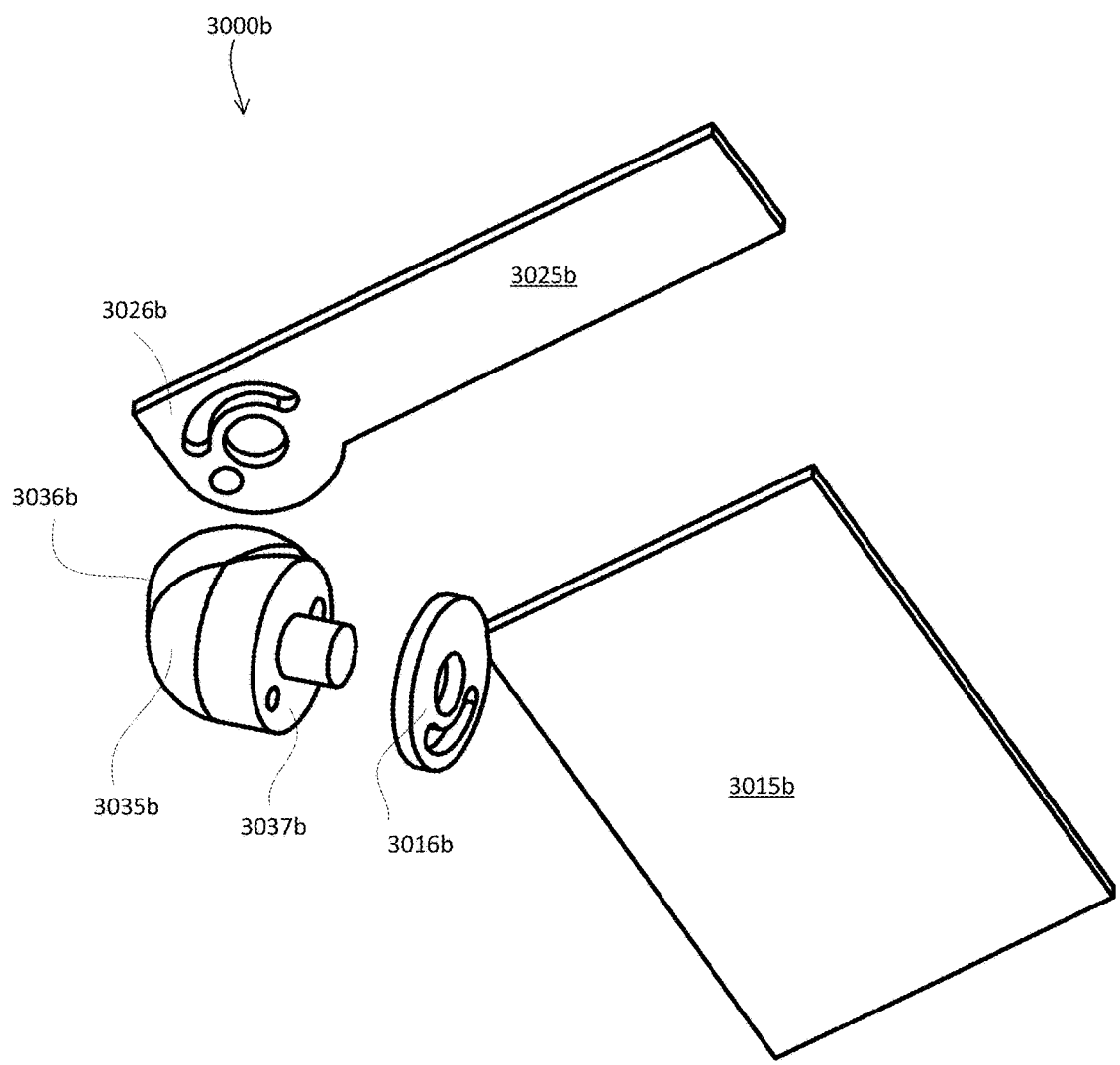
Figure 30C:
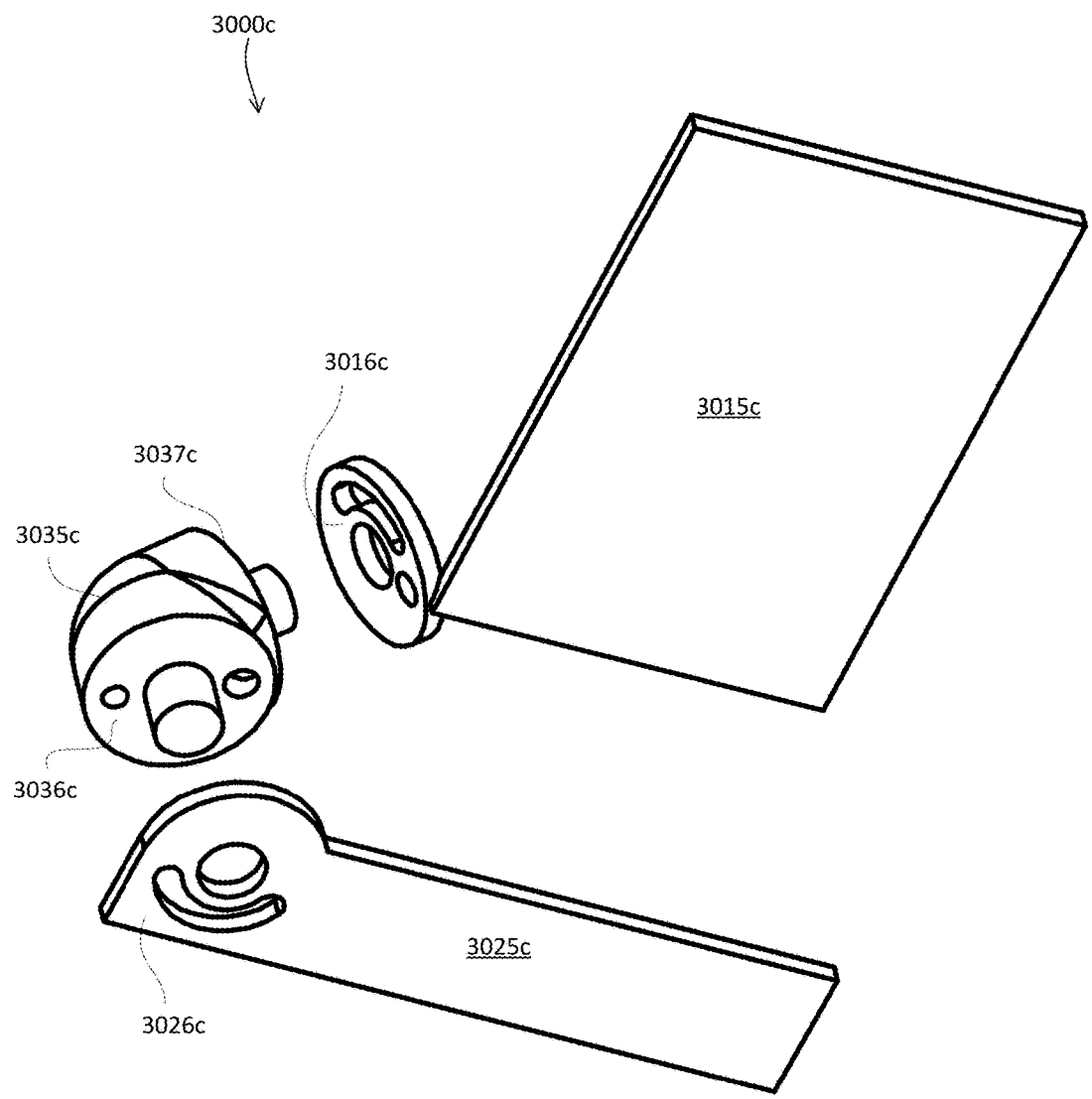

With reference to FIGS. 30A-30C, an accessory tray assembly 3000*a*, 3000*b*, 3000*c* and related attachment components may include a tray 3015*a*, 3015*b*, 3015*c* movable between a generally vertical stored position and a generally horizontal in-use position; and a swivel joint 3035*a*, 3035*b*, 3035*c* operable between the tray and a mount 3025*a*, 3025*b*, 3025*c*, the swivel joint having an elbow, a first plate 3036*a*, 3036*b*, 3036*c*, and a second plate 3037*a*, 3037*b*, 3037*c*. The first plate may be fixedly attached to a mount mating surface 3026*b*, 3026*c* of the mount 3025*a*, 3025*b*, 3025*c* and the second plate may be fixedly attached to a tray mating surface 3016*b*, 3016*c* of the tray. The first plate may include a generally planar attachment surface rotatably attached to a first surface of the elbow and a first tab at an oblique angle with respect to the attachment surface of the first plate. The second plate may include a generally planar attachment surface rotatably attached to a second surface of the elbow and a second tab at an oblique angle with respect to the attachment surface of the second plate. During a rotation between the first plate and the elbow, contact between the attachment surface of the first plate and the second tab may substantially prevent rotation between the second plate and the elbow. During a rotation between the second plate and the elbow, contact between the first tab and the attachment surface of the second plate may substantially prevent rotation between rotation between the first plate and the elbow.

An accessory tray assembly for attachment to a seat assembly having a frame and at least one arm rest supported by the frame, the arm rest having an outer edge defining an outer vertical plane and an inner edge defining an inner vertical plane. The accessory tray assembly may include a tray movable between a generally vertical stored position and a generally horizontal in-use position; a swivel joint disposed between and operably connecting the tray and the frame, the swivel joint having first and second generally planar surfaces defining an oblique angle with respect to one another, the swivel joint pivotably attached to the frame at the first surface which defines a first plane of rotation of the swivel joint with respect to the frame, and the swivel joint pivotably attached to the tray at the second surface which defines a second plane of rotation of the swivel joint with respect to the tray. The tray may be movable between the stored position and the in-use position by rotation between the swivel joint and the frame in the first plane of rotation and between the tray and the swivel joint in the second plane of rotation. In the stored position, the tray may be disposed under an arm rest and in a space defined between an outer vertical plane and an inner vertical plane. As the tray is moved between the stored position and the in-use position, the accessory tray assembly may be configured such that no part of the tray crosses the outer vertical plane. As the tray moves between the in-use position and the stored position, the tray may move into the space and under the arm rest without displacing the arm rest.

An accessory tray assembly for attachment to a seat assembly having a frame and at least one arm rest supported by the frame. The arm rest may include an outer edge defining an outer vertical plane and an inner edge defining an inner vertical plane. The accessory tray assembly may include a tray movable between a generally vertical stored position and a generally horizontal in-use position, a swivel joint disposed between and operably connecting the tray and the frame, the swivel joint may have first and second generally planar surfaces defining an oblique angle with respect to one another. The swivel joint may be pivotably attached to the frame at the first surface which defines a first plane of rotation of the swivel joint with respect to the frame, and the swivel joint may be pivotably attached to the tray at the second surface which defines a second plane of rotation of the swivel joint with respect to the tray. The tray may be movable between the stored position and the in-use position by rotation between the swivel joint and the frame in the first plane of rotation and between the tray and the swivel joint in the second plane of rotation. In the stored position, the tray may be disposed under the arm rest and in a space defined between the outer vertical plane and the inner vertical plane. As the tray is moved between the stored position and the in-use position, the accessory tray assembly may be configured such that no part of the tray crosses the outer vertical plane. The swivel joint may include a first plate and a second plate. During rotation about the first plane of rotation, contact between at least a portion of the first plate and at least a portion of the second plate may substantially prevent rotation about the second plane of rotation.

During rotation about the second plane of rotation, contact between at least a portion of the first plate and at least a portion of second plate may substantially prevent rotation about the first plane of rotation.

In the above the words "stop," "limit" and "prevent," when used in conjunction with movement of a component of an accessory tray assembly may be interpreted as being in association with a force below a threshold value that would not cause breakage of an associated accessory tray assembly when a force above the threshold is applied. This "breakaway" or "threshold" force may allow for a given accessory tray assembly to be forcibly moved out of an chair occupants path in case of, for example, an emergency exit. In such a circumstance, thereby, an associated accessory tray assembly may be relocated without causing damage to any related components. In other words, an accessory tray assembly movement may be stopped, limited or prevented in normal operation, however, the accessory tray assembly movement may occur by applying a force above a force threshold.

An accessory tray and/or an associated assembly may include seat identifiers, row identifiers, server call buttons, lights, display(s), power receptacles, power charging stations, advertisements, retaining features for food service items, retaining features for customer items, associated chair controls, tray position controls, or other features to enhance the patrons experience. For example, a portion of an accessory tray assembly may be illuminated when a chair occupants food order is ready to be picked-up or delivered; the illuminated portion may indicate to a food delivery person which chair to deliver to. Centrally located items may combine and/or collate features and functional devices. An associated tray may be detached and reattached to/from an associated tray base to allow further enhancements of features such as serving as transport device, for ease of cleaning, or enablement of other features.

An accessory tray assembly may include control features that coordinate chair operation with movement of, for example, an associated tray. For example, a service tray may be configured to fit within a fixed tray of an accessory tray assembly. When the service tray is placed within the fixed tray, associated controls of a powered recliner chair may become active. The chair may automatically recline when a chair occupant moves the tray toward an in-use position. The chair may automatically move to an upright position when the chair occupant moves the tray toward an out-of-use position. A tray may be coordinated with a particular chair and may be purchased by a patron at the time a movie ticket, event ticket, food, beverage, or the like is purchased.

While the drawings illustrate the item generally referred to as a lock dog, which attaches an accessory tray assembly by rotation of a component, alternate attachment methods may incorporate wedges or other locking methods. These features can be included in an accessory tray assembly without stops.

Figure 31A:
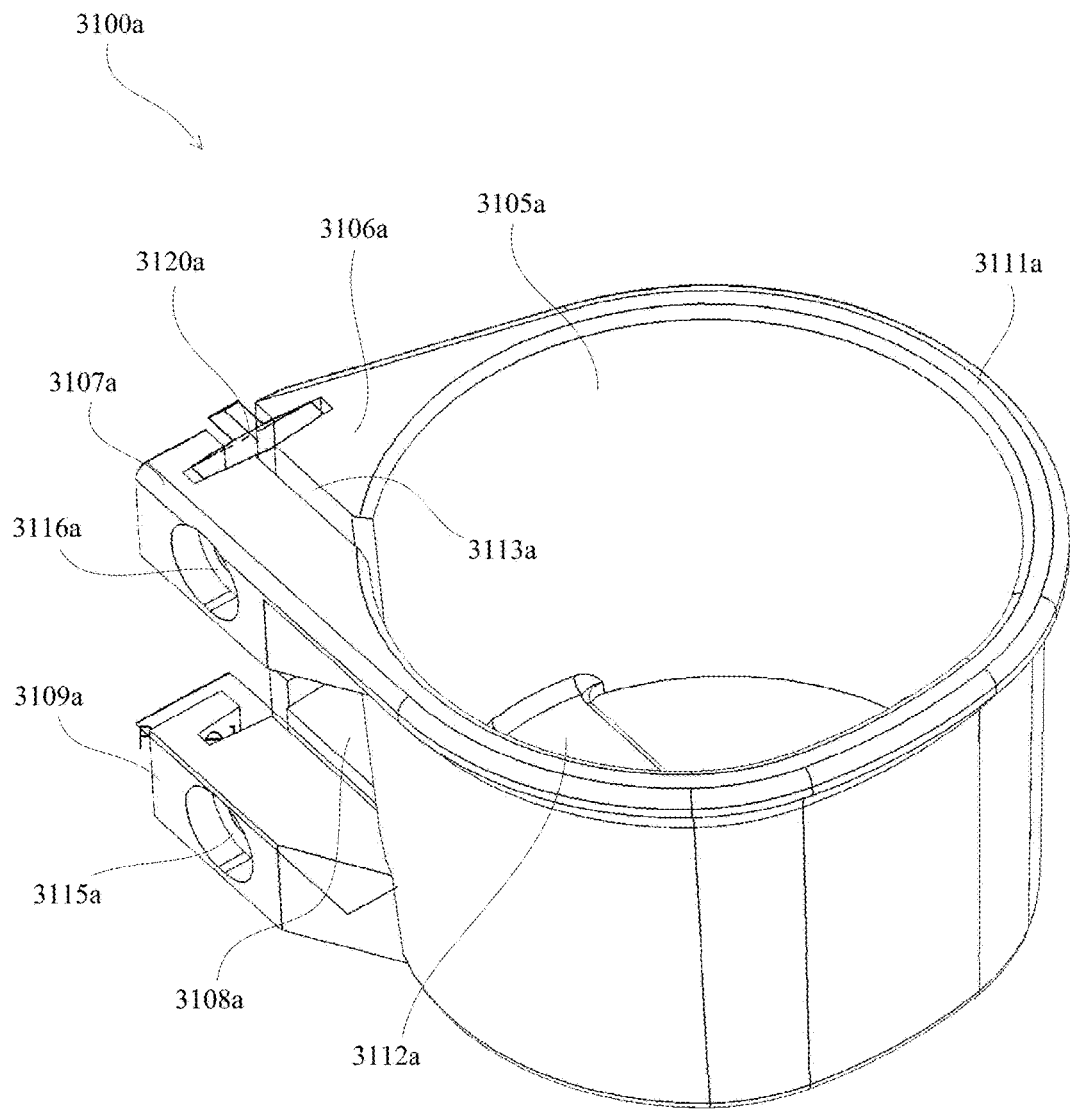
FIG. 31A depicts a front, top, perspective view of an example cup holder.

Turning to FIG. 31A, cup holder assembly 3100a may include a cup holder 3105a attached to a portion of a chair structure 3120a (e.g., a chair standard, a chair arm, a chair back support, a chair back, etc.). The cup holder 3105a may also include an upper stiffening lip 3111a and a cup support 3112a having, for example, a web configuration that may allow liquid to drain out of the cup holder 3105a. The cup holder 3105a may further include an attachment structure which may include a first fixed portion 3106a, a first flexible portion 3107a, a second fixed portion 3108a, and a second flexible portion 3109a defining a channel 3113a.

The cup holder 3105a may be attached to a chair structure 3120a by, for example, first flexing the first flexible portion 3107a away from the first fixed portion 3106a and/or flexing the second flexible portion 3109a away from the second fixed portion 3108a, thereby, widening the channel 3113a. Subsequent to flexing the first flexible portion 3107a away from the first fixed portion 3106a and/or flexing the second flexible portion 3109a away from the second fixed portion 3108a, the chair structure 3120a may be received within the cup holder attachment structure. Subsequent to the chair structure 3120a being received within the cup holder attachment structure, a first fastener 3115a and/or a second fastener may draw the first flexible portion 3107a toward the first fixed portion 3106a and/or drawing the second flexible portion 3109a toward the second fixed portion 3108a, thereby, clamping the cup holder attachment structure onto the chair structure 3120a. The cup holder 3105a may be removed from the chair structure 3120a by reversing the above sequence.

Figure 31B:
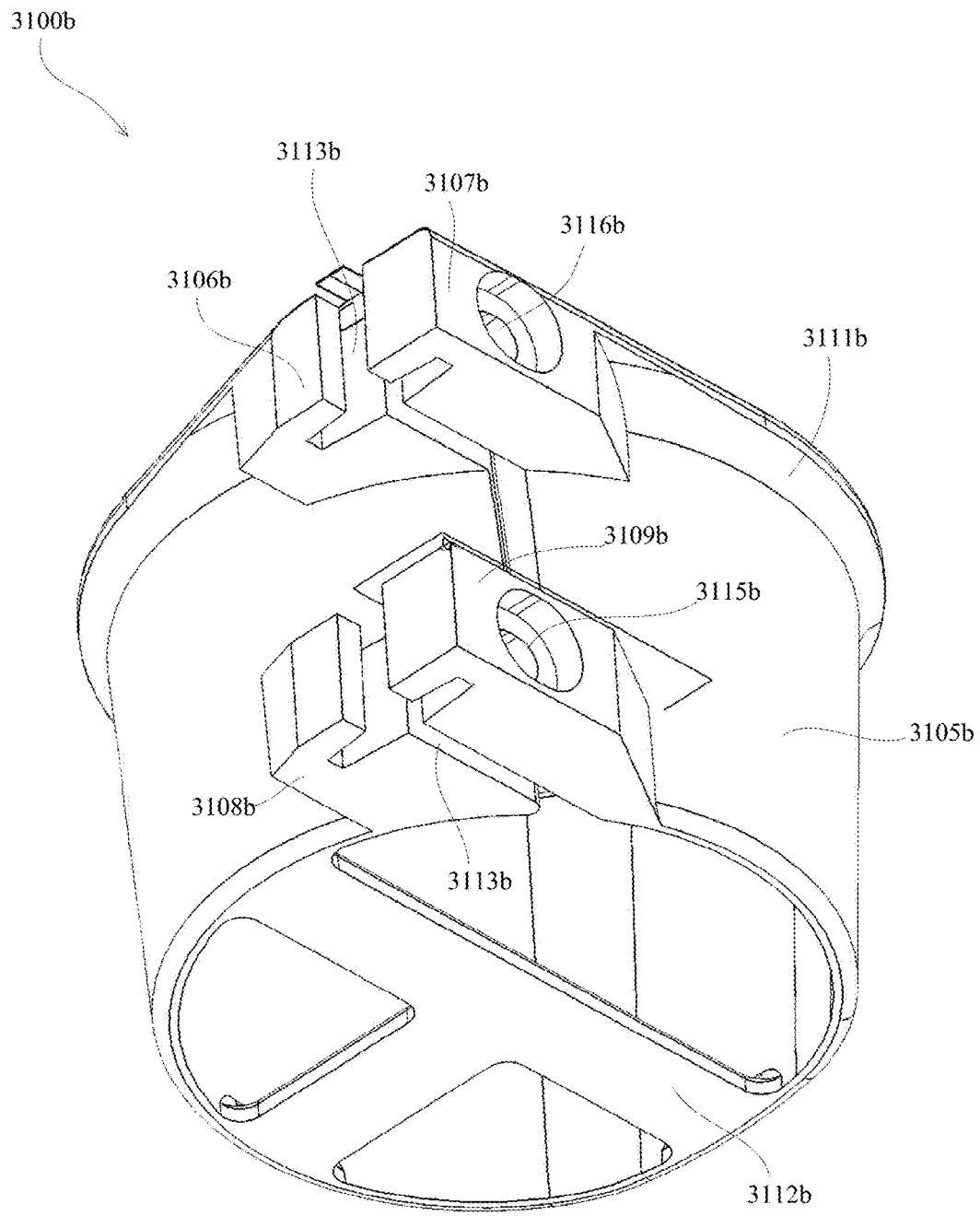
FIG. 31B depicts a bottom, rear, perspective view of an example cup holder.

With reference to FIG. 31B, cup holder assembly 3100b may include a cup holder 3105b attached to a portion of a chair structure (not shown in FIG. 31B). The cup holder 3105b may also include an upper stiffening lip 3111b and a cup support 3112a having, for example, a web configuration that may allow liquid to drain out of the cup holder 3105b. The cup holder 3105b may further include an attachment structure which may include a first fixed portion 3106b, a first flexible portion 3107b, a second fixed portion 3108b, and a second flexible portion 3109b defining a channel 3113b.

Figure 31C:
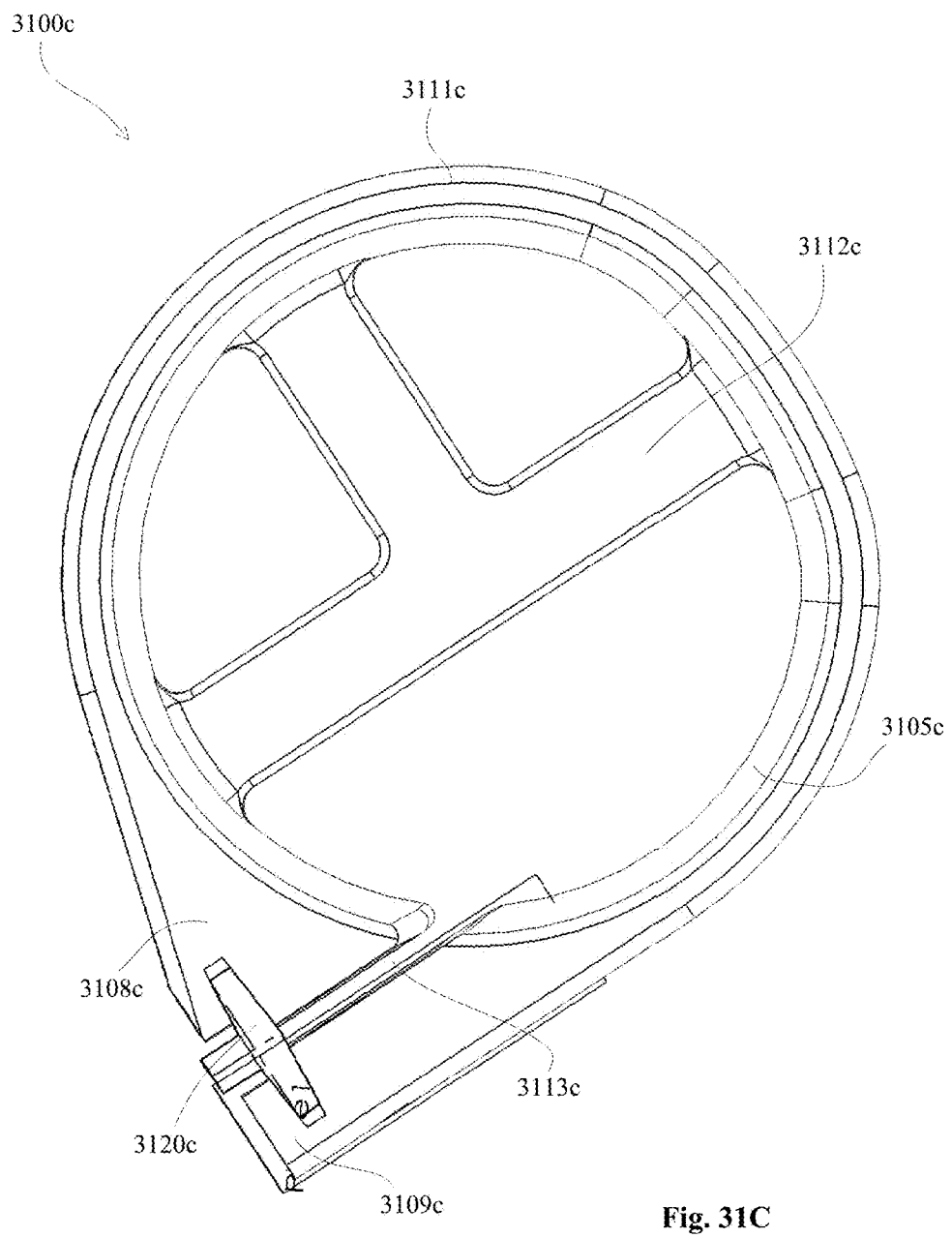
FIG. 31C depicts a top plan view of an example cup holder.

Turning to FIG. 31C, cup holder assembly 3100c may include a cup holder 3105c attached to a portion of a chair structure 3120c (e.g., a chair standard, a chair arm, a chair back support, a chair back, etc.). The cup holder 3105c may also include an upper stiffening lip 3111c and a cup support 3112c having, for example, a web configuration that may allow liquid to drain out of the cup holder 3105c. The cup holder 3105c may further include an attachment structure which may include a first fixed portion 3108c and a first flexible portion 3109c defining a channel 3113c.

Figure 31D:
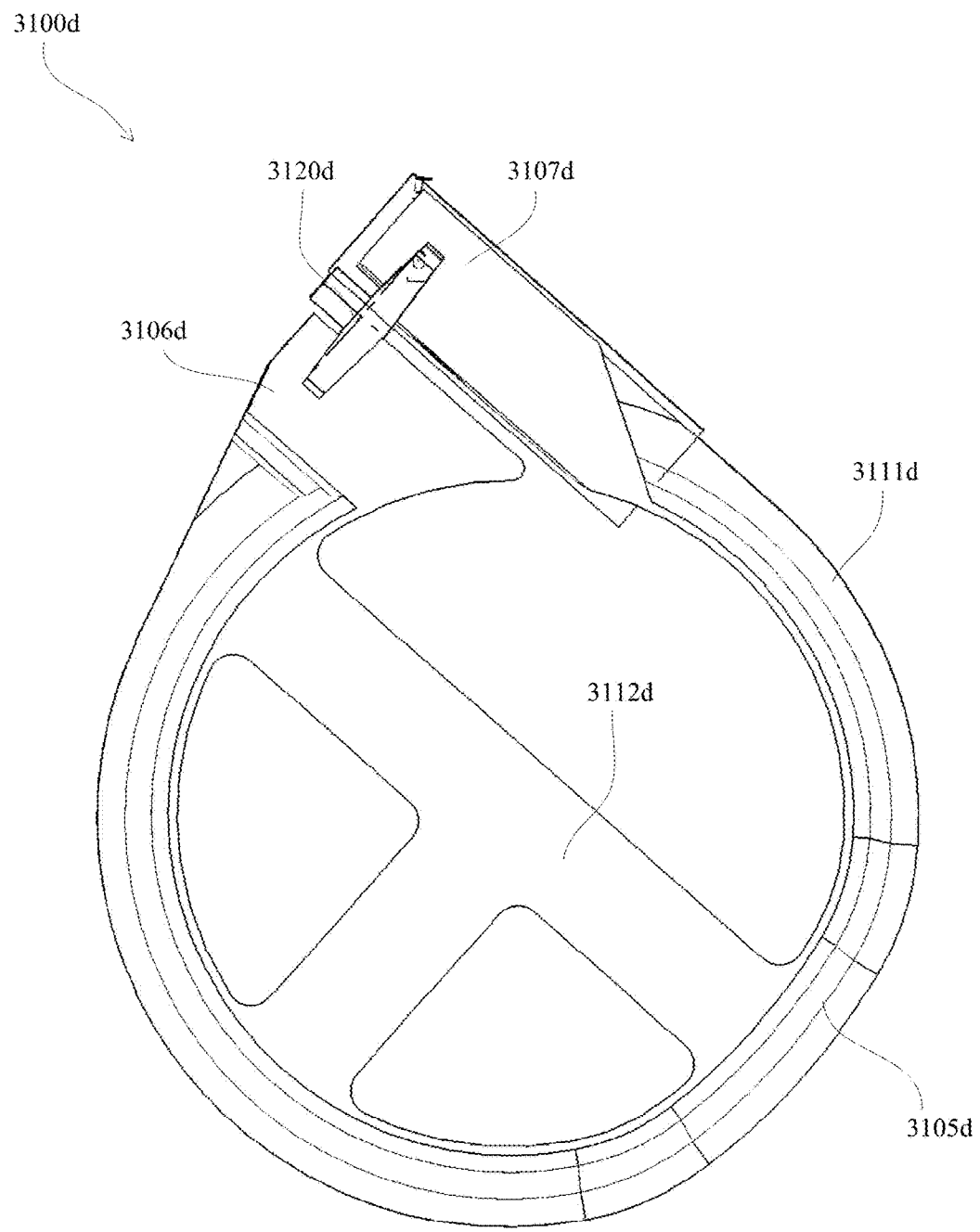
FIG. 31D depicts a bottom plan view of an example cup holder.

With reference to FIG. 31D, cup holder assembly 3100d may include a cup holder 3105d attached to a portion of a chair structure 3120d (e.g., a chair standard, a chair arm, a chair back support, a chair back, etc.). The cup holder 3105d may also include an upper stiffening lip 3111d and a cup support 3112d having, for example, a web configuration that may allow liquid to drain out of the cup holder 3105d. The cup holder 3105d may further include an attachment structure which may include a first fixed portion 3106d and a first flexible portion 3107d defining a channel 3113d.

Figure 32A:
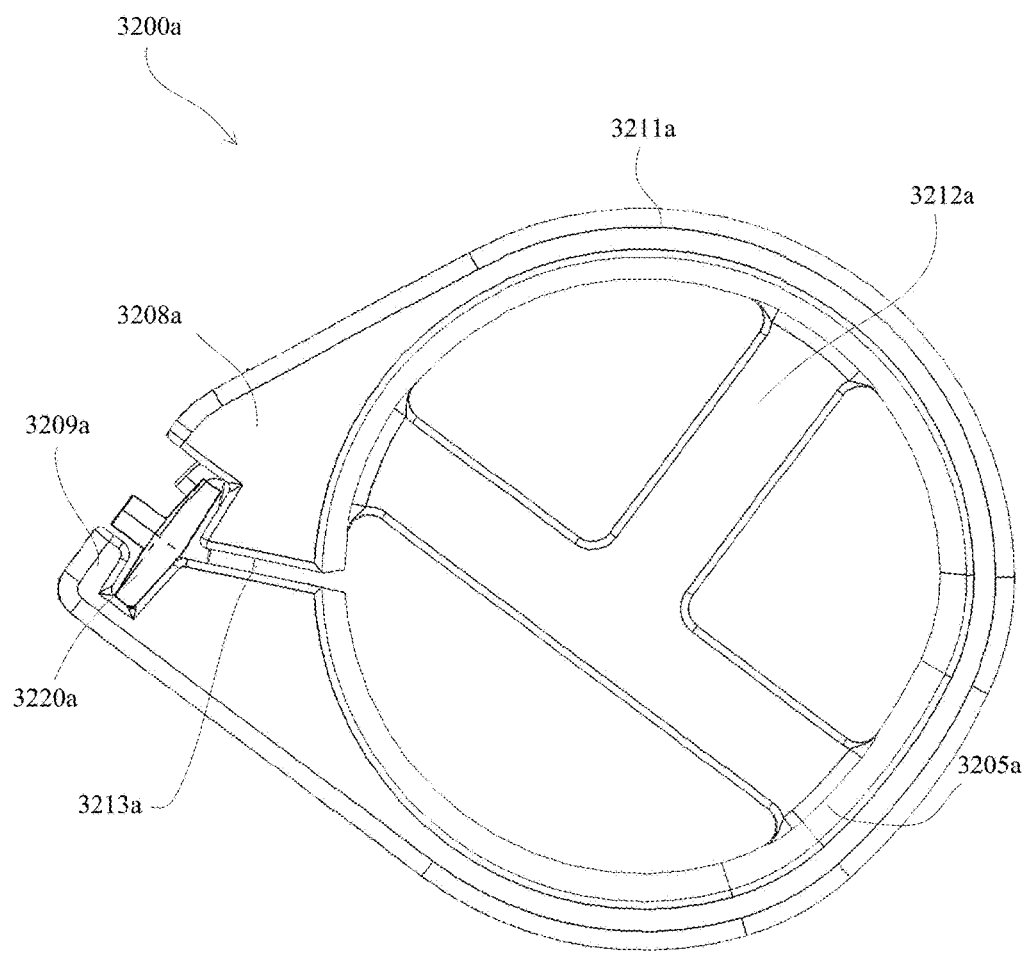
FIG. 32A depicts a front, top, perspective view of an example cup holder.

With reference to FIG. 32A, cup holder assembly 3200a may include a cup holder 3205a attached to a portion of a chair structure 3220a (e.g., a chair standard, a chair arm, a chair back support, a chair back, etc.). The cup holder 3205a may also include an upper stiffening lip 3211a and a cup support 3212a having, for example, a web configuration that may allow liquid to drain out of the cup holder 3205a. The cup holder 3205a may further include an attachment structure which may include a fixed portion 3206a, and a clamp 3207a defining a channel 3213a.

The cup holder 3205a may be attached to a chair structure 3220a by, for example, first moving the clamp 3207a away from the fixed portion 3206a, thereby, widening the channel 3213a. Subsequent to moving the clamp 3207a away from the fixed portion 3206a, the chair structure 3220a may be received within the cup holder attachment structure. Subsequent to the chair structure 3220a being received within the cup holder attachment structure, a first fastener 3215a and/or a second fastener 3216a may draw the clamp 3207a toward the fixed portion 3206a, thereby, clamping the cup holder attachment structure onto the chair structure 3220a. The cup holder 3205a may be removed from the chair structure 3220a by reversing the above sequence.

Figure 32B:
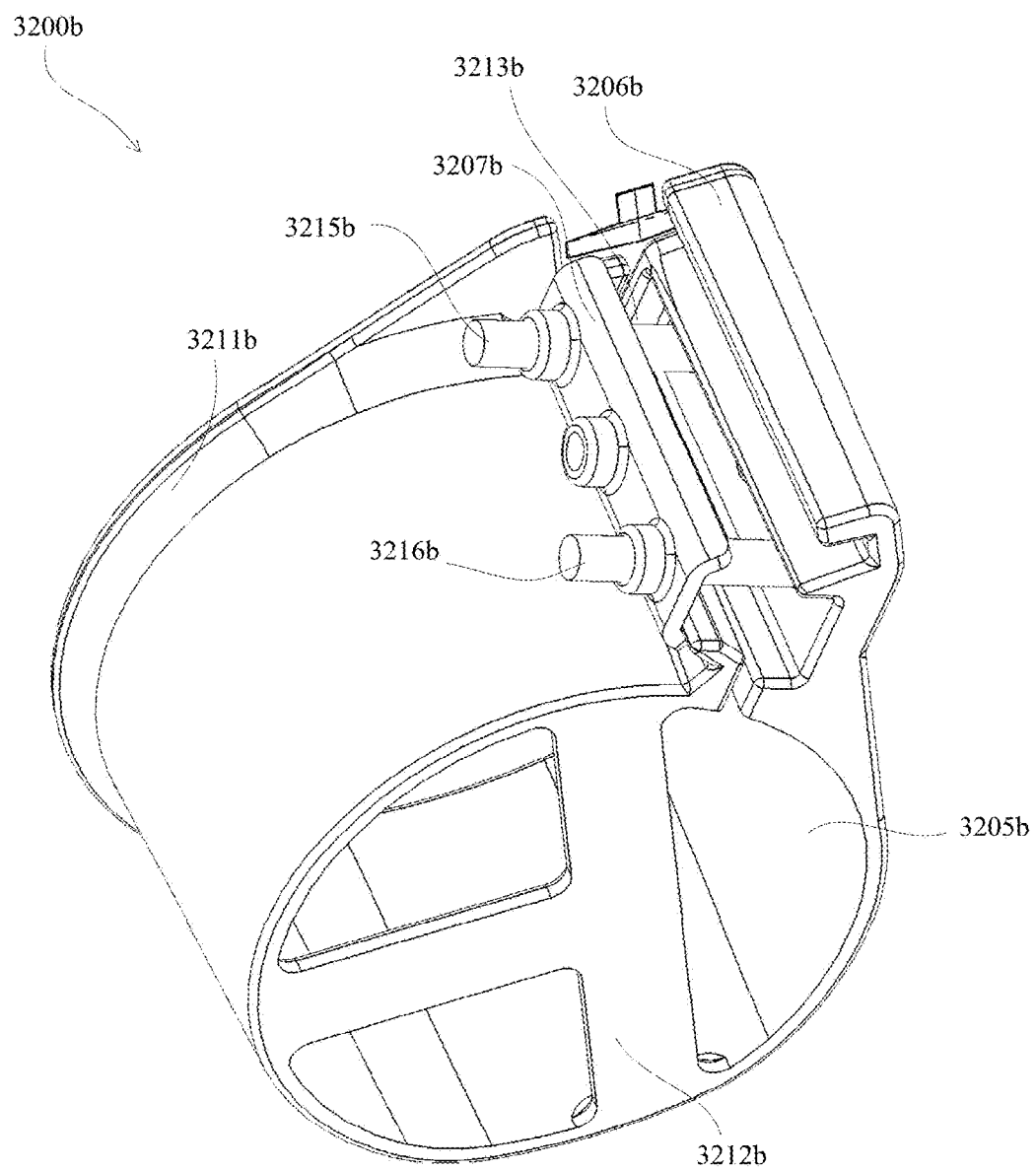
FIG. 32B depicts a bottom, rear, perspective view of an example cup holder.

Turning to FIG. 32B, cup holder assembly 3200b may include a cup holder 3205b attached to a portion of a chair structure (not shown in FIG. 32B). The cup holder 3205b may also include an upper stiffening lip 3211b and a cup support 3212a having, for example, a web configuration that may allow liquid to drain out of the cup holder 3205b. The cup holder 3205b may further include an attachment structure which may include a fixed portion 3206b and a clamp 3207b defining a channel 3213b.

Figure 32C:
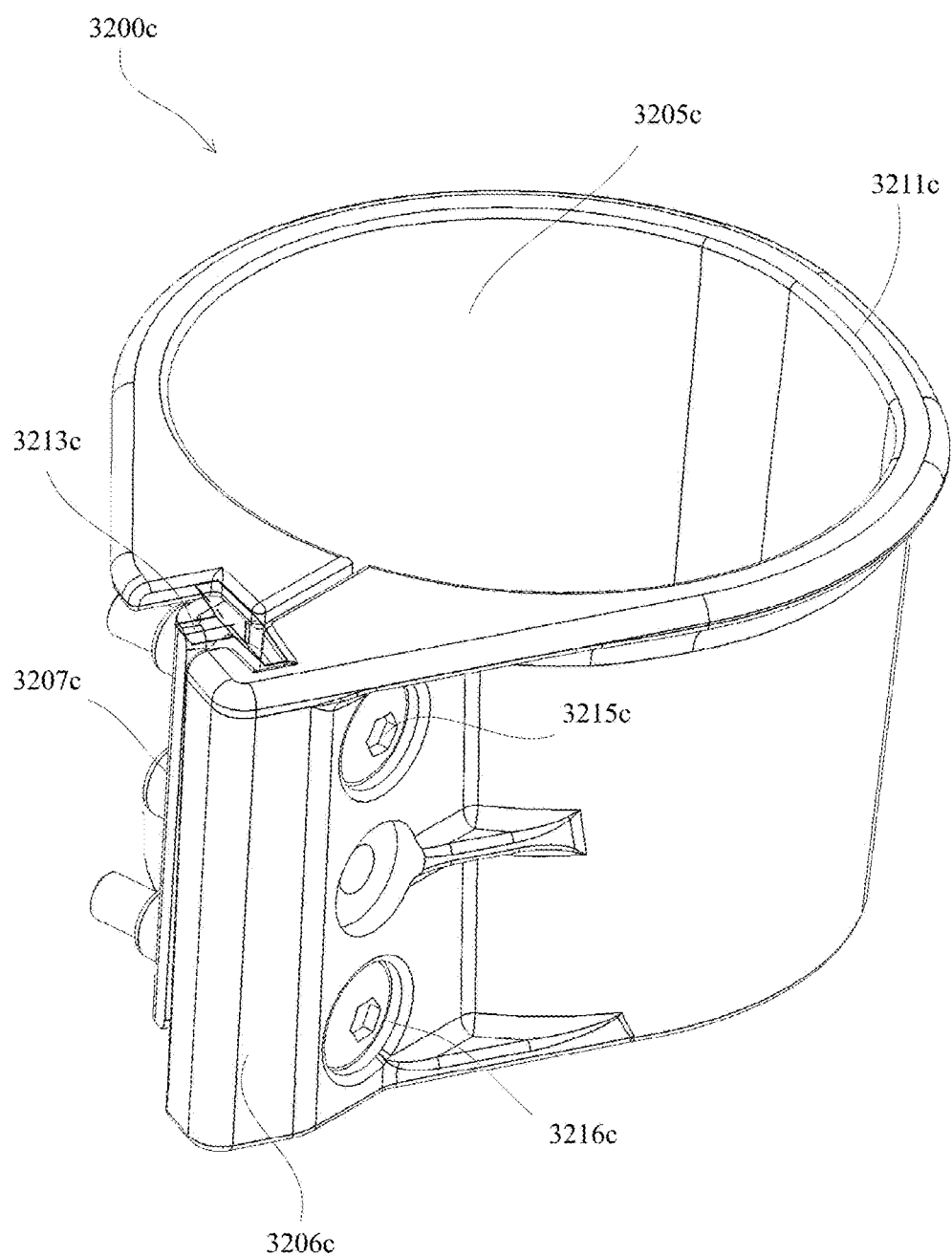
FIG. 32C depicts a top plan view of an example cup holder.

With reference to FIG. 32C, cup holder assembly 3200c may include a cup holder 3205c attached to a portion of a chair structure 3220c (e.g., a chair standard, a chair arm, a chair back support, a chair back, etc.). The cup holder 3205c may also include an upper stiffening lip 3211c and a cup support 3212c having, for example, a web configuration that may allow liquid to drain out of the cup holder 3205c. The cup holder 3205c may further include an attachment structure which may include a fixed portion 3206c and a clamp 3207c defining a channel 3213c.

Figure 32D:
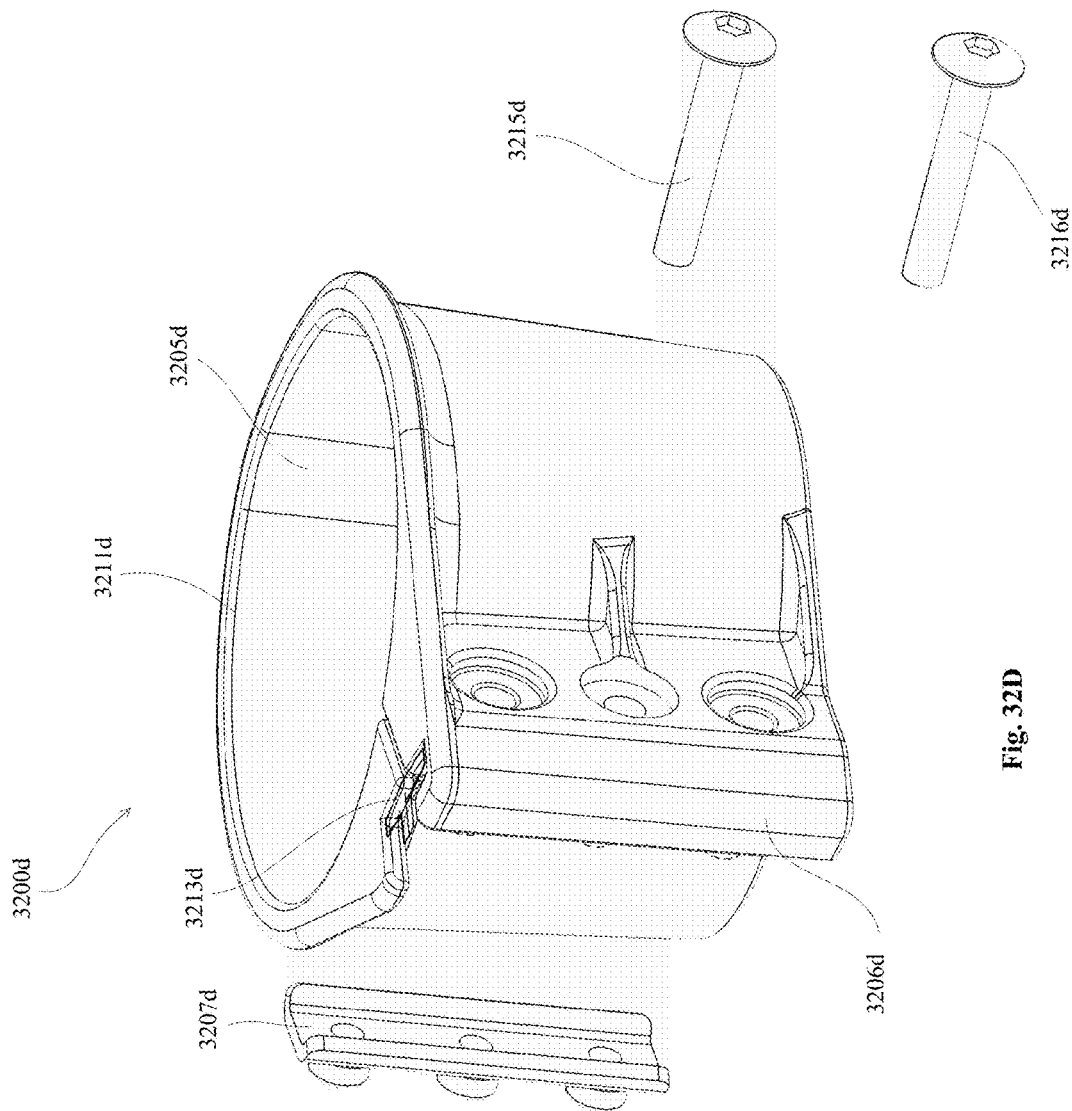
FIG. 32D depicts a bottom plan view of an example cup holder.

Turning to FIG. 32D, cup holder assembly 3200d may include a cup holder 3205d attached to a portion of a chair structure 3220d (e.g., a chair standard, a chair arm, a chair back support, a chair back, etc.). The cup holder 3205d may also include an upper stiffening lip 3211d and a cup support 3212d having, for example, a web configuration that may allow liquid to drain out of the cup holder 3205d. The cup holder 3205d may further include an attachment structure which may include a fixed portion 3206d and a clamp 3207d defining a channel 3213d.

Figure 33A:
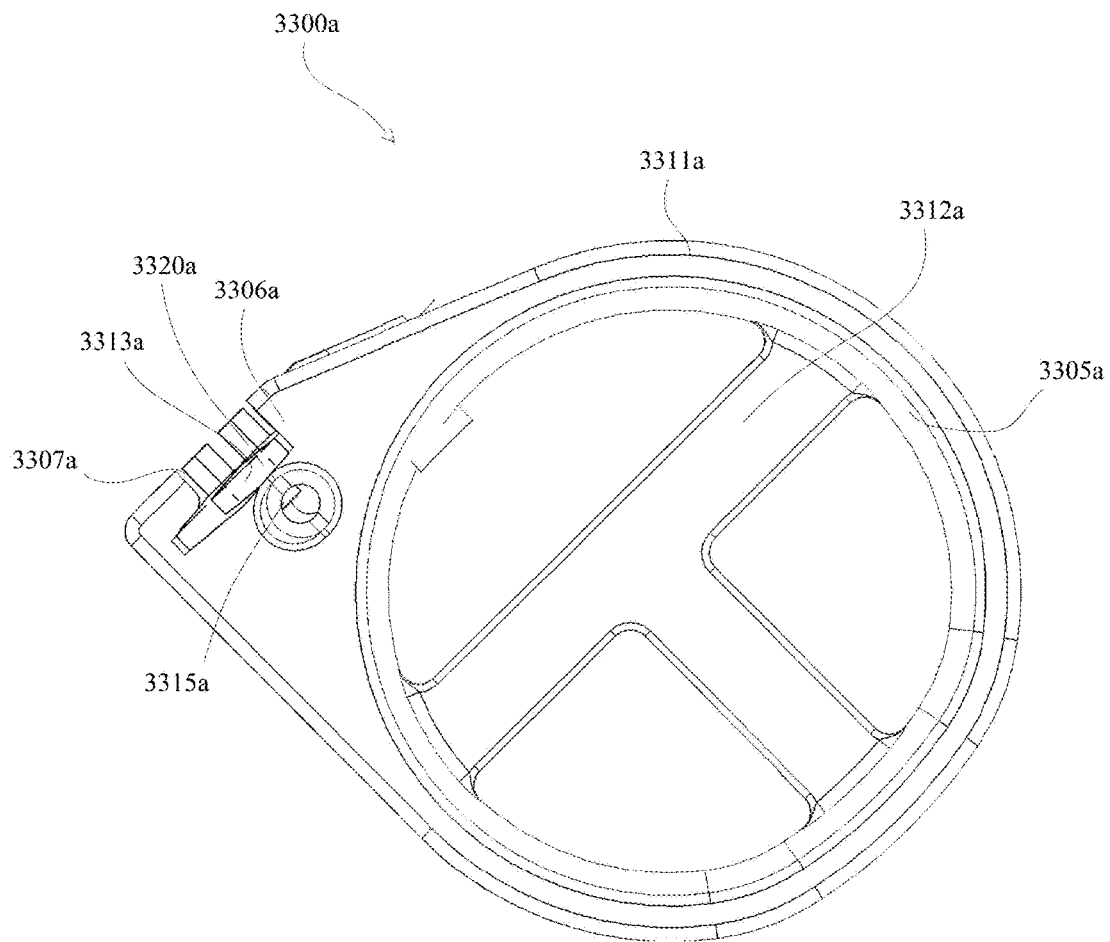
FIG. 33A depicts a front, top, perspective view of an example cup holder.

With reference to FIG. 33A, cup holder assembly 3300a may include a cup holder 3305a attached to a portion of a chair structure 3320a (e.g., a chair standard, a chair arm, a chair back support, a chair back, etc.). The cup holder 3305a may also include an upper stiffening lip 3311a and a cup support 3312a having, for example, a web configuration that may allow liquid to drain out of the cup holder 3305a. The cup holder 3305a may further include an attachment structure which may include a fixed portion 3306a, and a wedge 3307a defining a channel 3313a.

The cup holder 3305a may be attached to a chair structure 3320a by, for example, first moving the wedge 3307a away from the fixed portion 3306a, thereby, widening the channel 3313a. Subsequent to moving the wedge 3307a away from the fixed portion 3306a, the chair structure 3320a may be received within the cup holder attachment structure. Subsequent to the chair structure 3320a being received within the cup holder attachment structure, a first fastener 3315a may draw the wedge 3307a toward the fixed portion 3306a, thereby, clamping the cup holder attachment structure onto the chair structure 3320a. The cup holder 3305a may be removed from the chair structure 3320a by reversing the above sequence.

Figure 33B:
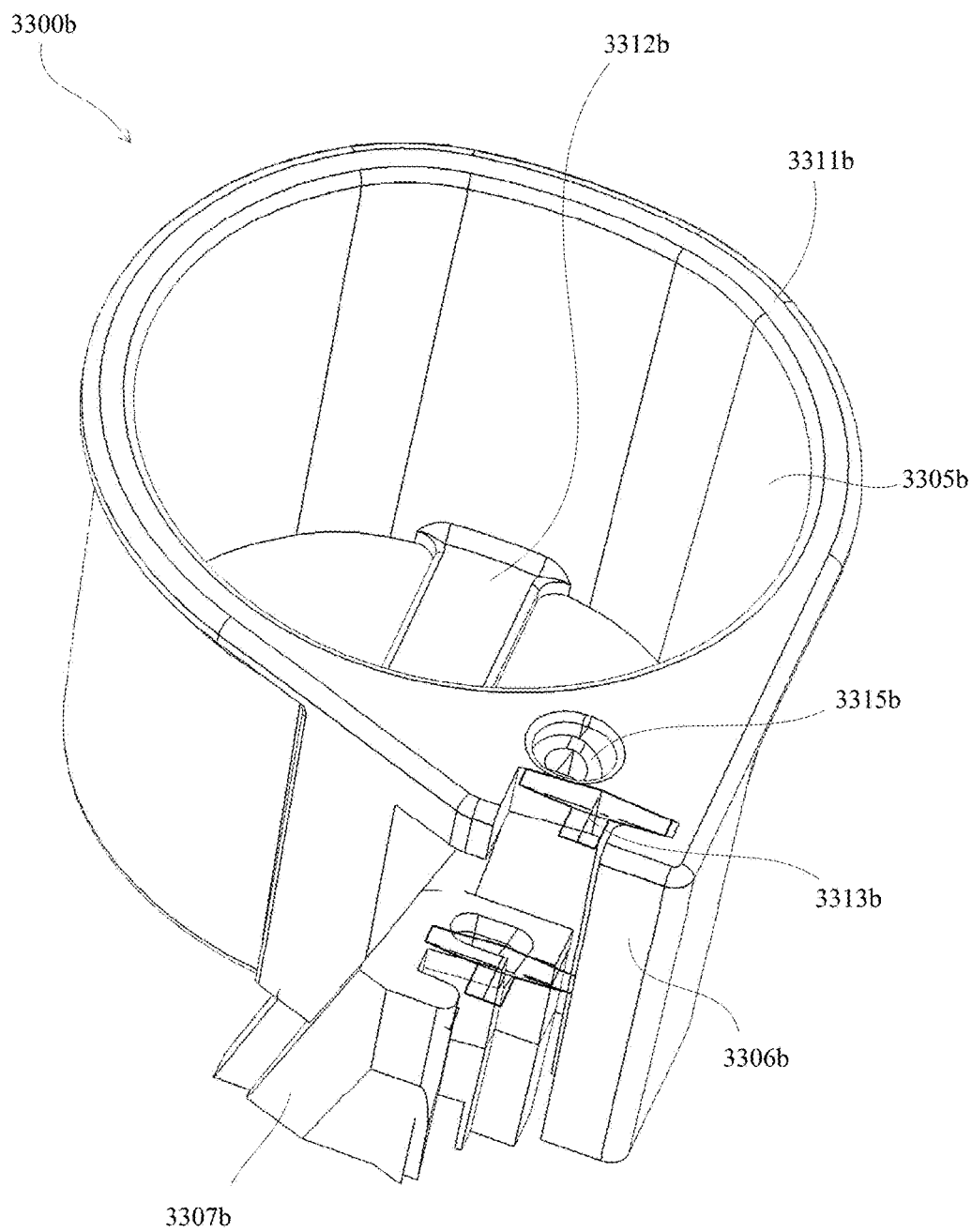
FIG. 33B depicts a bottom, rear, perspective view of an example cup holder.

Turning to FIG. 33B, cup holder assembly 3300b may include a cup holder 3305b attached to a portion of a chair structure (not shown in FIG. 33B). The cup holder 3305b may also include an upper stiffening lip 3311b and a cup support 3312a having, for example, a web configuration that may allow liquid to drain out of the cup holder 3305b. The cup holder 3305b may further include an attachment structure which may include a fixed portion 3306b and a wedge 3307b defining a channel 3313b.

Figure 33C:
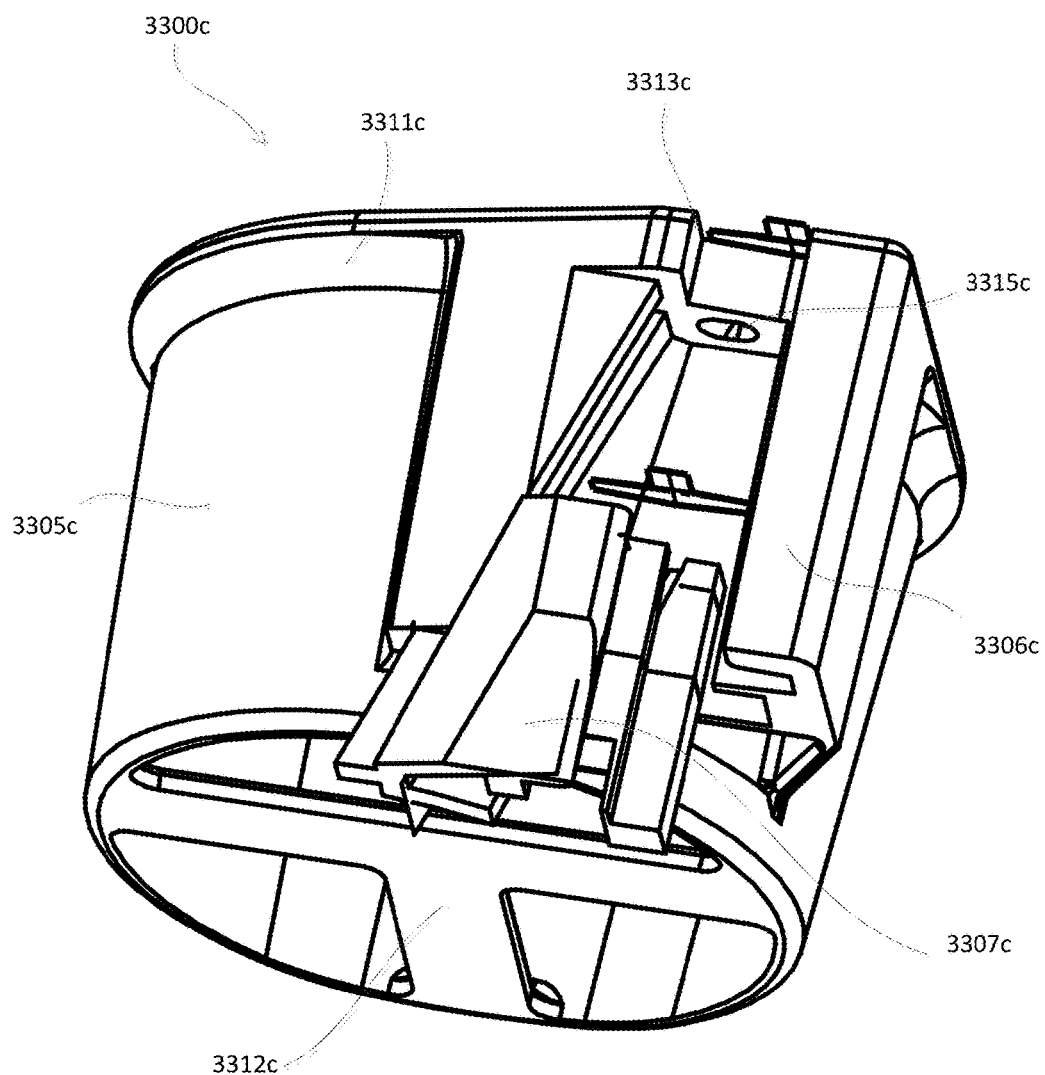
FIG. 33C depicts a top plan view of an example cup holder.

With reference to FIG. 33C, cup holder assembly 3300c may include a cup holder 3305c attached to a portion of a chair structure 3320c (e.g., a chair standard, a chair arm, a chair back support, a chair back, etc.). The cup holder 3305c may also include an upper stiffening lip 3311c and a cup support 3312c having, for example, a web configuration that may allow liquid to drain out of the cup holder 3305c. The cup holder 3305c may further include an attachment structure which may include a fixed portion 3306c and a wedge 3307c defining a channel 3313c.

Figure 33D:
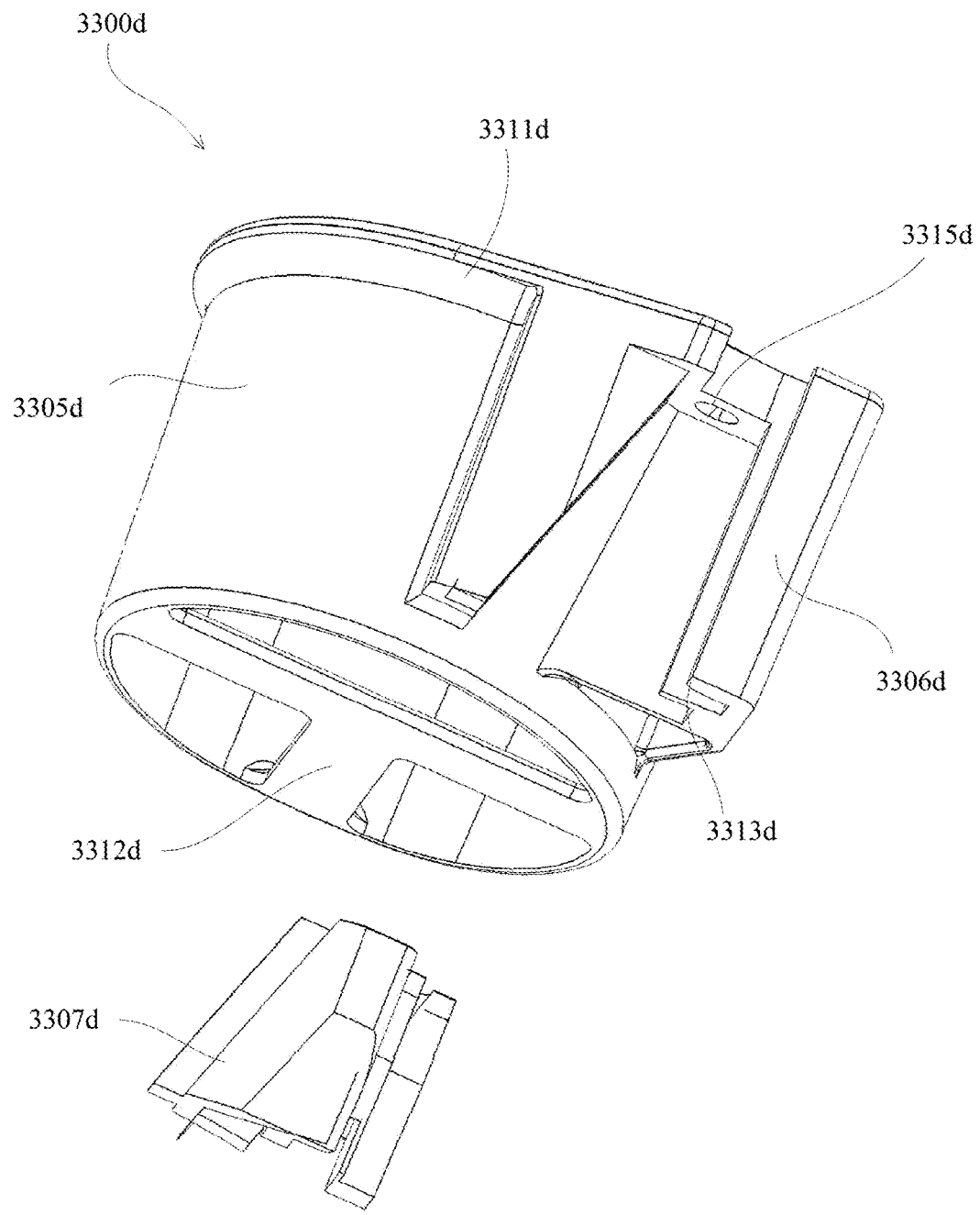
FIG. 33D depicts a bottom plan view of an example cup holder.

Turning to FIG. 33D, cup holder assembly 3300d may include a cup holder 3305d attached to a portion of a chair structure 3320d (e.g., a chair standard, a chair arm, a chair back support, a chair back, etc.). The cup holder 3305d may also include an upper stiffening lip 3311d and a cup support 3312d having, for example, a web configuration that may allow liquid to drain out of the cup holder 3305d. The cup holder 3305d may further include an attachment structure which may include a fixed portion 3306d and a wedge 3307d defining a channel 3313d.

Figure 34A:
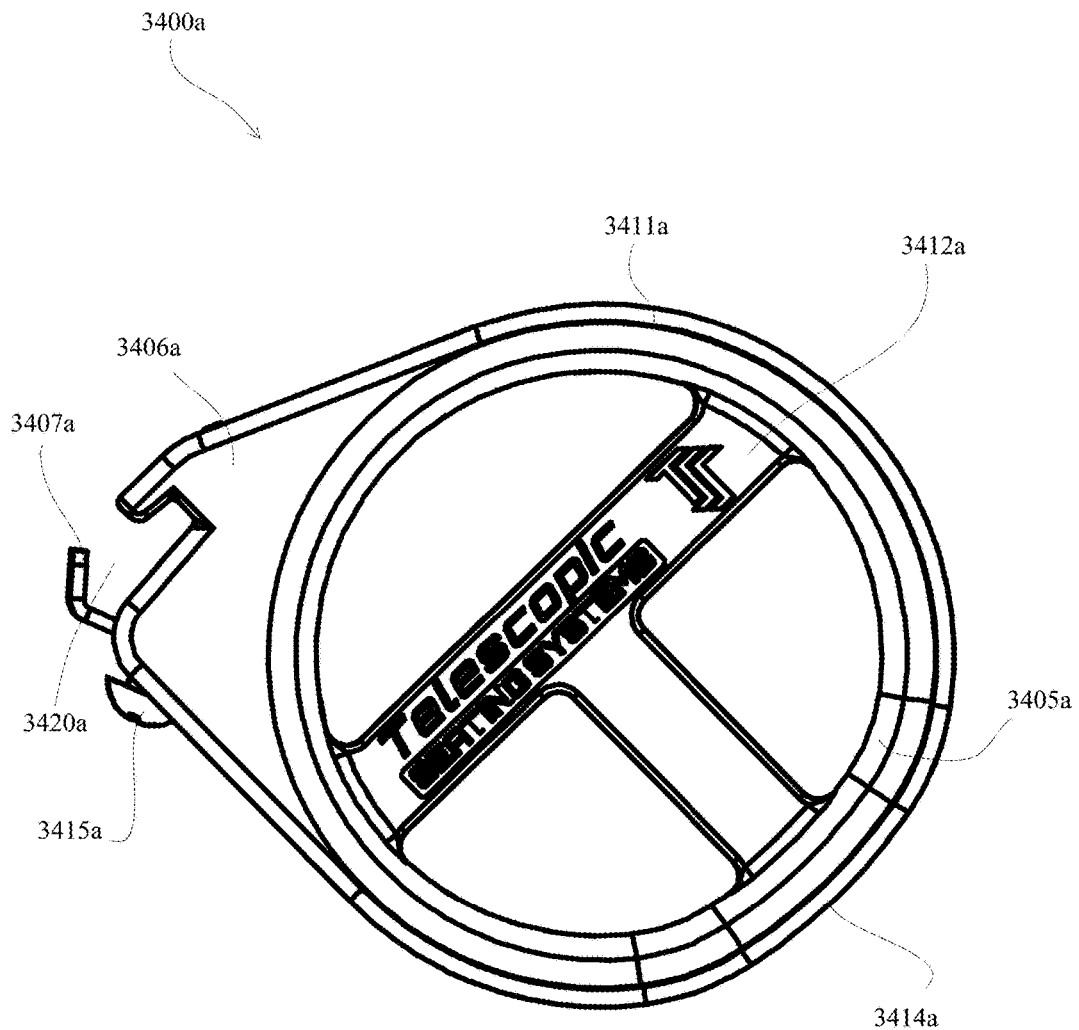
FIG. 34A depicts a front, top, perspective view of an example cup holder.

With reference to FIG. 34A, cup holder assembly 3400a may include a cup holder 3405a attached to a portion of a chair structure 3420a (e.g., a chair standard, a chair arm, a chair back support, a chair back, etc.). The cup holder 3405a may also include an upper stiffening lip 3411a and a cup support 3412a having, for example, a web configuration that may allow liquid to drain out of the cup holder 3405a. The cup holder 3405a may further include an attachment structure which may include a fixed portion 3406a, and a clamp 3407a defining a channel 3420a. The cup holder 3405a may include a slightly flattened portion 3414a opposite the channel 3420a. The flattened portion 3414a may be configured to align with a vertically orientated plane defined by a rearward most portion of an associated chair back or front. Thereby, the cup holder 3405a will not extend into an associated walkway behind the associated chair.

The cup holder 3405a may be attached to a chair structure 3420a by, for example, first moving the clamp 3407a away from the fixed portion 3406a, thereby, widening the channel 3413a. Subsequent to moving the clamp 3407a away from the fixed portion 3406a, the chair structure 3420a may be received within the cup holder attachment structure. Subsequent to the chair structure 3420a being received within the cup holder attachment structure, a first fastener 3415a and/or a second fastener 3416a may draw the clamp 3407a toward the fixed portion 3406a, thereby, clamping the cup holder attachment structure onto the chair structure 3420a. The cup holder 3405a may be removed from the chair structure 3420a by reversing the above sequence.

Figure 34B:
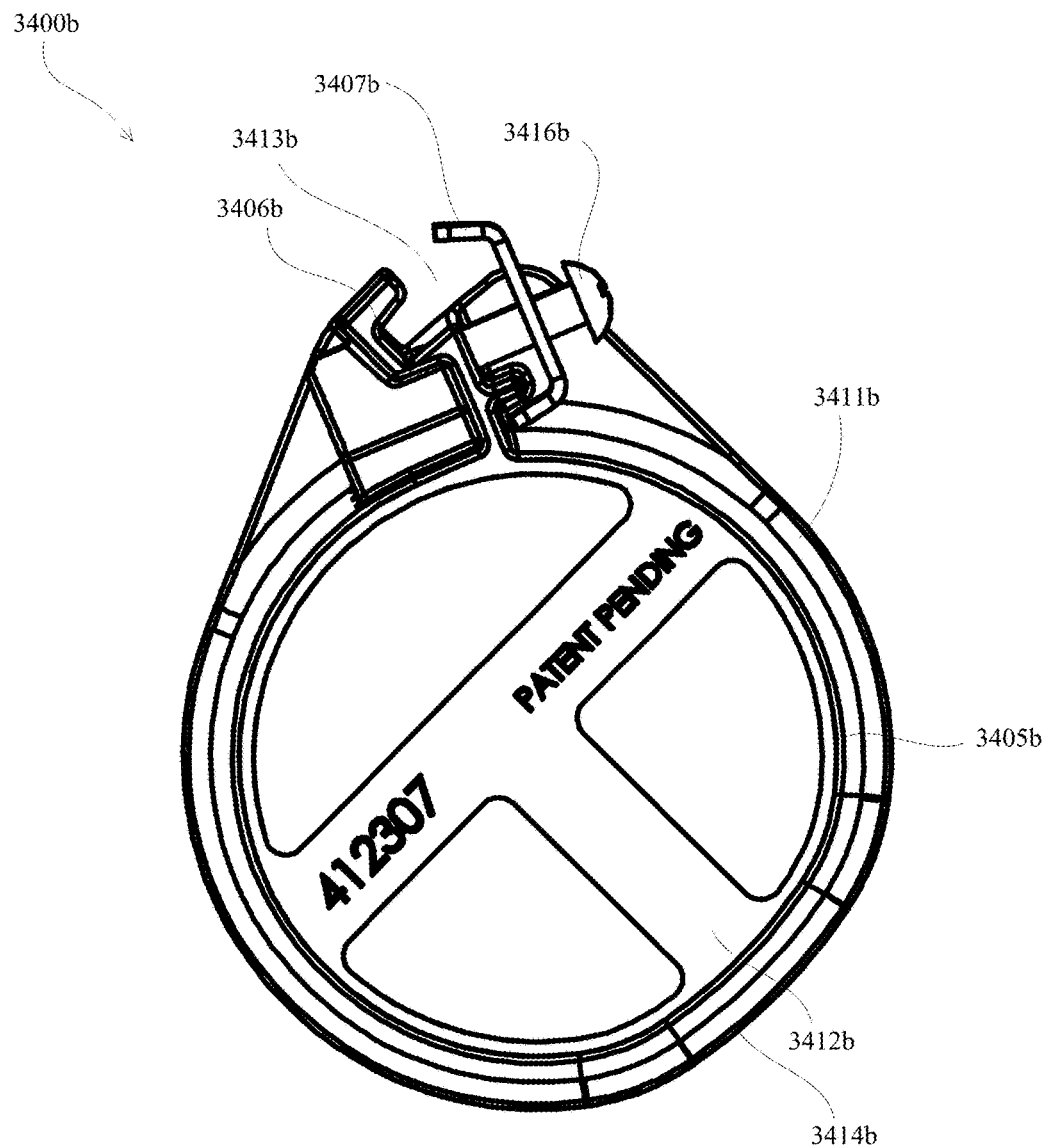
FIG. 34B depicts a bottom, rear, perspective view of an example cup holder.

Turning to FIG. 34B, cup holder assembly 3400b may include a cup holder 3405b attached to a portion of a chair structure (not shown in FIG. 34B). The cup holder 3405b may also include an upper stiffening lip 3411b and a cup support 3412a having, for example, a web configuration that may allow liquid to drain out of the cup holder 3405b. The cup holder 3405b may further include an attachment structure which may include a fixed portion 3406b and a clamp 3407b defining a channel 3413b. The cup holder 3405b may include a slightly flattened portion 3414b opposite the channel 3420b. The flattened portion 3414b may be configured to align with a vertically orientated plane defined by a rearward most portion of an associated chair back or front. Thereby, the cup holder 3405b will not extend into an associated walkway behind the associated chair.

Figure 34C:
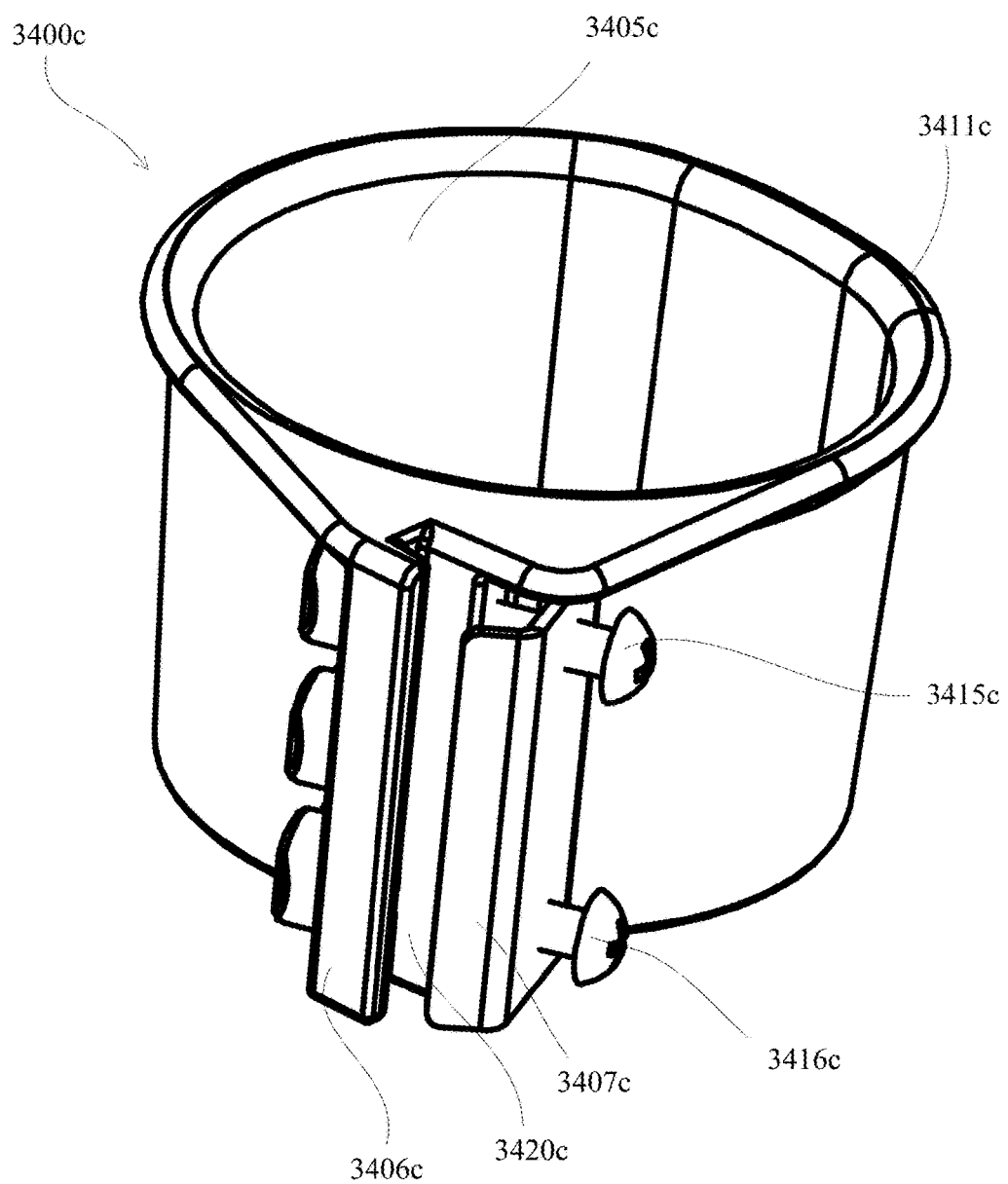
FIG. 34C depicts a top plan view of an example cup holder.

With reference to FIG. 34C, cup holder assembly 3400c may include a cup holder 3405c attached to a portion of a chair structure 3420c (e.g., a chair standard, a chair arm, a chair back support, a chair back, etc.). The cup holder 3405c may also include an upper stiffening lip 3411c and a cup support 3412c having, for example, a web configuration that may allow liquid to drain out of the cup holder 3405c. The cup holder 3405c may further include an attachment structure which may include a fixed portion 3406c and a clamp 3407c defining a channel 3413c.

Figure 34D:
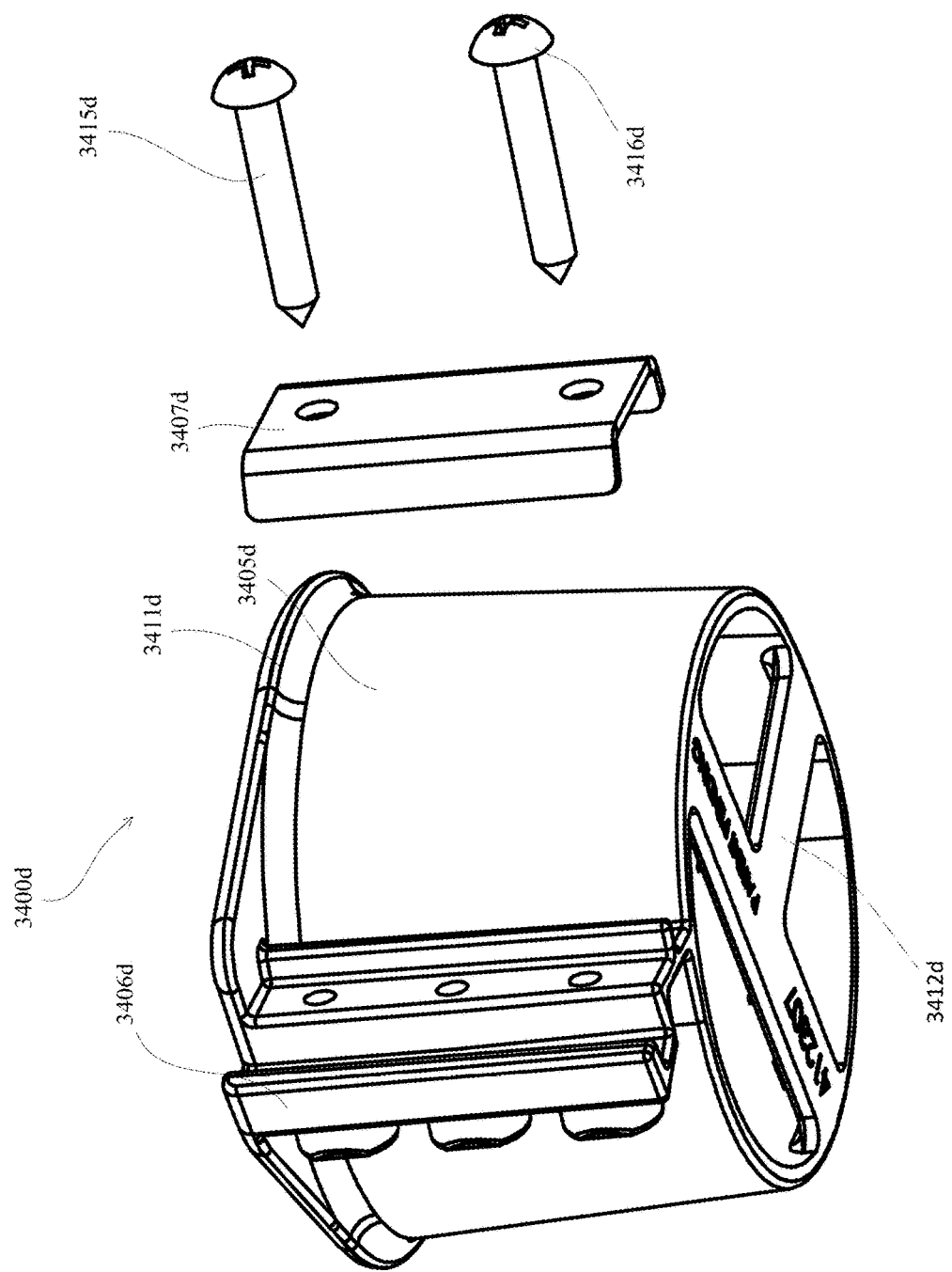
FIG. 34D depicts a bottom plan view of an example cup holder.

Turning to FIG. 34D, cup holder assembly 3400d may include a cup holder 3405d attached to a portion of a chair structure 3420d (e.g., a chair standard, a chair arm, a chair back support, a chair back, etc.). The cup holder 3405d may also include an upper stiffening lip 3411d and a cup support 3412d having, for example, a web configuration that may allow liquid to drain out of the cup holder 3405d. The cup holder 3405d may further include an attachment structure which may include a fixed portion 3406d and a clamp 3407d defining a channel 3413d.

Figure 35:
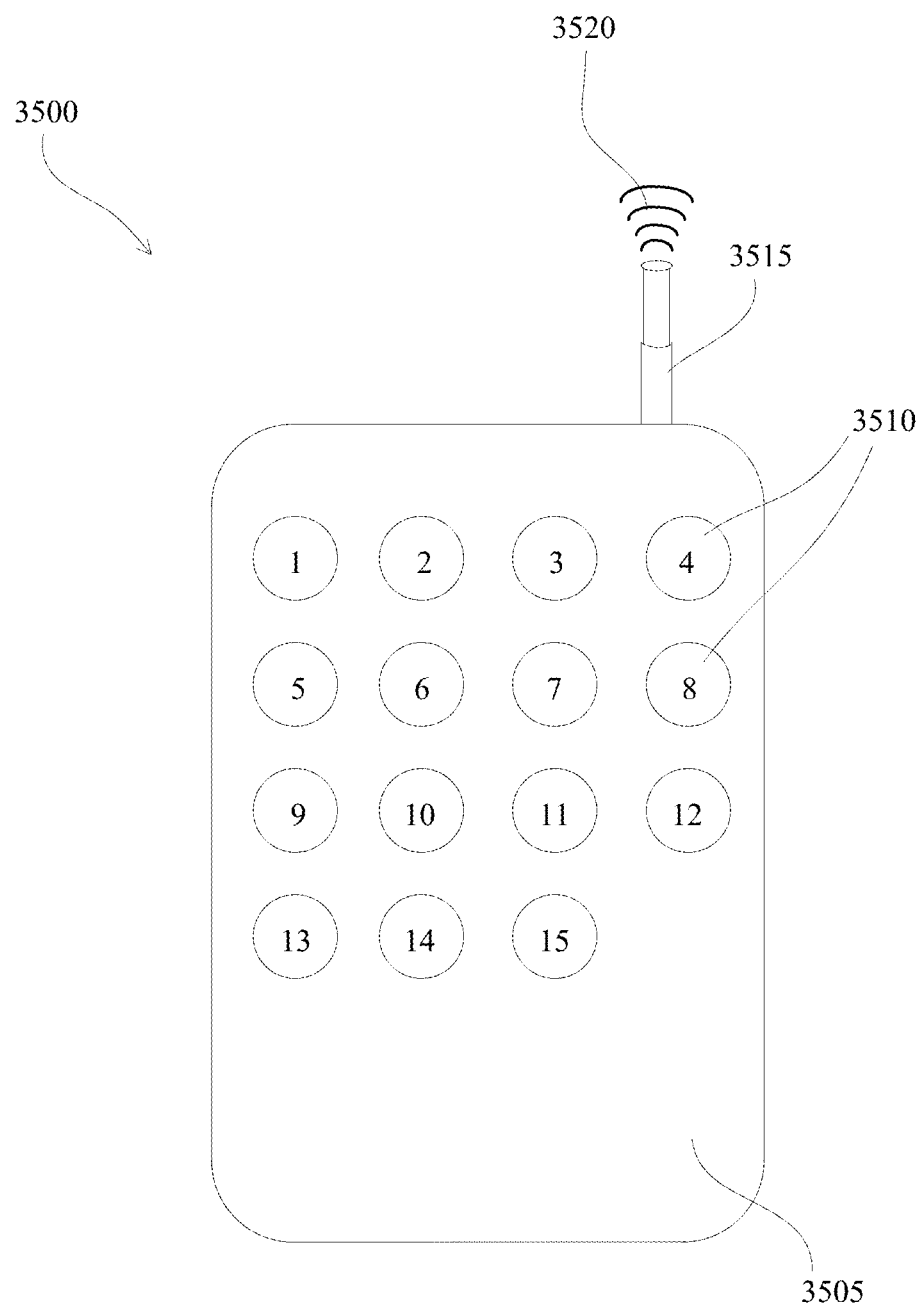
FIG. 35 depicts an example wireless chair controller.

With reference to FIG. 35, a remote chair controller 3500 may include a plurality of buttons 3510 proximate a housing cover 3505. The remote chair controller 3500 may further include an antenna 3515 to provide a wireless communication link 3520. The remote chair controller 3500 may be configured to control a powered recliner chair as, for example, any of the powered recliner chairs disclosed in commonly assigned patent applications: Ser. 62/143,079, entitled POWERED CHAIRS FOR PUBLIC VENUES, ASSEMBLIES FOR USE IN POWERED CHAIRS, AND COMPONENTS FOR USE IN ASSEMBLIES FOR USE IN POWERED CHAIRS, as filed on Apr. 4, 2015; Ser. 62/149,596, entitled POWERED CHAIRS FOR PUBLIC VENUES, ASSEMBLIES FOR USE IN POWERED CHAIRS, AND COMPONENTS FOR USE IN ASSEMBLIES FOR USE IN POWERED CHAIRS, as filed on Apr. 19, 2015; Ser. 62/159,791, entitled POWERED CHAIRS FOR PUBLIC VENUES, ASSEMBLIES FOR USE IN POWERED CHAIRS, AND COMPONENTS FOR USE IN ASSEMBLIES FOR USE IN POWERED CHAIRS, as filed on May 11, 2015; Ser. 62/159,791, entitled POWERED CHAIRS FOR PUBLIC VENUES, ASSEMBLIES FOR USE IN POWERED CHAIRS, AND COMPONENTS FOR USE IN ASSEMBLIES FOR USE IN POWERED CHAIRS, as filed on May 11, 2015; Ser. 62/175,210, entitled POWERED CHAIRS FOR PUBLIC VENUES, ASSEMBLIES FOR USE IN POWERED CHAIRS, AND COMPONENTS FOR USE IN ASSEMBLIES FOR USE IN POWERED CHAIRS, as filed on Jun. 12, 2015; and No. PCT/US16/25803, entitled POWERED CHAIRS FOR PUBLIC VENUES, ASSEMBLIES FOR USE IN POWERED CHAIRS, AND COMPONENTS FOR USE IN ASSEMBLIES FOR USE IN POWERED CHAIRS, as filed on Apr. 3, 2016, the disclosures of which are incorporated herein in their entireties by reference.

In particular, a remote chair controller 3500 may communicate with a chair controller (e.g., controller 800 of FIG. 8 of PCT/US16/25803), a local chair control (e.g., local control 270 of FIG. 2 of PCT/US16/25803), a chair control module (e.g., control module 1490e of FIG. 14E of PCT/US16/25803) to provide control of, for example, an individual chair (e.g., a chair 1200a of FIG. 12A of PCT/US16/25803) and/or a group of chairs (e.g., group of chairs 1300A of FIG. 13A of PCT/US16/25803).

As a particular example, each of the buttons 3510 may be associated with a given theater (e.g., theater 1, theater 2, etc.) within a group of theaters. Pressing button 1 for a predetermined period of time (e.g., three seconds, five seconds, etc.) may cause the remote chair controller 3500 to transmit an initiation signal to a chair control 800 to, for example, cause a subset of chairs (e.g., A or B) of a group of chairs 1300a within theater 1 to move to either an upright orientation, a partially reclined orientation, or a reclined orientation. This functionality may provide access to a theater maintenance person for cleaning at least a portion of an associated theater. The chair control 800 may include a first timer that causes the chair control 800 to store a chair control sequence status in memory and to exit the remote control mode after a first period of time (e.g., five minutes, ten minutes, fifteen minutes, etc.). The chair control 800 may include a second timer that causes the chair control 800 to exit the remote control mode and clear the chair control sequence status from memory after a second period of time (e.g., one-half hour, one hour, one and a half hours, etc.). Single button 300 initiation may be considered to, for example, represent an "easy" mode.

Chair control 800 may include at least one light (e.g., a light 1499h of FIG. 14H of PCT/US16/25803) that may, for example, provide feedback to an operator of the remote chair controller 3500 that the chair control 800 has received a control signal from the remote chair controller. Alternatively, or additionally, a light 1499h may indicate whether a chair 1200a, or a group of chairs 1300a, has been left within a control sequence (e.g., a theater cleaning mode).

A remote chair controller 3500 may include a display (e.g., a liquid crystal display, a LED display, a vacuum fluorescent display, an OLED display, etc.) and/or may be a smart device (e.g., a tablet computer, a cellular phone, etc.). Thereby, a remote chair controller 3500 may be provided to an individual along with, for example, a ticket purchase to provide chair control and/or information. For example, a remote chair controller 3500 may be configured as an information display for hearing impaired. A remote chair controller 3500 may include a microphone, a voice recognition unit, and may display words and/or words/characters indicative of emotions associated with a current event (e.g., a movie, a concert, a sporting event, a play, etc.).

A chair control 800 may be configured such that a local chair control 270 may override any control signal received from a remote chair controller 3500 (e.g., activation of a local chair control 270 may cause an associated chair to recline even though a remote chair control 3500 is sending, or has sent, a chair upright signal). A remote chair controller 3500 may be configured such that pressing a sequence of buttons 3510, or holding a particular button 3510 for a given time period, may initiate a pre-determined event. For example, pressing a sequence of buttons 3510 may initiate a semi-automatic chair response, may initiate only chairs denoted as A in FIG. 13A, may initiate only chairs denoted as B in FIG. 13A, may initiate control of an individual chair within an associated venue, and/or may allow a user to change an "easy" mode function.

Alternatively, or additionally, a remote chair controller 3500, a local chair control 270 and/or a master venue controller (e.g., master control 1305a of FIG. 13A of PCT/US16/25803) may be coordinated to provide particular functionality (e.g., turn on/off associated lighting, call for assistance, indicate a chair associated with a concession order, etc.). For example, a remote chair controller 3500 and/or a local chair control 270 may allow a chair occupant and/or a venue operations person to interact with other venue features (e.g., participate in current raffles, participate in trivia games, order concessions, order tickets to other events, call for a valet service, etc.). A remote chair controller 3500 and/or a local chair control 270 may be configured to send signals to a master control 1305a which may, in turn, transmit signals to a chair control 800.

Figure 36:
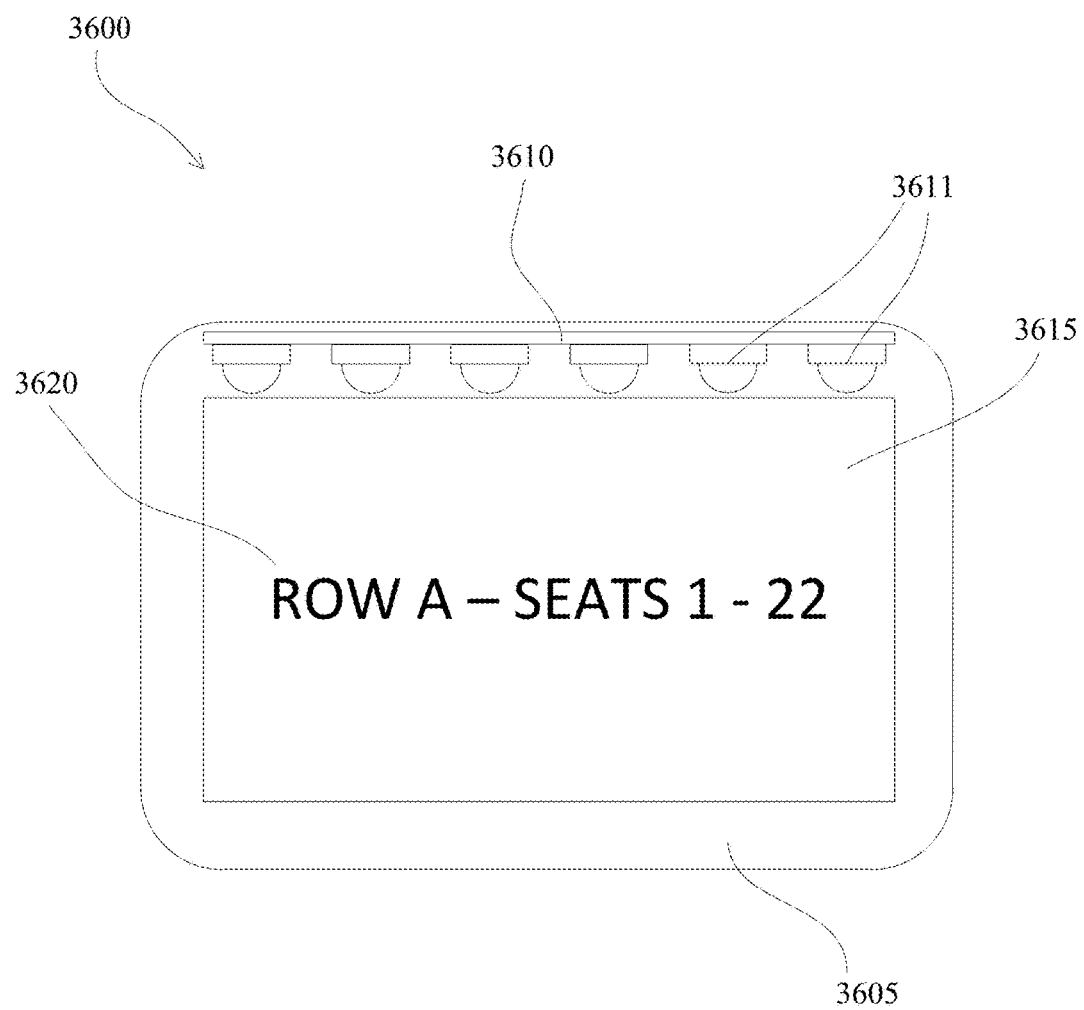
FIG. 36 depicts an example display.

Turning to FIG. 36, a display 3600 may include an electrical circuit board 3610 having a plurality of light emitting diodes (LEDs) 3611 and a display panel 3615 having a display 3620 incorporated within a display housing 3605. The display panel 3615 may be glass with the display 3620 etched on an associated surface of the glass. The LEDs 3611 may define an edge lighting assembly. At least a portion of the LEDs 3611 may be controlled similar to the light 3299a as described above. Alternatively, or additionally, at least a portion of the LEDs 3611 may remain on at least while ambient lighting within an associated venue is dim. As illustrated in FIG. 36, a display 3600 may define a row/seat identification tag to be installed on, for example, an end panel of a chair at an end of a given row of seats. A display 3600 may be installed on an associated chair without display panel or with a blank display panel 3615. In either event, a display panel 3615 may be incorporated into the display 3600 after the chair is installed within a venue. Thereby, the display may reflect any desired information.

The display 3600 may include a liquid crystal display (LCD), a vacuum fluorescent (VF) display, an organic light emitting diode (OLED) display, LEDs and light pipes display, and may provide a visual indicator to a venue patron. In any event, the display 3600 may communicate seat identity to the patron, theatre staff, etc. Alternately, or additionally, the display 3600 may communicate to the patron and aid the patron/staff in locating their/a seat and, thus, function as an "electronic usher." The patron may be given a device (e.g., device 3500 of FIG. 35) that may provide an indication, such as lights or vibrate when the device is adjacent to the patron's seat. The patron may be given a device 3500 that may provide an indication, such as a light or in the seat such as light up the display 3600 or partially open when the device 3500 is adjacent to the patron's seat. Such a device 3500 may enable associated chair functions, as paid for by the patron, when the device 3500 is adjacent/paired to the associated chair. Different service tiers (e.g., chair motion, hearing impaired functionality, chair heating/cooling, chair massage, etc.) may be provided based on payment.

With reference to FIGS. 37A-37D, a display assembly 3700a-d may include a cover 3705a-d, a display 3710a, area illumination 3716a having a first power connector 3717a-d and a second power connector 3718a-d, and a display mount 3720b-d having fastener apertures 3721b, 3721d. The cover 3705a-d may include a display aperture 3706c, 3706d and area illumination apertures 3707c, 3707d. The area illumination 3716a may be mounted on a printed circuit board 3715c, 3715d along with an area illumination controller 3719d. The display 3710a may include at least one light source 3731c, 3731d, a protective shield 3711c, 3711d, and a light pipe 3712c, 3712d proximate a retainer 3735c, 3735d having light pipe/protective shield alignment features 3736d. The light source 3731c, 3713d may be mounted on a printed circuit board 3730c, 3730d along with an area illumination controller 3740d and having a first power connector 3732d and a second power connector 3733d.

Figure 37A:
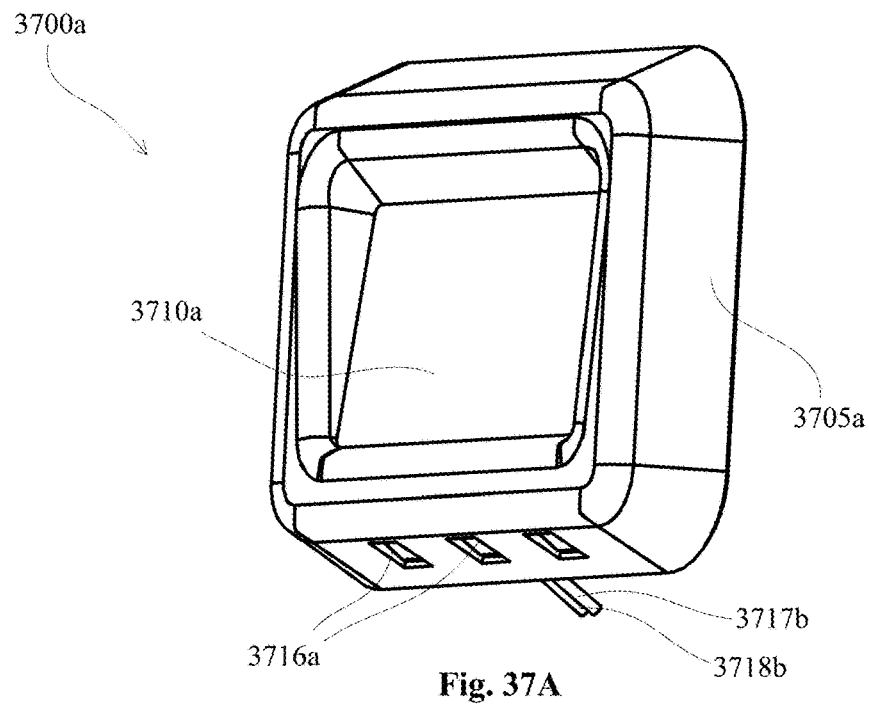
Figure 37B:
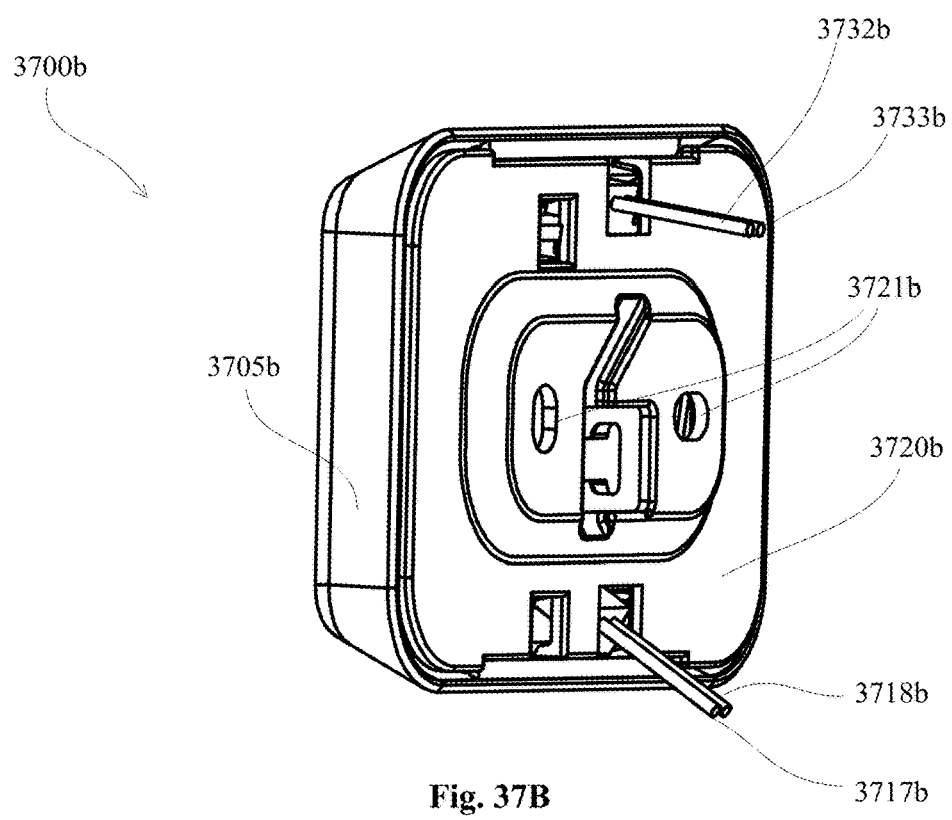
Figure 37C:
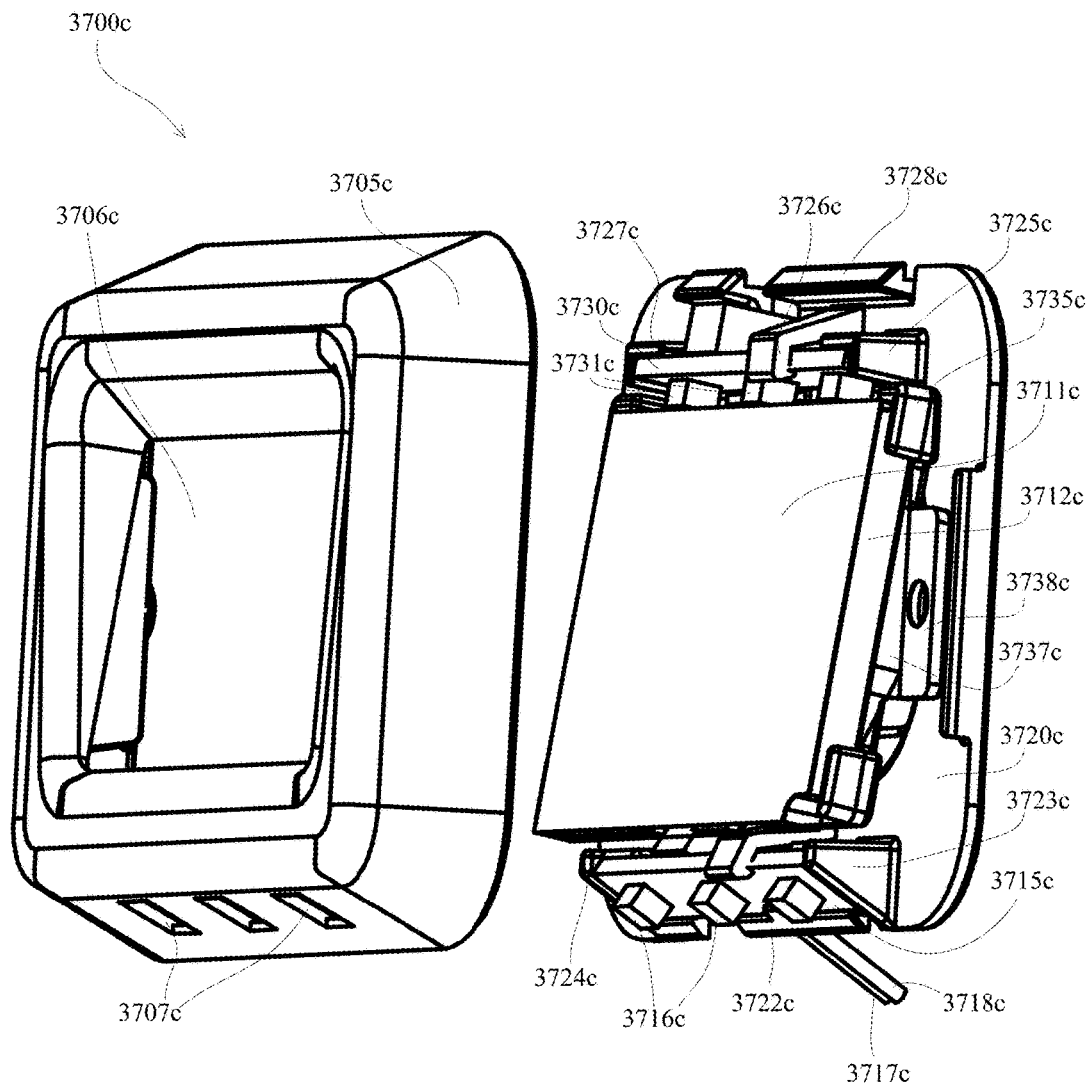

The retainer 3735c, 3735d may include mounting feet 3738c, 3738d and angled standoffs 3737c, 3737d configured to maintain the light pipe 3712c, 3712d at an angle with respect to the display mount 3720b-d as illustrated in FIG. 37C. The display mount 3720b-d may include first retention features 3723c, 3723d, 3724c, 3724d configured to retain the printed circuit board 3715c, 3715d proximate the display mount 3720b-d. The display mount 3720b-d may include second retention features 3725c, 3725d, 3726c, 3726d, 3727c, 3727d configured to retain the printed circuit board 3730c, 3730d proximate the display mount 3720b-d. The display mount 3720b-d may include third retention features 3728c, 3728d configured to retain the cover 3705a-d proximate the display mount 3720b-d.

A display assembly 3700a-d may include a means to mount a display to a chair 3720b-d, 3721b-d. A display assembly 3700a-d may include a means to facilitate field configuring customer selected options on a chair 3713d. A display assembly 3700a-d may include a means to separate chair components to optimize manufacturing and installation efficiencies.

While display device may utilize a display information connector such as wire harness, a display may include a means of transmitting energy and or information to the display wirelessly. While a display assembly 3700a-d may include light emitting diodes (LEDs) 3731c, 3731d illuminating a light pipe 3712c, 3712d, a display assembly 3700a-d may include any technology for communication of light through a display (e.g., a backlit liquid crystal display, a segmented LED display, etc.).

A display assembly 3700a-d may include a base assembly which may be assembled at a factory and assembled to an associated chair which may contain some or all of the following components: LEDs for illuminating a light pipe, LEDs for area illumination, a base to hold components, a base which may contain features to manage wire routing, aid assembly and reduce unwanted forces applied to components, a base with features to attach base to chair, a base with features to locate the base to an associated chair, a base with features that manage light for intended function and reduce light travel to unwanted areas, a base with features to align and connect to mating components, and/or a base without a light source but with contacts for transmitting energy and data to mating components for display purpose.

A display assembly 3700a-d may include a display head which may be assembled and ship separately from an associated chair. A display assembly 3700a-d may include a may contain features or components to collect information or energy from a base unit for display. A display assembly 3700a-d may include a may contain features or components to collect light from a base unit for display. A display assembly 3700a-d may include a may contain a light source or display which communicates to an associated chair for display. A display assembly 3700a-d may include a may contain a light pipe which may be customized for specific chair applications and may be assembled to a corresponding chair at a chair manufacturing facility. A display assembly 3700a-d may include a may contain means to display information and or illuminate adjacent areas. A display assembly 3700a-d may include a may contain means to illuminate adjacent areas and or display information. A display assembly 3700a-d may include a functions that may be controlled jointly or independently. A display assembly 3700a-d may include a light pipes or retaining components which contain features to aid assembly and proper orientation. A display assembly 3700a-d may contain features to enhance to propagation of light to a desired area proximate an associated chair. A display assembly 3700a-d may contain multiple information display indictors or technologies to aid in the communication of information. A display assembly 3700a-d may contain features to direct light to improve illumination of adjacent areas proximate an associated chair. A display assembly 3700a-d may contain components to protect a light pipe or display devise from hazards of an associated chair environment (e.g., liquids, dirt, etc.). A display assembly 3700a-d may be unitized by fasteners, snaps, or other features to aid shipping portions of the display assembly 3700a-d separately. A display assembly 3700a-d may contain features to aid assembly to a base unit.

A display assembly 3700*a-d* may contain at least one feature which allows addition of a light pipe during field installation (e.g., a hinged cover that would allow a light pipe to be inserted and then snapped closed). A display assembly 3700*a-d* may have display or lighting components angled to aid function.

Alternately, or additionally, a display assembly 3700*a-d* may be unitized such that portions of the display assembly 3700*a-d* may be shipped separately from an associated chair for assembly to the chair and data/power connection. In such a configuration, the display assembly may be connected to an information harness and may be attached to an associated chair via many possible methods including snapping into holes or other features on the chair. Feature(s) may be included on an associated chair which may or may not be concealed by upholstery which will may allow a display assembly 3700*a-d* to be added to the chair. For example, there may be a hole in an arm of the chair which may be covered by upholstery. When a customer pays for a display option, a chair installer may, for example, penetrate the upholstery gaining access to a display data/power stream, thereby, allowing for quick customization of the chair. Alternately, or additionally, a chair may include wireless power and data transmission, thus, the display may only need to be physically mounted to the chair.

A display assembly 3700*a-d* may reduce factory customization of chairs. A display assembly 3700*a-d* may integrate with any of the chairs disclosed within the above referenced patent application, and may include a low voltage power supply, wire routing, and/or device control. A display assembly 3700*a-d* may simplify display wiring and routing. A display assembly 3700*a-d* may allow improved information communication and display. A display assembly 3700*a-d* may allow configuration of displays at an associated chair.

A display assembly 3700*a-d* may include illumination of multiple light sources that may be controlled independently. For example, any given light source may be automatically controlled (e.g., dimmed, brightened, turned on, turned off, etc.) based on a venue event, a predetermined time, a motion sensor, etc. A display assembly 3700*a-d* may include other displays (e.g., chair is "sold", chair is not working, etc.). A display assembly 3700*a-d* may include a base that ships separately to an associated chair installation job site. A display assembly 3700*a-d* may include a display unit that ships separately to an associated chair installation job site, and may be customized for a particular application. A display assembly 3700*a-d* may allow for many display options including having a unit in which a light pipe may be inserted.

Figure 38A:
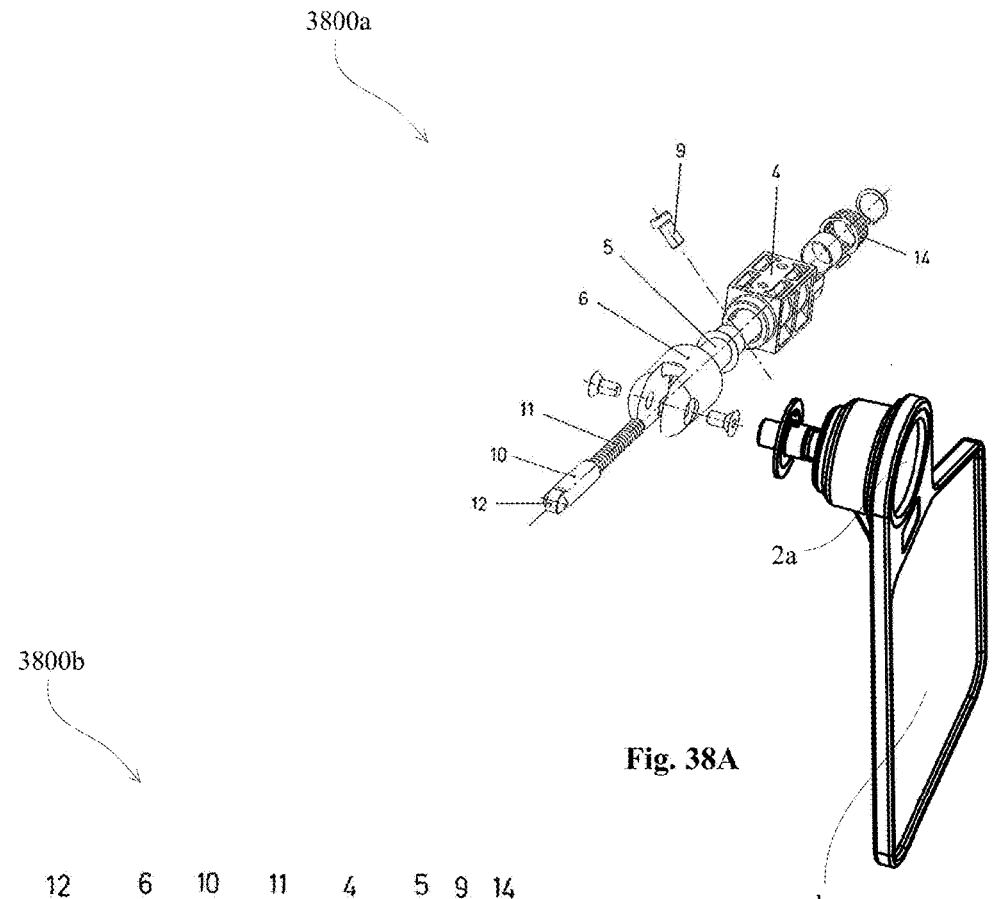
FIGS. 38A and 38B depict various views of an example pivotally stowaway tray assembly with accessory compartment.
Figure 38B:
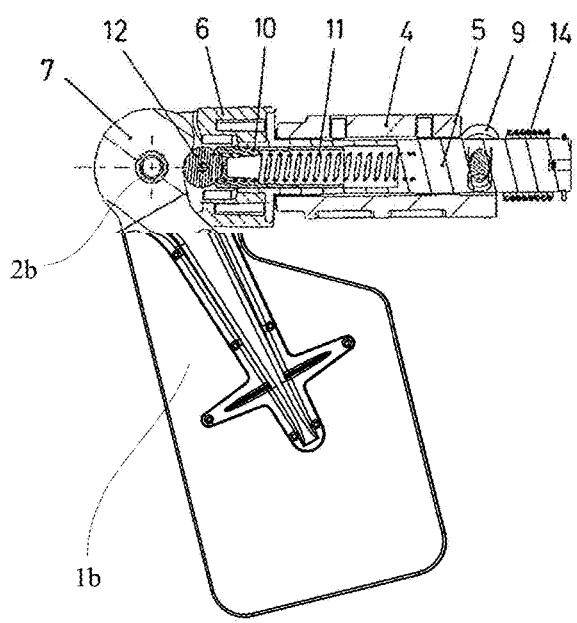

Turning to FIGS. 38A and 38B, a pivotally stowaway tray assembly with accessory compartment 3800*a*, 3800*b* may include a tray 1*a*, 1*b* having an accessory compartment 2*a*, 2*b* (e.g., a cup holder, a pencil holder, a cellular telephone holder/charger, etc.). The object of the invention relates to an arrangement of a tablet hinge system incorporated in armchairs, establishing an assembly which allows folding tablet 1, corresponding to the furled position under the armrest 2 of the assembly of the armchair 3 in application, by simply pushing the tablet 1 forwards, from the position for use, to be perfectly gathered in the furled position. According to the invention, the arrangement of tablet 1 in the armrest 2 of the armchair 3 in application is established by means of an assembly support 4, which is included fixed with respect to the armrest 2 a rotating hollow shaft 5 being incorporated axially with respect to said support 4. The shaft 5 has in its front end a head 6, with respect to which the tablet 1 is articulated by means of a cam-shaped element 7 projecting in an area of a corner of the same. The support 4 has in its rear part an angular notch 8, while the shaft 5 incorporates in its rear end a perpendicular bolt 9 acting with respect to the mentioned notch 8 of the support 4, determining two stop positions limiting the rotation of the shaft 5 between two defined angular positions. Inside shaft 5, there is a rod 10 included with axial freedom which is pushed by a spring 11 to project through the head 6, so that in the assembly arrangement said rod 10 rests with pressure on the periphery of the cam 7 of the tablet 1. A roller 12 is incorporated in the end of the rod 10 by means of which said rod 10 provides a rotation support on the periphery of the cam 7. In an end area of its contour, the cam 7 defines a notch 13 in which it is capable to fit the end of the rod 10 provided with the roller 12, such that when said fitting is established, a provisional blocking of the rotation of the tablet 1 is determined between the cam 7 and the shaft 5 with respect to the shaft 5. With all of the foregoing and starting from a folded position of the tablet 1 in the armchair 3, as shown in FIGS. 38A and 38B, to take the tablet 1 to the position for use, the tablet 1 has to be raised to a vertical position by rotating it with respect to the articulated assembly on the head 6 of shaft 5 and then folding it to the horizontal position for use. However, to take the tablet 1 to the folding position form the position for use, it is only necessary to push the tablet 1 forwards such that when a certain position is reached, the tablet 1 itself makes the shaft 5 rotate with respect to the support 4, so that the tablet 1 is in a position in which it falls into the folded position by its own weight. When the furled position included under the corresponding armrest 2 is reached, the tablet 1 is retained in this position by means of a provisional blocking, due to the fitting of the end of the rod 10 into the notch 13 of the cam 7, preventing a rebound by which the tablet 1 may be improperly projected towards the front of the armchair 3 in a wrong folding and entailing an obstacle in the space in front of the armchair 3. When the tablet 1 is taken forwards, the rotation of shaft 5 occurs by the weight of tablet 1 due to its shape, but with the purpose of increasing the efficiency and the rapidity of said rotation and with respect to the shaft 5, a torsion spring 14 is also incorporated in an arrangement tending to make said shaft 5 rotate in the direction which takes tablet 1 to the position which falls into the folded position. It should be understood that the accessory compartment 2*a*, 2*b*, may be attached to an associated armrest such that the accessory compartment 2*a*, 2*b* does not pivot when the tray 1*a*, 1*b* is pivoted.

Figure 39:
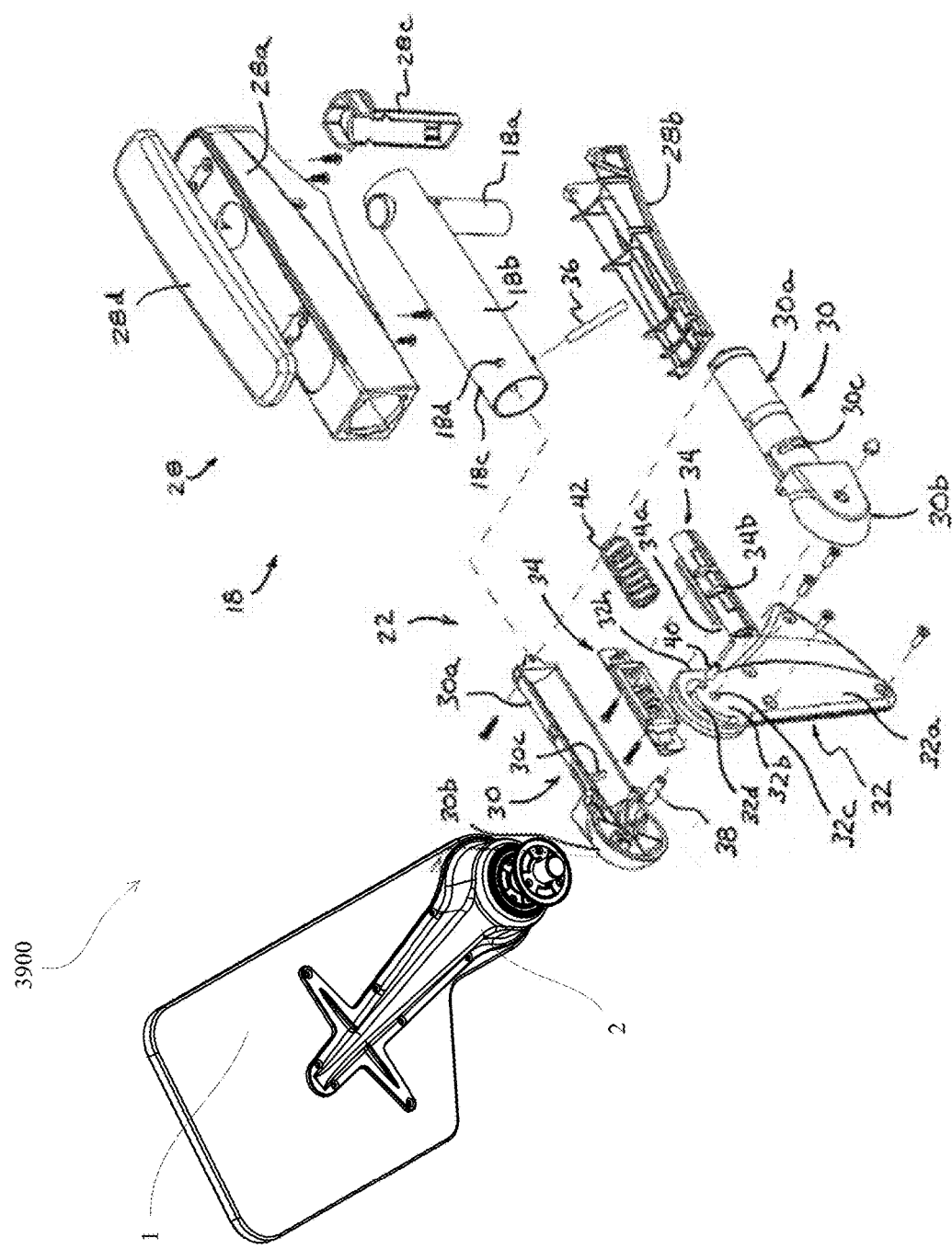
FIG. 39 depicts an example pivotally stowaway tray assembly with accessory compartment.
Figure 41A:
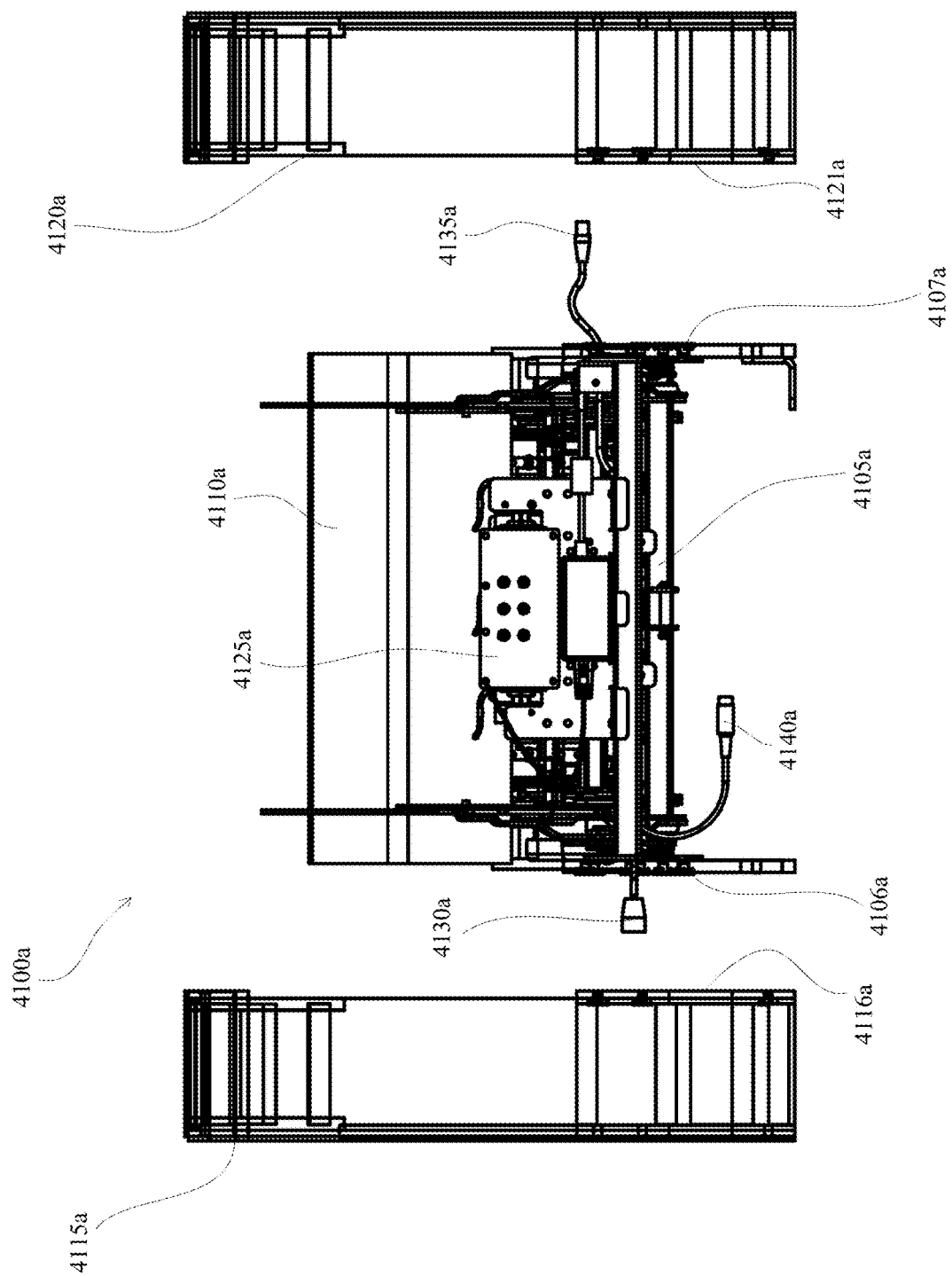
FIGS. 41A-D depict various views of example components for use within powered recliner chairs.
Figure 41B:
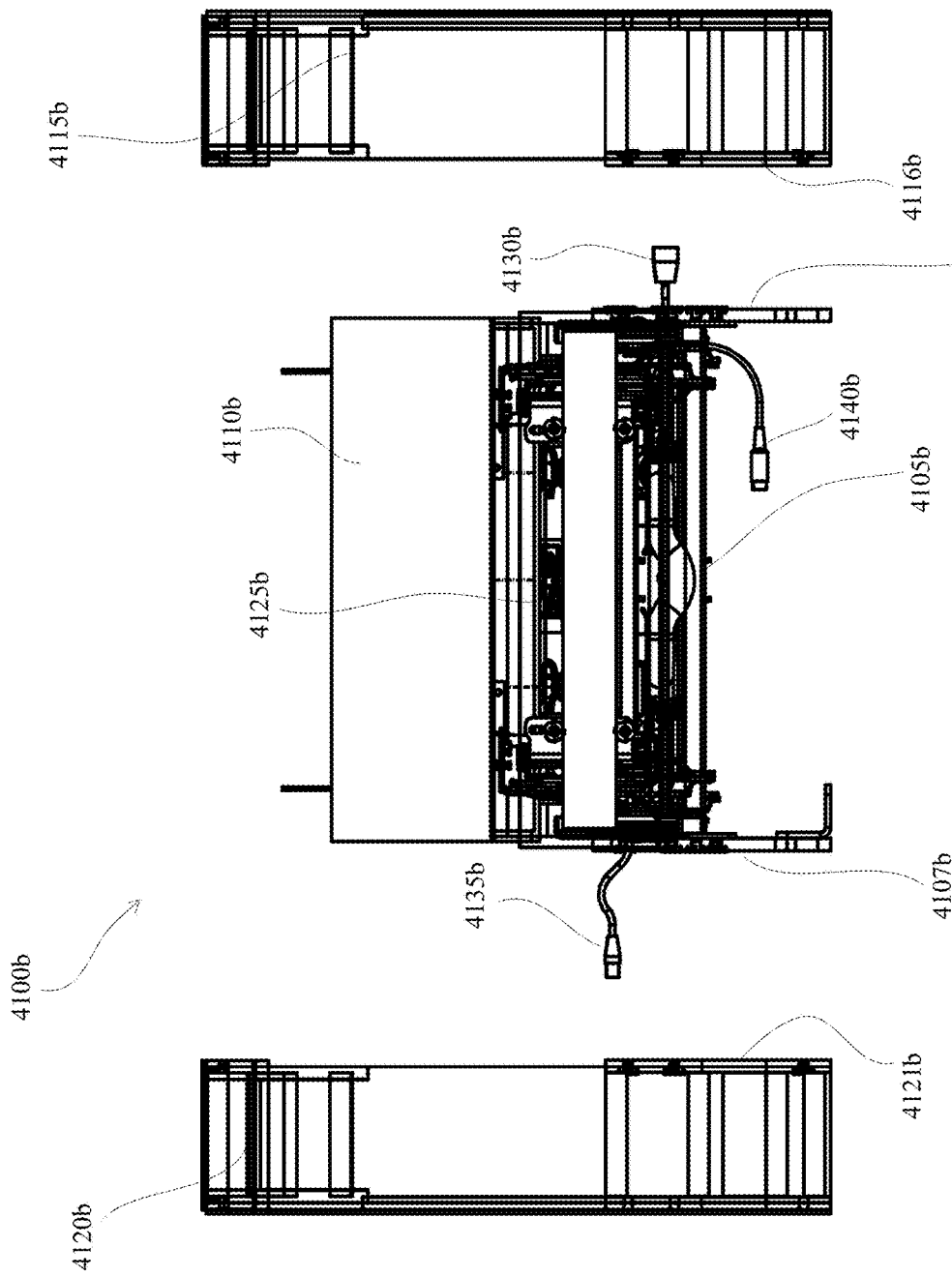
Figure 41C:
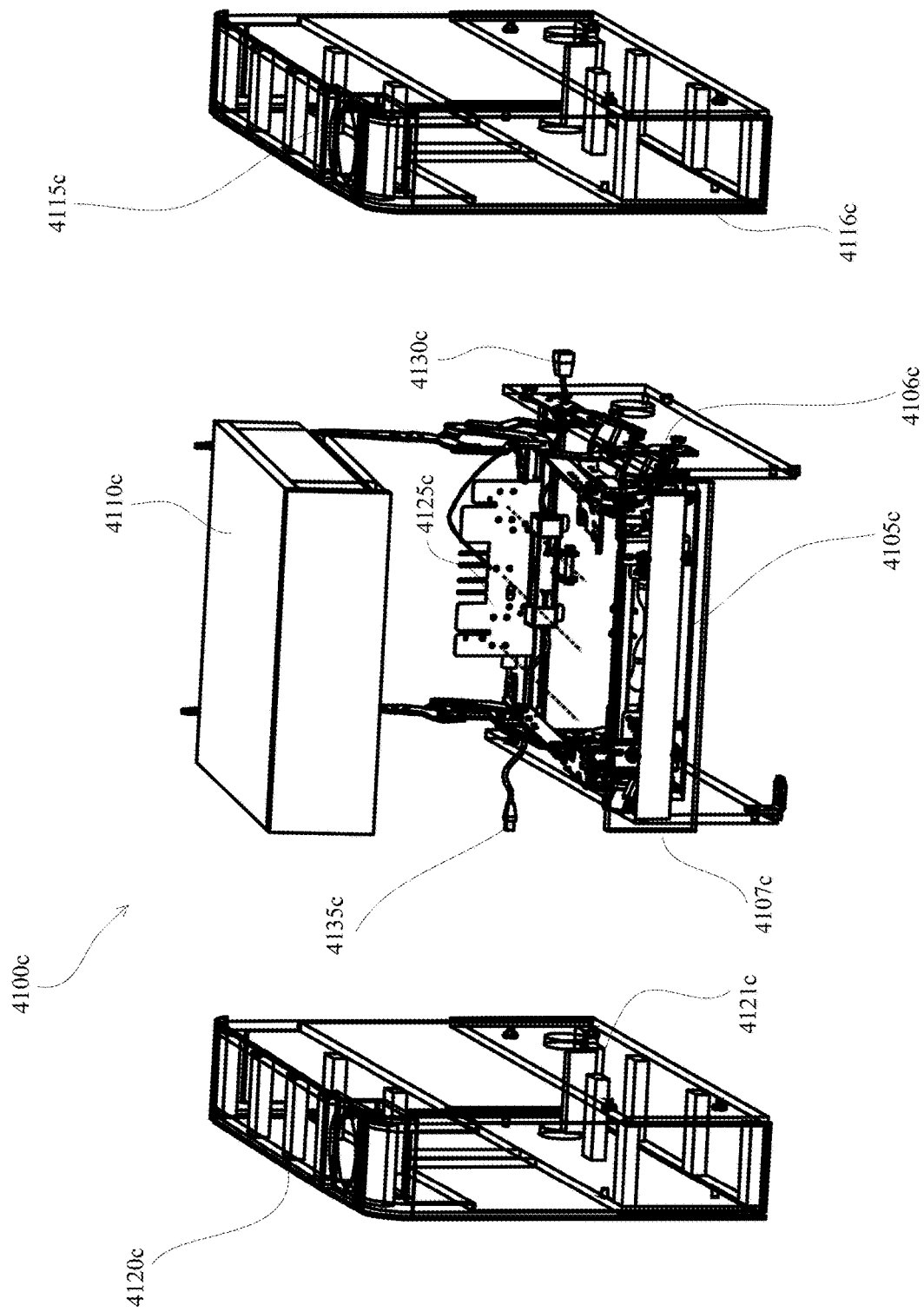
Figure 41D:
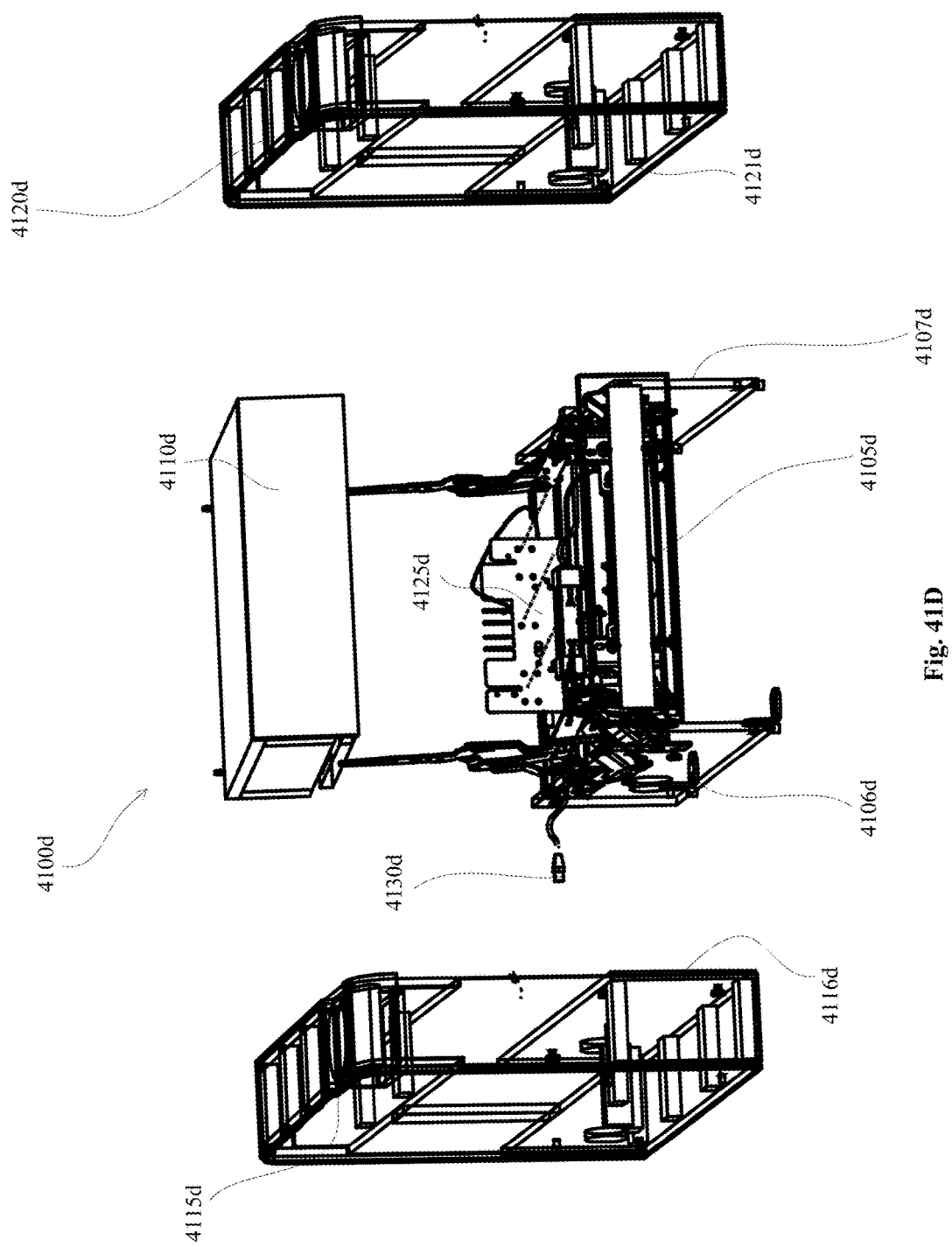
Figure 42A:
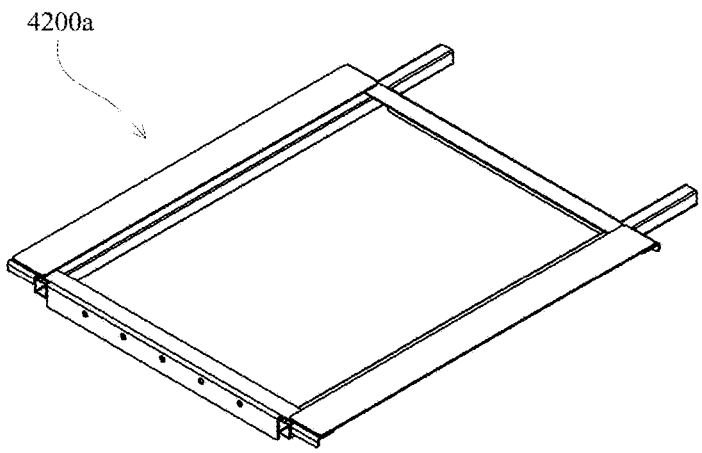
FIGS. 42A-D depict various views of an example removable chair seat frame.
Figure 42C:
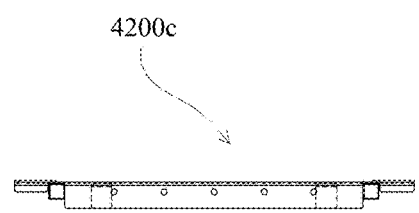
Figure 42B:
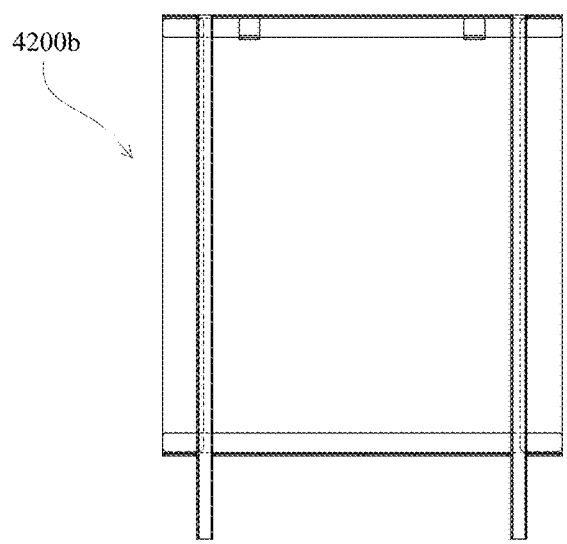
Figure 42D:
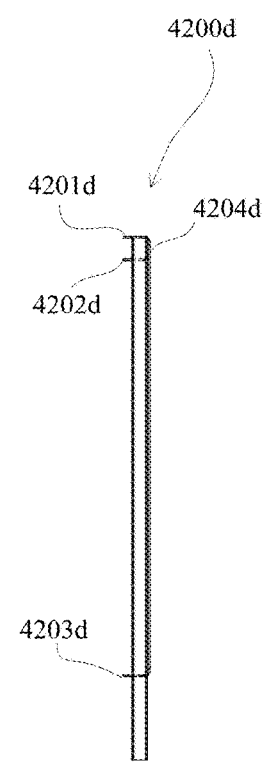

With reference to FIG. 39, a pivotally stowaway tray assembly with accessory compartment 3900 may include a tray 1 having an accessory compartment 2 (e.g., a cup holder, a pencil holder, a cellular telephone holder/charger, etc.). Armrest 18 (with adjustment mechanism 22 and tablet 20) is mounted at the upper end of one of the support legs 24, such as, for example, at the right support leg for supporting a tablet for a right-handed person to use while sitting in the seat or at the left support leg for supporting a tablet for a left-handed person to use while sitting in the seat. Another armrest (not shown) may be mounted at the other support leg and the other armrest would not necessarily include the adjustment mechanism and tablet or may include an adjustment mechanism and tablet for the seat adjacent to the first seat. The armrest 18 with the adjustment mechanism and tablet thus may be mounted at either or both support legs, depending on the particular application of the seat assembly. For example, each support leg may have an armrest and adjustment mechanism and tablet mounted thereto, with each support leg being a left leg for one seat and a right leg for an adjacent seat, such as for a plurality of seats arranged in a row at a seating facility. The adjustment mechanisms and tablets may be configured to be right hand tablets (with the tablet for a particular seat mounted to the right support leg of that seat) or left hand tablets (with the tablet for a particular seat mounted to the left support leg of that seat), depending on the particular application of the seat assemblies. In the illustrated embodiment, armrest 18 includes mounting post 18a that engages or is received in tube member 24c of support leg 24, and that may be secured to the tube member 24c, such as via one or more retaining elements 24e, such as a screw or pin or the like. As shown, armrest 18 includes a generally horizontal support or tube member 18b that is attached to mounting post 18a. Tube member 18b and mounting post 18a are received or contained at least partially within a housing or armrest casing 28, which may include an upper casing 28a, a lower casing 28b and a rear casing portion 28c, and which may include a padded armrest portion 28d at an upper surface thereof. Rear casing portion 28c may be formed to receive a portion of mounting post 18a and may provide a non-circular portion of the mounting post that is received in a non-circular tube member 24c to non-pivotally mount armrest 18 to support leg 24, Support or tube member 18b extends generally horizontally to an open end portion of the casing 28, and is configured to receive or attach to adjustment mechanism 22 to adjustably mount tablet 20 at the forward or outer end of the armrest 18. Adjustment mechanism 22 is adjustable to pivotally mount tablet 20 at the outer end of the armrest. The adjustment mechanism is configured to allow for pivotal movement of tablet 20 about a generally horizontal pivot axis that is generally normal to the longitudinal axis of the armrest and support tube to facilitate movement between the lowered or stowed or non-use position beneath armrest 18 and the raised position. The adjustment mechanism is also configured to allow for pivotal movement of tablet about a pivot axis that extends generally longitudinally along support or tube member 18b to facilitate pivoting of the tablet to its generally horizontal in-use position. Further, the adjustment mechanism is also configured to limit pivotal movement of the tablet about the longitudinal pivot axis when the tablet is in its lowered or stored position and until the tablet is raised or pivoted upward a threshold amount. The adjustment mechanism is also configured to allow pivotal movement of the tablet about a generally vertical pivot axis when the tablet is in its generally horizontal in-use position to facilitate adjustment of the tablet relative to the person using the tablet at the seat assembly. In the illustrated embodiment, adjustment mechanism 22 includes a pivot housing or pivot element 30 that includes a pivot shaft portion 30a that is received in support tube 18b and a tablet mounting portion 30b that pivotally mounts a swing arm or mounting arm 32 (which is attached or affixed to tablet 20, such as via a plurality of fasteners or the like). Shaft portion 30a has a transverse slot 30c formed therethrough that extends transverse to the longitudinal axis of the shaft portion 30a. Pivot element 30 receives a plunger 34 therein that is longitudinally movable along pivot element 30 in response to pivotal movement of swing arm 32 about tablet mounting portion 30b of pivot 30, as discussed below. When pivot shaft portion 30a is received within support tube 18b, a pin or stop element 36 is inserted at least partially through support tube 18b (such as through a hole or set of holes 18c or 18d of support tube 18b) and through slot 30c of pivot shaft portion 30a and at least partially through plunger 34 to allow for controlled pivotal and longitudinal movement of plunger 34 and pivot element 30 relative to support tube 18b to control the adjustment or movement of swing arm 32 and tablet 20 relative to armrest 18, as also discussed below. Swing arm 32 includes a tablet mounting portion 32a that is configured to attach to tablet 20, such as via a plurality of screws, and a pivot mounting portion 32b that is configured to pivotally mount to tablet mounting portion 30b of pivot element 30. In the illustrated embodiment, pivot mounting portion 32b of swing arm 32 is pivotally mounted to mounting portion 30b of pivot element 30 via a pivot pin or axle 38. Pivot mounting portion 32b includes a hole or aperture 32c therethrough for receiving pivot axle 38 and includes an arcuate or variable radius slot 32d at least partially around hole 32c and along a perimeter region of pivot mounting portion 32b. The arcuate slot 32d has different radii from the pivot hole 32c that vary from a smaller radius portion 32e to a larger radius portion 32f. The pivot mounting portion 32b has a generally arcuate or curved perimeter region 32g and includes a generally flat or non-curved stop surface 32h (generally at or near the smaller radius portion 32e) for engaging plunger 34 to longitudinally move or adjust plunger 34 along pivot shaft 30a, as discussed below. Plunger 34 is configured to be movably received within pivot shaft 30a and includes a slot or receiving portion 34a for receiving the perimeter region of pivot mounting portion 32b of swing arm 32. A pin or guide element 40 is inserted or received at least partially through plunger 34 and at least partially through or in arcuate slot 32d. Guide pin 40 functions to move along arcuate slot 32d as swing arm 32 is pivoted and to impart a longitudinal movement of plunger 34 in response to the pivotal movement of swing arm 32 about pivot axle 38 via the tracking of the guide pin 40 along the variable radius arcuate slot 32d of pivot mounting portion 32b of swing arm 32, as discussed below. In the illustrated embodiment, guide pin 40 is non-rotatable or rotationally fixed relative to plunger 34 so as to slidably track along arcuate slot 32d in a non-rotational or non-rolling manner. For example, guide pin 40 may be press-fit through apertures in the plunger or may be non-circular or keyed or otherwise formed so as to be received in a correspondingly formed non-circular aperture in the plunger to maintain the guide pin in a non-rotational state relative to the plunger. However, it is envisioned that guide pin 40 could be rotatably mounted to the plunger so as to rotate or roll as it tracks along the arcuate slot. Plunger 34 also includes a slot 34b through the body of plunger 34 for at least partially receiving pin or stop element 36 that is received at least partially through support tube 18b and through transverse slot 30c of pivot shaft portion 30a. Slot 34b of plunger 34 includes a longitudinal slot portion 34c (which extends longitudinally along plunger 34) and a transverse slot portion 34d (which extends normal to longitudinal slot portion 34c). In the illustrated embodiment, pivot element 30 and plunger 34 are shown as two-piece constructions, with the two halves or portions of each component being snapped and/or fastened or otherwise joined or connected together to form the pivot element and plunger components. However, it is envisioned that the pivot element and/or plunger may comprise unitary constructions or other constructions or forms, while remaining within the spirit and scope of the present invention. In the illustrated embodiment, the curved perimeter region 32g of swing arm 32 provides a curved outer surface that generally corresponds to a curved or partial spherical-shaped outer surface of tablet mounting portion 30b of pivot element 30, thus providing an enhanced appearance to the adjustment mechanism. In the illustrated embodiment, tablet mounting portion 30b, at its end toward shaft portion 30a, is generally rectangular or square-shaped and corresponds to the generally rectangular or square-shaped end of upper armrest housing 28a when the pivot element is oriented with pivot axle 38 in a generally horizontal orientation (where the tablet may be in its stored position) or a generally vertical orientation (where the tablet may be in its use position). Thus, the adjustment mechanism provides generally flush or continuous outer surfaces at the end of the armrest when the tablet is stored or in use to provide an enhanced appearance to the seat assembly. It should be understood that the accessory compartment 2, may be attached to an associated armrest such that the accessory compartment 2 does not pivot when the tray 1 is pivoted.

Turning to FIGS. 40A and 40B, a pivotally stowaway tray assembly with accessory compartment 4000a, 4000b may include a tray 1a, 1b having an accessory compartment 2a, 2b (e.g., a cup holder, a pencil holder, a cellular telephone holder/charger, etc.). A fitting or the like for pivotally attaching a tray assembly to chairs may be substantially horizontally and laterally arranged on the chair. An axis of rotation from its horizontal working position in front of the seat surface of the chair in a vertical, the space in front of the seat surface releasing position may be folded up and about a pivot axis in a vertical gap space laterally adjacent to the seat surface. The pivot mechanism may allow a seat user to pop up the tray assembly by hand in a vertical position and then laterally sunk into a gap next to the chair or on an associated row of seats. The sinking may include known fittings so that only one movement of the worktop by hand is necessary with assistance of a spring to from its vertical. An associated pivot mechanism may include an outer tube 8, an inner tube 9, a bearing in the inner tube plunger 10 and arranged in the inner tube. A bearing disc 13 may accommodate a tray 1a, 1b placed near a peripheral edge. The bearing disc 13 may serve as a control curve 15 and may cooperate with a spring-loaded pressure piston 10. The plunger 10 may be transverse to the piston axis extending pressure pin 16 which may include a base member extending in an axial direction of the inner tube slot 17. A head of the pressure pin 16 may engage a recess 18 of the outer tube 8 to secure the tray 1a, 1b in a desired orientation. A rear end of the compression spring 11 may be supported on an end cap 19 of the outer tube 8. It should be understood that the accessory compartment 2a, 2b, may be attached to an associated armrest such that the accessory compartment 2a, 2b does not pivot when the tray 1a, 1b is pivoted.

With referenced to FIGS. 41A-D, a powered recliner chair assembly 4100a-d may include a central chair frame 4105a-d, a chair seat box structure 4110a-d, a first arm box 4115a-d, a second arm box 4120a-d, a power junction box 4125a-d, a power inlet connection 4130a-d, a power outlet connection 4135a-d, and at least one actuator connector 4140a-d. As described in more detail with respect to FIGS. 42A-D, the chair seat box structure 4110a-d may be movable, or removable, to facilitate access underneath the associated assembly 4100a-d. Each arm box 4115a-d, 4120a-d may include arm box quick attachment features 4116a, 4121a-d, respectively, configured to cooperate with chair recliner mechanism structure quick attachment features 4106a-d, 4107a-d, respectively, to facilitate installation, removal, and/or replacement of an associated arm box 4115a-d, 4120a-d. For example, a pair of central chair frames 4105a-d may be secured in place within an associated venue spaced apart from one another such that an arm box 4115a-d, 4120a-d may be slid downward between the pair of central chair frames 4105a-d and secured in place via the respective arm box quick attachment features 4116a, 4121a-d and the chair recliner mechanism structure quick attachment features 4106a-d, 4107a-d.

A chair recliner mechanism structure 4105a-d and/or an arm box 4115a-d, 4120a-d may include power cord rack features that receive a power inlet connection 4130a-d or a power outlet connection 4135a-d from a backside or a respective chair and retain the power inlet connection 4130a-d and/or the power outlet connection 4135a-d up off an associated floor surface. The power cord rack features may be, for example, hook shape features that allow installation of the power inlet connection 4130a-d and/or the power outlet connection 4135a-d, and/or the arm boxes 4115a-d, 4120a-d without unplugging the power inlet connection 4130a-d and/or the power outlet connection 4135a-d from an associated power junction box 4125a-d. In fact, a series of power inlet connections 4130a-d and/or power outlet connections 4135a-d may be plugged into respective power junction boxes 4125a-d while laying, for example, on a floor behind a row of associated chairs, and subsequently the series of power inlet connections 4130a-d and/or power outlet connections 4135a-d, along with respective power junction boxes 4125a-d, may be set in place with the associated chair recliner mechanism structures 4105a-d and/or arm boxes 4115a-d, 4120a-d set in place.

A powered recliner chair may include a power supply having a battery and a battery charger. The battery charger may be configured to automatically charge the battery during periods of time in which an associated electric actuator motor is not in operation. Thereby, the power supply and battery may be configured to provide a constant voltage to the electric actuator motor during times when, for example, several actuators, that are connected to the given power supply, are activated. The power supply may also include a constant voltage transformer that outputs a constant voltage regardless of current draw from electric actuator motor(s). The transformer may, for example, adjust automatically to maintain a generally constant DC voltage output to the electric actuator motor. In lieu of, or in addition to, a battery within a power supply, a battery charger and/or a battery may be provided within any given actuator. Any given chair assembly may be configured such that, for example, when an associated venue experiences an electric power outage, the chair assembly may be reoriented to an upright orientation, via electric power from a battery. Once the chair assembly is reoriented to an upright orientation, an associated chair control may disable operation of the chair assembly until the venue electric power is restored.

Turning to FIGS. 42A-D, a removable/movable chair seat frame 4200a-d may include a tubular frame 4201d, a chair seat frame location feature 4202d, a first cross brace 4203d and a second cross brace 4204d. In cooperation with the removable/movable chair seat frame 4200a-d, a chair seat box structure (e.g., chair seat box structure 4110a-d of FIGS. 41A-D) may interlock into an associated recliner chair in a fashion to allow the seat box to be restrained when occupied and to be moved into a position to aid cleaning. For example, bracket(s) may cooperate with member(s) of a recliner mechanism or items connected to the recliner mechanism to restrict undesirable seat movement and noise when the recliner is occupied, but allow for easy movement of the chair seat when the associated chair is unoccupied. Alternatively, a chair seat may be attach to an associated chair via a pillow top or other flexible member (e.g., a hinge mechanism). In addition to, or in lieu of, a powered recliner chair, or group of powered recliner chairs, being reoriented from an upright orientation to a reclined orientation as described herein and within the patents and patent applications that are incorporated by reference herein, a chair seat box structure may include an actuator that is configured to move the chair seat in response to a user activating, for example, a remote and/or local control button. Thereby, venue personnel may access under respective chairs for cleaning and/or servicing.

A removable/movable chair seat frame 4200*a-d* may be, for example, hinged along a front side and an actuator may be provided to pivot the removable/movable chair seat frame 4200*a-d* upward to assist a chair occupant to stand up and exit the chair. An associated removable/movable chair seat frame 4200*a-d* control (e.g., a first set of user controls/displays 4410*a, b*, a second set of user controls/displays 4415*a,b* and/or a third set of user controls/displays 4420*b*) may be provided in, for example, an arm box.

Figure 43A:
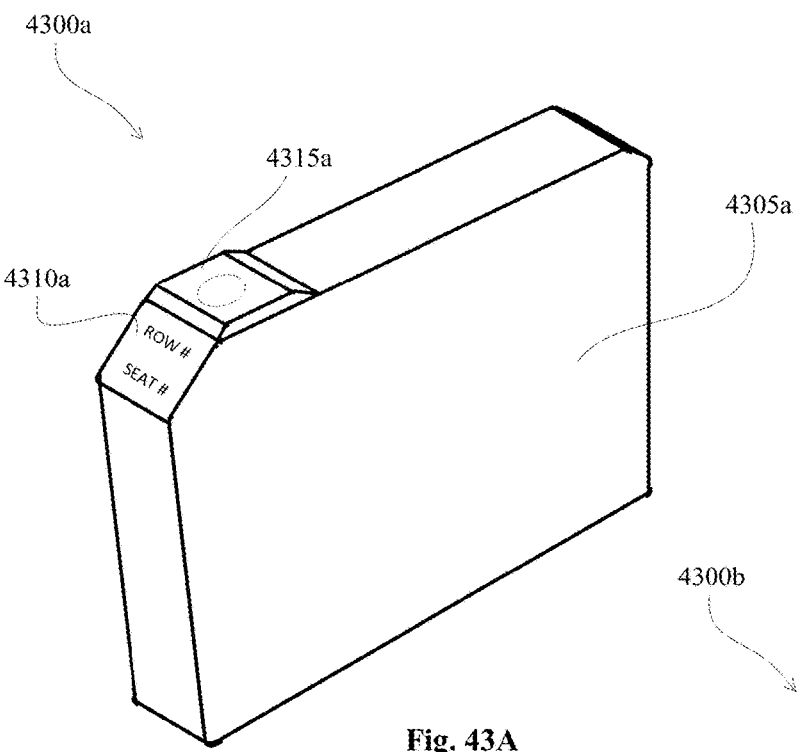
FIGS. 43A and 43B depict example arm boxes for use with powered recliner chairs.
Figure 43B:
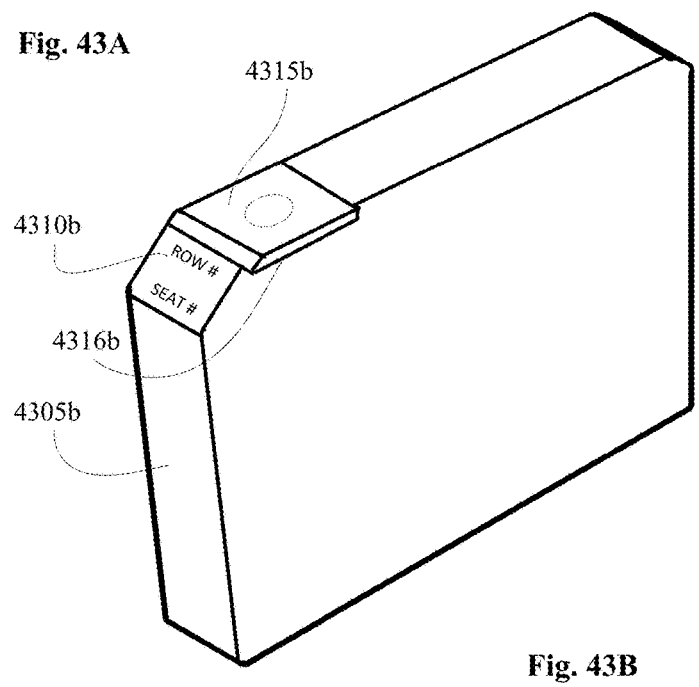

With reference to FIGS. 43A and 43B, an arm box assembly 4300*a, b* may include an arm box 4305*a, b*, a first user interface/display 4310*a, b*, and a second user interface/display 4315*a, b*. The first user interface/display 4310*a, b* and/or the second user interface/display 4315*a, b* may include a plurality of light sources configured to illuminate respective display features. Any given light source may be manually or automatically controlled. For example, any given light source may be automatically controlled (e.g., dimmed, brightened, turned on, turned off, etc.) based on a venue event, a predetermined time, a motion sensor, etc. Any given second user interface/display 4315*a* may include an aperture to, for example, receive or allow access to an associated cup holder. Any given user interface may include manual controls for the light sources, chair recline/upright controls, a chair heater control, a chair massage control, etc.

As illustrated in FIGS. 43A and 43B, the first user interface/display 4310*a, b* may be angled toward a front of an associated venue and away from view of occupants of chairs such that, for example, a chair and/or row number may be illuminated and visible to individuals walking, yet without being visible to individuals that are seated. An area light, or lights, 4316*b* may be incorporated within a second user interface/display 4315*b* to, for example, provide row and/or aisle illumination similar to light sources 3716*c* of FIG. 37C. In any event, any given light, or lights, 4316*b* may be manually or automatically controlled. For example, any given light source may be automatically controlled (e.g., dimmed, brightened, turned on, turned off, etc.) based on a venue event, a predetermined time, a motion sensor, etc.

Figure 44A:
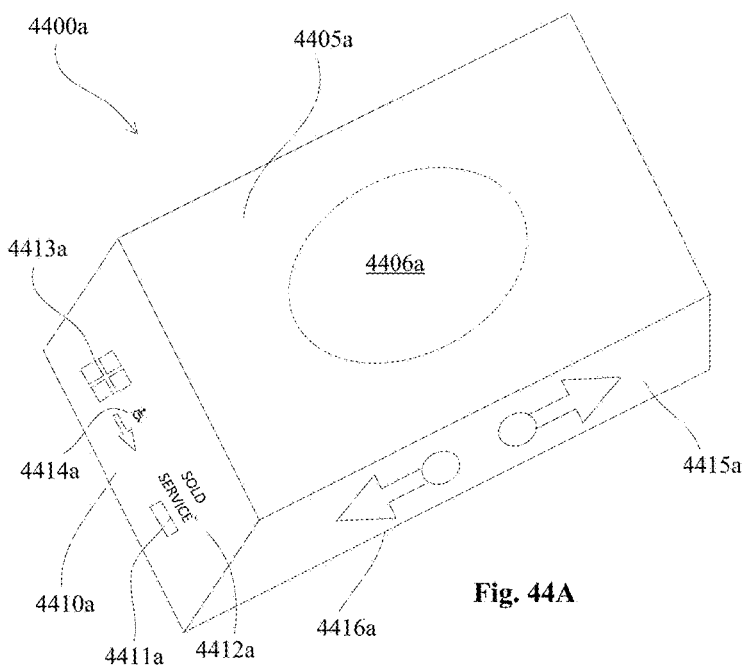
FIGS. 44A and 44B depict example user interfaces for use with powered recliner chairs.
Figure 44B:
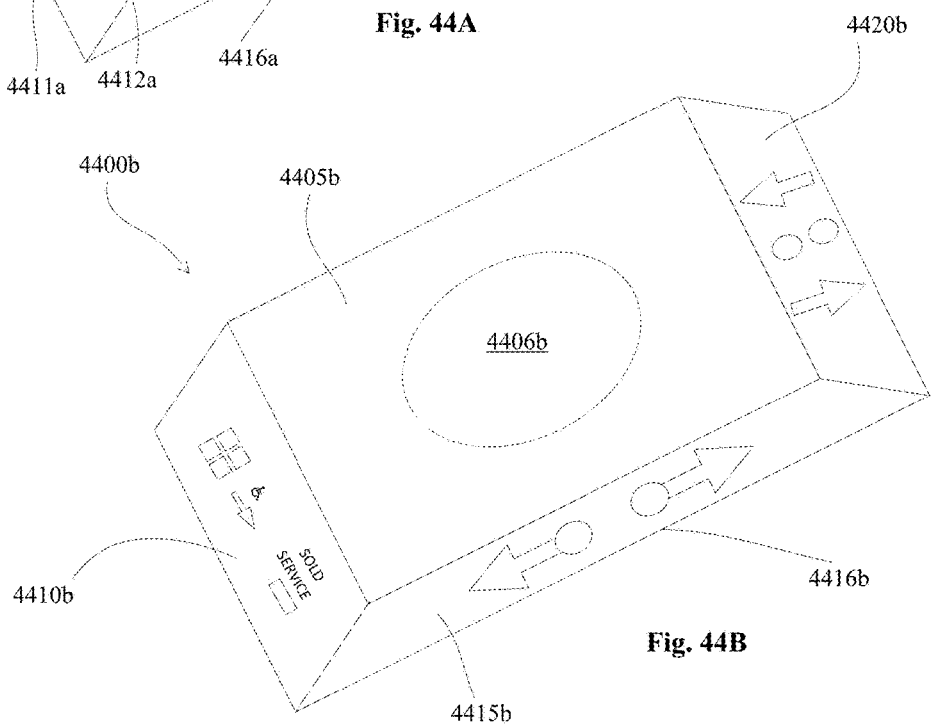

Turning to FIGS. 44A and 44B, a user interface 4400*a,b* may include a top surface 4405*a, b*, a first set of user controls/displays 4410*a, b*, a second set of user controls/displays 4415*a,b* and/or a third set of user controls/displays 4420*b*. While not shown in FIG. 44A or 44B, any given user interface 4400*a, b* may include a fourth set of user controls/displays on a second side and/or a fifth set of user controls/displays on a top side. The user interface 4400*a,b* may be similar to, for example, the first user interface/display 4315*a,b* of FIGS. 43A and 43B. The user interface 4400*a,b* may include a plurality of light sources configured to illuminate respective display features. Any given light source may be manually or automatically controlled. For example, any given light source may be automatically controlled (e.g., dimmed, brightened, turned on, turned off, etc.) based on a venue event, a predetermined time, a motion sensor, etc. Any given user interface 4400*a,b* may include an aperture 4406*a,b* to, for example, receive or facilitate addition of a tray (e.g., any tray of FIG. 20-23) or to allow access to an associated cup holder. Any given user interface may include manual controls for the light sources, chair recline/upright controls, a chair heater control, a chair massage control, etc.

An area light, or lights, 4416*a,b* may be incorporated within a user interface 4400*a,b* to, for example, provide row and/or aisle illumination similar to light sources 3716*c* of FIG. 37C and 4316*b* of FIG. 43B. In any event, any given light, or lights, 4416*a, b* may be manually or automatically controlled. For example, any given light source may be automatically controlled (e.g., dimmed, brightened, turned on, turned off, etc.) based on a venue event, a predetermined time, a motion sensor, etc.

Any given user interface 4400*a, b* may include an ambient light sensor to, for example, automatically control light output of an associated light source and/or display. For example, during pre-show or non-movie times, venue lights may be on such that a seat number may automatically increase intensity. Alternatively, light control may be programmed thru an associated venue control network. In any event, a seat number may be bright when needed and dim when it gets dark during, for example, a show. Alternatively, or additionally, bright seat lights may be set during, for example, a bright section of the show. Any given user interface 4400*a, b* may incorporate a sensor to detect if an associated chair is occupied. Any given user interface 4400*a, b* may incorporate additional controls such as vibration, massage, call for food, emergency/assistance call, etc. Any given user interface 4400*a, b* may incorporate chair extend retract controls on each side for a pair of adjacent chairs. For end of row chairs, a row side may include aisle lights, a row number/letter, a seat number, an ADA designation 4414*a*, an indicator when associated chairs are in a venue cleaning mode 4413*a*, a call light indicator for a patron/chair needing service 4412*a* in that row, etc. Any given user interface 4400*a, b* may be mounted flush with sides of an associated arm box/flip up arm as illustrated in FIG. 43B, and may extend wider than the arm box/flip up arm so that features such as down lighting or aisle lights 4316*b* may be incorporated. Any given user interface 4400*a, b* may include some or all of smart chair control features, such as smart power, venue cleaning, power modules, etc. Any given user interface 4400*a, b* may facilitate modularization of an associated recliner chair by enhancing stand-alone nature of the RMSs, arm boxes, chair seats, chair ottomans, chair backs, and/or headrests. Any given user interface 4400*a, b* may incorporate power supplies or power regulators for independent items such as aisle lights, tasks lights, cup holders, snack trays, call buttons, and/or features to enhance patron experience or venue operation. Any given user interface 4400*a, b* may incorporate an optical beam paired with beam/receiver module. The beam could originate in one chair and go across the seat width. An occupant in the chair may break the beam indicating an occupant present. The beam/receiver modules are available in many types for example a garage door opener safety close switch.

Any given user interface 4400*a, b* may include a clock or sleep timer(s) configured to automatically dim or shut off associated light sources/displays during times when an associated venue is not in operation. This can take a number of forms: turn off/dim a light source/display if an associated chair is not used for more than a predetermined time (e.g., an hour, 3-hours, etc.). Any given user interface 4400*a, b* may incorporate multiple timers and actions. Automatic control may incorporate patterns, for example, turn off every other row or chair. Alternatively, the pattern can alternate, rotate, vary, during normal times, for example, every other chair user interface 4400*a,b* may dim for 5 minutes. A row number may be automatically turned on and an associated seat number turned off on alternating chairs. Which chair is "on" and "off" may be changed in some pattern such as by day, venue cleaning cycle (System can toggle at venue cleaning activation), etc. Any given user interface 4400*a, b* may incorporate a global clock timer that sets on/off times.

Any given user interface 4400*a, b* may incorporate a wake up code in the control system to turn on/off displays until a next button push. Any given user interface 4400*a, b* may allow any chair in a particular venue to detect a button push on any other chair and react/wake up. Any given user interface 4400*a, b* may incorporate, for example, a wifi module to sync an internet time, a battery, a processor, a memory, and/or a programming port 4411*a* (e.g., a USB port, an RS-232 port, a RS-422 port, etc.), an audio port. Thereby, any given user interface 4400*a, b* may be configured to provide all chair control and/or user functions described herein. When a user interface includes a battery, the user interface may not require any external electrical connections to facilitate chair control and/or user functionality (i.e., user interface power may be provided via the battery and control data may be transmitted/received wireless).

Any given user interface 4400*a, b* may include a power connection (e.g., a direct current (DC) connection and/or an alternating current connection) and/or a data connection (e.g., wired and/or wireless data connection). The power connection and/or the data connection may include any suitable plug/receptacle to facilitate user interface installation, removal and/or replacement.

Any given user interface 4400*a, b* may include a chair position sensor that is configured to sense an angle at which an associated chair is reclined. Thereby, the user interface 4400*a, b* may be programmed to limit an angle at which the given chair may be reclined. Thus, a chair that is installed adjacent a wall or a handicap accessible area, for example, may be programmed to recline less than other chairs in other areas of a respective venue.

Any given user interface 4400*a, b* may include switches, controls and displays. For example, a recliner control switch may be incorporated with remote venue cleaning control circuitry into a single circuit board. The combined control may be located in an arm box and/or in a remote control positioned at, for example, a rear of an associated chair. Locating the controls in an arm box may provide improved control signal reception, may allow customization to an arm box and may make associated recliner structure less custom. This may reduce overall complexity and may speed installation. Furthermore, locating controls in an arm box may combine chair number, display, chair status such as sold/available, etc., may include a USB port or other input feature (wired or wireless) to, for example, program a chair assembly. For example, programming may include venue cleaning chair programming, smart power programming, setting display parameters such as chair number, row letter, a chair network ID such as IP address etc. Moreover, locating controls in an arm box may combine an AC to DC motor power supply with these items to reduce cost, components, and/or complexity.

Any given user interface 4400*a, b* may be configured to monitor and/or control recline/retraction functions of an associated chair or associated chairs. For example, a user interface 4400*a, b* may be programmed to monitor a number of electrical pulses applied to an associated actuator and/or to monitor an amount of time the associated actuator is activated. Thereby, the user interface 4400*a, b* may be configured to limit chair movement. For example, a given chair may be configured to be installed in a venue with a row spacing particular row spacing, and a chair foot rest (or ottoman) movement may be limited to ensure a row egress that meets an associated fire code (e.g., twelve inches for chair installations in the United States, fourteen inches for chair installations in Canada, etc.). Alternatively, or additionally, a position sensor (e.g., a haul effect sensor, a limit sensor, a linear rheostat, a rotary rheostat, etc.) may be connected to a user interface input to provide a chair position feedback signal. In any event, a user interface 4400*a, b* (and/or chair control) may be configured to monitor/control a chair orientation. Similarly, chairs installed in a back row of a venue may include a chair back/head rest that does not recline as far back as a chair back/head rest of a chair installed in a front row of the venue. An associated ottoman, on the other hand, may extend the same for the chair in the back row and the chair in the front row. Thereby, a head of a chair occupant in the back row will remain more upright when the associated chair back/head rest is reclined when compared to a head of a chair occupant in a chair located in the front row.

A number of electrical pulses applied to an actuator may be proportional to an associated actuator drive current. Alternatively, or additionally, a width of pulses applied to an actuator may be proportional to an associated actuator drive current. A user interface 4400*a, b* (or other control) may control an actuator based on a number of electrical pulses and/or a width of electrical pulses applied to an actuator drive motor. A user interface 4400*a, b* (or other control) may control an actuator based on a frequency of electrical pulses applied to an actuator drive motor. An actuator may be either a linear actuator or a rotary actuator. While an actuator/control as disclosed herein may be incorporated within a powered recliner chair, a similar actuator/control may be incorporated in any application (e.g., two-dimensional laser cutters, two-dimensional plasma cutters, two-dimensional water jet cutters, multi-axis machining systems, multi-axis robots, etc.).

A user interface 4400*a, b* may include a touch screen display having a plurality of control button icons, with each control button icon being configured to result in a respective chair being oriented to a predetermined orientation when the respective control button icon is selected by a user. For example, a user may momentarily touch a particular control button icon and the respective chair will orient to a fully reclined orientation. Activation of a second control button icon may result in the associated chair being oriented to a fully upright orientation. Activation of a third control button icon may result in the associated chair being oriented to an orientation in between fully reclined and fully upright. Activation of a forth control button icon, and/or activation of a venue cleaning function, may cause a plurality of chairs in a given venue to reorient to an orientation that causes, for example, associated foot rests (or ottomans) and/or chair backs to extend into a row space otherwise required when the associated venue is occupied (i.e., when the venue is vacant, the chairs may be reclined further than when the venue is occupied). Thereby, the chairs may simultaneously meet respective fire codes and facilitate venue cleaning.

By providing chair orientation monitoring and/or feedback, an associated user interface (and/or chair control) may be programmed to orient a chair relative to differing venue floor angles. Alternatively, or additionally, chair orientation data may be acquired and stored to, for example, enable venue designers to analyze preferred chair orientations. Chair orientation data may be used for design of venue chair layouts. In circumstances where a user interface is programmed to monitor chair orientation via application of electric power to an actuator, the user interface may detect variations in electric power (e.g., a spike when an ottoman begins to move, a spike when a chair is fully reclined, a spike when a chair is fully upright, etc.) to, for example, set (or validate) a "known" (or current) orientation. Subsequently, the user interface (or chair control) may approximate chair orientation based on actuator activation time and/or power pulses.

Additionally, or alternatively, by providing chair orientation monitoring and/or feedback, an associated user interface (and/or chair control) may be programmed to orient a group of chairs within a venue during emergency situations. For example, a user interface (and/or chair control) may automatically reorient chairs close to aisles before chairs in a center of a row when a fire alarm is activated. As another example, chairs may be automatically reoriented to a predetermined orientation between a fully upright orientation and a fully reclined orientation in response to an emergency notification.

Figure 44C:
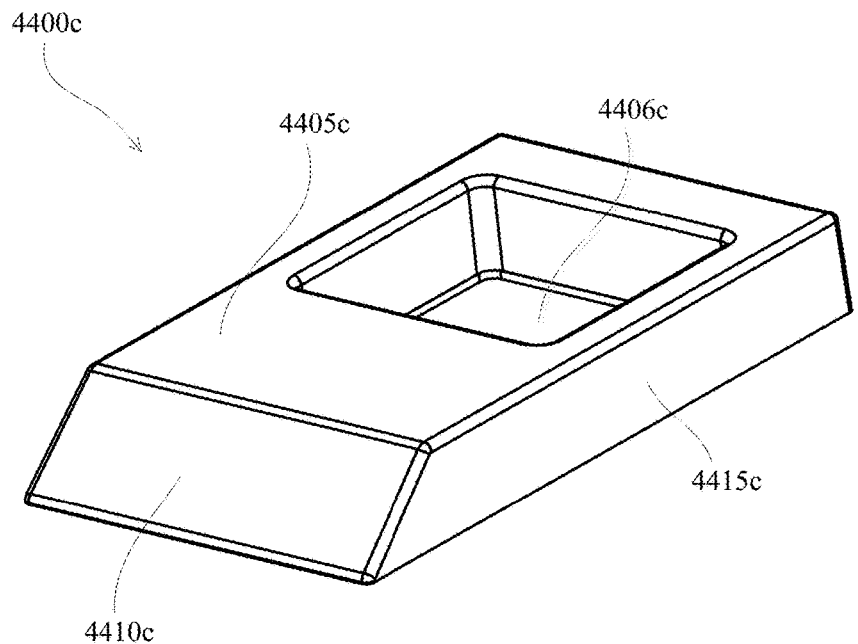
FIGS. 44C and 44D depict an example user interfaces for use with powered recliner chairs.
Figure 44D:
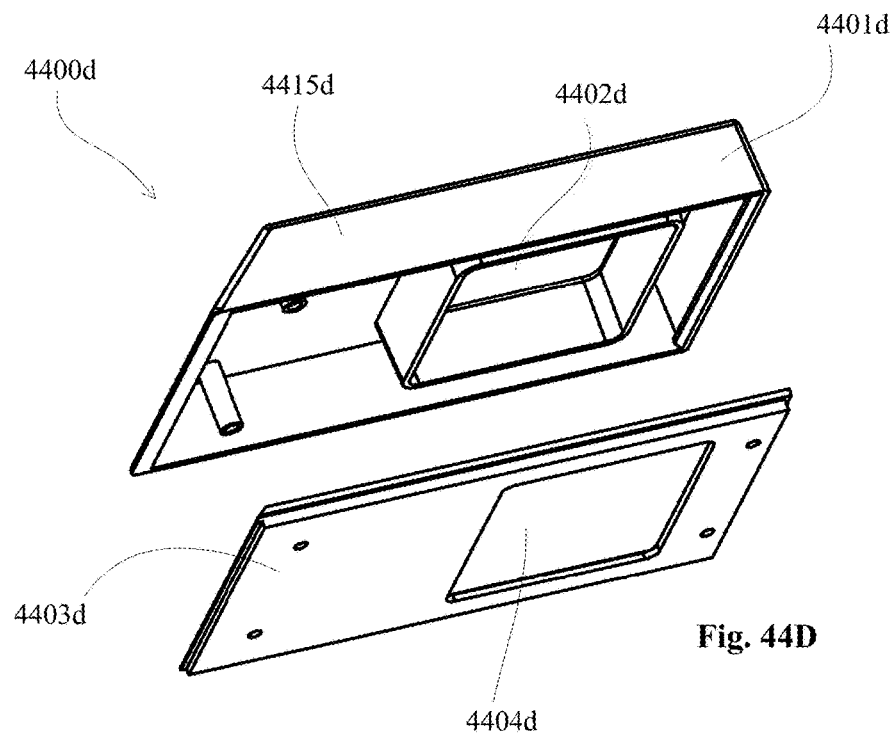

With reference to FIGS. 44C and 44D, a user interface 4400c, d may include a top surface 4405c, d, a first set of user controls/displays 4410c, d, a second set of user controls/displays 4415c, d and/or a third set of user controls/displays 4420c. While not shown in FIG. 44C or 44D, any given user interface 4400c, d may include a fourth set of user controls/displays on a second side and/or a fifth set of user controls/displays on a top side. The user interface 4400c, d may be similar to, for example, the first user interface/display 4315a,b of FIGS. 43A and 43B or either of the user interfaces 4400a, b of FIGS. 44A and 44B, respectively. The user interface 4400c, d may include a top half 4401d having, for example, a square (or rectangular) shaped opening 4406c, 4402d, and a bottom half 4403d having, for example, a square (or rectangular) shaped opening 4404d. The opening 4406c, 4402d, 4404d may be, for example, configured to receive a ball and socket (or knuckle) (e.g., ball and socket (or knuckle) 2935a of FIG. 29A). Alternatively, the opening 4406c, 4402d, 4404d may be configured to receive a cup holder, a display, a user interface, etc.

In addition to a chair reorientation control, a user interface 4400a-d may include a chair heater control, a chair massage unit control, a chair lighting control, a venue lighting control, and/or a chair electric power management control. A user interface 4400a-d may be, for example, communicatively coupled to a powered reclining chair site and/or a venue operations center (e.g., a powered reclining chair site 160, a venue operations center 105, etc. of FIG. 1) and may automatically control electric power usage. For example, a user interface 4400a-d and/or a powered reclining chair site 160 may be configured to automatically turn off and/or limit electric power to at least one chair accessory (e.g., a chair heater, a chair cooling unit, a chair massage unit, a lighting unit, a chair electric power outlet, a chair USB port, etc.) when an associated chair, that is electrically connected to a common electric power supply, is being reoriented (i.e., when electric power is being applied to a chair actuator).

A processor of a user interface 4400a-d may receive movie play data (e.g., movie queue data) from a processor (e.g., processor 167 of FIG. 1) of a powered reclining chair site 160, and the processor of the user interface 4400a-d may automatically control electric power usage of a chair accessory based upon the movie play data. For example, the processor of the user interface 4400a-d may automatically turn off a chair accessory (e.g., a chair heater, a chair cooling unit, a chair massage unit, a chair electric power outlet, a chair USB port, etc.) based upon the movie play data (e.g., when no movie is playing). Alternatively, or additionally, the processor of the user interface 4400a-d may automatically turn on a chair accessory (e.g., a chair lighting unit, a chair information display, etc.) based upon the movie play data (e.g., when no movie is playing).

The processor 167 may automatically control a chair accessory (e.g., a chair heater, a chair cooling unit, a chair massage unit, a lighting unit, a chair electric power outlet, a chair USB port, etc.) and/or a chair actuator based on movie play data. For example, the processor 167 may automatically turn off, or limit electric power, to a chair accessory when a venue cleaning system is activated (i.e., when a group of powered recliner chairs are being reoriented via a remote control). Additionally, or alternatively, the processor 167 may automatically supply electric power to a chair accessory from an alternative electric power source (e.g., a solar panel, a battery, a capacitor, etc.) when a powered recliner chair or group of powered recliner chairs is/are being reoriented. Thereby, the processor 167 (or a processor of a user interface 4400a-d) may automatically control an electrical power demand and/or an electric power supply.

The processor 167 may control electric power usage on a macro level based upon, for example, movie play data, and any given user interface 4400a-d may control electric power usage on a micro level. For example, a processor 167 may enable operation of a chair accessory based upon the movie play data and a processor of a given user interface 4400a-d may automatically control electric power usage of the chair accessories based upon, for example, whether an occupant of the respective chair is activating an associated chair actuator. As a specific example, a chair actuator may draw approximately 0.8 Amperes at $110V_{ac}$ (approximately 88 Watts) when the chair actuator is energized and a chair heater may draw approximately 200-400 Watts when the chair heater is activated. By disabling the chair heater while the actuator is energized, the processor of the user interface 4400a-d may limit overall electric power consumption to the maximum usage of any given chair accessory or chair actuator. Alternatively, or additionally, the processor of the user interface 4400a-d may vary electric power to any given chair accessory based upon which other chair accessories and/or chair actuator(s) are being activated.

In any event, the processor of the user interface 4400a-d may automatically draw electric power from an alternative electric energy source (e.g., a solar panel, a generator, a battery, a capacitor, an uninterruptable power supply, etc.) based upon which chair accessories and/or chair actuator(s) are being operated. For example, the processor of the user interface 4400a-d may automatically turn on/off a chair heater and/or chair cooling unit cyclically, such that a chair occupant does not feel any change in temperature, when a chair actuator is energized.

Figure 45:
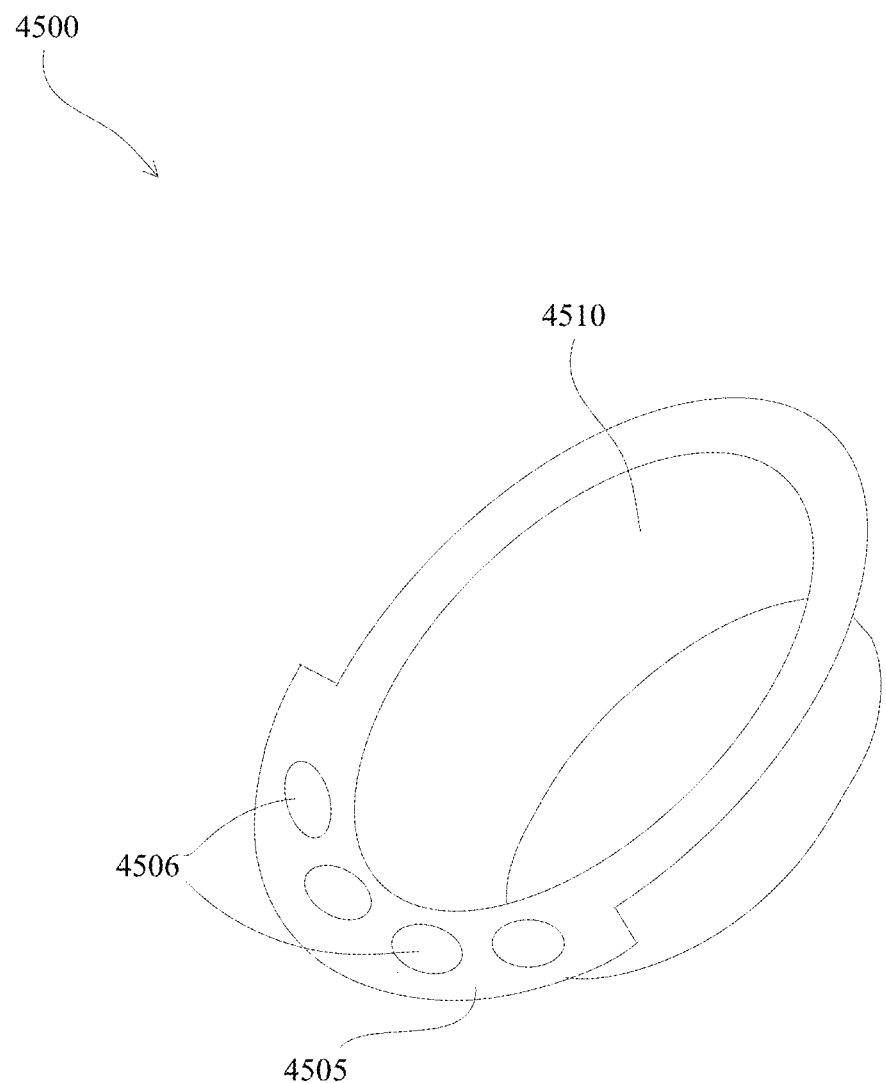
FIG. 45 depicts an example cup holder having a user interface for use with powered recliner chairs.
Figure 46A:
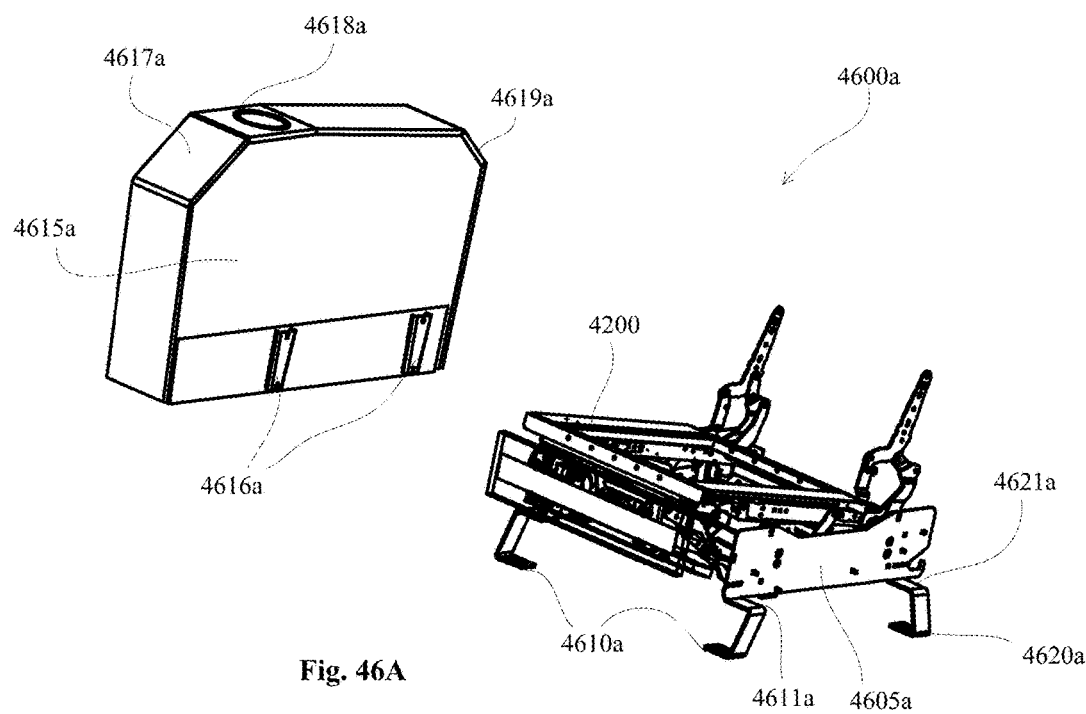
FIGS. 46A-D depict various views of an example assembly for use with powered recliner chairs.
Figure 46B:
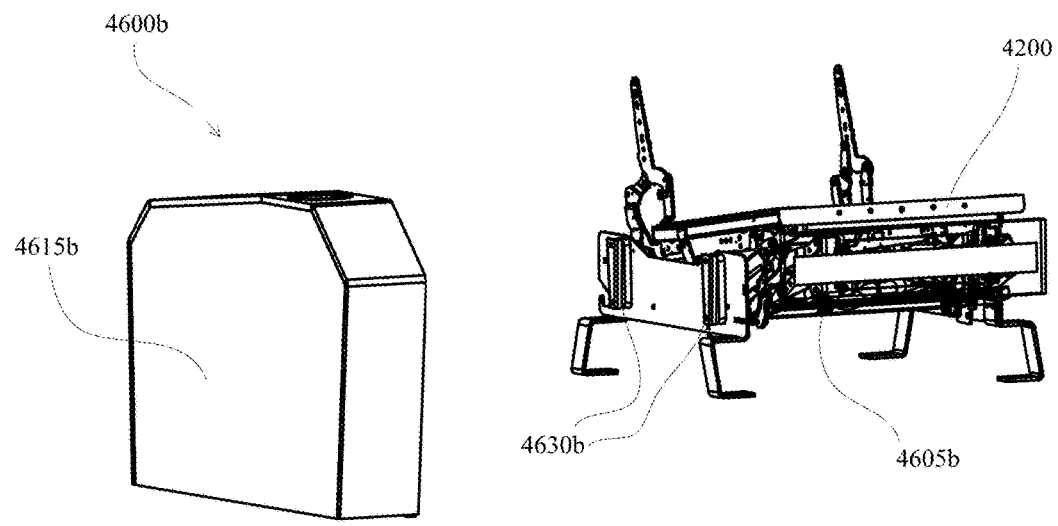
Figure 46C:
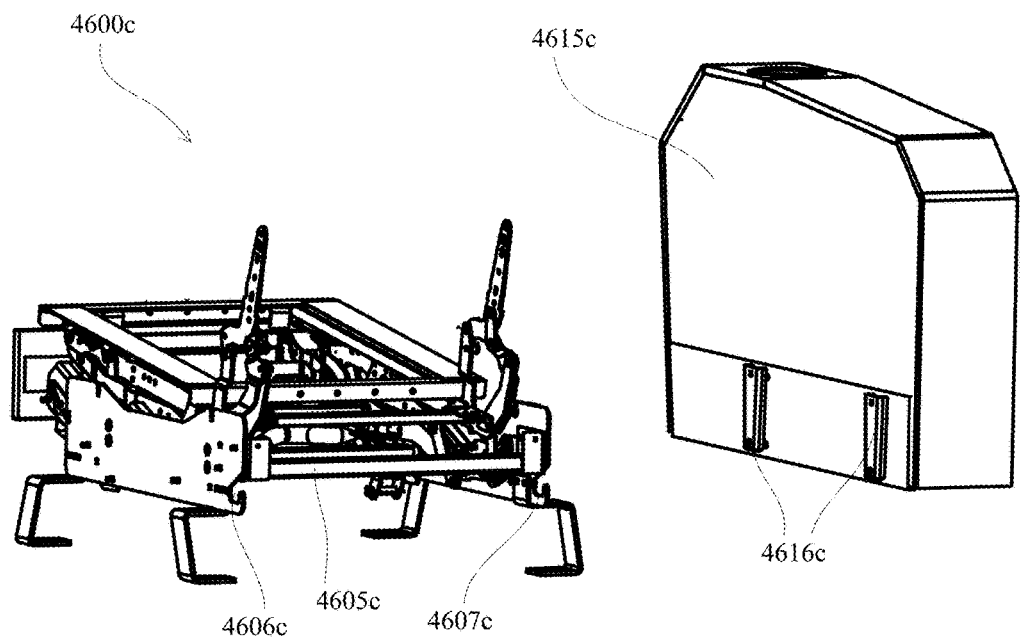
Figure 46D:
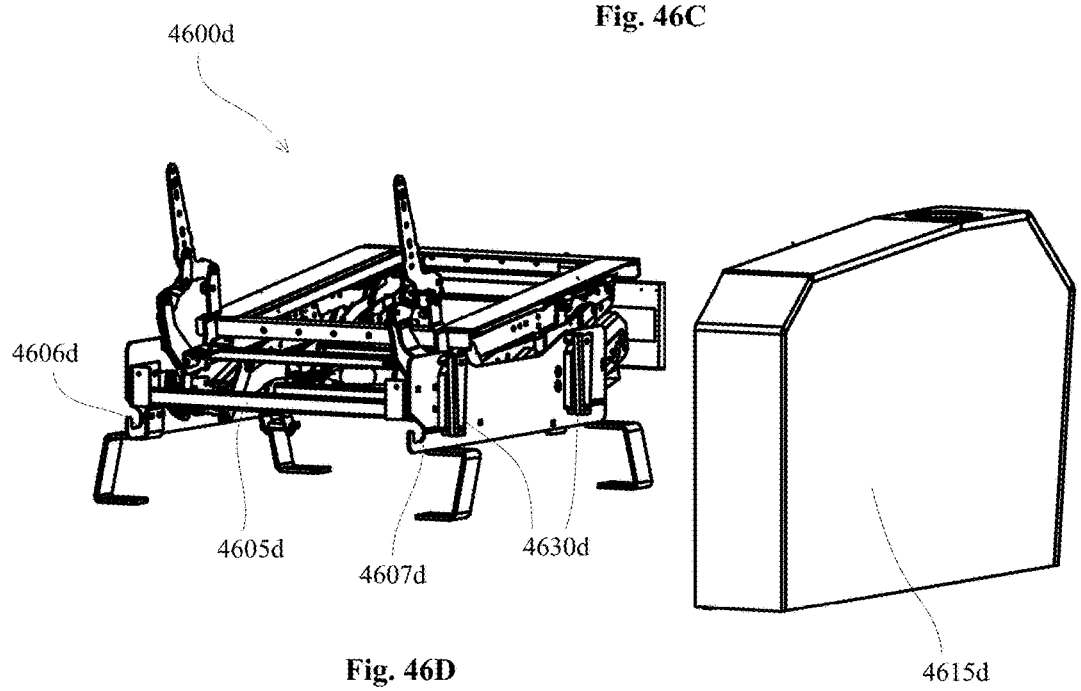
Figure 48A:
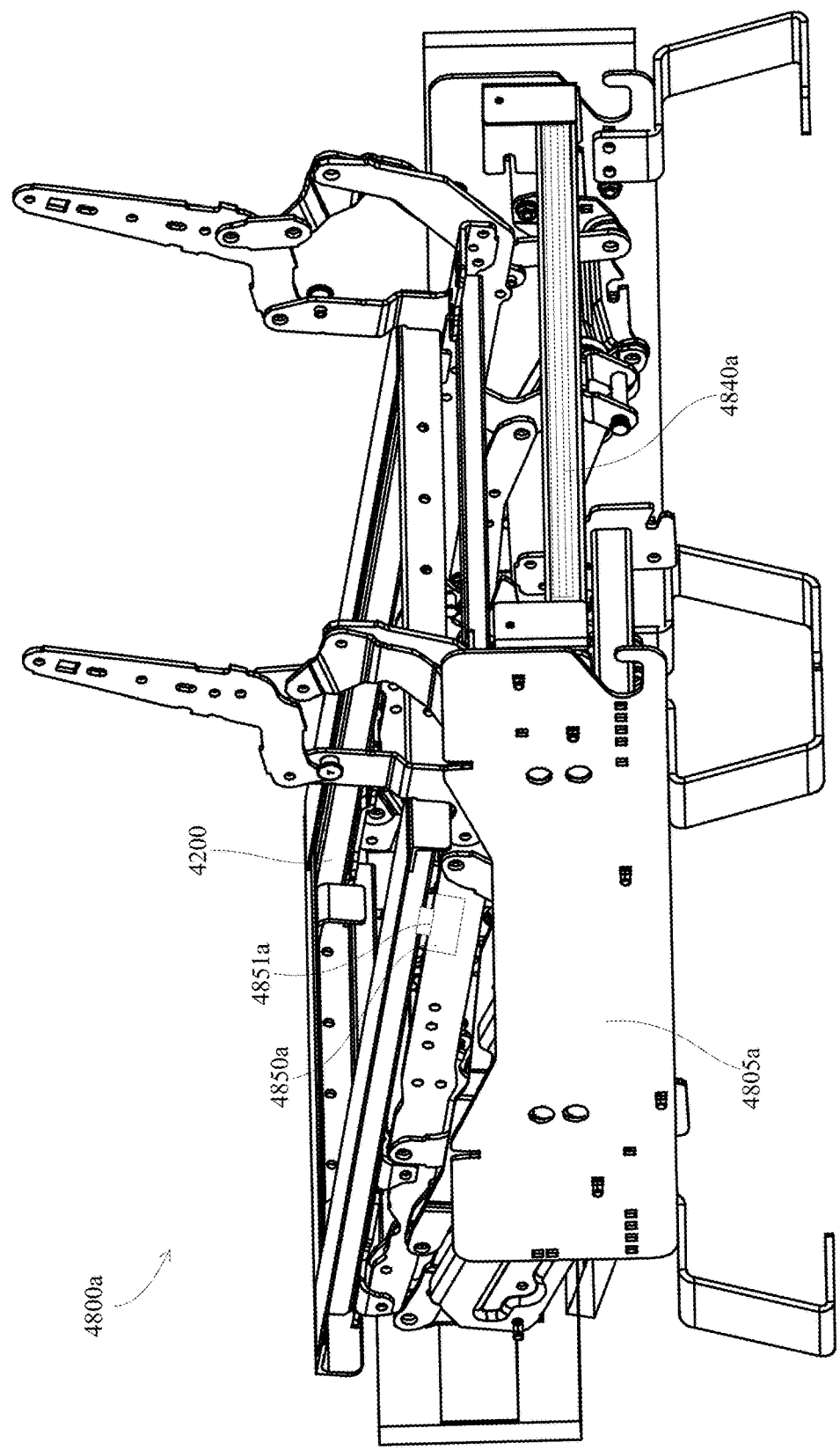
FIGS. 48A-H, J and K depict various views of example recliner mechanism structure electrical components.
Figures 48B, 48C:
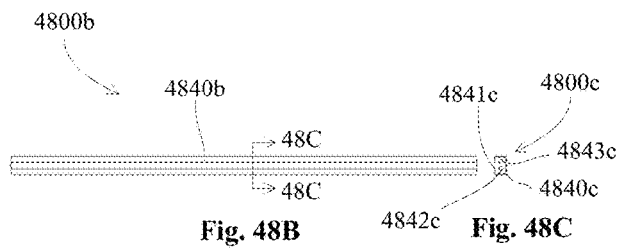
Figures 48D, 48E, 48F:
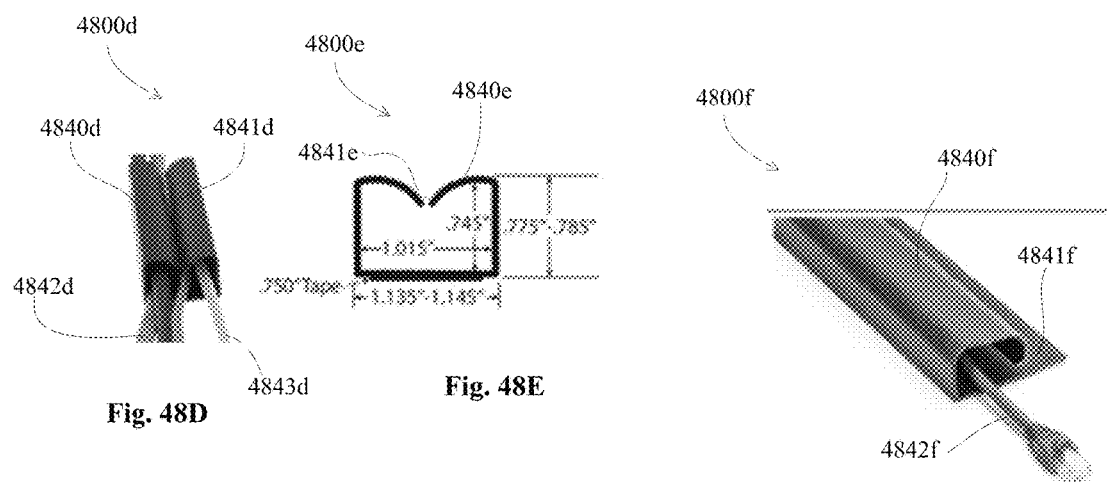
Figure 48G:
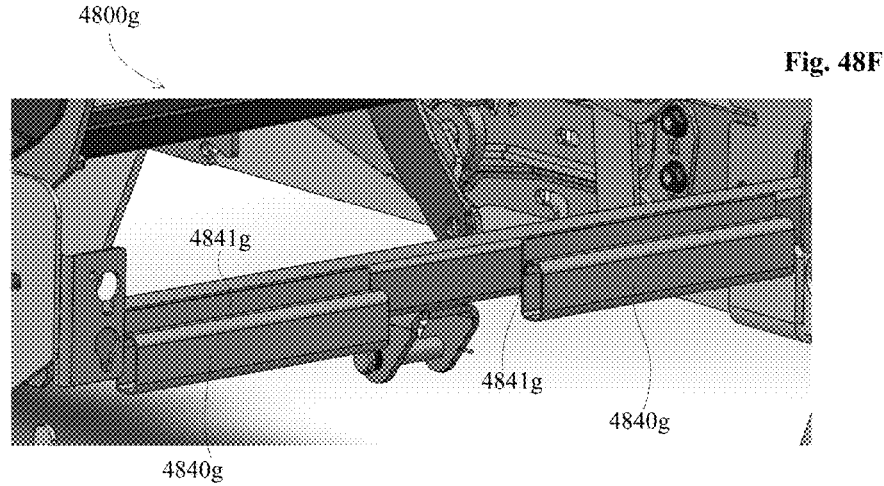
Figure 48H:
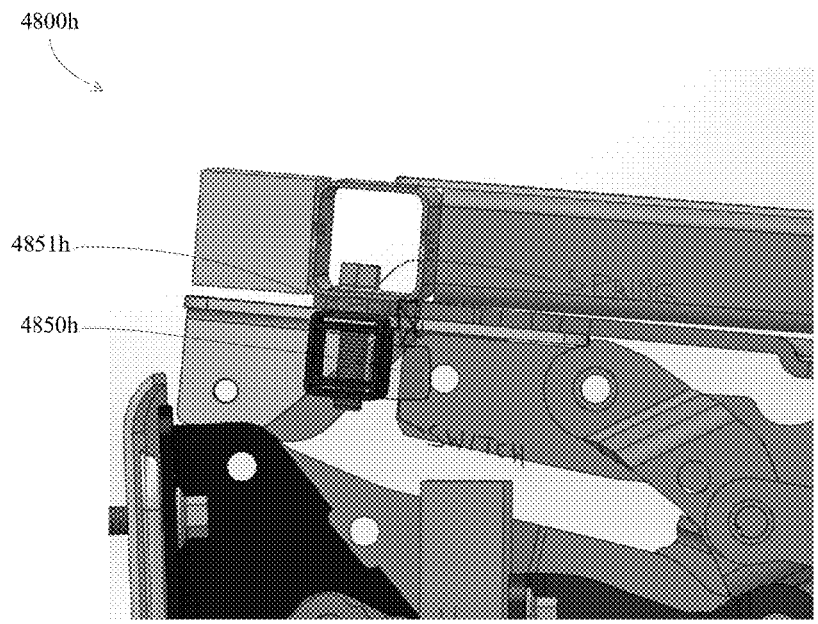
Figure 48J:
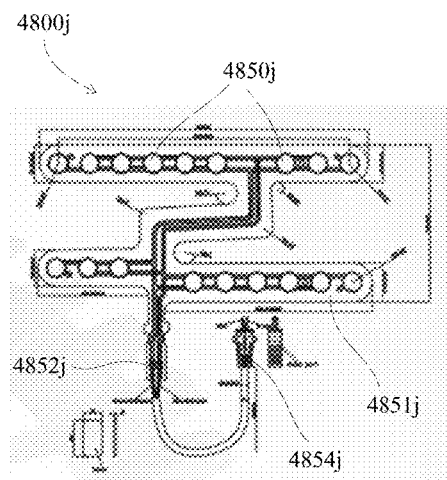
Figure 48K:
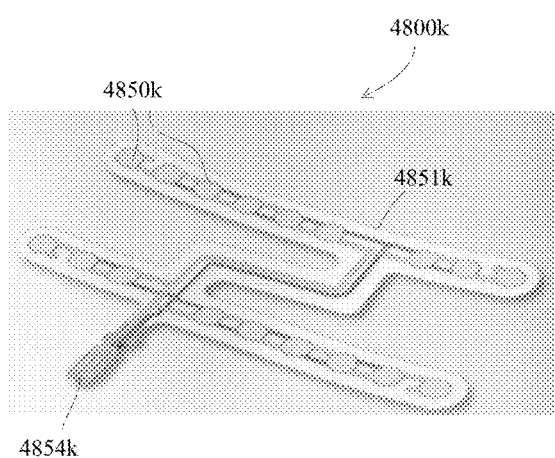
Figures 49A, 49B:
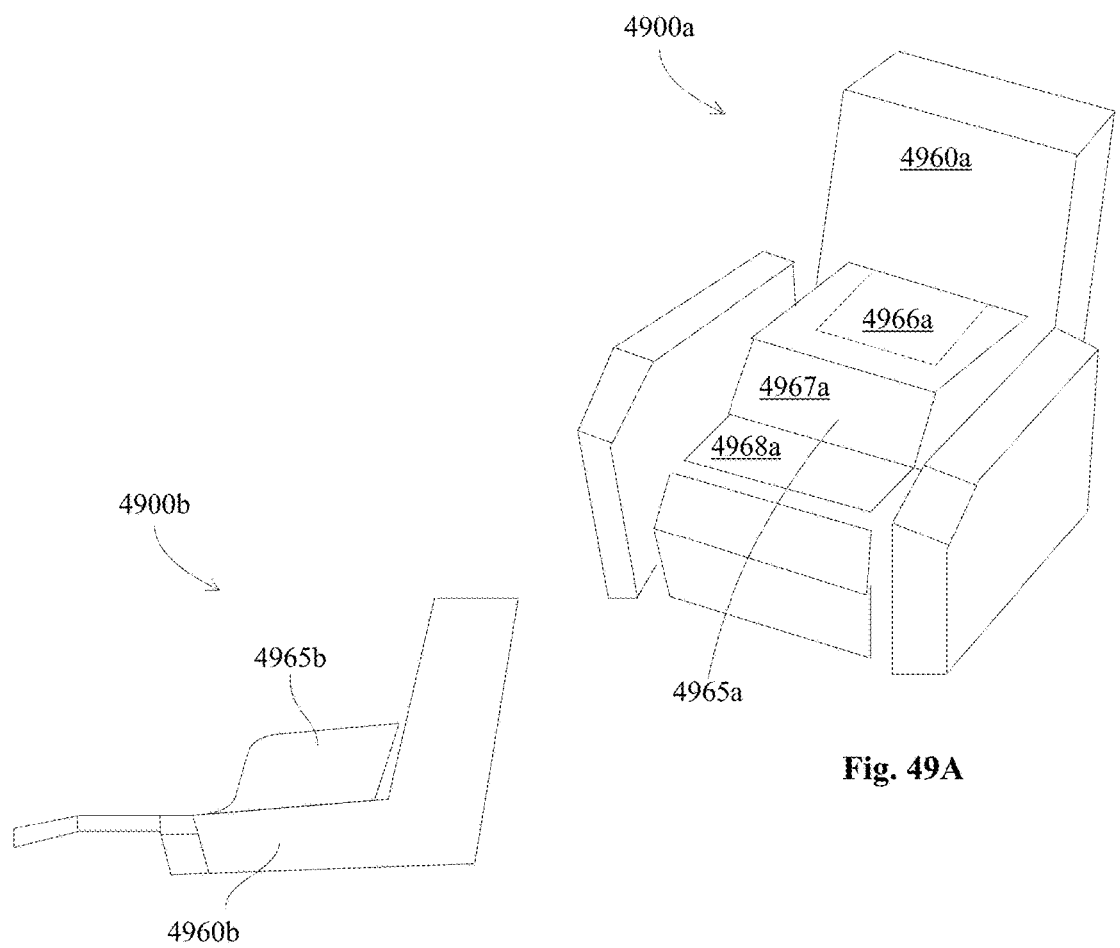
FIGS. 49A-D depict various views of example booster seats and related components.
Figure 49C:
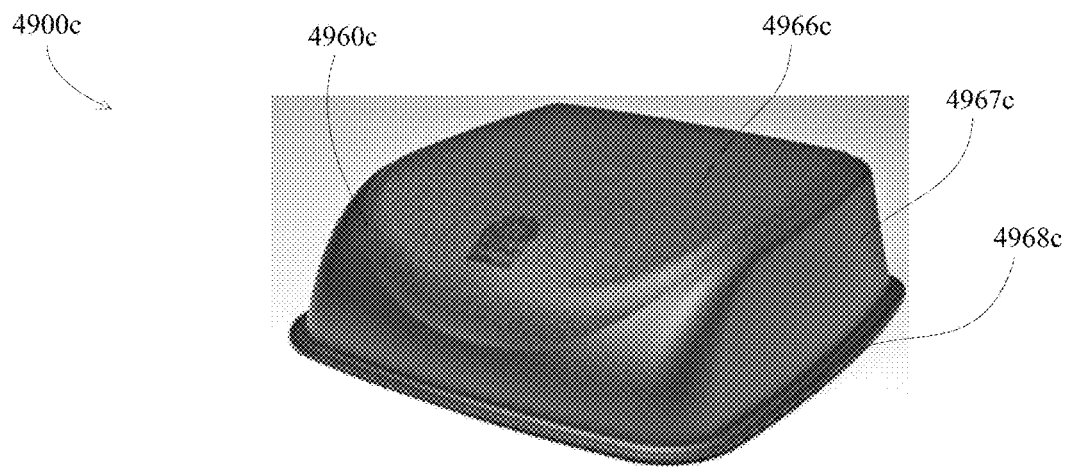
Figure 49D:
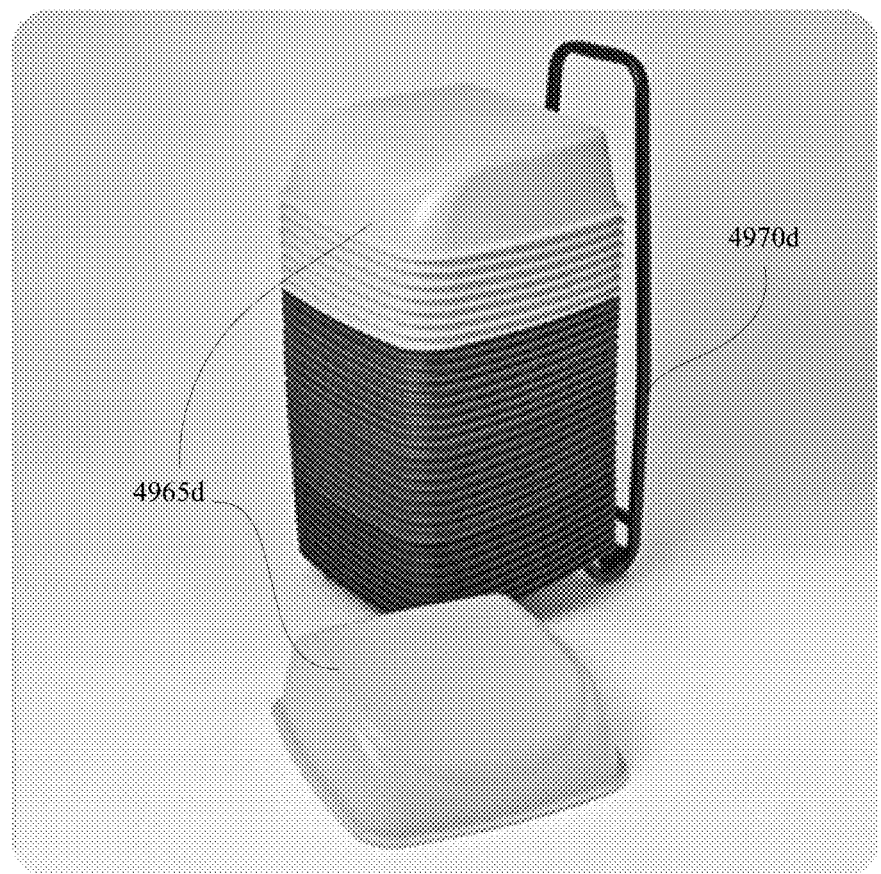

Turning to FIG. 45, a cup holder assembly 4500 may include a light source 4510, and a flange 4505 having a user interface 4506. The cup holder 4500 may include a plurality of light sources configured to illuminate an inside portion of the cup holder 4510 and/or respective display features. Any given light source may be manually or automatically controlled. For example, any given light source may be automatically controlled (e.g., dimmed, brightened, turned on, turned off, etc.) based on a venue event, a predetermined time, a motion sensor, etc. The user interface 4506 may include manual controls for the light sources, chair recline/upright controls, a chair heater control, a chair massage control, etc.

With reference to FIGS. 46A-D, an assembly 4600a-d may include a recliner mechanism structure (RMS) 4605a-d and at least one arm box 4615a-d. While only one arm box 4615a-d is shown in FIGS. 46A-D, an assembly 4600a-d may include two arm boxes (i.e., one on either side of the RMS 4605*a-d*. A row of powered recliner chairs may include a plurality of assemblies 4600*a-d*. In any event, an RMSs may be secured to an associated venue floor via, for example, a pair of front mounting feet 4610*a* and a pair of rear mounting feet 4620*a*. An arm box 4615*a-d* may include a first user interface/display 4617*a*, a second user interface display 4618*a*, and/or a third user interface/display 4619*a*. Any one of the user interfaces/displays 4617*a*, 4618*a*, 4619*a* may be similar to, for example, a user interface/display 4400*a, b* of FIG. 44A or 44B. Any given front mounting foot 4610*a* may include a front arm box rest 4611*a* and any given rear mounting foot 4620*a* may include a rear arm box rest 4621*a*. An RMS may include a movable/removable chair seat frame 2400 similar to, for example, movable/removable chair seat frame 4200 of FIGS. 4200*a-d*.

A chair recliner mechanism structure 4605*a-d* and/or an arm box 4615*a-d* may include power cord rack features 4606*c, d*, 4607*c, d* configured to receive a power inlet connection (e.g., power inlet connection 4130*a-d* of FIG. 41A-D) or a power outlet connection (e.g., power outlet connection 4135*a-d* of FIGS. 41A-D) from a backside or a respective chair and retain the power inlet connection 4130*a-d* and/or the power outlet connection 4135*a-d* up off an associated floor surface. The power cord rack features 4606*c, d*, 4607*c, d* may be, for example, hook shape features that allow installation of the power inlet connection 4130*a-d* and/or the power outlet connection 4135*a-d*, and/or the arm boxes 4615*a-d* without unplugging the power inlet connection 4130*a-d* and/or the power outlet connection 4135*a-d* from an associated power junction box (e.g., power junction box 4125*a-d* of FIGS. 41A-D). In fact, a series of power inlet connections 4130*a-d* and/or power outlet connections 4135*a-d* may be plugged into respective power junction boxes 4125*a-d* while laying, for example, on a floor behind a row of associated chairs, and subsequently the series of power inlet connections 4130*a-d* and/or power outlet connections 4135*a-d*, along with respective power junction boxes 4125*a-d*, may be set in place with the associated chair recliner mechanism structures 4605*a-d* and/or arm boxes 4615*a-d* set in place.

An arm box 4615*a-d* may include a pair of mounting brackets 4616*a, c* and an associated RMS may include a mating pair of mounting brackets 4630*b, d* configured to secure the arm box proximate the RMS. As shown in FIGS. 46A-D, the arm box may, for example, be slid downward between two adjacent RMSs subsequent to the RMSs being secured to an associated venue floor (i.e., each RMS may include a pair of mating mounting brackets and both sides of the arm box may include a pair of mounting brackets). Alternatively, or additionally, any given arm box may include at least one bracket (e.g., a hook shaped bracket and/or a tab) configured to engage, for example, a respective front arm box rest 4611*a* or a respective rear arm box rest 4621*a*. An arm box may be configured to slide into place from a front side or rear side between, for example, two proximate RMSs. Any given mounting bracket/mating mounting bracket, arm box rest/hook shaped bracket may be wedge shaped, snap fit, secured via a fastener (e.g., a pin, a screw, an interlock, etc.), and may be configured to increase a structural rigidity of a cooperating structure.

Any given mounting foot 4610*a*, 4620*a* may be secured to an associated RMS via, for example, two fasteners. When packaging an RMS for shipment from a RMS assembly site to an associated venue, one of each pair of fasteners may be removed or loosened, and the respective mounting feet 4610*a*, 4620*a* may be swiveled upward such that the mounting feet are above a lower most portion of the RMS, thereby, reducing associated package size and/or reducing mounting foot exposure to bending/damage. The mounting feet 4610*a*, 4620*a* may be pivotally attached to a respective RMS via, for example, a hinge, and the mounting feet 4610*a*, 4620*a* may simply be pivoted from a shipping orientation to an installation orientation. Any given mounting bracket/mating mounting bracket, arm box rest/hook shaped bracket may be configured to reduce shipping package size, reduce installation time/complexity, facilitate arm box installation/removal/replacement, increase structural strength/rigidity etc.

Any given RMS/arm box rests may be configured to accommodate various chair widths. For example, the arm box rests 4611*a*, 4621*a* may be of sufficient dimension to allow a respective chair seat to extend beyond sides of an RMS and still an arm box will rest on the arm box rests 4611*a*, 4621*a*. Alternatively, a width of any given RMS may be specifically matched to a respective chair width.

Any given RMS may include a mechanism (e.g., a cable between an ottoman and an actuator, an actuator extend hard stop, an actuator rotation hard stop, a gas-charged piston and actuator) to control movement of a chair back relative to movement of a chair foot rest (or ottoman). For example, when a chair is occupied the mechanism may cause the chair back to move further relative to the foot rest compare to when the chair is being operated to, for example, clean an associated venue. Thereby, the chair may comply with fire codes while facilitating venue cleaning. Any given RMS that includes mechanism to control movement of a chair back relative to movement of a chair foot rest (or ottoman) may also include a feature (e.g., a solenoid, a spring, etc.) to override the mechanism. Thereby, a respective chair may comply with fire codes while facilitating venue cleaning.

Alternatively, or additionally, a RMS may include a mechanism (e.g., a cable between an ottoman and an actuator, an actuator extend hard stop, an actuator rotation hard stop, a gas-charged piston and actuator, etc.) to control movement of a chair ottoman. For example, the chair ottoman may be limited in travel while chair back movement remains unrestricted. The chair ottoman movement limiting mechanism may include springs, dampers or other devices that may reduce a peak loading of controlling movement of an associated powered recliner chair and/or movement of components of the chair compared to powered recliner chairs that do not include an ottoman movement limiting mechanism.

With reference to FIGS. 47A-E, a mounting foot 4700*a-e* may include an RMS attachment 4701*a-c*, an arm box rest 4702*a-c*, a chair elevation 4703*a-c*, and a floor attachment 4704*a-c*. Any given mounting feet 4700*a-e* may be configured to facilitate adjustment of an angle of a respective chair relative to a floor angle. For example, a chair may be leveled via adjustment of a pair of front mounting feet 4610*a* and a pair of rear mounting feet 4620*a*.

Turning to FIGS. 48A-H, J and K, a recliner mechanism structure assembly 4800*a-h, j, k* may include a chair seat frame 4200 movably supported by a recliner mechanism structure 4805*a*, an electrical wire support 4840*a-g*, and an occupant sensor 4850*a, h, j, k*. An electrical wire support 4840*a-g* may include a longitudinally extending slot 4841*c-g* for receiving at least one power and/or data conductor 4842*c, d*, 4843*c, d, f*. A plurality of electrical wire supports 4840*a-g* may be configured such that associated power and/or data conductors 4842*c, d*, 4843*c, d, f* may be, for example, laid out on a floor of a venue, behind a row of powered recliner chairs, and subsequently inserted within the electrical wire supports 4840*a-g*.

An occupant sensor 4850*a, h, j, k* may include a spring 4851*a, h* and/or a spring material 4851*j, k* configured to, for example, move a portion of an associated chair (e.g., a chair seat support 4200) such that an associated occupant sensor 4850*a, h, j, k* will indicate that an occupant has exited an associated chair. An occupant sensor 4850*j, k* may include a timer 4852*j* and a plug connection 4854*j, k*. The timer 4852*j* may be configured within an associated chair electrical system to, for example, prevent momentary activation of an associated occupant sensor 4850*a, h, j, k* (i.e., the occupant sensor 4850*a, h, j, k* may be activated for a predetermined time prior to indicating that a chair is occupied).

An occupant sensor may be incorporated into a smart control module (SCM) in lieu of pressure sensors. For example, an optical beam paired with beam/receiver module may be included. The beam could originate in one chair SCM and go across a seat width. Thereby, an occupant, in an associated chair, would break the beam indicating that the occupant is present.

With reference to FIGS. 49A-D depict various views of example booster seat assemblies and related components 4900*a-d*. As one example, a booster seat 4965*a, b* may be designed for use with powered recliner chairs 4960*a, b* in theaters, arenas and auditoriums, a contoured, pillow-top seating surface 4966*a*, 4967*a*, 4968*a* may provide a comfortable movie watching experience. A large seating surface 4966*a*, 4966*c* may accommodate a variety of human body sizes. The booster seat 4965*a* may include an elongated foot rest portion 4968*a* that may, for example, cover an associated portion of a chair 4960*a, b*. A booster seat 4965*a, b* may include a padded setting portion.

A booster seat 4965*a-d* may include at least one cup holder and/or snack tray portion. A booster seat 4965*a-d* may include an angled back to conform to a powered recliner chair back when in a partially reclined orientation. A booster seat 4965*a-d* may define an advertising and/or souvenir that may be sold to a patron. A booster seat 4965*a-d* may include a strap and/or hook to secure the booster seat to an associated chair 4960*a*, 4960*b*. A booster seat 4965*a-d* may include padding and/or foam to at least partially fill spaces between the booster seat and an associated chair. A booster seat 4965*a-d* may include at least one pouch for retaining advertising and/or promotional materials related to an associated venue. A booster seat 4965*c* may include molded-in resistance ribs 4968*c* may provide stability by gripping a seating surface without damaging the seat 4960*a, b*.

A booster seat 4965*a-d* may, for example, be constructed of a seamless, molded, plastic with rounded corners. A booster seat set 4900*d* may include, for example, thirty-six booster seats 4965*a-d* and rolling cart 4970*d* for easy transportation and storage. Individual booster seat 4965*a-d* dimensions may be, for example, 16" D×16 1/2" W×5" H (406×419×127 mm). A booster seat stand (or rolling cart) 4970*d* may hold, for example, thirty-six individual booster seats 4965*a-d*. Alternatively, a booster seat stand (or rolling cart) 4970*d* may hold any number of individual booster seats 4965*a-d*. A booster seat stand (or rolling cart) 4970*d* may be, for example, 18 1/2" D×16 1/2 W×32 1/2" H (470×419×826 mm), and include a hipping weight of, for example, 70 lbs. Alternatively, a booster seat stand (or rolling cart) 4970*d* may include any dimensions and weight depending on available space and a number of booster seats 4965*a-d* desired.

Turning to FIGS. 50A-F, a display assembly 5000*a-f* may include an information plate 5015*a, c, e, g* removably secured within a receptacle 5006*b, d* of an associated chair assembly (e.g., a chair bottom 5005*a*) such that, for example, when an associated chair seat is in an unoccupied orientation (i.e., tilted up), the information plate is visible (e.g., oriented as illustrated in FIG. 50A). The chair bottom 5005*a* may be secured to an associated chair via fasteners 5007*a, d*, 5008*a, d*. Any given fastener 5007*a, d*, 5008*a, d* may be hidden from view behind an information plate 5007*a, d*, 5008*a, d*.

An information plate 5015*a, c, e, g* may be placed in a receptacle 5006*b, d* by, for example flexing the information plate 5015*a, c, e, g* and inserting the tabs 5017*c, g*, 5018*c, g* into a respective hole 5011*b, f*, 5012*b, f* and then releasing the information plate 5015*a, c, e, g* such that the information plate 5015*a, c, e, g* snaps behind retention features 5009*b*, 5010*b*. Thereby, no tools are required to install an information plate 5015*a, c, e, g*. An information plate 5015*a, c, e, g* may be removed by, for example, inserting a pin (or the like) into either, or both of the reside removal holes 5013*f*, 5014*f*. Alternatively, or additionally, an information plate 5015*a, c, e, g* may be removed from a receptacle 5006*b, d* by prying the information plate 5015*a, c, e, g* from a front side.

An information plate 5015*a, c, e, g* may include, for example, a chair number 5016*c* and/or a row number. Alternatively, or additionally, the information plate 5015*a, c, e, g* may include any other information, such as, a chair manufacture logo, a venue name or logo, promotional information, information as to whether a ticket has been purchased for the associated chair, a chair "owner's" information, sponsor information, advertising information, etc. An information plate 5015*a, c, e, g*/receptacle 5006*b, d* may be configured to define a display (e.g., display 3700*a-d* of FIGS. 37A-D, display 4300*a, b* of FIGS. 43A and B, display 4400*a, d* of FIGS. 44A and B, or display 4500 of FIG. 45). An information plate 5015*a, c, e, g*/receptacle 5006*b, d* may further include at least one sensor component (e.g., an occupancy sensor, an occupant pinch-point sensor, a chair location sensor, etc.). An information plate 5015*a, c, e, g* may be an etched piece of plastic with paint in the etched portion, a piece of plastic with a colored surface laser etched, a thin piece of metal with an etched portion painted, a thin piece of metal with a colored surface laser etched, etc.

A receptacle 5006*b, d* may be formed within an associated chair assembly (e.g., a chair bottom 5005*a*) via an associated mold. Alternatively, or additionally, a receptacle 5006*b, d* may be formed within an associated chair assembly (e.g., a chair bottom 5005*a*) via machining process (e.g., a drill, a router, etc.).

With reference to FIGS. 51A-F, a display assembly 5100*a-f* may include an information plate 5115*b, d, f* removably secured within a receptacle of an associated chair assembly (e.g., a chair bottom pivot assembly 5130*a* attached to, for example, a chair standard 5135*a*) such that, for example, when an associated chair seat is in an unoccupied orientation (i.e., tilted up), the information plate is visible (e.g., oriented as illustrated in FIG. 51A).

An information plate 5115*b, d, f* may be placed in a receptacle 5106*b, d* by, for example flexing the information plate 5115*b, d, f* and inserting the tabs 5117*c, g*, 5118*c, g* into a respective hole 5111*b, f*, 5112*b, f* and then releasing the information plate 5115*b, d, f* such that the information plate 5115*b, d, f* snaps behind retention features 5109*b*, 5110*b*. Thereby, no tools are required to install an information plate 5115*b, d, f*. An information plate 5115*b, d, f* may be removed by, for example, inserting a pin (or the like) into either, or both of the reside removal holes 5113*e, f*, 5114*e, f*. Alternatively, or additionally, an information plate 5115*b, d, f* may be removed from a receptacle by prying the information plate 5115b, d, f from a front side.

An information plate 5115b, d, f may include, for example, a chair number 5116c and/or a row number. Alternatively, or additionally, the information plate 5115b, d, f may include any other information, such as, a chair manufacture logo, a venue name or logo, promotional information, information as to whether a ticket has been purchased for the associated chair, a chair "owner's" information, sponsor information, advertising information, etc. An information plate 5115b, d, f/receptacle 5106b, d may be configured to define a display (e.g., display 3700a-d of FIGS. 37A-D, display 4300a, b of FIGS. 43A and B, display 4400a, d of FIGS. 44A and B, or display 4500 of FIG. 45). An information plate 5015a, c, e, g/receptacle 5006b, d may further include at least one sensor component (e.g., an occupancy sensor, an occupant pinch-point sensor, a chair location sensor, etc.). An information plate 5115b, d, f may be an etched piece of plastic with paint in the etched portion, a piece of plastic with a colored surface laser etched, a thin piece of metal with an etched portion painted, a thin piece of metal with a colored surface laser etched, etc.

A receptacle 5106b, d may be formed within an associated chair assembly (e.g., a chair seat pivot assembly 5130a) via an associated mold. Alternatively, or additionally, a receptacle 5106b, d may be formed within an associated chair assembly (e.g., a chair seat pivot assembly 5130a) via machining process (e.g., a drill, a router, etc.).

A thickness of a display circuit board may include a Mylar graphic with, for example, a thickness up to 4 mm. Alternatively, a Mylar graphic a 3 mm thickness or 1-2 mm thick. A display may include an injection molded light housing including, for example, a length of 11 mm, or as short as 6 mm. See if 9 mm. An associated display printed circuit board may include a thickness of approximately 2 mm, with connection pins and components on a backside with a total thickness of, for example, 3 mm. The connection pins may be located away from critical areas, such as, a lower edge so the connection pins don not interfere with related structures.

A display 50a-f, 51a-f may be configured with an ambient light sensor to control light output of a display. For example, during pre-show or non-movie times theatre lights may be on such that a seat number can automatically increase intensity. This may reduce the need to program light control thru, for example, an associated control network. Thus, a seat number may be bright when needed and dim when it gets dark during a show. Notably, bright seat lights, during bright sections of the show, may be desirable. A display 50a-f, 51a-f may be configured as a "side display" oriented toward an associated chair. A side display may be located on both sides of, for example, a shared center armrest.

An occupant sensor may be incorporated within an associated display to detect if the chair is occupied. A sensor may be included within a display to indicate when an associated power recliner chair is reclined and/or extended. For example, symbols may be included within a display to indicate whether an associated chair is oriented in a reclined and/or non-reclined orientation. A display may include, for example, recline preset positions 1, 2, 3 and 4. A display may include an auto close button, an order call button, an emergency call button A chair may include features such as a massage feature, a vibration feature, a volume control for internal speakers, a USB or power port, a communications port, etc. A side display may be included and may be oriented toward a wall, an aisle, or another chair with its own controls. A display 50a-f, 51a-f may include aisle lights, a row number/letter, an adults with disabilities (ADA) designation, an indicator when associated chairs are in a venue cleaning mode, a call light indicator for a patron/chair needing service in that row, etc.

A remote control may, for example, include fifteen individual buttons: 1 extend, 2 retract, 3 retract all the way home, 4 go to ¼ open, 5 go to ½ open, 6 go to full extend, 7 under seat lights on/off, 8 isle light on/off, 9 all lights on/off, 13 calibrate, and 14 set full extend position. After calibration a full extend soft stop may be set such that movement of an associated chairs does not ram into a hard stop. ¼ and ½ open may be set from an associated hard stop. A chair may be manually move to a desired position and a button may be pushed to set the desired position. Subsequently, the associated seat will not extend further than the set position using the extend on the seat switch (activation of a remote may still go all the way).

An uninterruptible power supply (UPS) may be incorporated into, for example, a chair arm box such that the assembly may be delivered to a venue pre-assembled. Feedback from a chair, or group of chairs, may be provided to a central venue system to indicate chair occupancy, chair overcurrent conditions, UPS status/health, chair orientation status, etc. A chair actuator current may be determined based on pulse width of an applied electrical signal. A power supply may supply power to a group of four, or more chairs. A position sensor (e.g., a global positioning sensor) may be included in a chair such that, for example, a venue system may automatically determine a physical location of the given chair within the venue and/or one chair may determine a relative location of another chair. At least one energy storage device may be connected to, for example, an output of an electric power supply, or may be incorporated within an uninterruptible power supply connected to an input of the electric power supply. The at least one energy storage device may include at least one of: a battery or a capacitor. The electric power supply and the at least one energy storage device may provide electric power to, for example, electric motors of respective actuators.

With reference to FIGS. 52A-C, an example mounting foot 5205a-c for use in a powered recliner chair assembly 5200a-c may include a long portion 5206a-c and a short portion 5208a-c. The long portion 5206a-c may be connected to the short portion 5208a-c at, for example, a ninety degree angle. The long portion 5206a-c may include first slotted holes 5207a-c. The short portion 5208a-c may include second slotted holes 5209a-c.

When a mounting foot engagement pin 5211a of an associated powered recliner chair assembly 5200a-c is received within a first slotted hole 5207a-c, a respective portion 5210a of the powered recliner chair assembly 5200a-c is farther from an associated chair support surface than when the engagement pin 5211a of the associated powered recliner chair assembly 5200a-c is received within a second slotted hole 5209a-c. Thereby, a height of the associated powered recliner chair assembly 5200a-c may be changed by reorienting associated mounting feet 5205a-c. For example, a powered recliner chair assembly 5200a-c may be levelly installed on a sloped chair support surface by orienting two front mounting feet 5205a-c with associated chair front engagement pins 5211a received within a respective first slotted hole 5206a-c and associated chair rear engagement pins 5211a received within a respective second slotted hole 5209a-c.

Turning to FIGS. 53A-E, a chair assembly 5300a-e may include a chair standard 5305a-d with mounting feet 5307a-e and folding tray assembly attachment plate brackets

Figure 53A:
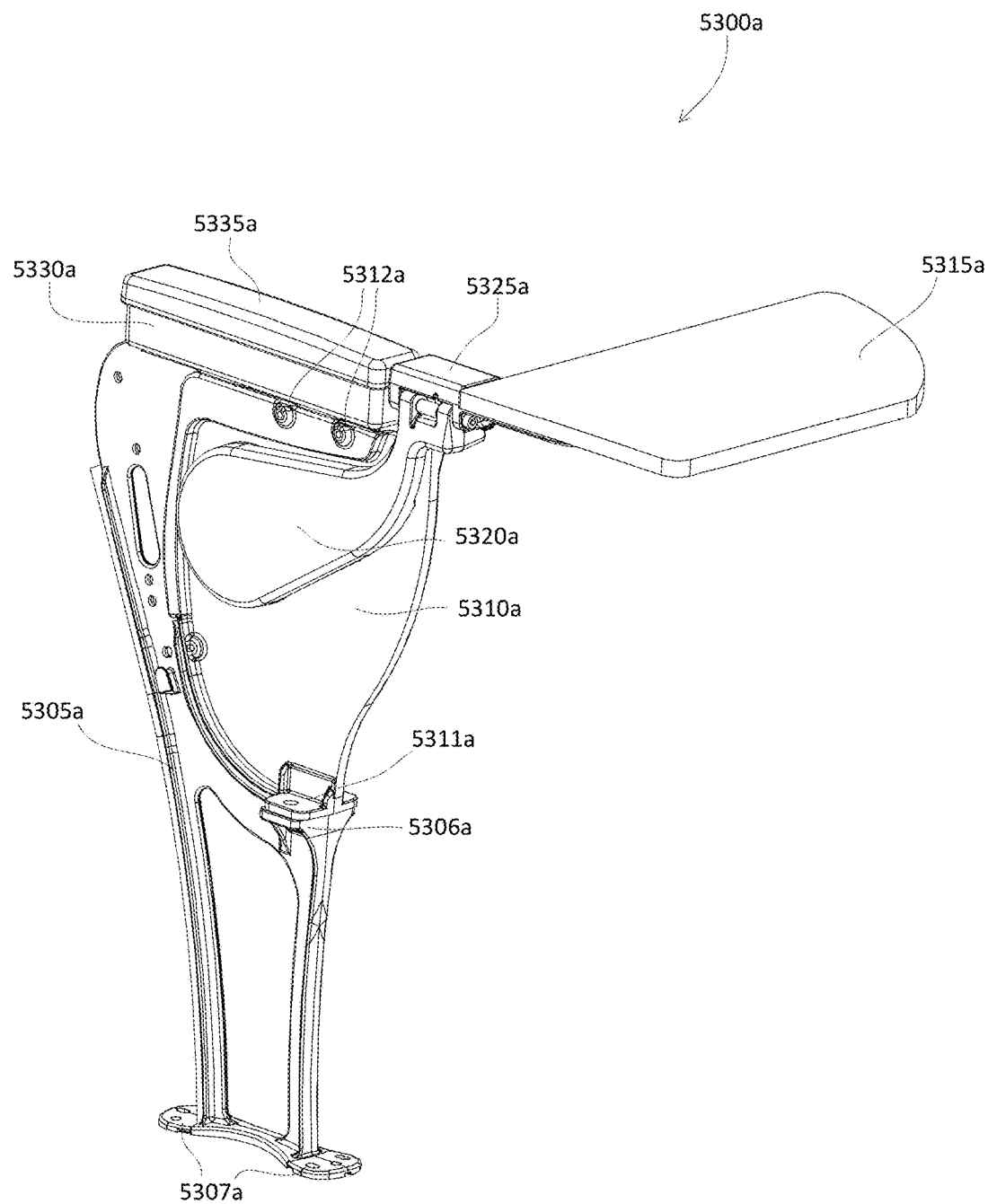
FIGS. 53A-E depict various views of an example foldable tray assembly for use within various rocker style chair assemblies, beam mounted chair assemblies and/or power recliner chair assemblies.
Figure 53B:
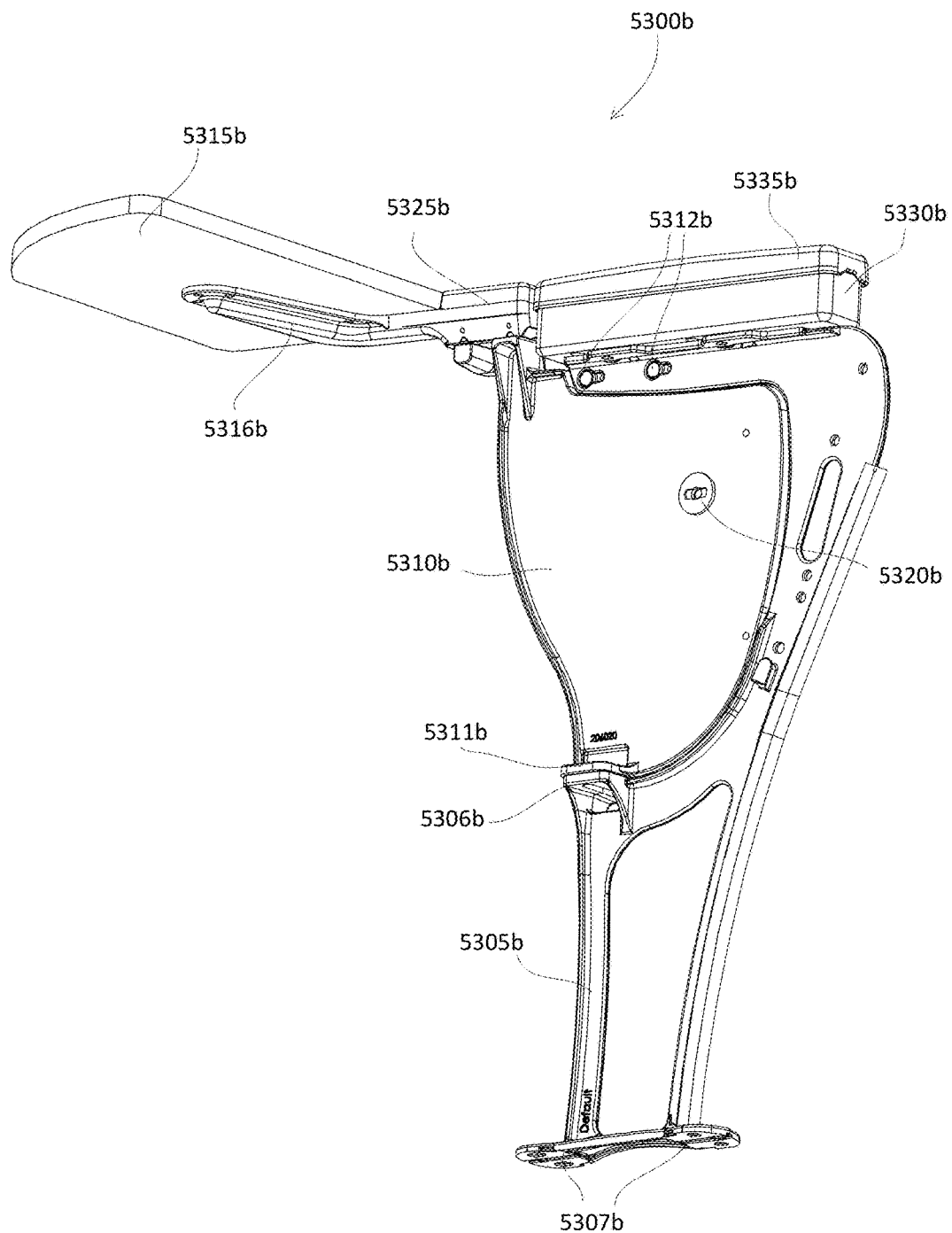
Figure 54A:
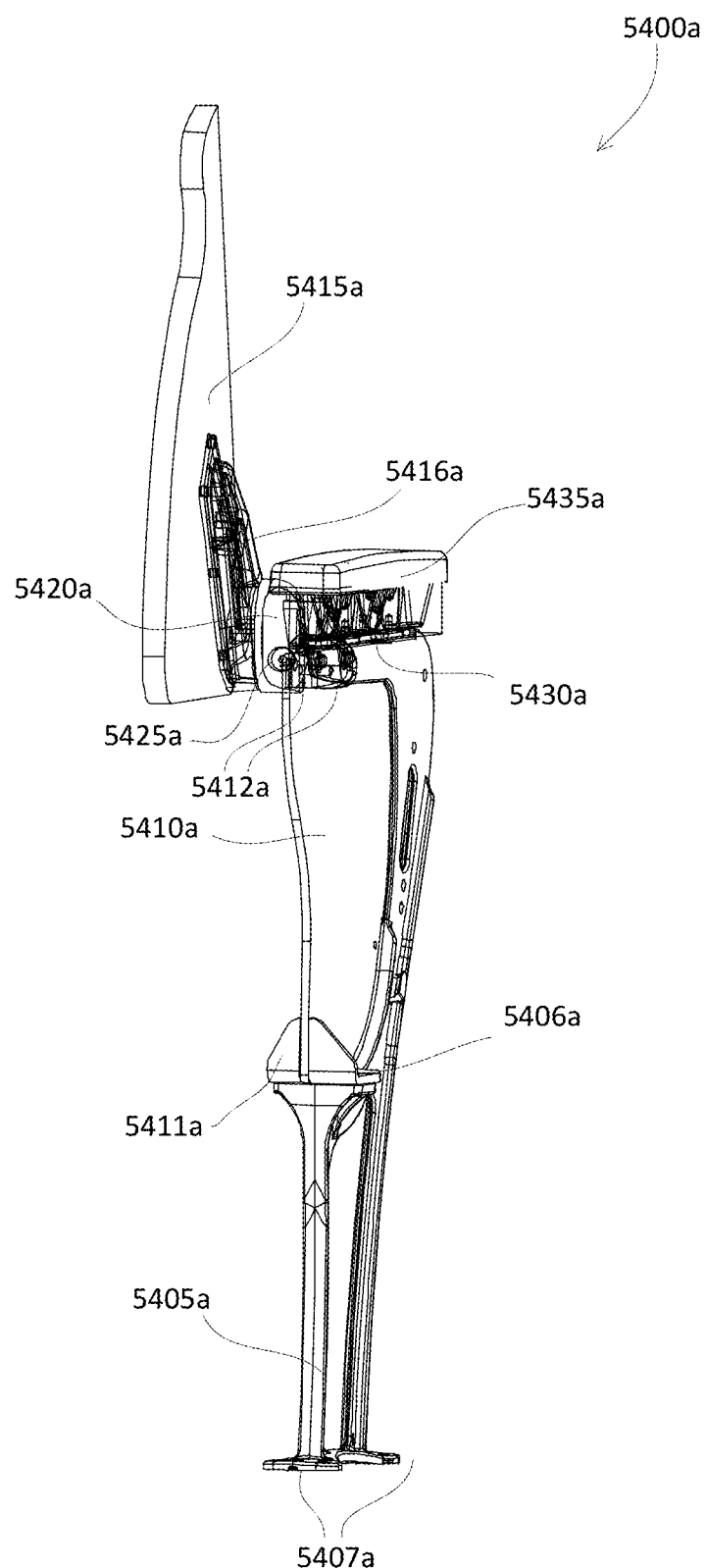
FIGS. 54A-G depict various views of an example foldable tray assembly for use within various rocker style chair assemblies, beam mounted chair assemblies and/or power recliner chair assemblies.
Figure 54B:
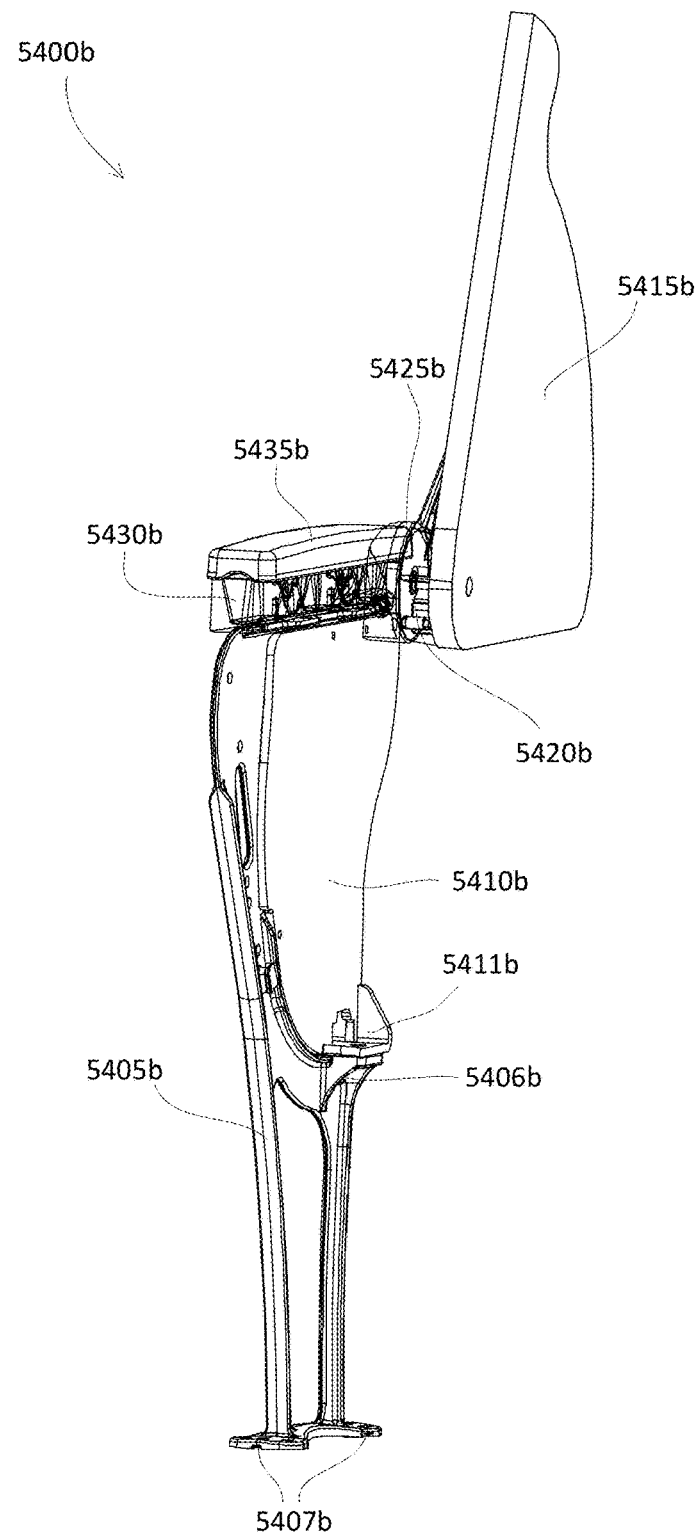
Figure 54C:
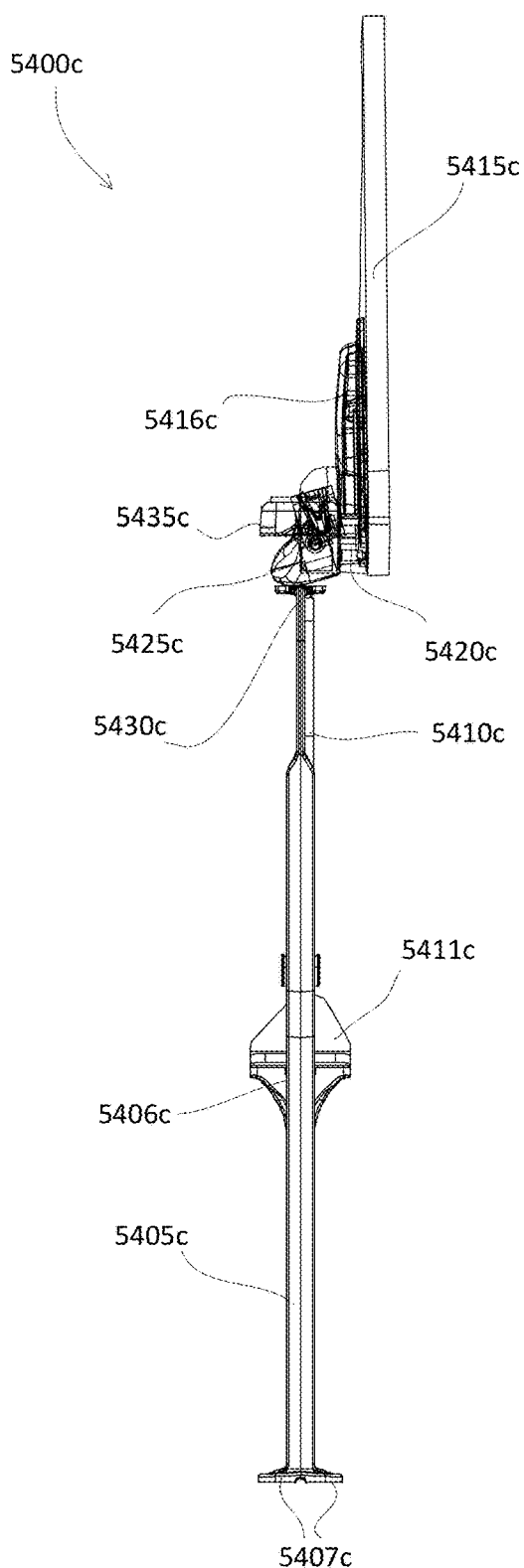
Figure 54D:
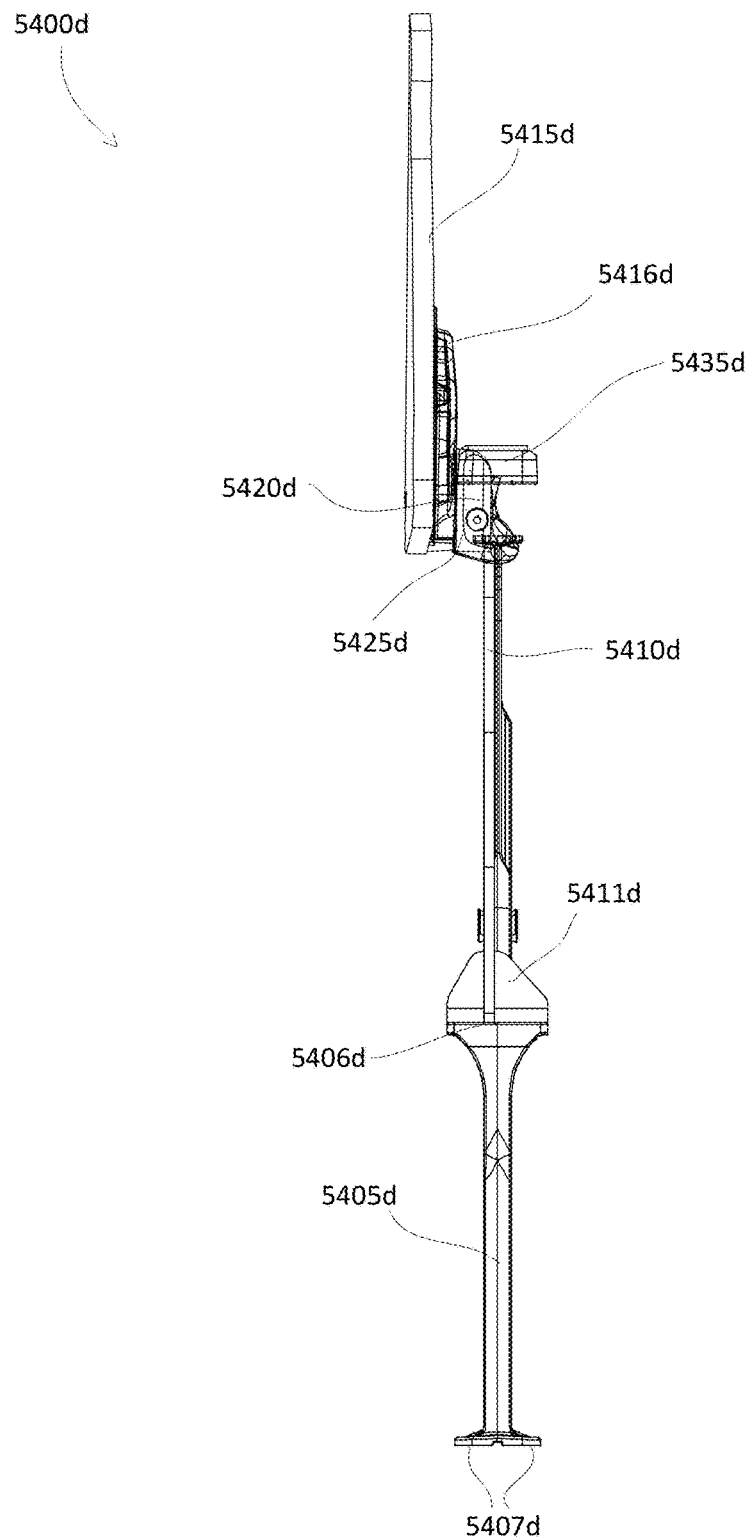

5306*a-d*. The chair assembly 5300*a-e* may also include a folding tray assembly attachment plate 5310*a-e* having a standard connection bracket 5311*a-e* and attachment holes 5312*a-e* configured to attach the folding tray assembly attachment plate 5310*a-e* to the chair standard 5305*a-e*. The chair assembly 5300*a-e* may further include a foldable tray 5315*a-e* pivotally attached to a tray swivel 5320*a-e* via a tray pivot 5325*a-e*. The foldable tray 5315*a-e* may be, for example, configured to pivot between an in use orientation (e.g., an in use orientation as shown in FIG. 53A) and an intermediate orientation (e.g., an in intermediate orientation as shown in FIG. 54A). The tray swivel 5320*a-e* is swively connected to the folding tray assembly attachment plate 5310*a-e*. The foldable tray 5315*a-e* may be, for example, configured to swivel between the intermediate orientation (e.g., an in intermediate orientation as shown in FIG. 54A) and a stowed orientation (e.g., a stowed orientation wherein the foldable tray 5315*a-e* is position alongside the standard 5405*a-e* and/or alongside the folding tray assembly attachment plate 5410*a-e*).

Figure 53C:
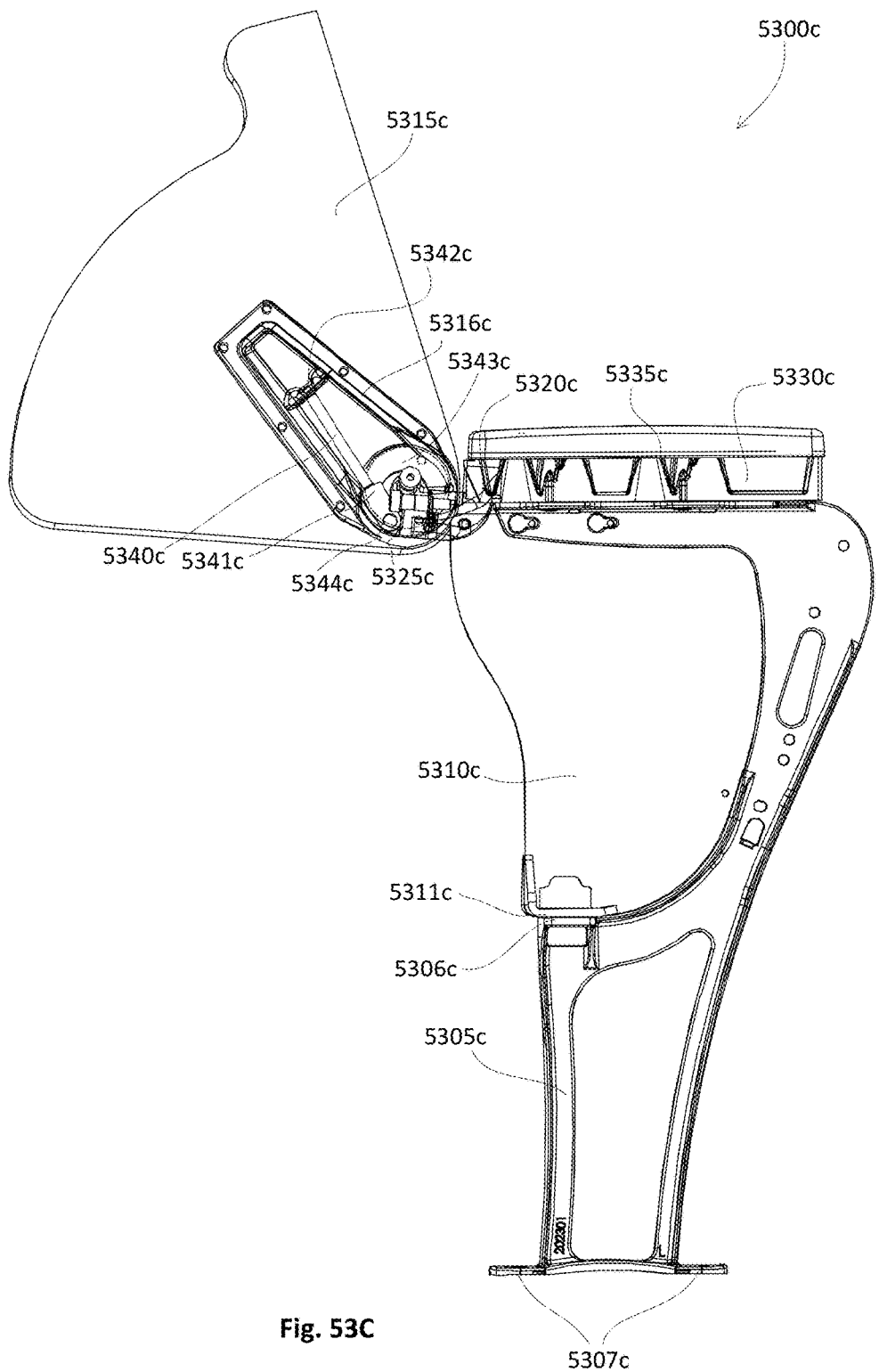
Figure 53D:
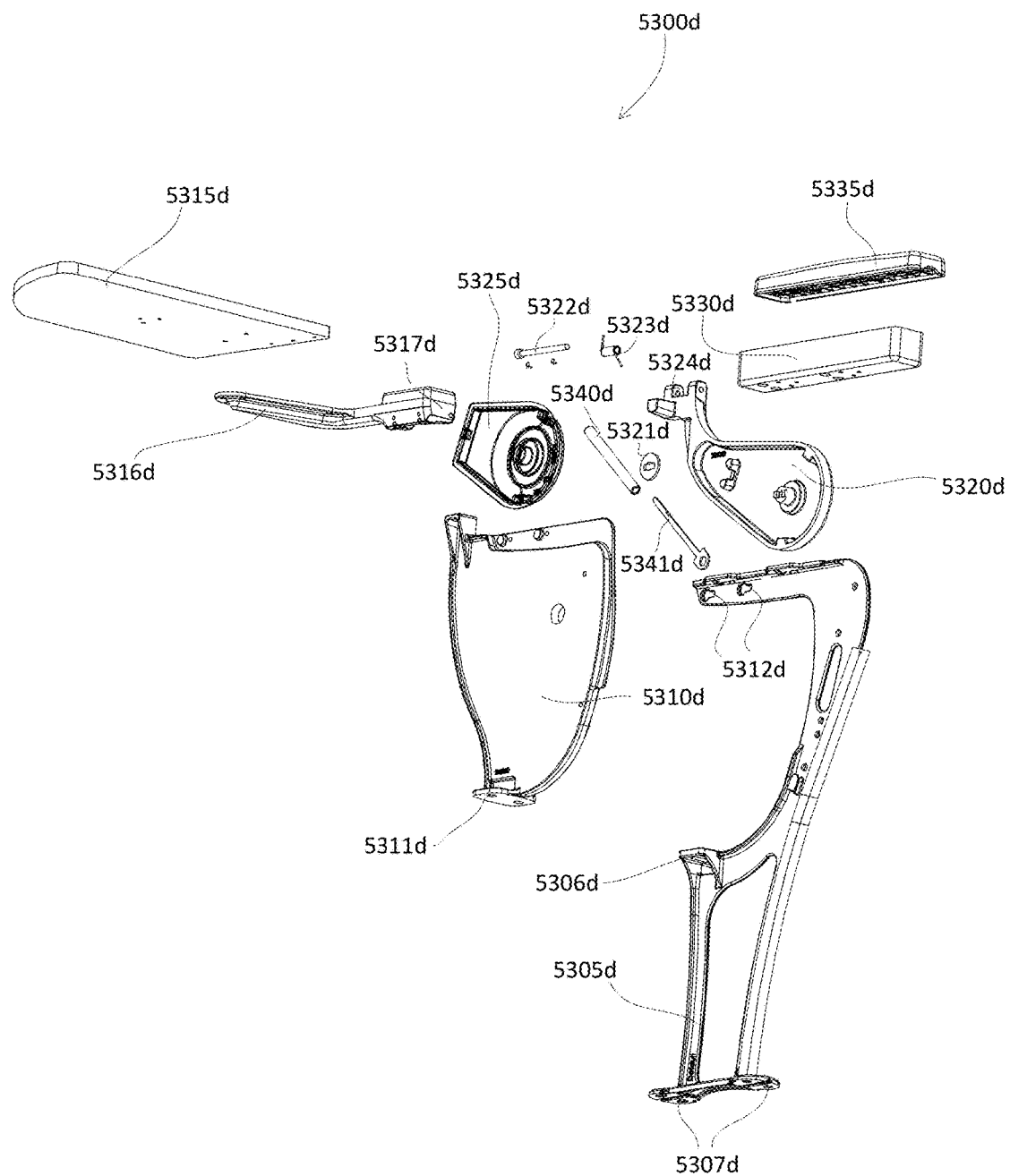
Figure 53E:
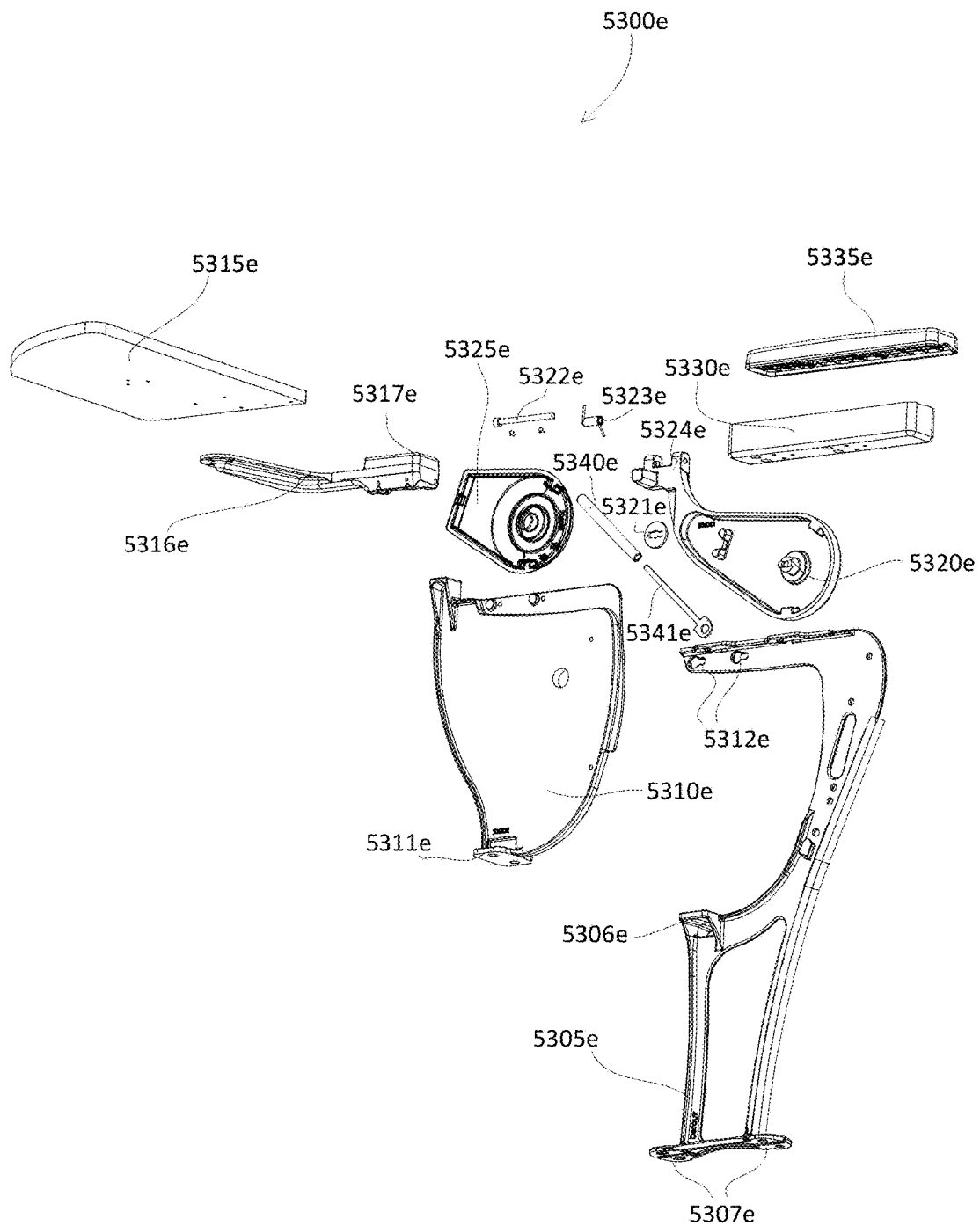

With further reference to FIGS. 53C-53E, the foldable tray 5315*c-e* may be attached to a tray bracket 5316*c-e*. The tray bracket 5316*c-e* may be pivotally connected to the tray swivel 5320*c-e* via a pivot pin 5322*d,e* and pivot 5317*d,e*/5324*e,e*. A tray pivot bias spring 5323*d,e* may be included to bias the tray 5315*a-e* in the intermediate orientation once the tray is manually oriented into the intermediate orientation. The chair assembly 5300*a-e* may further include a tray swivel piston 5340*c-e*/5341*c-e* connected to the tray swivel 5320*c-e* via a keeper 5321*d,e*. The tray swivel piston 5340*c-e*/5341*c-e* may be configured to absorb energy (e.g., absorb energy via a spring 5340*c-e* as the foldable tray 5315*a-e* begins to reorient from the intermediate orientation toward a stowed orientation, and to bias the foldable tray 5315*a-e* in the stowed orientation once the foldable tray 5315*a-e* is nearly in the stowed orientation. As shown in FIG. 53C, a first end 5344*c* of a rod 5341*c* may travel within a channel 5343*c* of the tray swivel 5320*a-e* while the tray swivel 5320*a-e* reorients from the intermediate orientation toward a stowed orientation, and to bias the foldable tray 5315*a-e* in the stowed orientation once the foldable tray 5315*a-e* is nearly in the stowed orientation. Likewise a second end 5342*c* of the rod 5341*c* travels within the spring 5340*c* while the tray swivel 5320*a-e* reorients from the intermediate orientation toward a stowed orientation (charging the spring), and the spring 5340*c* discharges to bias the foldable tray 5315*a-e* in the stowed orientation once the foldable tray 5315*a-e* is nearly in the stowed orientation.

The chair assembly 5300*a-e* may include an armrest 5335*a-e* connected to the standard 5305*a-e* via an arm bracket 5330*a-e*. While a top surface of the foldable tray 5315*a* is shown in FIG. 53A to form a planar relationship with a top surface of the armrest 5335*a-e* when the foldable tray 5315*a-e* is in an in use orientation, the top surface of the foldable tray 5315*a-e* may be located above or below the top surface of the armrest 5335*a-d* by changing a dimension of the armrest 5335*a-e*, the arm bracket 5330*a-e* and/or be altering a shape of the tray swivel 5320*a-e*. For example, the foldable tray 5315*a-e* may be raised to provide a chair occupant more space under the foldable tray 5315*a-e*.

The foldable tray 5315*a-e*, the tray pivot 5325*a-e*, the tray swivel 5320*a-e* and/or the folding tray assembly attachment plate 5310*a-e* may be shipped to a chair assembly 5300*a-e* installation separately from an associated chair standard 5305*a-e*. Thereby, an associated shipping container size may be reduced when compared to a shipping container associated with shipping a complete chair assembly 5300*a-e*.

With reference to FIGS. 54A-G, a chair assembly 5400*a-g* may include a chair standard 5405*a-g* with mounting feet 5407*a-g* and structural reinforcement plate brackets 5406*a-g*. The chair assembly 5400*a-g* may also include a structural reinforcement plate 5410*a-g* having a standard connection bracket 5411*a-g* and attachment holes 5412*a-g* configured to attach the structural reinforcement plate 5410*a-g* to the chair standard 5405*a-g*. The chair assembly 5400*a-g* may further include a foldable tray 5415*a-g* pivotally attached to a tray swivel 5420*a-g* via a tray pivot 5425*a-g*. The foldable tray 5415*a-g* may be, for example, configured to pivot between an in use orientation (e.g., an in use orientation as shown in FIG. 53A) and an intermediate orientation (e.g., an in intermediate orientation as shown in FIG. 54A). The tray swivel 5420*a-g* may be swively connected to the folding tray attachment bracket 5430*a-g*. The foldable tray 5415*a-g* may be, for example, configured to swivel between the intermediate orientation (e.g., an in intermediate orientation as shown in FIG. 54A) and a stowed orientation (e.g., a stowed orientation wherein the foldable tray 5415*a-d* is position alongside the standard 5405*a-d* and/or alongside the folding tray assembly attachment plate 5410*a-d*, or within an arm box when, for example, the folding tray assembly is incorporated within a chair (e.g., a powered recliner chair) having an arm box).

Figure 54E:
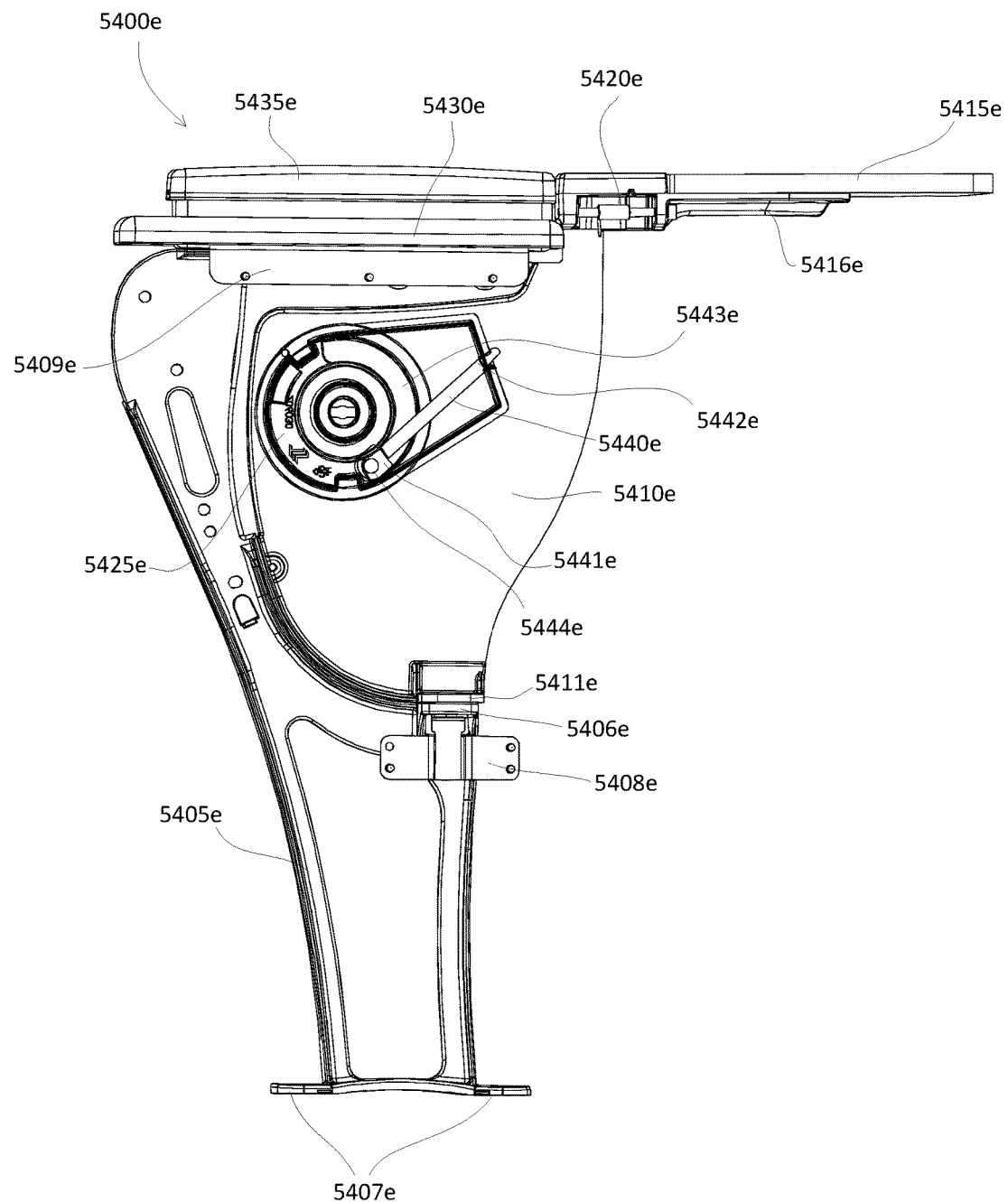
Figure 54F:
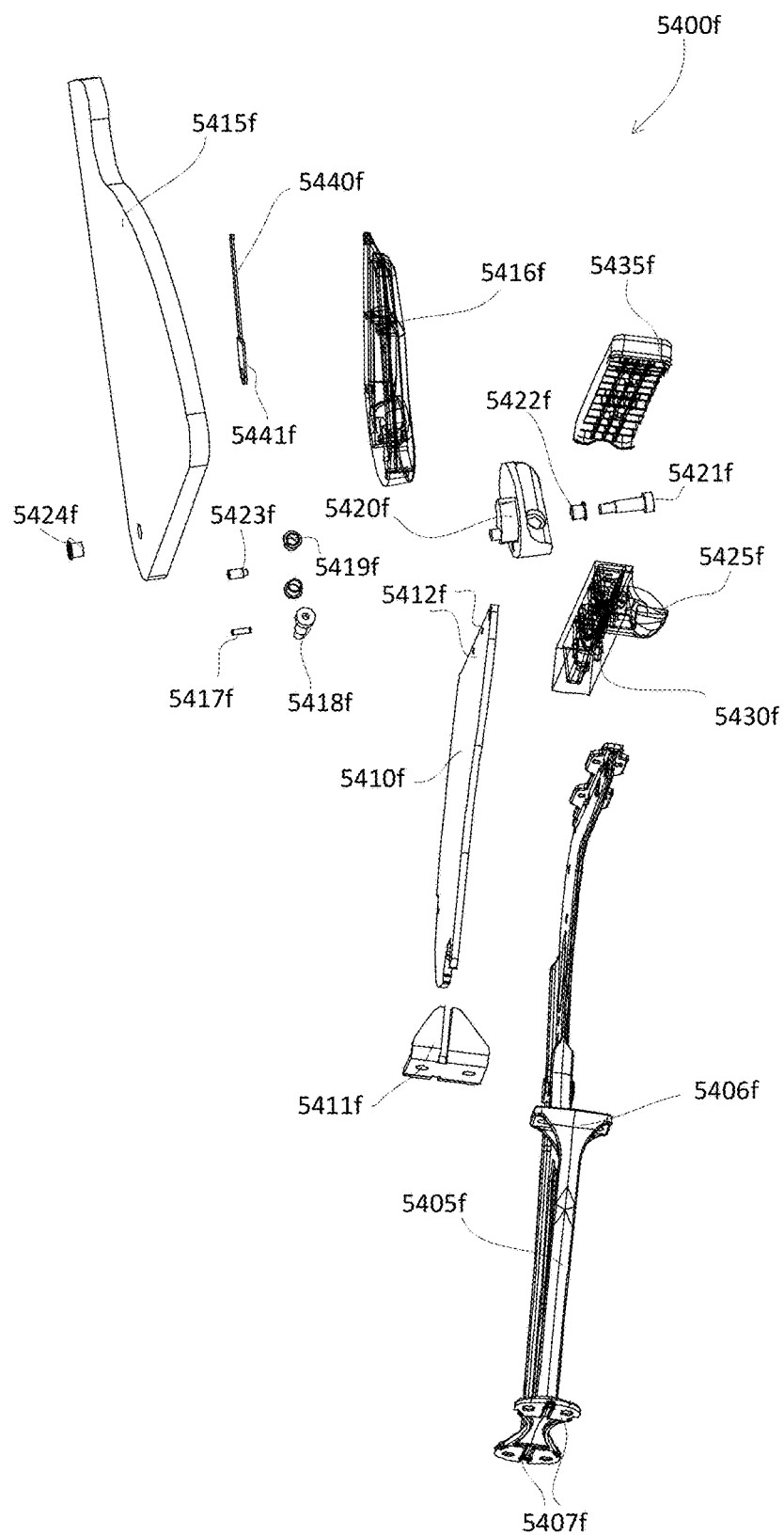
Figure 54G:
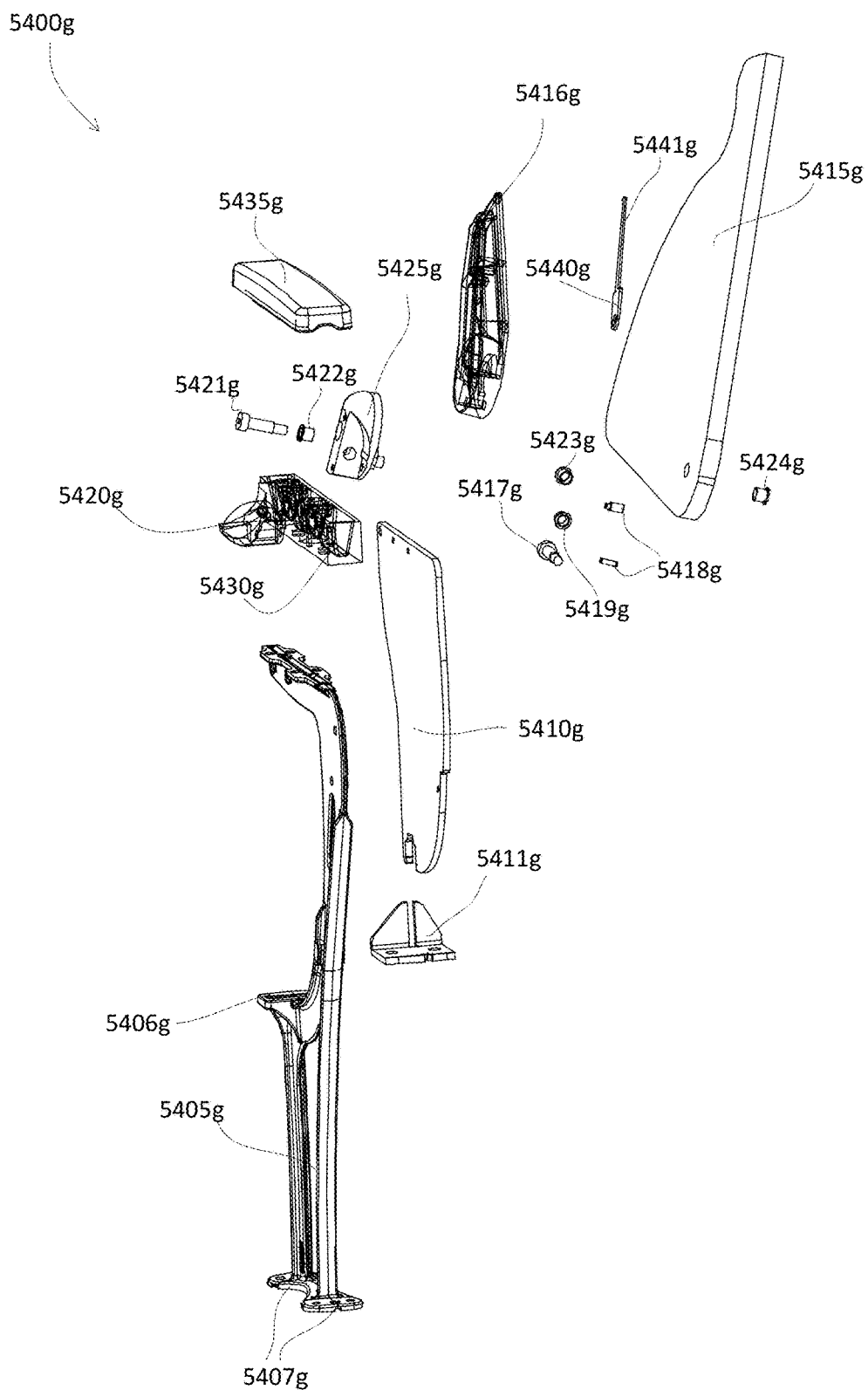

With further reference to FIGS. 54E-54G, the foldable tray 5415*e-g* may be attached to a tray bracket 5416*e-g*. The tray bracket 5416*f,g* may be pivotally connected to the tray swivel 5420*e-g* via a pivot pin 5422*f,g* and pivot 5417*f,g*/5424*f,g*. A tray pivot bias spring 5423*f,g* may be included to bias the tray 5415*a-g* in the intermediate orientation once the tray is manually oriented into the intermediate orientation. The chair assembly 5400*a-g* may further include a tray swivel piston 5440*f,g*/5441*f,g* connected to the tray swivel 5420*f,g* via a keeper 5421*f,g*. The tray swivel piston 5440*f, g*/5441*f,g* may be configured to absorb energy as the foldable tray 5415*a-g* begins to reorient from the intermediate orientation toward a stowed orientation, and to bias the foldable tray 5415*a-g* in the stowed orientation once the foldable tray 5415*a-g* is nearly in the stowed orientation. As shown in FIG. 54F, a first end 5344*f* of a rod 5341*f* may travel within a channel 5343*f* of the tray swivel 5320*a-g* while the tray swivel 5320*a-g* reorients from the intermediate orientation toward a stowed orientation (charging the spring), and the spring 5340*f* discharges to bias the foldable tray 5315*a-g* in the stowed orientation once the foldable tray 5315*a-g* is nearly in the stowed orientation. Likewise a second end 5342*f* of the rod 5341*f* travels within the spring 5340*f* while the tray swivel 5320*a-g* reorients from the intermediate orientation toward a stowed orientation, and to bias the foldable tray 5315*a-g* in the stowed orientation once the foldable tray 5315*a-g* is nearly in the stowed orientation.

The foldable tray 5415*a-g*, the tray pivot 5425*a-g* and/or the tray swivel 5420*a-g* may be shipped to a chair assembly 5400*a-g* installation separately from an associated chair standard 5405*a-g*. Thereby, an associated shipping container size may be reduced when compared to a shipping container associated with shipping a complete chair assembly 5400*a-g*.

The chair assembly 5400*a-g* may include adjustment features 5417*f,g*, 5418*f,g* and 5419*f,g* configured to enable adjustments to compensate for manufacturing dimension variations and/or component wear.

The chair assembly 5400*a-g* may include an armrest 5435*a-g* connected to the standard 5405*a-g* via an arm bracket 5430*a-g*. While a top surface of the foldable tray 5415*a-g* to form a planar relationship with a top surface of the armrest 5435*a-g* (similar to a top surface of foldable tray 5315*a* and top surface of armrest 5335*a* as shown in FIG. 53A) when the foldable tray 5415*a-g* is in an in use orientation, the top surface of the foldable tray 5415*a-g* may be located above or below the top surface of the armrest 5435*a-g* by changing a dimension of the armrest 5435*a-g*, the arm bracket 5430*a-g* and/or be altering a shape of the tray swivel 5420*a-g*. For example, the foldable tray 5415*a-g* may be raised to provide a chair occupant more space under the foldable tray 5415*a-g*.

Any given chair assembly (e.g., an arm box, an arm rest, an ottoman, a chair seat, a chair back, etc.) may include at least on area for a chair occupant to store at least one item (e.g., a purse, gloves, a hat, a scarf, a coat, etc.) without the need to occupy valuable space within an occupant portion of chair seat area of the chair. Alternatively, or additionally, a chair assembly may include a hook, a protrusion, and/or other feature to allow an item to be hung from, for example, a snack tray or an arm box. The feature may be retractable or permanently located. The feature may be part of a snack tray surface, or support structure. Alternatively, or additionally, a hook, protrusion, recess or other feature to allow an item to be hung from or located within an arm box, recliner back or recliner seat. The feature may be: retractable or permanently located; part of or attached to any arm box surface or feature such as but not limited to the forward facing, rearward facing, upward facing or side facing feature; and/or part of cup holder, snack tray, display or other feature permanently or temporarily part of the arm box. A feature may be: enclose or lockable to provide additional security, constructed for internal viewing examples include mesh enclosures of recesses with see-thru materials, include lights or other indicators to inform the patron of the presence of items, and/or may be externally controllable to open to reveal the presence of items. Examples of external control of a feature may include, but are not limited to, ability to be automatically opened when a chair occupant exits the chair, at the end of a performance, and/or from some other remote signal. A recliner seating surface that includes surfaces at a complimentary angle to a chair occupant may include sitting/reclining surfaces that move up or down and/or that rotate to complement an occupant experience. Examples include but are not limited to: an armrest that is lowered so adjacent seating surfaces may be shared, an armrest surface is lowered or raised to facilitate or prevent contact between adjacent patrons, movement of features so cup holder(s), controls, lights, etc. functions are maintained or enhanced by said movement, and/or movement of features to increase patron area. For example, a surface that may include controls, cup holders, purse hooks etc. rotates to provide increase space while still presenting the controls to the patron. The cup holder could rotate independently to still provide a use position. An armrest may raise or lower presenting area(s) of increased space for the patron or their articles. These areas may or may not include any of the enhancements noted above.

Any given chair assembly may include a foot rest on a back of a chair in front of a particular chair and/or a retractable foot rest from a front of the particular chair. Additionally, any given chair assembly may include a powered snack tray in back of chair in front of a particular chair and/or a powered snack tray in a "desk" in front of the particular chair.

Although exemplary embodiments of the invention have been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

What is claimed is:

1. A plurality of electric powered chair assemblies, comprising:
    a first electric powered chair assembly and a second electric powered chair assembly, wherein at least one of the first electric powered chair assembly or the second electric powered chair assembly includes a movable chair seat, and wherein movement of the movable chair seat enables access under a respective one of the first electric powered chair assembly or the second electric powered chair assembly; and
    an electric power supply having an input and an output, wherein the electric power supply is mounted within the first electric powered chair assembly, wherein a first set of electric wiring extends from the output of the electric power supply to a first electric actuator mounted within the first electric powered chair assembly, wherein a second set of electric wiring extends from the output of the electric power supply to a second electric actuator mounted within the second electric powered chair assembly, and wherein a third set of electric wiring extends from the first electric powered chair assembly to the second electric powered chair assembly proximate the second set of electric wiring.

2. The plurality of electric powered chairs of claim 1, wherein the movable chair seat is pivotally attached to the respective one of the first electric powered chair assembly or the second electric powered chair assembly.

3. The plurality of electric powered chairs of claim 1, wherein at least one of the first electric powered chair assembly or the second electric powered chair assembly includes an arm rest pivotally attached to the respective one of the first electric powered chair assembly or the second electric powered chair assembly.

4. The plurality of electric powered chairs of claim 1, further comprising:
    a fourth set of electric wiring extending from the electric power supply to a first illuminated push button located in the first electric powered chair assembly.

5. The plurality of electric powered chairs of claim 1, further comprising:
    a fifth set of electric wiring extending from the electric power supply to a second illuminated pushbutton located in the second electric powered chair assembly.

6. The plurality of electric powered chairs of claim 1, wherein the electric power supply and at least a portion of the first, second and third electric wiring are mounted on either the first electric powered chair assembly of the second electric powered chair assembly behind a removable panel.

7. The plurality of electric powered chairs of claim 1, further comprising:
    a fourth set of electric wiring extending from the output of the electric power supply to a third electric actuator mounted within the second electric powered chair assembly, wherein the second electric actuator is configured to reorient a chair back of the second electric powered chair assembly and the third electric actuator is configured to reorient a chair seat of the second electric powered chair assembly.

8. A plurality of electric powered chair assemblies, comprising:
    a first electric powered chair assembly and a second electric powered chair assembly;

an electric power supply having an input and an output, wherein the electric power supply is mounted within the first electric powered chair assembly, wherein an input voltage rating of the input is higher than an output voltage rating of the output, wherein a first set of electric wiring extends from the output of the electric power supply to a first electric actuator mounted within the first electric powered chair assembly, and wherein a second set of electric wiring extends from the first electric powered chair assembly to the second electric powered chair assembly proximate the first set of electric wiring; and an electrical energy storage device connected to the electric power supply, wherein the electrical energy storage device is configured to provide electric power to at least one of the first actuator or the second actuator.

9. The plurality of electric powered chairs of claim 8, wherein at least one of the first electric powered chair assembly or the second electric powered chair assembly includes a movable chair seat, wherein movement of the movable chair seat enables access under the respective one of the first electric powered chair assembly or the second electric powered chair assembly, and wherein the movable chair seat is pivotally attached to the respective one of the first electric powered chair assembly or the second electric powered chair assembly.

10. The plurality of electric powered chairs of claim 8, wherein at least one of the first electric powered chair assembly or the second electric powered chair assembly includes an arm rest pivotally attached to the respective one of the first electric powered chair assembly or the second electric powered chair assembly.

11. The plurality of electric powered chairs of claim 8, further comprising:
a third set of electric wiring extending from the electric power supply to a first illuminated pushbutton located in the first electric powered chair assembly.

12. The plurality of electric powered chairs of claim 8, further comprising:
a snack tray pivotally attached to at least one of: the first electric powered chair assembly or the second electric powered chair assembly.

13. The plurality of electric powered chairs of claim 8, further comprising:
an energy storage device charger configured to recharge the electric energy storage device.

14. The plurality of electric powered chairs of claim 8, further comprising:
a remote control configured to reorient both the first electric powered chair assembly and the second electric powered chair assembly.

15. A plurality of electric powered chair assemblies, comprising:
a first electric powered chair assembly and a second electric powered chair assembly; and
an electric power supply having an input and an output, wherein the electric power supply is mounted within the first electric powered chair assembly, wherein an input voltage rating of the input is higher than an output voltage rating of the output, wherein a first set of electric wiring extends from the output of the electric power supply to a first electric actuator mounted within the first electric powered chair assembly, wherein a second set of electric wiring extends from the first electric powered chair assembly to the second electric powered chair assembly, and wherein a third set of electric wiring extends from the electric power supply to a first illuminated pushbutton located in the first electric powered chair assembly.

16. The plurality of electric powered chairs of claim 15, wherein at least one of the first electric powered chair assembly or the second electric powered chair assembly includes a movable chair seat, wherein the movable chair seat is pivotally attached to the respective one of the first electric powered chair assembly or the second electric powered chair assembly, wherein movement of the movable chair seat enables access under the respective one of the first electric powered chair assembly or the second electric powered chair assembly, and wherein the movable chair seat is pivotally attached to the respective one of the first electric powered chair assembly or the second electric powered chair assembly.

17. The plurality of electric powered chairs of claim 15, wherein at least one of the first electric powered chair assembly or the second electric powered chair assembly includes an arm rest pivotally attached to the respective one of the first electric powered chair assembly or the second electric powered chair assembly.

18. The plurality of electric powered chairs of claim 15, further comprising:
a chair heater within at least one of: the first electric powered chair assembly or the second electric powered chair assembly.

19. The plurality of electric powered chairs of claim 15, further comprising:
at least one of a number plate or a letter plate attached to at least one of: the first electric powered chair assembly or the second electric powered chair assembly.

20. The plurality of electric powered chairs of claim 15, further comprising:
at least one of chair feet or chair legs, configured within at least one of: the first electric powered chair assembly or the second electric powered chair assembly, to raise the respective one of the first electric powered chair assembly or the second electric powered chair assembly above a floor.

21. A plurality of electric powered chair assemblies, comprising:
a first electric powered chair assembly and a second electric powered chair assembly;
an arm rest pivotally attached to at least one of the first electric powered chair assembly or the second electric powered chair assembly, wherein the arm rest is pivotally attached to the respective one of the first electric powered chair assembly or the second electric powered chair assembly; and
an electric power supply having an input and an output, wherein the electric power supply is mounted within the first electric powered chair assembly, wherein an input voltage rating of the input is higher than an output voltage rating of the output, wherein a first set of electric wiring extends from the output of the electric power supply to a first electric actuator mounted within the first electric powered chair assembly, wherein a second set of electric wiring extends from the first electric powered chair assembly to the second electric powered chair assembly, and wherein a third set of electric wiring extends from the electric power supply to a first illuminated pushbutton located in the first electric powered chair assembly.

22. The plurality of electric powered chairs of claim 21, wherein at least one of the first electric powered chair assembly or the second electric powered chair assembly includes a movable chair seat, wherein movement of the movable chair seat enables access under the respective one of the first electric powered chair assembly or the second electric powered chair assembly, and wherein the movable chair seat is pivotally attached to the respective one of the first electric powered chair assembly or the second electric powered chair assembly.

23. The plurality of electric powered chairs of claim 22, wherein the movable chair seat is pivotally attached to the respective one of the first electric powered chair assembly or the second electric powered chair assembly.

24. The plurality of electric powered chairs of claim 21, further comprising:
an electrical energy storage device connected to the electric power supply, wherein the electrical energy storage device is configured to provide electric power to the first actuator or a second actuator.

25. The plurality of electric powered chairs of claim 24, further comprising:
an energy storage device charger configured to recharge the electric energy storage device.

26. The plurality of electric powered chairs of claim 21, further comprising:
a chair heater within at least one of: the first electric powered chair assembly or the second electric powered chair assembly.

27. The plurality of electric powered chairs of claim 21, further comprising:
at least one of a number plate or a letter plate attached to at least one of: the first electric powered chair assembly or the second electric powered chair assembly.

28. The plurality of electric powered chairs of claim 21, further comprising:
at least one of chair feet or chair legs, configured within at least one of: the first electric powered chair assembly or the second electric powered chair assembly, to raise the respective one of the first electric powered chair assembly or the second electric powered chair assembly above a floor.

29. The plurality of electric powered chairs of claim 21, further comprising:
a fourth set of electric wiring extending from the electric power supply to a second illuminated pushbutton located in the second electric powered chair assembly.

30. The plurality of electric powered chairs of claim 21, wherein the electric power supply and at least a portion of the first and second electric wiring are mounted on the first electric powered chair assembly behind a removable panel.

* * * * *